US008608548B2

(12) United States Patent
Mattice et al.

(10) Patent No.: US 8,608,548 B2
(45) Date of Patent: Dec. 17, 2013

(54) INTELLIGENT WAGERING TOKEN AND WAGERING TOKEN TRACKING TECHNIQUES

(75) Inventors: Harold E. Mattice, Gardnerville, NV (US); Roger William Harris, Reno, NV (US); Timothy W. Moser, Las Vegas, NV (US); Richard J. Schneider, Las Vegas, NV (US)

(73) Assignee: IGT, Las Vegas, NV (US)

( * ) Notice: Subject to any disclaimer, the term of this patent is extended or adjusted under 35 U.S.C. 154(b) by 861 days.

(21) Appl. No.: 12/414,468

(22) Filed: Mar. 30, 2009
(Under 37 CFR 1.47)

(65) Prior Publication Data

US 2010/0093428 A1 Apr. 15, 2010

Related U.S. Application Data

(63) Continuation-in-part of application No. 11/870,249, filed on Oct. 10, 2007, which is a continuation-in-part of application No. 11/565,424, filed on Nov. 30, 2006, which is a continuation-in-part of application No. 10/170,278, filed on Jun. 12, 2002, now Pat. No. 7,311,605, application No. 12/414,468, which is a continuation-in-part of application No. 11/829,028, filed on Jul. 26, 2007, now Pat. No. 8,425,313, which is a continuation of application No. 11/655,496, filed on Jan. 19, 2007, now Pat. No. 8,430,749, which is a continuation-in-part of application No. 11/303,444, filed on Dec. 15, 2005, now abandoned, which is a continuation of application No. 10/170,278, filed on Jun. 12, 2002, now Pat. No. 7,311,605, application No. 12/414,468, which is a continuation-in-part of application No. 11/224,903, filed on Sep. 12, 2005, now Pat. No. 7,938,722.

(60) Provisional application No. 60/858,046, filed on Nov. 10, 2006.

(51) Int. Cl.

| | |
|---|---|
| *A63F 9/24* | (2006.01) |
| *A63F 13/00* | (2006.01) |
| *G06F 17/00* | (2006.01) |

(52) U.S. Cl.
USPC .................. 463/25; 463/29; 463/40; 463/42; 463/43; 463/47

(58) Field of Classification Search
USPC .............................. 463/25, 29, 40, 42–43, 47
See application file for complete search history.

(56) References Cited

U.S. PATENT DOCUMENTS 4,836,553 A 6/1989 Suttle et al.

(Continued)

FOREIGN PATENT DOCUMENTS

| | | |
|---|---|---|
| EP | A-0 999 517 | 5/2000 |
| EP | A-1 936 541 | 6/2008 |

(Continued)

OTHER PUBLICATIONS

US Office Action dated Dec. 22, 2010 issued in U.S. Appl. No. 11/870,233.

(Continued)

*Primary Examiner* — Werner Garner

(74) *Attorney, Agent, or Firm* — Neal, Gerber & Eisenberg LLP

(57) ABSTRACT

Wireless communications among devices in a wager-based gaming environment are provided, including between a number of RFID-enabled player tracking cards (or "smart cards") and an electronic wagering token. The electronic wagering token periodically samples and stores updated information received from the smart cards; periodically acquires updated wagering token ownership information relating to an identity of a current owner of the wagering token, based on the sampled and stored updated information; stores, in a memory of the wagering token, at least a portion of the updated token ownership information; and provides, to at least one external device, wireless access to a first selected portion of the updated token ownership information stored in the memory.

23 Claims, 27 Drawing Sheets

(56) References Cited

U.S. PATENT DOCUMENTS 5,103,081 A 4/1992 Fisher et al.
5,534,917 A 7/1996 MacDougall
5,586,936 A 12/1996 Bennett et al.
5,636,209 A 6/1997 Perlman
5,651,548 A 7/1997 French et al.
5,665,961 A 9/1997 Matzka
5,735,742 A 4/1998 French
5,799,946 A 9/1998 Groussman
5,851,011 A 12/1998 Lott
5,941,769 A 8/1999 Order
5,951,012 A 9/1999 Feola
6,001,016 A 12/1999 Walker et al.
6,077,163 A 6/2000 Walker et al.
6,149,522 A 11/2000 Alcorn et al.
6,186,895 B1 2/2001 Oliver
6,267,671 B1 7/2001 Hogan
6,319,125 B1 11/2001 Acres
6,464,584 B2 10/2002 Oliver
6,620,047 B1 9/2003 Alcorn et al.
6,629,591 B1 * 10/2003 Griswold et al. ............. 194/205
6,645,077 B2 11/2003 Rowe
6,672,589 B1 1/2004 Lemke et al.
6,685,564 B2 2/2004 Oliver
6,685,567 B2 2/2004 Cockerville
6,698,759 B2 3/2004 Webb et al.
6,800,029 B2 10/2004 Rowe et al.
6,804,763 B1 10/2004 Stockdale
6,863,608 B1 3/2005 LeMay et al.
6,923,724 B2 8/2005 Williams
6,962,530 B2 11/2005 Jackson
7,018,291 B1 3/2006 Lemke et al.
7,029,009 B2 4/2006 Grauzer et al.
7,035,276 B2 * 4/2006 Bradford et al. .............. 370/445
7,058,204 B2 6/2006 Hildreth et al.
7,111,141 B2 9/2006 Nelson
7,111,845 B2 9/2006 Walker et al.
7,165,770 B2 1/2007 Snow
7,267,614 B1 * 9/2007 Jorasch et al. .................. 463/25
7,384,339 B2 6/2008 LeMay et al.
7,510,190 B2 3/2009 Snow et al.
7,515,718 B2 4/2009 Nguyen et al.
7,927,212 B2 4/2011 Hedrick et al.
8,016,657 B2 9/2011 Walker et al.
2002/0002076 A1 1/2002 Schneier et al.
2002/0034978 A1 3/2002 Legge et al.
2003/0032474 A1 2/2003 Kaminkow et al.
2003/0036425 A1 2/2003 Kaminkow et al.
2003/0078103 A1 4/2003 LeMay et al.
2003/0148812 A1 8/2003 Paulson
2003/0203756 A1 10/2003 Jackson
2003/0232647 A1 12/2003 Moser
2004/0147314 A1 7/2004 LeMay et al.
2004/0192434 A1 9/2004 Walker et al.
2005/0026680 A1 2/2005 Gururajan et al.
2005/0051955 A1 3/2005 Schubert et al.
2005/0051965 A1 3/2005 Gururajan et al.
2005/0082755 A1 4/2005 Snow
2005/0116020 A1 6/2005 Smolucha et al.
2005/0127606 A1 6/2005 Snow et al.
2005/0192099 A1 9/2005 Nguyen et al.
2005/0242500 A1 11/2005 Downs
2005/0272501 A1 12/2005 Tran et al.
2005/0282622 A1 12/2005 Lindquist
2005/0288083 A1 12/2005 Downs
2006/0036874 A1 2/2006 Cockerville et al.
2006/0040730 A1 2/2006 Walker et al.
2006/0046836 A1 3/2006 Walker et al.
2006/0052109 A1 3/2006 Ashman et al.
2006/0063575 A1 * 3/2006 Gatto et al. ....................... 463/1
2006/0063577 A1 3/2006 Downs et al.
2006/0063586 A1 3/2006 Krenn et al.
2006/0073885 A1 4/2006 Rowe et al.
2006/0076401 A1 4/2006 Frerking
2006/0105836 A1 5/2006 Walker et al.
2006/0121972 A1 6/2006 Walker et al.
2006/0252521 A1 11/2006 Gururajan et al.
2006/0252530 A1 11/2006 Obergerger et al.
2006/0252531 A1 11/2006 Kando et al.
2006/0252554 A1 11/2006 Gururajan et al.
2006/0287045 A1 12/2006 Walker et al.
2006/0287068 A1 12/2006 Walker et al.
2006/0287071 A1 12/2006 Walker et al.
2006/0287961 A1 12/2006 Mori et al.
2007/0004505 A1 1/2007 Walker et al.
2007/0087834 A1 4/2007 Moser
2007/0094721 A1 * 4/2007 Nguyen et al. .................... 726/9
2007/0115125 A1 5/2007 Lyon
2007/0135215 A1 6/2007 Walker et al.
2007/0155483 A1 7/2007 Walker et al.
2007/0243934 A1 10/2007 Little et al.
2007/0243935 A1 10/2007 Huizinga
2007/0254732 A1 11/2007 Walker et al.
2007/0293311 A1 12/2007 Walker et al.
2007/0298873 A1 12/2007 Nguyen et al.
2008/0076506 A1 3/2008 Nguyen et al.
2008/0076572 A1 3/2008 Nguyen et al.
2008/0113772 A1 5/2008 Burrill et al.
2008/0150476 A1 6/2008 Lamothe
2008/0231457 A1 9/2008 Mattice et al.
2008/0300044 A1 * 12/2008 Ohtani ............................ 463/22
2008/0305862 A1 12/2008 Walker et al.
2009/0069090 A1 3/2009 Moser et al.
2009/0093300 A1 4/2009 Lutnick et al.
2009/0124376 A1 * 5/2009 Kelly et al. ..................... 463/29
2009/0131151 A1 5/2009 Harris et al.
2009/0191955 A1 * 7/2009 Seelig et al. .................... 463/25
2009/0253498 A1 10/2009 Wolf et al.
2010/0062854 A1 * 3/2010 Goto et al. ...................... 463/36
2010/0093429 A1 4/2010 Mattice et al.
2010/0210350 A9 8/2010 Walker et al.
2010/0227670 A1 9/2010 Arezina et al.

FOREIGN PATENT DOCUMENTS

WO WO 00/33246 6/2000
WO WO 2005/110564 11/2005
WO WO 2006/090197 8/2006
WO WO 2006/124912 11/2006
WO WO 2007/067213 6/2007
WO WO 2007/133690 11/2007
WO WO 2008/028148 3/2008
WO WO 2008/061001 5/2008
WO WO 2009/061618 5/2009
WO WO 2010/114575 10/2010
WO WO 2010/114576 10/2010

OTHER PUBLICATIONS

US Final Office Action dated Jun. 6, 2011 issued in U.S. Appl. No. 11/870,233.
US Office Action dated Dec. 22, 2010 issued in U.S. Appl. No. 11/870,249.
US Final Office Action dated Jun. 8, 2011 issued in U.S. Appl. No. 11/870,249.
US Office Action dated Jul. 21, 2011 issued in U.S. Appl. No. 12/249,771.
US Office Action dated Sep. 26, 2011 issued in U.S. Appl. No. 12/416,611.
US Office Action dated Sep. 20, 2011 issued in U.S. Appl. No. 12/414,470.
PCT International Search Report and Written Opinion dated Jun. 5, 2008 issued in PCT/US2007/084254.
PCT International Preliminary Report on Patentability and Written Opinion dated May 12, 2009 issued in PCT/US2007/084254.
AU Examiner's first report dated Aug. 8, 2011 from Australian Patent Application No. 2007319422.
PCT International Search Report and Written Opinion dated Jan. 29, 2009 issued in PCT/US2008/080820.
PCT International Preliminary Report on Patentability and Written Opinion dated May 11, 2010 issued in PCT/US2008/080820.
PCT International Search Report dated Dec. 29, 2009 issued in PCT/US2009/057351.

(56) References Cited

OTHER PUBLICATIONS

PCT International Preliminary Report on Patentability and Written Opinion dated Oct. 4, 2011 issued in PCT/US2009/057351.
PCT International Search Report dated Dec. 21, 2009 issued in PCT/US2009/057354.
PCT International Preliminary Report on Patentability and Written Opinion dated Oct. 4, 2011 issued in PCT/US2009/057354.
Gesture Tek, Responsive Media, http://www.gesturetek.com; downloaded and printed on Nov. 20, 2006, 1 page.
Identification Cards—Contactless Integrated Circuit(s) Cards—Proximity Cards—Proximity Cards—//Cartes D'Identification—Cartes a Circuit(s) Integre(s) Sans Contact—Cartes De Proximite—International Standard ISO/I EC, XX, XX, No. 14443-3, Feb. 1, 2001, pp. IVII, 01, XP001146902, paragraph [6.4.3]; figures 9, 11, 56 pages.
Macau Casinos Use RFID to Authenticate Chips, *RFID Journal*, http//www.rfidjournal.com/article/articleprint/2878/-1/1, downloaded and printed Feb. 13, 2007, 2 pages.
Magellan Technology Rolls Out PJM into Casinos Worldwide, Magellan Technology Pty Ltd., Nov. 22, 2006, 2 pages.
MARS External Antenna Types, http://www.magtech.com.au/; downloaded and printed on Feb. 13, 2007, 1 page.
European Office Action for European Application No. 09 792 669.5 dated Mar. 1, 2013.

* cited by examiner

1450

INTELLIGENT WAGERING TOKEN AND WAGERING TOKEN TRACKING TECHNIQUES

RELATED APPLICATION DATA

This application is a continuation-in-part application, pursuant to the provisions of 35 U.S.C. 120, of prior U.S. patent application Ser. No. 11/870,249entitled "AUTOMATED SYSTEM FOR FACILITATING MANAGEMENT OF CASINO GAME TABLE PLAYER RATING INFORMATION" by MOSER et al., filed on Oct. 10, 2007, which claims benefit 35 U.S.C. §119 to U.S. Provisional Application Ser. No. 60/858,046, naming Moser, et al. as inventors, and filed Nov. 10, 2006. Each of these applications is incorporated herein by reference in its entirety for all purposes.

This application is a continuation-in-part application of and claims priority under 35 U.S.C. §120 to commonly owned and co-pending of U.S. patent application Ser. No. 11/565,424, entitled "CASINO PATRON TRACKING AND INFORMATION USE," by Moser et al., and filed on Nov. 30, 2006, which is a continuation-in-part under 35 U.S.C. §120 of commonly owned U.S. patent application Ser. No. 10/170,278, entitled "PLAYER TRACKING ASSEMBLY FOR COMPLETE PATRON TRACKING FOR BOTH GAMING AND NON-GAMING CASINO ACTIVITY," by Moser et al., filed on Jun. 12, 2002. Each of these applications is herein incorporated by reference in its entirety for all purposes.

This application is a continuation-in-part application of and claims priority under 35 U.S.C. §120 to commonly owned and co-pending of U.S. patent application Ser. No. 11/829,028, entitled "DYNAMIC CASINO TRACKING AND OPTIMIZATION," by Nelson et al., and filed on Jul. 26, 2007, which is a continuation of U.S. patent application Ser. No. 11/655,496, filed Jan. 19, 2007 and entitled "DYNAMIC CASINO TRACKING AND OPTIMIZATION" , which is a continuation-in-part of U.S. patent application Ser. No. 11/303,444, filed Dec. 15, 2005 and entitled "PLAYER TRACKING ASSEMBLY FOR COMPLETE PATRON TRACKING FOR BOTH GAMING AND NON-GAMING CASINO ACTIVITY" , which is a continuation of U.S. application Ser. No. 10/170,278, filed Jun. 12, 2002, and entitled the same. Each of these applications is herein incorporated by reference in its entirety for all purposes.

This application is a continuation-in-part application, pursuant to the provisions of 35 U.S.C. 120, of prior U.S. patent application Ser. No. 11/224,903, entitled "ENHANCED GAMING CHIPS AND TABLE GAME SECURITY" by Rowe et al., filed on Sep. 12, 2005, the entirety of which is incorporated herein by reference for all purposes.

BACKGROUND

Various aspects of the present disclosure generally relate to player tracking services and player rating services implemented at live casino gaming environments.

Player tracking programs are offered at gaming establishments for various reasons, including the desire to attain and/or maintain a player's interest in game play. (Although there are many types of gaming establishments, including casinos, cruise ships, riverboats, etc., all types of gaming establishments may be referred to herein as "casinos.")

In general, casino operators have an interest in collecting the information relating to their patrons (e.g., players). Conventionally, such information may include player tracking data relating to individual player activities and/or other characteristics. As an incentive to get players to elect to have their game play activities tracked, casino operators typically offer players membership in player tracking programs which provide various rewards to the players.

Player tracking programs provide rewards to players that typically correspond to the player's level of patronage, e.g., to the player's playing frequency and/or total amount of game plays at a given casino. Player tracking rewards may include free meals, free lodging and/or free entertainment. Some such complimentary rewards are often referred to as "comps." Player tracking rewards may help to sustain a game player's interest in additional game play during a visit to a gaming establishment and may entice a player to visit a gaming establishment to partake in various gaming activities.

Player tracking programs may be applied to any game of chance offered at a gaming establishment. In particular, player tracking programs are very popular with players of mechanical slot gaming machines and video slot gaming machines. In a gaming machine, a player tracking program is implemented using a player tracking unit installed in the gaming machine and in communication with a remote player tracking server.

Presently, casino patron player tracking mechanisms have typically involved the use of individualized player tracking cards (e.g., where a player is assigned a unique player tracking card with unique player tracking ID), which may be used to determine the identity of a player at a given gaming machine or gaming table.

SUMMARY

Various aspects described or referenced herein are directed to different methods, systems, and computer program products for operating an electronic wagering token adapted for use in a betting environment involving placement of wagers during wager-based game play. In at least one embodiment the wagering token comprises: an outer body having a center portion, a rim portion, and a specific monetary denomination and amount designated on an outer surface thereof; a first processor disposed within the outer body; at least one transceiver including a first transceiver disposed within the outer body; at least two antennas disposed within the outer body including a first antenna and a second antenna; a rechargeable, portable power source disposed within the outer body; and a charging circuit disposed within the outer body and electrically coupled to the rechargeable power source, the charging circuit may be operable to recharge the rechargeable power source by distributing power acquired from an external source. In at least one embodiment, the wagering token may be configured or designed as multi-band frequency transceiver device which is operable to transmit and receive wireless signals associated with selected frequency bands of an electromagnetic spectrum. In at least one embodiment, the selected frequency bands of the electromagnetic spectrum may include at least: Low Frequency band signals having an associated frequency range of 30 kHz to 300 kHz, and/or High Frequency band signals having an associated frequency range of 3 MHz to 30 MHz.

In at least one embodiment, the first antenna may be configured as a magnetic energy pickup antenna which is electrically coupled to the charging circuit and operable to receive wireless signals for use in performing magnetic induction. In at least one embodiment, the magnetic energy pickup antenna may further be operable to receive distribution of wireless power provided from the external source.

In at least one embodiment, the wagering token may also include memory disposed within the outer body, and may be operable to: periodically acquire updated signal strength information relating one or more detected wireless signals originating from one or more external devices; store at least a portion of the updated signal strength information in the memory; and provide, to at least one external device, wireless access to a first selected portion of the updated signal strength information stored in the memory.

In at least one embodiment, the wagering token may also include memory disposed within the outer body, and may be operable to: detect wireless signals originating from one or more external devices; acquire external device identifier information relating to identities of one or more external devices which have engaged in wireless communication with the wagering token; store at least a portion of the external device identifier information in the memory; and provide, to at least one external device, wireless access to a first selected portion of the external device identifier information stored in the memory.

In at least one embodiment, the wagering token may also include memory disposed within the outer body, and may be operable to: periodically acquire updated token ownership information relating to an identity of a current owner of the wagering token; store at least a portion of the updated token ownership information in the memory; and provide, to at least one external device, wireless access to a first selected portion of the updated token ownership information stored in the memory.

In at least one embodiment, the wagering token may also include memory disposed within the outer body, and may be operable to: periodically acquire updated token ownership information relating to an identity of a current owner of the wagering token; store at least a portion of the updated token ownership information in the memory, wherein the updated token ownership information includes timestamp data representing at least one first time when the updated token ownership information was acquired by the wagering token; store, in the memory, token ownership history information relating to at least one identity of at least one previous owner of the wagering token, wherein the token ownership information history includes timestamp data representing at least one second time when the previous owner of the wagering token was the owner of the wagering token; provide, to at least one external device, wireless access to a first selected portion of the updated token ownership information stored in the memory; and provide, to at least one external device, wireless access to a first selected portion of the token ownership history information stored in the memory.

In at least one embodiment, the wagering token may be operable to: detect a first event or condition relating to a possible occurrence of a wagering token signal transmission collision; and automatically initiate, at the wagering token and in response to detection of the first event or condition, at least one first action relating to initiation of a first signal collision avoidance procedure at the wagering token.

In at least one embodiment, the wagering token may be operable to: operate in a first operating mode during a first time interval, wherein the first operating mode corresponds to a non-collision avoidance mode of operation; engage in first wireless communication with a first external device during the first time interval, wherein the first wireless communication is performed by the wagering token without use of a wireless signal collision avoidance mechanism; detect a first event or condition relating to a possible occurrence of a wagering token signal transmission collision; automatically initiate, at the wagering token and in response to detection of the first event or condition, at least one first action relating to initiation of a first signal collision avoidance procedure at the wagering token; operate in a second operating mode during a second time interval, wherein the second operating mode corresponds to a collision avoidance mode of operation; and engage in second wireless communication with a second external device during the second time interval, wherein the second wireless communication is performed by the wagering token using a first wireless signal collision avoidance mechanism.

In at least one embodiment, the wagering token may be operable to: provide, during the second time interval, an intentionally delayed answer signal in response to an interrogation signal from an outside RFID source.

In at least one embodiment, the wagering token may be operable to: detect an occurrence of a first event or condition; and automatically disable or deactivate the wagering token from use in wagering activities and wager-based game play activities in response to detecting the first event or condition.

In at least one embodiment, the first antenna may be configured as a magnetic energy pickup antenna which is electrically coupled to the charging circuit and operable to receive wireless signals for use in performing magnetic induction. In some embodiments, the wagering token may be operable to: automatically and dynamically electrically decouple the charging circuit from the rechargeable power source in response to detecting a first event or condition; generate, using the magnetic energy pickup antenna, signal strength information which includes wireless signal voltage data relating to voltage measurements of one or more different wireless signals which are detected by the wagering token; and determine, using the wireless signal voltage data, received signal strength data corresponding to one or more of the different wireless signals detected by the wagering token.

Other aspects described or referenced herein are directed to different methods, systems, and computer program products for implementing wireless communications among devices in a wager-based gaming environment. In at least one embodiment, the wager-based gaming environment may include a first portable electronic smart card device comprising a first outer body having a center portion, a rim portion, and a specific monetary denomination and amount designated on an outer surface thereof; a first processor disposed within the first outer body; at least one transceiver including a first transceiver disposed within the first outer body; at least two antennas disposed within the first outer body including a first antenna and a second antenna; a first rechargeable, portable power source disposed within the first outer body; a first charging circuit disposed within the first outer body and electrically coupled to the first rechargeable power source, the first charging circuit being operable to recharge the first rechargeable power source by distributing power acquired from an external source. In at least one embodiment, the first portable electronic smart card device may be configured or designed as multi-band frequency transceiver device which is operable to transmit and receive wireless signals associated with selected frequency bands of an electromagnetic spectrum. In at least one embodiment, the selected frequency bands of the electromagnetic spectrum may include at least: Low Frequency band signals having an associated frequency range of 30 kHz to 300 kHz, and/or High Frequency band signals having an associated frequency range of 3 MHz to 30 MHz.

In at least one embodiment, the wager-based gaming environment may include a first plurality of electronic wagering tokens each operable to engage in wireless communication with the first portable electronic smart card device. In at least one embodiment, the first portable electronic smart card device may be operable to periodically initiate wireless communication with at least a portion of the first plurality of electronic wagering tokens. In at least one embodiment, the first portable electronic smart card device may be operable to periodically scan for a presence of electronic wagering tokens which are located within a predefined proximity of the first portable electronic smart card device.

In at least one embodiment, the wager-based gaming environment may include a first plurality of electronic wagering tokens each operable to engage in wireless communication with the first portable electronic smart card device. In at least one embodiment, the first portable electronic smart card device may be operable to: periodically scan for a presence of electronic wagering tokens which are located within a predefined proximity of the first portable electronic smart card device; determine an identity of at least one electronic wagering token which is detected to be within the predefined proximity of the first portable electronic smart card device; and provide, to an external device, wagering token inventory information, wherein the wagering token inventory information includes information relating to at least one identity of at least one electronic wagering token which was detected as being located within a predefined proximity of the first portable electronic smart card device during a first time interval.

In at least one embodiment, the first portable electronic smart card device may include memory disposed within the first outer body, and may be further operable to: periodically scan for a presence of electronic wagering tokens which are located within a predefined proximity of the first portable electronic smart card device; determine an identity of at least one electronic wagering token which is detected to be within the predefined proximity of the first portable electronic smart card device; generate wagering token inventory information, wherein the wagering token inventory information includes information relating to at least one identity of at least one electronic wagering token which was detected as being located within a predefined proximity of the first portable electronic smart card device during a first time interval; and store at least a portion of the wagering token inventory information in the memory.

In at least one embodiment, the wager-based gaming environment may include a first plurality of electronic wagering tokens each operable to engage in wireless communication with the first portable electronic smart card device. In at least one embodiment, the first portable electronic smart card device may be operable to: receive data communications from at least one of the first plurality of electronic wagering tokens; and transmit, using the at least one transceiver, at least a portion of the received data communications to the first external device.

In at least one embodiment, the wager-based gaming environment may include a first plurality of electronic wagering tokens each operable to engage in wireless communication with the first portable electronic smart card device. In at least one embodiment, the first portable electronic smart card device may be operable to: receive a first data communication from a first electronic wagering token, wherein the first data communication includes signal strength information relating to at least one wireless signal generated by at least one external device which was detected by the first electronic wagering token during a first time interval; and provide at least a portion of the received signal strength information to a first remote device which is operable to engage in wireless communication with the first portable electronic smart card device.

In at least one embodiment, the wager-based gaming environment may include a first plurality of electronic wagering tokens each operable to engage in wireless communication with the first portable electronic smart card device. In at least one embodiment, the first portable electronic smart card device may be operable to periodically detect and identify electronic wagering tokens which are within possession or control of a first person during a first time interval. In at least one embodiment, the wager-based gaming environment may include a first plurality of electronic wagering tokens each operable to engage in wireless communication with the first portable electronic smart card device. In at least one embodiment, the first portable electronic smart card device may be operable to periodically detect and identify electronic wagering tokens which are detected as being within a given patron's predefined personal space. In at least one embodiment, the first portable electronic smart card device may be operable to: transmit instructions to an identified electronic wagering token for causing a first feature or component to be enabled at the electronic wagering token; and transmit instructions to the identified electronic wagering token for causing the first feature or component to be disabled at the electronic wagering token.

In at least one embodiment, the wager-based gaming environment may include a first plurality of electronic wagering tokens each operable to engage in wireless communication with at least one remote device at the live casino gaming environment. In at least one embodiment, the system may be operable to perform real-time tracking of the first plurality of electronic wagering tokens throughout the live casino gaming environment, including the at least one authorized gaming region and the at least one non-gaming region.

In at least one embodiment, the wager-based gaming environment may include a first plurality of electronic wagering tokens each operable to engage in wireless communication with at least one remote device at the live casino gaming environment. In at least one embodiment, the system may be operable to perform tracking of electronic wagering tokens which are detected as being within possession or control of a first patron during at least one event selected from a group comprising: an event relating to the first patron entering an authorized gaming region of the live casino gaming environment, an event relating to the first patron exiting an authorized gaming region of the live casino gaming environment, an event relating to the first patron initiating start of a first gaming session at a gaming device or gaming table of the live casino gaming environment, an event relating to a location of the first patron being detected as being within a predefined proximity to the gaming device or gaming table of the live casino gaming environment, an event relating to the closing of the first gaming session, and/or an event relating to the location of the first patron being detected as no longer being within the predefined proximity to the gaming device or gaming table.

In at least one embodiment, the wager-based gaming environment may include a first plurality of electronic wagering tokens each operable to engage in wireless communication with at least one remote device at the live casino gaming environment. In at least one embodiment, the system may be operable to: determine an identity of a first patron whose presence is detected at the live casino gaming environment; periodically detect and identify electronic wagering tokens which are within possession or control of the first patron of the live casino gaming environment during at least one time interval; and generate, in response to detecting and identifying a presence of a first electronic wagering token which is determined to be within possession or control of the first patron, token-owner association information which includes information relating to a first ownership association between the first patron and the first electronic wagering token.

Additional objects, features and advantages of the various aspects described or referenced herein will become apparent from the following description of its preferred embodiments, which description should be taken in conjunction with the accompanying drawings.

DESCRIPTION OF EXAMPLE EMBODIMENTS

Figure 1A:
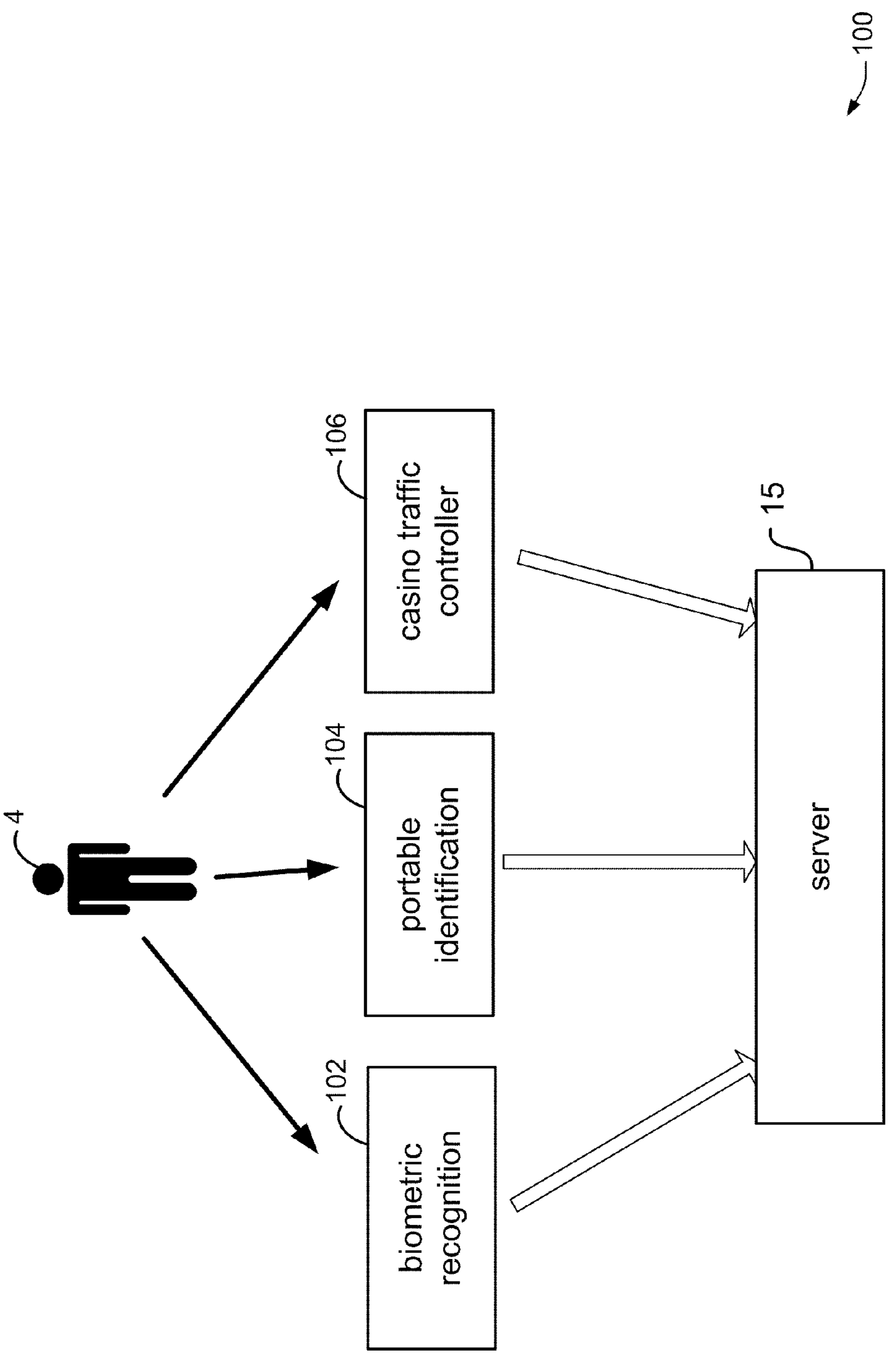
FIG. 1A shows various techniques for at least partially identifying and tracking a casino patron in accordance with specific embodiments of various aspects described or referenced herein.

Various techniques will now be described in detail with reference to a few example embodiments thereof as illustrated in the accompanying drawings. In the following description, numerous specific details are set forth in order to provide a thorough understanding of one or more aspects and/or features described or reference herein. It will be apparent, however, to one skilled in the art, that one or more aspects and/or features described or reference herein may be practiced without some or all of these specific details. In other instances, well known process steps and/or structures have not been described in detail in order to not obscure some of the aspects and/or features described or reference herein.

One or more different inventions may be described in the present application. Further, for one or more of the invention(s) described herein, numerous embodiments may be described in this patent application, and are presented for illustrative purposes only. The described embodiments are not intended to be limiting in any sense. One or more of the invention(s) may be widely applicable to numerous embodiments, as is readily apparent from the disclosure. These embodiments are described in sufficient detail to enable those skilled in the art to practice one or more of the invention(s), and it is to be understood that other embodiments may be utilized and that structural, logical, software, electrical and other changes may be made without departing from the scope of the one or more of the invention(s). Accordingly, those skilled in the art will recognize that the one or more of the invention(s) may be practiced with various modifications and alterations. Particular features of one or more of the invention(s) may be described with reference to one or more particular embodiments or figures that form a part of the present disclosure, and in which are shown, by way of illustration, specific embodiments of one or more of the invention(s). It should be understood, however, that such features are not limited to usage in the one or more particular embodiments or figures with reference to which they are described. The present disclosure is neither a literal description of all embodiments of one or more of the invention(s) nor a listing of features of one or more of the invention(s) that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. To the contrary, a variety of optional components are described to illustrate the wide variety of possible embodiments of one or more of the invention(s).

Further, although process steps, method steps, algorithms or the like may be described in a sequential order, such processes, methods and algorithms may be configured to work in alternate orders. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred.

When a single device or article is described, it will be readily apparent that more than one device/article (whether or not they cooperate) may be used in place of a single device/article. Similarly, where more than one device or article is described (whether or not they cooperate), it will be readily apparent that a single device/article may be used in place of the more than one device or article.

The functionality and/or the features of a device may be alternatively embodied by one or more other devices that are not explicitly described as having such functionality/features. Thus, other embodiments of one or more of the invention(s) need not include the device itself.

Due to their increasing popularity, player tracking cards and player tracking programs have essentially become the de facto marketing method of doing business at casinos. As suggested above, a player's incentive for using the player tracking services is awards provided by the gaming machine operator (e.g., the casino). Some incentives of a casino for providing player tracking services is to generate "brand" loyalty, gather valuable information that may be used for marketing and provide better customer services. This is due to the fact that the programs allow a casino to identify and reward customers based upon their previous game play history. In particular, a goal of the casinos is to identify and then to provide a higher level of service to certain groups of players identified as especially valuable to the casinos.

Gaming establishments are continually searching for new and innovative techniques to track patron activity to improve casino operations and marketing. Thus, while current tracking systems are adequate, they are limited mainly to wagering game play. It would be desirable to provide more versatile player tracking methods and devices.

One aspect disclosed herein is directed to various techniques for identifying and tracking persons in live casino gaming establishments and their behaviors and/or related data. A casino may use one or more different data collection techniques. The behavior data generally refers to the actions and/or preferences of a person in the context of the entertainment resources of a gaming establishment. The behavior data may include, for example, one or more of the following types of data or information (or combinations thereof):

- A person's (e.g., player's) activities and/or movements in the casino.
- How and where casino patrons spend their money.
- The quantity and/or value of money and/or wagering tokens a person possesses when entering a gaming region of the casino.
- The quantity and/or value of money and/or wagering tokens a person possesses when leaving a gaming region of the casino.
- The quantity and/or value of money and/or wagering tokens a person possesses at various times while the person is located in a gaming region of the casino.
- The quantity and/or value of money and/or wagering tokens a person possesses at various times while the person is located in a gaming region of the casino.
- The quantity and/or value of money and/or wagering tokens a person possesses when starting a gaming session at a gaming machine or gaming table.
- The quantity and/or value of money and/or wagering tokens a person possesses when ending a gaming session at a gaming machine or gaming table.
- A patron's gaming activities and/or preferences such as, for example: the types and duration of games played by the player, the time and frequency of play, patterns of betting or wagering, casino service(s) used or requested by the patron, commonalities between demographic groups, etc.
- Etc.

In at least one embodiment, portions of the above-described data and/or other data may be used by a casino operator (and/or may be used by various types of data analysis systems within the casino) to estimate the value of the patron as a customer.

According to different embodiments, a player's behavior data may be acquired from a variety of different sources, such as, for example, prior game interaction, player tracking systems, wagering token tracking systems, demographic sources, marketing information, combinations thereof, etc. Other information sources may be also used. Tracking may occur repeatedly over time for new and existing patrons.

In one embodiment, behavior data may include historical game play data collected from gaming machines and other wagering entertainment resources such as card tables. Historical game play data may include any information associated with a previous game interaction, such as what games a person played in the past, when they played, and betting history. Gaming machines may store this information as a person plays; a camera on the gaming machine allows any player in front of the gaming machine to be identified using facial recognition techniques for example. A communications link between the gaming machine and a central server allows the historical game play data to be automatically and centrally stored and assigned to that person or that person's demographic group(s).

Player tracking systems represent a continuous source for behavior data such as prior game interaction and demographic information. The player tracking systems often gather personal information when the person signs up for player tracking, and collect historical game play data, over time, at gaming machines that the person plays. These systems allow a player to be identified at a gaming system, track games and wagering activities performed by the player, and gather other information related to player's activities. Players agree to have their game play tracked by a tracking system in exchange for perceived added value in the form of rewards or other services offered by a casino. The player tracking systems also collect service preference data for a person.

Marketing information obtained by businesses associated with a casino represents another suitable source of personal information. Such marketing information is commonly provided with tour groups, trade shows (e.g., a Science Fiction or computer industry convention attending a Las Vegas hotel for a few days), and other temporary visitors to a city or casino. In addition, gaming information may be obtained by a personal questionnaire. The questionnaire may be acquired via paper, telephone, web-based, etc. A person when signing up for a room at a casino/hotel may fill out a paper questionnaire.

FIG. 1A shows various example techniques which may be used in a casino gaming establishment for at least partially identifying a person located within the casino.

In one embodiment, patron identification may employ the use of biometric recognition 102. Biometrics uses biological information to establish and verify identity of a person; the basic idea behind biometrics is that each person's body contains unique properties that can be used to distinguish the person from others. 'Biometric data' refers to data used to identify a person based on a person's physical trait or behavioral characteristics. 'Biometric identification' refers to the process of identifying of a person based on his or her biometric data. Fingerprint identification is one example of biometric identification, and may be implemented with an optical scanner and fingerprint software installed on a gaming machine. Facial recognition, retina scans, hand-written signatures, voice patterns and/or palm prints are also suitable for use herein.

For example, in one embodiment, facial recognition may be implemented using a camera on a gaming machine, and/or any other camera in a casino, and allows identification without the user or casino operator performing any initiating action. Facial recognition is also well suited for both full identification (e.g., uniquely identifying a person) or partial identification (e.g., identifying a person as part of an age demographic group). Other forms of biometric authentication 102 are suitable for use herein.

Biometric patron tracking 102 may be employed by patron tracking as described herein in unique ways. For example, in a specific embodiment, it is used to authenticate a user of a mobile gaming device. This acts as a policing mechanism to prevent unauthorized gaming on the mobile device. A gaming machine may also have a "Play" button programmed to read thumb or finger prints, which provides for unobtrusive patron tracking. Patron tracking via facial recognition may also be implemented using security cameras in a casino or cameras embedded in gaming machines. This provides an unobtrusive way to identify high rollers and potential security risks, for example. Biometric patron tracking could also be used to track patrons that do not like to register for patron tracking cards. In other embodiments, biometric patron identification and/or tracking may be used to create associations between an identified patron and one or more wagering tokens (e.g., one or more intelligent wagering tokens, as described herein) which are determined to be within the possession or control of the identified patron.

In some embodiments, patrons may also carry personal identification devices. For example, a casino patron may carry a portable gaming instrument 104, which, for example, may refer to any portable device used in a casino that is able to facilitate identification of a person. This may include, for example, a paper ticket or voucher, a smart card, intelligent wagering tokens, portable gaming devices, PDAs, cell phones, credit or debit cards, player tracking cards, RFID identification tags (e.g., which are located on one or more items carried by the person), etc.

Figure 11:
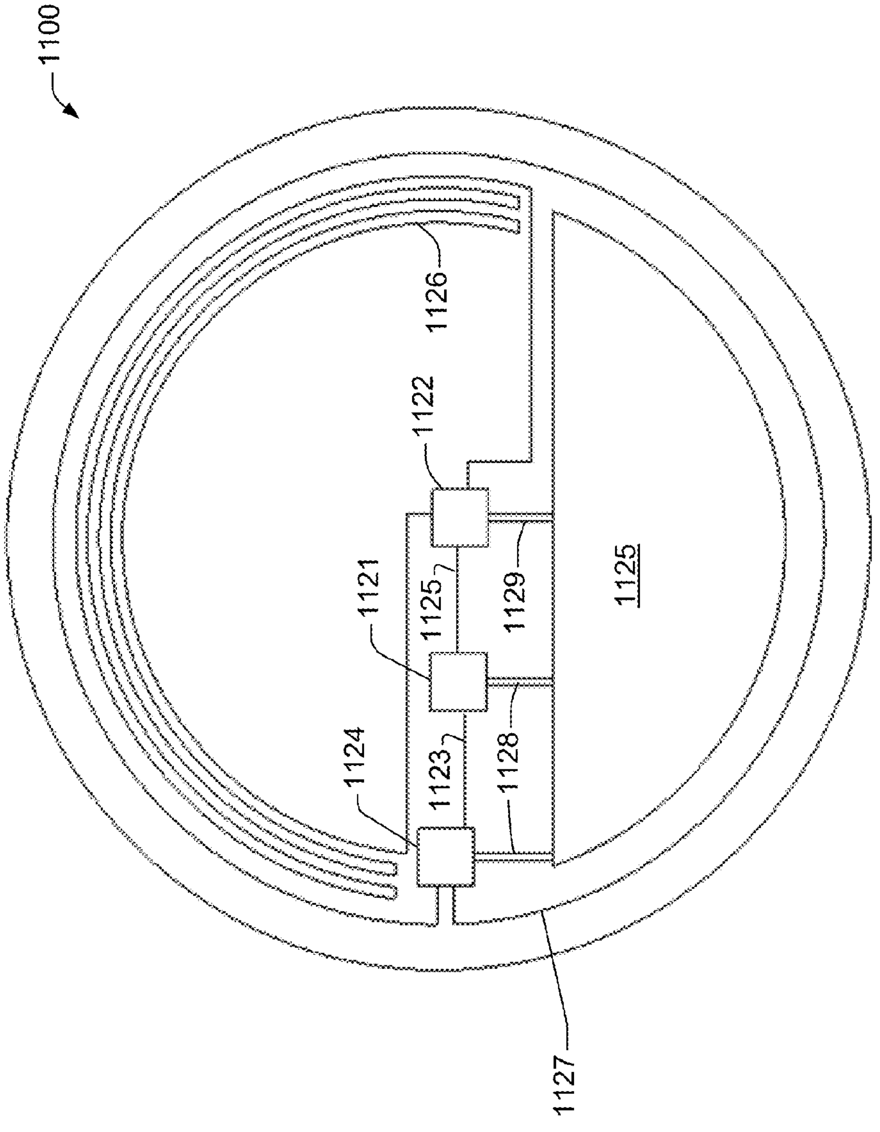
FIG. 11 shows a block diagram of another example embodiment of an intelligent wagering token 1100.

One example embodiment of an intelligent wagering token is illustrated and described with respect to FIG. 11 of the drawings. In other embodiments, an intelligent wagering token may be defined to include any type of casino wagering token (or betting chip) which includes electronic circuitry for engaging in wireless data communication with one or more external devices. Various example embodiments of intelligent wagering tokens are described, for example, in U.S. patent application Ser. No. 11/838,551, entitled "GAMING TOKEN HAVING A VARIABLE VALUE", by Jorasch et al., filed on Aug. 14, 2007, the entirety of which is incorporated herein by reference for all purposes.

For example, in one embodiment, portable instrument 104 can be a player-tracking card or paper ticket that partially or fully identifies the person carrying the instrument 104. In this case, a gaming machine 2 is equipped with a reader that allows players to insert their portable device into gaming machine 2 to be read before or during game play. Exemplary printed credit devices include printed-paper tickets and printed plastic cards. Plastic cards including a magnetic strip that stores information are also suitable for use herein. Some casinos issue player identification or player tracking cards that furnish a person awards for frequent patronage. Before beginning play, a player presents the card to a magnetic card reader that communicates with the gaming machine. The reader detects the card, and software on the gaming machine or network notes the card value and person. A person may carry the portable gaming instrument until redemption at a gaming machine, cash-out station or another location in a gaming establishment that redeems portable credit devices.

In one embodiment, portable instrument 104 uses wireless technology to communicate with various components, devices, and/or systems of the casino gaming network such as, for example, data collection unit(s) (DCUs) 37, player tracking/accounting server(s) 15, wagering token tracking/analysis system(s) 17, RFID transceivers, wireless communication components (e.g., located at one or more gaming machines, kiosks, etc.), etc. In one embodiment, portable instrument 104 may be configured or designed to perform wireless communication using RFID technology.

According to different embodiments, the portable gaming instrument 104 may fully or partially identify the person carrying the instrument 104. For example, in one embodiment, a player tracking card may include information which may be used to fully identify the person in possession of the card.

In some embodiments, a casino traffic controller 106 may also at least partially identify the person. In some embodiments, the casino traffic controller may be implemented as an automated mechanism which includes sufficient processing and analysis capabilities to make real time decisions based upon past and/or currently available (e.g., real time) input data. In other embodiments, the casino traffic controller may correspond to a human operator. For example, in one embodiment, one or more cameras in the casino may be positioned to monitor locations in the casino. The human casino traffic controller watches one or more of these locations on a video screen and makes real-time decisions for offerings based on what the video screen displays. Thus, the video screen may display a group of young men walking through the casino. In response, the casino traffic controller may offer advertisements on nearby video screens 9 according to their demographic status. In at least some embodiments, the casino traffic controller 106 may automatically identify and/or recognize a high roller and offer advertisements on nearby video screens 9 according to a high-income demographic status.

In at least one embodiment, one or more tracking systems may be provided for tracking patrons and/or patron activities in a casino gaming establishment having gaming sections and non-gaming sections. Further, in at least some embodiments, one or more tracking systems may also be provided for tracking the presence, identities, locations and/or movements of casino wagering tokens (also referred to as "gaming chips" or "betting chips") in a casino gaming establishment having gaming sections and non-gaming sections.

In one embodiment, a robust casino tracking system may be configured or designed to use player tracking cards, intelligent wagering tokens, and/or other portable devices adapted for distribution to patrons.

For example, in at least one embodiment, a player tracking card may be configured or designed to include a unique ID which may be associated with a specific patron or player and/or associated with (or linked to) one or more of the player's accounts such as, for example, a credit account, financial account, player tracking account, customer loyalty account, etc.

In at least one embodiment, the casino tracking system may include a plurality of gaming activity player tracking units positioned in one or more gaming sections of a casino proximate the gaming activity. In at least one embodiment, the activity player tracking units cooperate with the player tracking cards to monitor gaming activity data of a respective customer.

Non-gaming activity player tracking units may also be positioned about the casino in its non-gaming sections, and cooperate with the a player's player tracking card (and/or one or more of the player's intelligent wagering tokens) to monitor non-gaming data, such as, for example, non-gaming activity data relating to the player.

In at least one embodiment, various tracking units may be configured for placement proximate the entrances and exits of selected, respective gaming and non-gaming sections of the casino establishment. Thus, for example, in one embodiment, a non-gaming tracking unit may be configured or designed to detect the presence of patrons entering and/or exiting various non-gaming sections of the casino, such as a casino restaurant, a casino shop, a casino theater, a casino bar or a casino showroom, etc.

In at least one embodiment, the casino gaming establishment may provide a local casino gaming network which, for example, may include a computer system or server system which includes a database of the respective customer accounts associated with selected patrons. In at least one embodiment, tracking units deployed in both the gaming and non-gaming regions of the casino may be communicatively coupled to the computer system. In one embodiment, the computer system may be configured or designed to concurrently process (e.g., in real time) respective gaming activity data and/or non-gaming data relating to different patrons who have been detected and/or identified in the casino. In addition, patron movements throughout the casino establishment may be monitored and analyzed.

In at least one embodiment, at least a portion of tracking units deployed in the gaming and/or non-gaming regions of the casino may each include a wireless interface configured to detect and report (e.g., to selected devices/system of the casino network) the presence of a electronic media (e.g., player tracking cards, intelligent wagering tokens, etc.) in the local vicinity. According to specific embodiments, the tracking units may be configured or designed to report in real-time, at periodic intervals, upon the occurrence of specific conditions or events, and/or upon request.

In at least one embodiment, various tracking and real-time servicing techniques described herein may be utilized to enable a casino or other gaming establishment to dynamically tailor the provision and advertisement of entertainment resources to one or more people in a casino. For example, a casino traffic controller or automated central server may partially or fully identify a person when he enters or as he walks into or through a casino, and dynamically offer games, services and other entertainment resources to the person based on the person's identification and/or other tracked information associated with that person.

In at least one embodiment, partial identification means the person has not been uniquely identified, and may be based on commonalities between people (e.g., they are all part of a tour group or common convention staying at a casino/hotel) or based on demographics such as age, sex, etc. For example, previous offerings to people of a given demographic group may be used to determine what to offer a person who has only been partially identified in that demographic.

Many different player identification techniques are suitable for use herein. For example, facial recognition using cameras in a casino may be used to identify people in real time as they enter, exit and/or move about various regions of the casino. Player tracking cards allow historical game play data to be collected with high detail. Other identification techniques include those which are expressly described reference herein, as well as other identification techniques commonly known to one having ordinary skill in the art.

In one embodiment, the casino tracking system may be configured or designed to track various types of real time information relating to people, wagering tokens, and/or entertainment resources (e.g., gaming machines, video displays, mobile devices, etc.) in a casino. In at least one embodiment, such information may be analyzed, for example, in order to identify various statistical trends and/or patterns relating to various types of patron characteristics. In at least one embodiment, such information may be used to generate patron-specific profiles and/or for generating tailored offerings and/or promotions to selected casino patrons. In one embodiment, patron identification and data collection are automatically implemented, which allows high throughput casinos to collect data on hundreds or thousands of people on a daily basis.

According to specific embodiments, the tracking of people, wagering tokens, and/or entertainment resources may employ various types of wireless techniques. For example, in one embodiment, a tracking system may utilize a wireless communication mechanism such as RFID to passively track a patron's movements and/or activities throughout the casino. In some embodiments, the system may also be configured or designed to passively track the quantity and/or value of casino wagering tokens which are in possession or control of a given patron at various times. The tracking system may also be configured or designed to record what the patron did at stop points along a journey in the casino.

In at least one embodiment, when such tracking and data collection occurs for numerous people, the tracking system may accumulate a variety of patron-specific data that is useful for helping a casino provide tailored offerings to a patron. This also helps a casino service numerous patrons on a macro scale by providing the casino with detailed information on usage patterns, which is valuable when determining how to increase the layout efficiency of gaming machines and other entertainment resources in the casino. Thus, for example, on a macro level, patron tracking may be used to improve or optimize entertainment resources in a casino via an empirical understanding of patron behavior relative to the layout of entertainment resources. As a result, gaming machines, card tables and other entertainment resources may be moved based on the accurate data collection.

Proximity tracking may also be implemented. For example, in one embodiment an automated promotion system, in communication with the tracking system, may make real-time decisions regarding selection of tailored games and/or services which may be displayed or offered in a targeted location based on the identification or demographic status of one or more people in the targeted location. For example, gaming machines may display a game based upon information received from a server concerning the proximity of a detected high roller, or the demographic status of a patron who is within the proximity of a gaming machine or video screen. A small group of people may similarly be identified and serviced according to their common demographic status and proximity to known casino entertainment resources.

In another example, information relating to the quantity and/or value of casino wagering tokens which are currently in possession or control of a given patron may be used to present specifically selected promotional and/or tailored offerings to that patron. Examples of such promotional and/or tailored offerings may include, for example, game theme offerings, game type offerings, denomination offerings, paytable offerings, etc.

This methodology may also be used to promote other offerings and attract third party advertisers. For example, local shows and concerts in a city may advertise in real time within the casino to specifically targeted patrons or groups of patrons, for example, as such patrons are identified in real time at various different locations of the casino. The casino may charge for this advertising service, which provides another revenue stream for the casino.

Figure 1B:
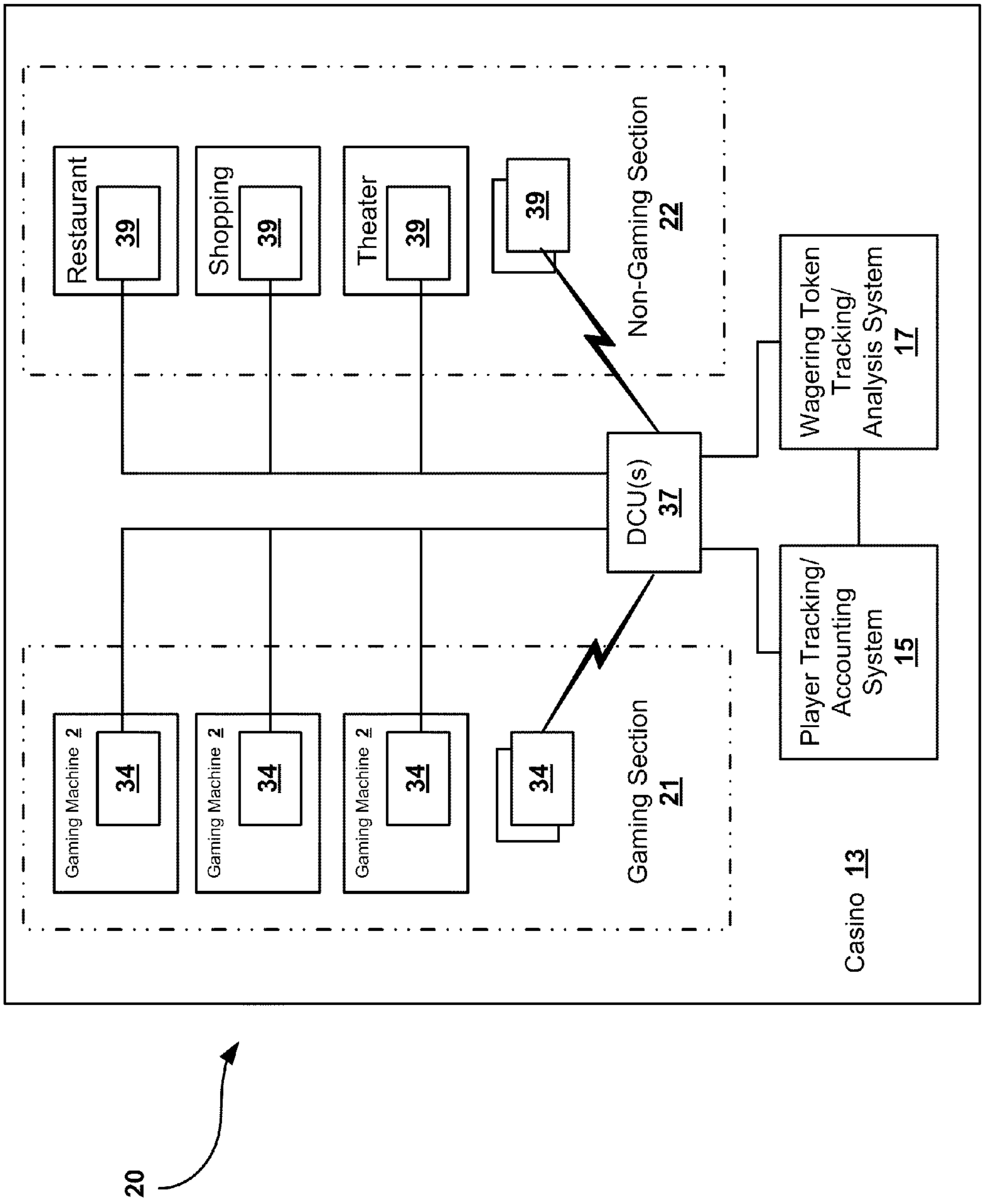
FIG. 1B shows an example embodiment of a player tracking system for tracking customer activity and/or customer-related data in a casino establishment having gaming sections and non-gaming sections.

FIG. 1B shows an example embodiment of a casino tracking system 20. In at least one embodiment, tracking system 20 may be configured or designed to track (e.g., in real time) information relating to identities, relative locations, and/or activities relating to various entities such as, for example: patrons, security, casino employees, intelligent wagering tokens, player tracking devices, etc.

As illustrated in the example of FIG. 1B, casino establishment 13 includes gaming sections 21 and non-gaming sections 22. In at least one embodiment tracking system 20 is operable to track player and/or intelligent wagering token movements (and/or other associated activities) in both gaming sections 21 and non-gaming sections 22.

In one embodiment, the tracking system 20 includes a plurality of different tracking identification devices (e.g., 104, FIG. 1A) adapted for distribution to casino patrons. Examples of different tracking identification devices may include, for example, a paper ticket or voucher, a smart card, intelligent wagering tokens, portable gaming devices, PDAs, cell phones, credit or debit cards, player tracking cards, RFID identification tags (e.g., which are located on one or more items carried by the person), etc.

In at least one embodiment, each tracking device has associated therewith a unique identifier for allowing each tracking device to be uniquely identified by the tracking system. In at least one embodiment, the system 20 further includes a plurality of tracking units 34 positioned in one or more gaming sections 21 of the casino establishment 13. These tracking units 34 cooperate with the tracking identification devices to facilitate monitoring and/or tracking of various information relating to identities, relative locations, and/or activities of persons and/or tracking devices.

In at least one embodiment, a plurality of non-gaming tracking units 39 are also positioned about the casino establishment 26 in one or more non-gaming section(s) 22. At least a portion of the non-gaming tracking units 39 which cooperate with the tracking identification devices to facilitate monitoring and/or tracking of various information relating to identities, relative locations, and/or activities of persons and/or tracking devices.

According to specific embodiments, the casino tracking system 20 may include player tracking/accounting system 15, and/or a wager token tracking system 17. In one embodiment, the tracking system 20 includes one or more databases such as, for example, at least one database of customer accounts associated with respective customer IDs, at least one database which includes information relating to associations between various different customer IDs and tracking device IDs, etc. In at least one embodiment (not shown), player tracking/accounting system 15 and wager token tracking system 17 may be implemented as a single or unified system.

In at least one embodiment, at least a portion of the gaming-region tracking units 34 and non-gaming region tracking units 39 may be communicatively coupled to player tracking system 15 and/or wagering token tracking system 17.

Tracking system 20 enables a casino to monitor both gaming activity and non-gaming activity. For example, the non-gaming tracking units 39 can be adapted to monitor the entrance and/or the exit of the patron in a non-gaming section 22 of the casino. One form of non-gaming activity monitoring may include the tracking of patron and/or intelligent wagering token movements throughout the establishment in non-gaming avenues of a casino such as, for example, theater, shopping, restaurants, pool, etc.

For example, in one embodiment, a casino patron may be in possession of an intelligent wagering token, which the patron carries in his or her pocket. In one embodiment, this intelligent wagering token may be linked to or associated with a given patron or customer ID. By recording the time of entrance and exit of the intelligent wagering token in a particular store or restaurant, the casino can monitor and analyze the patron's tendency to shop particular stores or frequent particular restaurants. Using the combined gaming activity data and non-gaming activity data, promotions and customer service programs can be more customized toward a respective customer, which enables a casino to better tailor advertisements and promotional awards to the customer based upon their past behaviors in the casino at both gaming and non-gaming activities.

By way of example, if the non-gaming activity data revealed that a particular patron frequently visited one of the many casino restaurants or shops more than another, future targeted promotions may advertise that restaurant to the patron to entice future patronage. Moreover, other promotions relating to other casino restaurants or stores may also be directed towards the patron to entice patronage.

In addition, at least a portion of the non-gaming tracking information which has been collected by the casino tracking system 20 may also be assigned to one or more demographic groups to help service other persons identified as belonging to such demographic groups. For example, in one embodiment, using the information from the casino tracking system, casino personnel may better estimate, for example:

- a total value of wagering tokens which is possessed by a patron (e.g., of a particular demographic) when entering a gaming region of the casino;
- how long it takes for a patron (e.g., of a particular demographic group) to begin gambling after they have entered the property;

how much a patron is likely to wager at any one gaming station;

a total value of wagering tokens which is possessed by a patron when beginning a gaming session at a particular gaming station (e.g., gaming machine, gaming table, etc.);

a total value of wagering tokens which is possessed by a patron when ending a gaming session at a particular gaming station (e.g., gaming machine, gaming table, etc.);

a total value of wagering tokens which is possessed by a patron when exiting a gaming region of the casino;

etc.

In other situations, the casino establishment may identify which restaurants, shops, etc. that a patron more frequently visits. This may add another level to focusing casino operations and marketing on influencing patron behaviors.

In still other applications, the tracking system 20 may identify a patron through his or her tracking identification device as the patron enters a restaurant or shop. A host or sales consultant may then approach and greet that patron by name, offer comps or promotions to VIP's, know what products interest them, etc.

In at least one embodiment, the player tracking/accounting system 15 may be configured or designed to perform one or more of the following operations (or combinations thereof):

store player tracking account information relating to a player's previous game play;

store player tracking account information relating to a player's historical frequency (e.g., the date and time spent) in the selected non-gaming sections of the casino;

calculate player tracking points based on a player's game play that may be used as basis for providing rewards to the player;

calculate player tracking points and promotions based on a player's frequency at the selected non-gaming sections;

etc.

According to specific embodiments, player tracking may include a conventional gaming activity component of a player tracking system, such as any of those currently in widespread application.

As illustrated in the example of FIG. 1B, a number of gaming machines 2 may be configured or designed to include a respective tracking unit 34. Additionally, as illustrated in the example of FIG. 1B, gaming machines 2 may be connected, for example, via one or more data collection unit(s) (DCU) 37, to the player tracking/accounting system 15 and/or wagering token tracking system 17.

In at least one embodiment, the one or more DCUs 37 may be deployed at various locations throughout the casino, including, for example, gaming section 21 and non-gaming section 22. In one embodiment, the DCUs may be communicatively coupled (e.g., via one or more wired interfaces and/or one or more wireless interfaces) to one or more different tracking units 34 and/or 39. In at least one embodiment, tracking units 34, 39 and DCUs 37 may collectively form part of a local network which is operable to consolidate the information gathered from the tracking units, and to forward selected information to the player tracking/accounting system 15 and/or wagering token tracking system 17. In alternate embodiments (not shown), some or all of the DCUs may be omitted, and at least a portion of the tracking units 34, 37 may be operable to communicate (e.g., either directly, or indirectly) with the player tracking/accounting system 15 and/or wagering token tracking system 17.

In at least one embodiment, selected gaming machines 2 may include a tracking unit 34 or slot machine interface board (SMIB). In some instances, the tracking unit 34 and SMIB are manufactured as separate units before installation into a gaming machine 2. Some tracking units 34 may include multiple different tracking devices, such as, for example: a gaming activity card reader; a wireless portable instrument identifier device; a key pad; a display; etc. In some embodiments, such tracking devices are used to acquire and/or collect selected tracking information.

In at least one embodiment, at least a portion of the tracking units 34, 39 may each include a wireless input/output interface. Additionally, in at least one embodiment, one or more tracking identification devices (e.g., 104) may include wireless communication interfaces such as, for example, Radio Frequency (RF) enabled smart cards and/or wireless Personal Digital Assistants (PDA) which enable wireless communication with other devices and/or systems of the casino tracking system.

Details of tracking units with peripheral devices operated by a master gaming controller are described in co-pending U.S. patent application Ser. No. 09/838,033, filed Apr. 19, 2001, by Cris s-Puskiewicz, et al, titled "Universal Player Tracking System," which is incorporated herein in its entirety and for all purposes and co-pending U.S. patent application Ser. No. 09/642,192, filed Aug. 18, 2000, by LeMay, et al, titled "Gaming Machine Virtual Player Tracking Services," which is incorporated herein in its entirety and for all purposes. Moreover, details of tracking systems with wireless player tracking identification devices are described in co-pending U.S. patent application Ser. No. 09/921,489, filed Aug. 3, 2001, by Hedrick, et al, titled "Player Tracking Communication Mechanisms in a Gaming Machine" which is incorporated herein in its entirety and for all purposes In one embodiment, one or more tracking units 34, 39 may use wireless communication to monitor patron and/or intelligent wagering token movements throughout the gaming and/or non-gaming sections of a casino without inconveniencing the patron. For example, in one embodiment, one or more non-gaming tracking units 34, 39 of the tracking system may each include a wireless interface configured to locally communicate with one or more of the following (or combinations thereof): player tracking cards (e.g., RFID-enabled player tracking cards), intelligent wagering tokens, and/or other types of portable wireless devices.

In this manner, movement of a patron may be automatically (and, in some embodiments, passively) detected and tracked (e.g., in real time) in selected gaming and/or non-gaming sections of the casino establishment without requiring use of a manual input device, and/or (in some embodiments) without requiring the patron to perform additional specific manual actions such as, for example, requiring the user to insert his or her player tracking card into a player tracking card reader.

By placing the wireless interfaces at or in the vicinity of the entrances and exits of selected gaming and/or non-gaming sections, the entry into and exit, as well as the time of entry and exit to/from such sections may be automatically detected and monitored.

In at least one embodiment, the wireless interfaces may be applied to automatically detect and/or communicate with one or more wireless identification devices carried by the player. Examples of various different types of wireless identification devices may include one or more of the following (or combinations thereof):

a Radio Frequency (RF) enabled smart card (which, for example, may be configured or designed to have a footprint about the size of a player tracking card);

an intelligent wagering token;

a portable wireless device (such as, for example, a Personal Digital Assistant (PDA), cell phone, etc.);

portable (e.g., laptop) computers;

etc.

Accordingly, in at least one embodiment, the presence of a patron carrying a wireless identification device (such as, for example, an intelligent wagering token) in a gaming or non-gaming section of the casino may be automatically detected and/or tracked by one or more tracking units. In some embodiments, upon such detection, a uni-directional communication link may be established between the wireless identification device and a given tracking unit to allow for information to be communicated from the wireless identification device to the tracking unit. In other embodiments, a bi-directional communication link may be established between the wireless identification device and tracking unit to allow for information to be communicated from the wireless identification device to the tracking unit and vice-versa.

By way of example, the wireless interface may use a wireless communication standard such as Bluetooth™ to communicate with portable wireless devices using the same standard. It will be appreciated, however, that other type of wireless communication protocols may be employed, such as, for example, 802.11 (WiFi), 802.15 (including Bluetooth™), 802.16 (WiMax), 802.22, Cellular standards such as CDMA, CDMA2000, WCDMA, Radio Frequency (e.g., RFID), Infrared, Near Field Magnetic communication protocols, hiperlan/2, HomeRF, etc.

For example, in one embodiment, Bluetooth devices may be configured or designed to communicate on a frequency of 2.45 Gigahertz. Typically, Bluetooth devices send out signals in the range of 1 milliwatt; the signal strength often limits the range of the devices to about 10 meters but also limits potential interference sources. Interference is also limited by using spread-spectrum frequency hopping. For instance, a device may use seventy-nine (79) or more randomly chosen frequencies within a designated range that change on a regular basis up to 1,600 times a second. Thus, even if interference occurs, it is likely only to occur for a short period of time.

According to one embodiment, when Bluetooth-capable devices come within range of one another, an electronic conversation commences to determine whether they have data share or whether one needs to control the other. The connection process is performed automatically. Once a conversation between the devices has occurred, the devices form a network. Bluetooth systems create a Personal-Area Networks (PAN) or "piconets". While the two or more devices in a piconet remain in range of one another, the distances between the communications devices may vary as the wireless devices are moved about. Once a piconet is established, the members of the piconet may randomly hop frequencies so they remain in touch with another and avoid other piconets that may be operating in proximity to the established piconet. When Bluetooth is applied in a casino environment, many such piconets may be operating simultaneously. Similarly, in other embodiments were different wireless communication protocols are used (such as, for example, RF/RFID communication protocols), multiple different wireless communication channels (e.g., associated with different wireless identification devices/tracking units) may be simultaneously or concurrently active.

In one embodiment, it may be preferable that the wireless interfaces of the tracking units be configured or designed to only be capable of local detection of a wireless identification device in order to prevent any adjacent tracking units from improperly detecting the presence of the wireless identification device. For example, in one embodiment, such localized detection may be within the range of about 0.0 feet to about 10.0 feet, and/or in the range of about 3.0 feet from the entrances into selected restaurants, shops, bars, nightclubs, theaters or any other strategic locations throughout the casino establishment 13.

There are several conventional types of wireless technologies which may be applied for wireless identification devices. For example, these include the Radio Frequency Identification (RFID) Systems such as the Ti-RFID systems provided by Texas Instruments Incorporated of Dallas, Tex., and the contactless smart cards by Fargo Electronics, Inc. of Eden Prairie, Minn.

One suitable technology is a Radio Frequency (RF) enabled smart card which can be applied in both the gaming tracking unit 34, and the non-gaming tracking unit 39.

Figure 2:
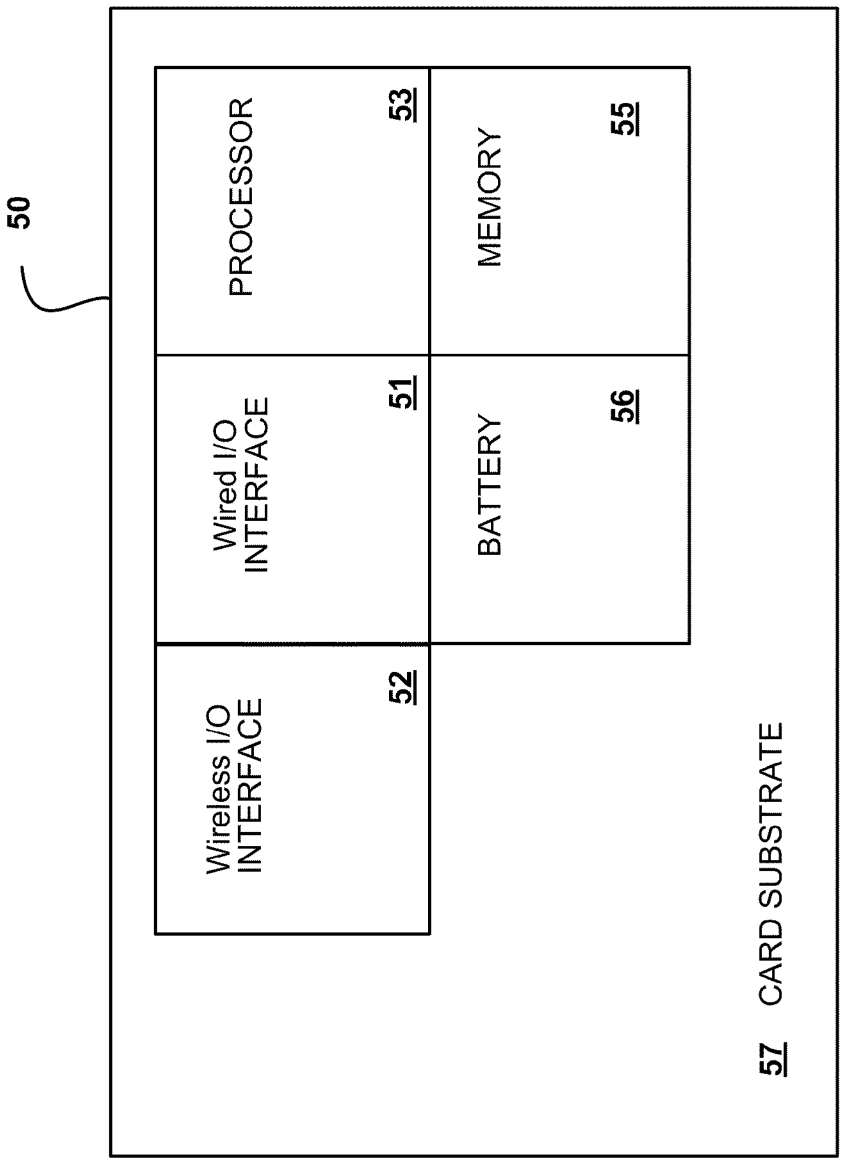
FIG. 2 illustrates a block diagram of an example embodiment of a smart card which may be used for implementing various aspects described herein.

FIG. 2 illustrates a block diagram of an example embodiment of a smart card which may be used for implementing various aspects described herein.

In at least one embodiment, smart card 50 may be implemented as an RF-enabled smart card, and may be configured or designed for wired and/or wireless communication with various devices such as, for example, one or more of the following (or combinations thereof): gaming machines, gaming peripherals, gaming terminals, gaming tables, intelligent wagering tokens, tracking units (e.g., 34 and/or 39), etc. In one embodiment, smart card 50 may have the same footprint as a magnetic striped card and may include, for example, one or more of the following (or combinations thereof): a wired input/output interface 51, a wireless input/output interface 52, a processor 53, memory 55, a battery 56 or portable power source (which, for example, may be incorporated in some manner on a card substrate 57), etc.

The battery 56 is used to supply power to operate the devices on the smart card 50. In some embodiments, when it is inserted into a smart card reader of some type, power may also be supplied to the card by the smart card reader. The processor 53 may be a general purpose microprocessor or a custom microcontroller incorporating gaming specific firmware. The memory 55 may include non-volatile memory such as, for example, flash memory, memristor-based non-volatile solid-state memory, etc. The wired input/output interface 51 may be an I/O EEPROM or the like that allows the smart card 50 to communicate with a smart card reader. Further, the I/O interface 51 may include one or more communication protocols that allow the smart card 50 to communicate directly with a gaming machine, gaming peripheral, gaming terminal, gaming table, and/or other devices designed to communicate with the smart card. Some communication protocols may be stored in the memory 55 of the smart card 50. The communication protocols stored in the memory 55 may be added and/or deleted from the smart card 50 as needed.

In accordance with at least one embodiment, at least a portion of tracking units (e.g., 34, 39, FIG. 1B) may be configured or designed to include wireless smart card readers, and may be deployed at strategic locations around the casino to track and monitor movement of smart cards (and/or intelligent wagering tokens) carried by patrons. For example, in casino non-gaming sections 22 such as restaurants, shops, theaters, bars or showrooms, the wireless smart card readers may be positioned proximate the entrances and/or exits into and out of the respective sections. Similar to department store security devices, these localized radio receivers may include two or more cooperating detector devices adapted for placement on opposed sides of each entrance/exit. When a patron carrying an RF enabled smart card (and/or RF enabled gaming chip) passes between the opposed detectors, their entrance/exit from the non-gaming section can be automatically detected and recorded.

The functions of the smart card, described above, may be performed by other wireless gaming devices. For instance, a player may carry a personal digital assistant (PDA) which may be configured or designed to communicate with non-gaming tracking units 39 and/or gaming tracking units 34 via a wireless communication interface. One example of a PDA that may be adapted for use with the present invention is the Palm VII from Palm, Inc., Santa Clara, Calif. In another example, a player may carry one or more intelligent wagering tokens (e.g., RF-enabled wagering tokens) which are configured or designed to communicate with non-gaming tracking units 39 and/or gaming tracking units 34 via a wireless communication interface. Examples of other suitable wireless devices are below.

At least some tracking system embodiments described herein may also include functionality for tracking entertainment resources in a casino.

Figure 3:
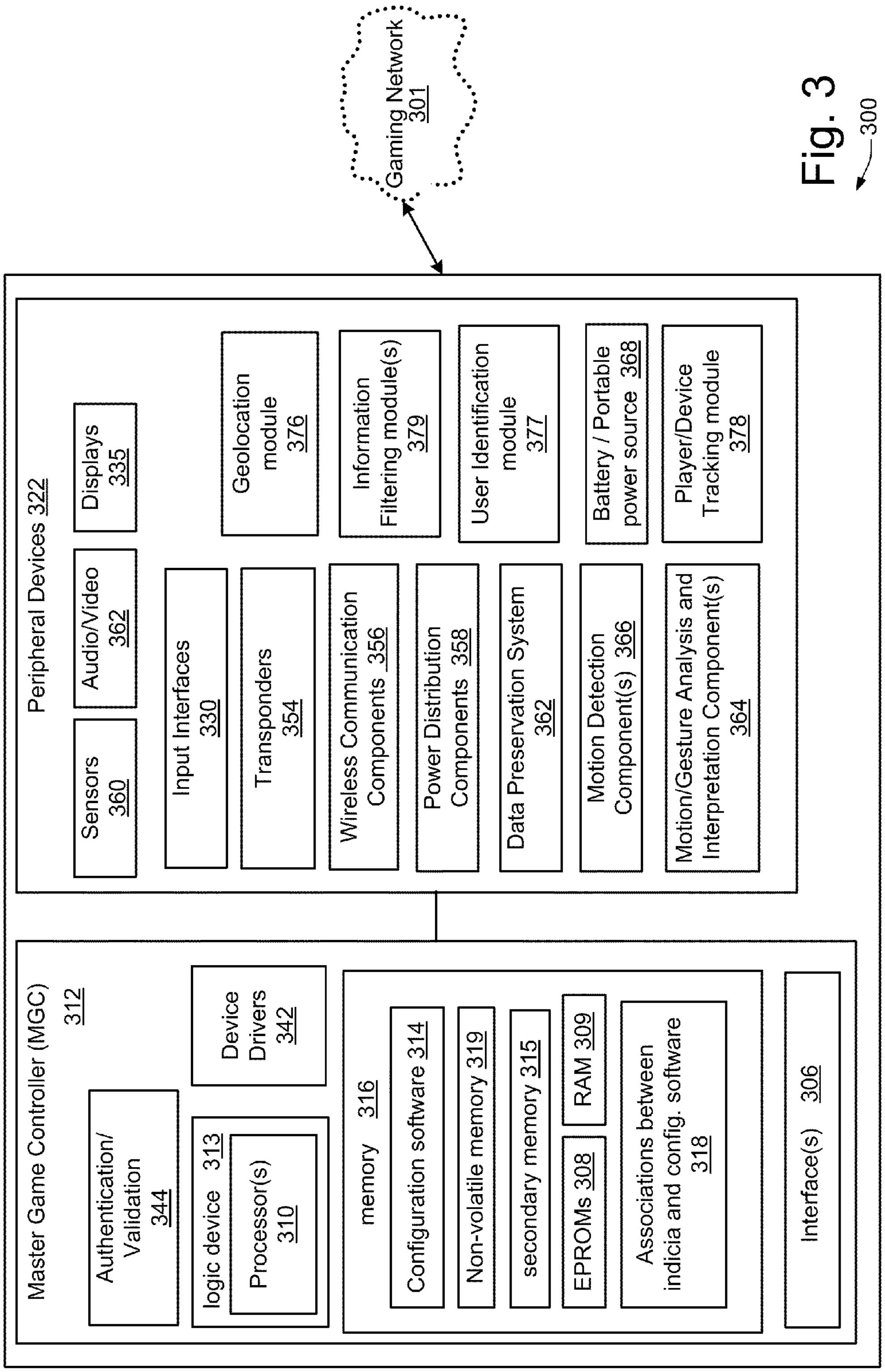
FIG. 3 is a simplified block diagram of an example gaming device 300 in accordance with a specific embodiment.

FIG. 3 is a simplified block diagram of an example gaming device 300 in accordance with a specific embodiment. According to different embodiments, different gaming devices may be implemented using one or more components of the gaming device 300 of FIG. 3.

In at least one embodiment, the term "gaming device" may be used to describe and variety of different types of machines, devices and/or systems which may be used or accessed by one or more users (e.g., players) for engaging in wager-based gaming activities. Examples of different types of gaming devices may include, but are not limited to, one or more of the following: mobile or portable gaming devices, gaming machines, gaming tables, slot machines, server-based gaming systems, and the like.

As illustrated in the embodiment of FIG. 3, gaming device 300 includes at least one processor 310, at least one interface 306, and memory 316.

In one implementation, processor 310 and master game controller 312 are included in a logic device 313 enclosed in a logic device housing. The processor 310 may include any conventional processor or logic device configured to execute software allowing various configuration and reconfiguration tasks such as, for example: a) communicating with a remote source via communication interface 306, such as a server that stores authentication information or game information; b) converting signals read by an interface to a format corresponding to that used by software or memory in the gaming device; c) accessing memory to configure or reconfigure game parameters in the memory according to indicia read from the device; d) communicating with interfaces, various peripheral devices 322 and/or I/O devices; e) operating peripheral devices 322 such as, for example, card readers, paper ticket readers, etc.; f) operating various I/O devices such as, for example, displays 335, input devices 330; etc. For instance, the processor 310 may send messages including game play information to the displays 335 to inform players of cards dealt, wagering information, and/or other desired information.

The gaming device 300 also includes memory 316 which may include, for example, volatile memory (e.g., RAM 309), non-volatile memory 319 (e.g., disk memory, FLASH memory, EPROMs, memristor-based non-volatile solid-state memory, etc.), unalterable memory (e.g., EPROMs 308), etc. The memory may be configured or designed to store, for example: 1) configuration software 314 such as all the parameters and settings for a game playable on the gaming device; 2) associations 318 between configuration indicia read from a device with one or more parameters and settings; 3) communication protocols allowing the processor 310 to communicate with peripheral devices 322 and I/O devices 311; 4) a secondary memory storage device 315 such as a non-volatile memory device, configured to store gaming software related information (the gaming software related information and memory may be used to store various audio files and games not currently being used and invoked in a configuration or reconfiguration); 5) communication transport protocols (such as, for example, TCP/IP, USB, Firewire, IEEE1394, Bluetooth, IEEE 802.11x (IEEE 802.11 standards), hiperlan/2, HomeRF, etc.) for allowing the gaming device to communicate with local and non-local devices using such protocols; etc. In one implementation, the master game controller 312 communicates using a serial communication protocol. A few examples of serial communication protocols that may be used to communicate with the master game controller include but are not limited to USB, RS-232 and Netplex (a proprietary protocol developed by IGT, Reno, Nev.).

A plurality of device drivers 342 may be stored in memory 316. Example of different types of device drivers may include device drivers for gaming device components, device drivers for peripheral components 322, etc. Typically, the device drivers 342 utilize a communication protocol of some type that enables communication with a particular physical device. The device driver abstracts the hardware implementation of a device. For example, a device drive may be written for each type of card reader that may be potentially connected to the gaming device. Examples of communication protocols used to implement the device drivers include Netplex, USB, Serial, Ethernet 175, Firewire, I/0 debouncer, direct memory map, serial, PCI, parallel, RF, Bluetooth™, near-field communications (e.g., using near-field magnetics), 802.11 (WiFi), etc. Netplex is a proprietary IGT standard while the others are open standards. According to a specific embodiment, when one type of a particular device is exchanged for another type of the particular device, a new device driver may be loaded from the memory 316 by the processor 310 to allow communication with the device. For instance, one type of card reader in gaming device 300 may be replaced with a second type of card reader where device drivers for both card readers are stored in the memory 316.

In some embodiments, the software units stored in the memory 316 may be upgraded as needed. For instance, when the memory 316 is a hard drive, new games, game options, various new parameters, new settings for existing parameters, new settings for new parameters, device drivers, and new communication protocols may be uploaded to the memory from the master game controller 312 or from some other external device. As another example, when the memory 316 includes a CD/DVD drive including a CD/DVD designed or configured to store game options, parameters, and settings, the software stored in the memory may be upgraded by replacing a first CD/DVD with a second CD/DVD. In yet another example, when the memory 316 uses one or more flash memory 319 or EPROM 308 units designed or configured to store games, game options, parameters, settings, the software stored in the flash and/or EPROM memory units may be upgraded by replacing one or more memory units with new memory units which include the upgraded software. In another embodiment, one or more of the memory devices, such as the hard-drive, may be employed in a game software download process from a remote software server.

In some embodiments, the gaming device 300 may also include various authentication and/or validation components 344 which may be used for authenticating/validating specified gaming device components and/or information such as, for example, hardware components, software components, firmware components, peripheral device components, user input device components, information received from one or more user input devices, information stored in the gaming device memory 316, etc. Examples of various authentication and/or validation components are described in U.S. Pat. No. 6,620,047, titled, "ELECTRONIC GAMING APPARATUS HAVING AUTHENTICATION DATA SETS," incorporated herein by reference in its entirety for all purposes.

Peripheral devices 322 may include several device interfaces such as, for example, one or more of the following (or combinations thereof): transponders 354, wire/wireless power distribution components 358, input interface(s) 330 (which, for example, may include contact and/or non-contact interfaces), sensors 360, audio and/or video devices 362 (e.g., cameras, speakers, etc.), wireless communication components 356, motion/gesture analysis and interpretation component(s) 364, data preservation components 362, motion detection components 366, geolocation components 376, information filtering components 379, user identification components 377, player/device tracking module(s) 378, one or more portable power sources 368, etc.

Sensors 360 may include, for example, optical sensors, pressure sensors, RF sensors, Infrared sensors, image sensors, thermal sensors, biometric sensors, etc. Such sensors may be used for a variety of functions such as, for example: detecting movements and/or gestures of various objects within a predetermined proximity to the gaming device; detecting the presence and/or identity of various persons (e.g., players, casino employees, etc.), devices (e.g., user input devices), and/or systems within a predetermined proximity to the gaming device.

In one implementation, at least a portion of the sensors 360 and/or input devices 330 may be implemented in the form of touch keys selected from a wide variety of commercially available touch keys used to provide electrical control signals. Alternatively, some of the touch keys may be implemented in another form which are touch sensors such as those provided by a touchscreen display. For example, in at least one implementation, the gaming device player displays may include contact input interfaces and/or non-contact input interfaces for allowing players to provide desired information (e.g., game play instructions and/or other input) to the gaming device and/or other devices in the casino gaming network (such as, for example, player tracking systems, side wagering systems, etc.).

Wireless communication components 356 may include one or more communication interfaces having different architectures and utilizing a variety of protocols such as, for example, 802.11 (WiFi), 802.15 (including Bluetooth™), 802.16 (WiMax), 802.22, Cellular standards such as CDMA, CDMA2000, WCDMA, Radio Frequency (e.g., RFID), Infrared, Near Field Magnetic communication protocols, etc. The communication links may transmit electrical, electromagnetic or optical signals which carry digital data streams or analog signals representing various types of information.

Power distribution components 358 may include, for example, components or devices which are operable for providing wired or wireless power to other devices. For example, in one implementation, the power distribution components 358 may include a magnetic induction system which is adapted to provide wireless power to one or more user input devices near the gaming device. In one implementation, a user input device docking region may be provided which includes a power distribution component that is able to recharge a user input device without requiring metal-to-metal contact. In at least one embodiment, power distribution components 358 may be operable to distribute power to one or more internal components such as, for example, one or more rechargeable power sources (e.g., rechargeable batteries) located at the gaming device.

In at least one embodiment, the gaming device may include a geolocation module 376 which, for example, may be configured or designed to acquire geolocation information from remote sources and use the acquired geolocation information to determine information relating to a relative and/or absolute position of the gaming device. For example, in one implementation, the geolocation module 376 may be adapted to receive GPS signal information for use in determining the position or location of the gaming device. In another implementation, the geolocation module 376 may be adapted to receive multiple wireless signals from multiple remote devices (e.g., gaming machines, servers, wireless access points, etc.) and use the signal information to compute position/location information relating to the position or location of the gaming device.

In at least one embodiment, the gaming device may include a user identification module 377. In one implementation, the user identification module may be adapted to determine the identity of the current user or current owner of the gaming device/device. For example, in one embodiment, the current user may be required to perform a log in process at the gaming device in order to access one or more features. Alternatively, the gaming device may be adapted to automatically determine the identity of the current user based upon one or more external signals such as, for example, an RFID tag or badge worn by the current user which provides a wireless signal to the gaming device for determining the identity of the current user. In at least one implementation, various security features may be incorporated into the gaming device to prevent unauthorized users from accessing confidential or sensitive information.

In at least one embodiment, the gaming device may include an Information filtering module(s) 379 which may be configured or designed to perform filtering (e.g., based on specified criteria) of selected information to be displayed at one or more displays of the gaming device.

In at least one embodiment, the gaming device may include at least one power source 368. In at least one implementation, the power source may include at least one mobile power source for allowing the gaming device to operate in a mobile environment. For example, in one implementation, the gaming device 300 may include one or more rechargeable batteries which, for example, may be implemented using a rechargeable, thin-film type battery.

In at least one embodiment, the gaming device may include at least one motion detection component 366 for detecting motion or movement of the gaming device and/or for detecting motion, movement, gestures from the user. In at least one embodiment, motion detection component(s) may include one or more of the following (or combinations thereof): accelerometer component(s), gyro component(s), camera component(s), rangefinder component(s), velocity transducer component(s), etc. In one embodiment, the motion detection component(s) may be operable to detect gross motion of a user (e.g., player, dealer, etc.).

In at least one embodiment, motion/gesture analysis and interpretation component(s) 364 may be operable to analyze and/or interpret information relating to detected player movements and/or gestures in order, for example, to determine appropriate player input information relating to the detected player movements and/or gestures. For example, in at least one embodiment, motion/gesture analysis and interpretation component(s) 364 may be operable to perform one or more functions such as, for example: analyze the detected gross motion or gestures of a participant; interpret the participant's motion or gestures (e.g., in the context of a casino game being played) in order to identify instructions or input from the participant; utilize the interpreted instructions/input to advance the game state; etc. In other embodiments, at least a portion of these additional functions may be implemented at a remote system or device.

For example, during play of a game of blackjack at a conventional game table, a player may signal "hit me" to the dealer by the player flicking or moving his cards in a sweeping motion towards the player. In at least one embodiment where the player is performing the "hit me" gesture using a gaming device, the gaming device may be adapted to automatically detect the player's gesture (e.g., gross motion) by sensing motion or movement (e.g., rotation, displacement, velocity, acceleration, etc.) using, for example, one or more motion detection sensors. In one embodiment, the gaming device may also be adapted to analyze the detected motion data in order to interpret the gesture (or other input data) intended by the player. Once interpreted, the gaming device may then provide the interpreted player input data (e.g., "hit me") to the gaming device (and/or other devices/systems) for advancement of the game state. Alternatively, the gaming device may be adapted to transmit information relating to the detected motion data to an external gaming system, and the external game system may be adapted to analyze the detected motion data in order to interpret the gesture (or other input data) intended by the player.

According to different embodiments, other criteria may also be used when analyzing the detected motion data for proper interpretation of the player's gestures and/or other input instructions. For example, the interpretation of the detected motion data may be constrained based on one or more of the following criteria (or combination thereof): type of game being played (e.g., craps, blackjack, poker, slots, etc.), location of the player/gaming device; current gaming device operating mode (e.g., table game operating mode, gaming machine operating mode, bonus game operating mode, restaurant operating mode, theater operating mode, lounge operating mode, hotel operating mode, parking service operating mode, room service operating mode, news magazine operating mode, etc.); game rules; time; player ID; player preferences; previous motion interpretation/analysis; and/or other criteria described herein.

In at least one embodiment, the gaming device may include a data preservation system 362 which is configured or designed to detect or sense one or more events and/or conditions which, for example, may result in damage to the gaming device and/or which may result in loss of information associated with the gaming device. Additionally, the data preservation system 362 may be operable to initiate one or more appropriate action(s) in response to the detection of such events/conditions.

In at least one embodiment, the gaming device may include a player/device tracking module 378. In one embodiment, player/device tracking module 378 may include functionality and/or features similar to other tracking units described or referenced herein (such as, for example, tracking units 34, 39 described previously, etc.). In some embodiments, player/device tracking module 378 may also be configured or designed to function as a data collection unit (e.g., similar to that of DCU 37, FIG. 1B). For example, in one embodiment, player/device tracking module 378 may be operable to detect, track, and/or communicate with one or more portable wireless devices (such as, for example, an RF-enabled smart card, an intelligent wagering token, etc.), and may further be operable to forward information acquired from (and/or relating to) a given portable wireless device to other devices/systems of the casino network (such as, for example, player tracking/accounting system 15, wagering token/analysis system 17, etc.).

In other embodiments (not shown) other peripheral devices include: card readers, bill validator/paper ticket readers, etc. Such devices may each comprise resources for handling and processing configuration indicia such as a microcontroller that converts voltage levels for one or more scanning devices to signals provided to processor 310. In one embodiment, application software for interfacing with peripheral devices 322 may store instructions (such as, for example, how to read indicia from a portable device) in a memory device such as, for example, non-volatile memory, hard drive, flash memory, etc.

In at least one embodiment, the gaming device may include user input device control components may be operable to control operating mode selection functionality, features, and/or components associated with one or more user input devices which communication with the gaming device. For example, in at least one embodiment, the user input device control components may be operable to remotely control and/or configure components of one or more user input devices based on various parameters and/or upon detection of specific events or conditions such as, for example: time of day, player activity levels; location of the user input device; identity of user input device user; user input; system override (e.g., emergency condition detected); proximity to other devices belonging to same group or association; proximity to specific objects, regions, zones, etc.

In at least one implementation, the gaming device may include card readers such as used with credit cards, or other identification code reading devices to allow or require player identification in connection with play of the card game and associated recording of game action. Such a user identification interface can be implemented in the form of a variety of magnetic card readers commercially available for reading user-specific identification information. The user-specific information can be provided on specially constructed magnetic cards issued by a casino, or magnetically coded credit cards or debit cards frequently used with national credit organizations such as VISA™, MASTERCARD™, banks and/or other institutions.

The gaming device may include other types of participant identification mechanisms which may use a facial image (e.g., captured via the use of a camera), fingerprint image, eye blood vessel image reader, or other suitable biological information to confirm identity of the user. Still further it is possible to provide such participant identification information by having the dealer manually code in the information in response to the player indicating his or her code name or real name. Such additional identification could also be used to confirm credit use of a smart card, transponder, and/or player's user input device.

It will be apparent to those skilled in the art that other memory types, including various gaming device readable media, may be used for storing and executing program instructions pertaining to the operation of various gaming devices described herein. Because such information and program instructions may be employed to implement the systems/methods described herein, example embodiments may relate to machine-readable media that include program instructions, state information, etc. for performing various operations described herein. Examples of machine-readable storage media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files including higher level code that may be executed by the gaming device using an interpreter.

According to specific embodiments, at least some embodiments of various gaming devices, gaming machines, and/or gaming devices described herein (collectively referred to herein as "gaming devices"), may be implemented with special features and/or additional circuitry that differentiate such gaming devices from general-purpose portable computers (e.g., portable PC computers, PDAs, etc., collectively be referred to herein as "PCs").

For example, gaming devices are highly regulated to ensure fairness and, in many cases, gaming devices are operable to dispense monetary awards of multiple millions of dollars. Therefore, to satisfy security and regulatory requirements in a gaming environment, hardware and software architectures may be implemented in gaming devices that differ significantly from those of general-purpose computers. For purposes of illustration, a description of gaming devices relative to general-purpose computing machines and some examples of the additional (or different) components and features found in gaming devices are described below. It is noted that such description may also be applicable for describing differences between general-purpose computing devices/systems, and gaming devices/systems described herein.

At first glance, one might think that adapting PC technologies to the gaming industry would be a simple proposition because both PCs and gaming devices employ microprocessors that control a variety of devices. However, because of such reasons as 1) the regulatory requirements that are placed upon gaming devices, 2) the harsh environment in which gaming devices operate, 3) security requirements and 4) fault tolerance requirements, adapting PC technologies to a gaming device can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in a gaming device because in a gaming device these faults can lead to a direct loss of funds from the gaming device, such as stolen cash or loss of revenue when the gaming device is not operating properly.

For the purposes of illustration, a few differences between PC systems and gaming devices will be described. A first difference between gaming devices and common PC based computers systems is that gaming devices are designed to be state-based systems. In a state-based system, the system stores and maintains its current state in a non-volatile memory, such that, in the event of a power failure or other malfunction the gaming device will return to its current state when the power is restored. For instance, if a player was shown an award for a game of chance and, before the award could be provided to the player the power failed, the gaming device, upon the restoration of power, would return to the state where the award is indicated. As anyone who has used a PC, knows, PCs are not state machines and a majority of data is usually lost when a malfunction occurs. This requirement affects the software and hardware design on a gaming device.

A second important difference between gaming devices and common PC based computer systems is that for regulation purposes, the software on the gaming device used to generate the game of chance and operate the gaming device has been designed to be static and monolithic to prevent cheating by the operator of gaming device. For instance, one solution that has been employed in the gaming industry to prevent cheating and satisfy regulatory requirements has been to manufacture a gaming device that can use a proprietary processor running instructions to generate the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used by the master gaming controller to operate a device during generation of the game of chance can require a new EPROM to be burnt, approved by the gaming jurisdiction and reinstalled on the gaming device in the presence of a gaming regulator. Regardless of whether the EPROM solution is used, to gain approval in most gaming jurisdictions, a gaming device must demonstrate sufficient safeguards that prevent an operator or player of a gaming device from manipulating hardware and software in a manner that gives them an unfair and some cases an illegal advantage. The gaming device should have a means to determine if the code it will execute is valid. If the code is not valid, the gaming device must have a means to prevent the code from being executed. The code validation requirements in the gaming industry affect both hardware and software designs on gaming devices.

A third important difference between gaming devices and common PC based computer systems is the number and kinds of peripheral devices used on a gaming device are not as great as on PC based computer systems. Traditionally, in the gaming industry, gaming devices have been relatively simple in the sense that the number of peripheral devices and the number of functions the gaming device has been limited. Further, in operation, the functionality of gaming devices were relatively constant once the gaming device was deployed, i.e., new peripherals devices and new gaming software were infrequently added to the gaming device. This differs from a PC where users will go out and buy different combinations of devices and software from different manufacturers and connect them to a PC to suit their needs depending on a desired application. Therefore, the types of devices connected to a PC may vary greatly from user to user depending in their individual requirements and may vary significantly over time.

Although the variety of devices available for a PC may be greater than on a gaming device, gaming devices still have unique device requirements that differ from a PC, such as device security requirements not usually addressed by PCs. For instance, monetary devices, such as coin dispensers, bill validators and ticket printers and computing devices that are used to govern the input and output of cash to a gaming device have security requirements that are not typically addressed in PCs. Therefore, many PC techniques and methods developed to facilitate device connectivity and device compatibility do not address the emphasis placed on security in the gaming industry.

To address some of the issues described above, a number of hardware/software components and architectures are utilized in gaming devices that are not typically found in general purpose computing devices, such as PCs. These hardware/software components and architectures, as described below in more detail, include but are not limited to watchdog timers, voltage monitoring systems, state-based software architecture and supporting hardware, specialized communication interfaces, security monitoring and trusted memory.

For example, a watchdog timer is normally used in International Game Technology (IGT) gaming devices to provide a software failure detection mechanism. In a normally operating system, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to enable the operating software to set the timeout interval within a certain range of time. A differentiating feature of the some preferred circuits is that the operating software cannot completely disable the function of the watchdog timer. In other words, the watchdog timer always functions from the time power is applied to the board.

IGT gaming computer platforms preferably use several power supply voltages to operate portions of the computer circuitry. These can be generated in a central power supply or locally on the computer board. If any of these voltages falls out of the tolerance limits of the circuitry they power, unpredictable operation of the computer may result. Though most modern general-purpose computers include voltage monitoring circuitry, these types of circuits only report voltage status to the operating software. Out of tolerance voltages can cause software malfunction, creating a potential uncontrolled condition in the gaming computer. Gaming devices of the present assignee typically have power supplies with tighter voltage margins than that required by the operating circuitry. In addition, the voltage monitoring circuitry implemented in IGT gaming computers typically has two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

One standard method of operation for IGT slot machine game software is to use a state machine. Different functions of the game (bet, play, result, points in the graphical presentation, etc.) may be defined as a state. When a game moves from one state to another, critical data regarding the game software is stored in a custom non-volatile memory subsystem. This is critical to ensure the player's wager and credits are preserved and to minimize potential disputes in the event of a malfunction on the gaming device.

In general, the gaming device does not advance from a first state to a second state until critical information that allows the first state to be reconstructed has been stored. This feature allows the game to recover operation to the current state of play in the event of a malfunction, loss of power, etc that occurred just prior to the malfunction. In at least one embodiment, the gaming device is configured or designed to store such critical information using atomic transactions.

Generally, an atomic operation in computer science refers to a set of operations that can be combined so that they appear to the rest of the system to be a single operation with only two possible outcomes: success or failure. As related to data storage, an atomic transaction may be characterized as series of database operations which either all occur, or all do not occur. A guarantee of atomicity prevents updates to the database occurring only partially, which can result in data corruption.

In order to ensure the success of atomic transactions relating to critical information to be stored in the gaming device memory before a failure event (e.g., malfunction, loss of power, etc.), it is preferable that memory be used which includes one or more of the following criteria: direct memory access capability; data read/write capability which meets or exceeds minimum read/write access characteristics (such as, for example, at least 5.08 Mbytes/sec (Read) and/or at least 38.0 Mbytes/sec (Write)). Devices which meet or exceed the above criteria may be referred to as "fault-tolerant" memory devices, whereas it is which the above criteria may be referred to as "fault non-tolerant" memory devices.

Typically, battery backed RAM devices may be configured or designed to function as fault-tolerant devices according to the above criteria, whereas flash RAM and/or disk drive memory are typically not configurable to function as fault-tolerant devices according to the above criteria. Accordingly, battery backed RAM devices are typically used to preserve gaming device critical data, although other types of non-volatile memory devices may be employed. These memory devices are typically not used in typical general-purpose computers.

Thus, in at least one embodiment, the gaming device is configured or designed to store critical information in fault-tolerant memory (e.g., battery backed RAM devices) using atomic transactions. Further, in at least one embodiment, the fault-tolerant memory is able to successfully complete all desired atomic transactions (e.g., relating to the storage of gaming device critical information) within a time period of 200 milliseconds (ms) or less. In at least one embodiment, the time period of 200 ms represents a maximum amount of time for which sufficient power may be available to the various gaming device components after a power outage event has occurred at the gaming device.

As described previously, the gaming device may not advance from a first state to a second state until critical information that allows the first state to be reconstructed has been atomically stored. This feature allows the game to recover operation to the current state of play in the event of a malfunction, loss of power, etc that occurred just prior to the malfunction. After the state of the gaming device is restored during the play of a game of chance, game play may resume and the game may be completed in a manner that is no different than if the malfunction had not occurred. Thus, for example, when a malfunction occurs during a game of chance, the gaming device may be restored to a state in the game of chance just prior to when the malfunction occurred. The restored state may include metering information and graphical information that was displayed on the gaming device in the state prior to the malfunction. For example, when the malfunction occurs during the play of a card game after the cards have been dealt, the gaming device may be restored with the cards that were previously displayed as part of the card game. As another example, a bonus game may be triggered during the play of a game of chance where a player is required to make a number of selections on a video display screen. When a malfunction has occurred after the player has made one or more selections, the gaming device may be restored to a state that shows the graphical presentation at the just prior to the malfunction including an indication of selections that have already been made by the player. In general, the gaming device may be restored to any state in a plurality of states that occur in the game of chance that occurs while the game of chance is played or to states that occur between the play of a game of chance.

Game history information regarding previous games played such as an amount wagered, the outcome of the game and so forth may also be stored in a non-volatile memory device. The information stored in the non-volatile memory may be detailed enough to reconstruct a portion of the graphical presentation that was previously presented on the gaming device and the state of the gaming device (e.g., credits) at the time the game of chance was played. The game history information may be utilized in the event of a dispute. For example, a player may decide that in a previous game of chance that they did not receive credit for an award that they believed they won. The game history information may be used to reconstruct the state of the gaming device prior, during and/or after the disputed game to demonstrate whether the player was correct or not in their assertion. Further details of a state based gaming machine, recovery from malfunctions and game history are described in U.S. Pat. No. 6,804,763, titled "High Performance Battery Backed RAM Interface", U.S. Pat. No. 6,863,608, titled "Frame Capture of Actual Game Play," U.S. application Ser. No. 10/243,104, titled, "Dynamic NV-RAM," and U.S. application Ser. No. 10/758,828, titled, "Frame Capture of Actual Game Play," each of which is incorporated by reference and for all purposes.

Another feature of gaming devices, such as IGT gaming computers, is that they often include unique interfaces, including serial interfaces, to connect to specific subsystems internal and external to the gaming device. The serial devices may have electrical interface requirements that differ from the "standard" EIA serial interfaces provided by general-purpose computers. These interfaces may include, for example, Fiber Optic Serial, optically coupled serial interfaces, current loop style serial interfaces, etc. In addition, to conserve serial interfaces internally in the gaming device, serial devices may be connected in a shared, daisy-chain fashion where multiple peripheral devices are connected to a single serial channel.

The serial interfaces may be used to transmit information using communication protocols that are unique to the gaming industry. For example, IGT's Netplex is a proprietary communication protocol used for serial communication between gaming devices. As another example, SAS is a communication protocol used to transmit information, such as metering information, from a gaming device to a remote device. Often SAS is used in conjunction with a player tracking system.

IGT gaming devices may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this.

Security monitoring circuits detect intrusion into an IGT gaming device by monitoring security switches attached to access doors in the gaming device cabinet. Preferably, access violations result in suspension of game play and can trigger additional security operations to preserve the current state of game play. These circuits also function when power is off by use of a battery backup. In power-off operation, these circuits continue to monitor the access doors of the gaming device. When power is restored, the gaming device can determine whether any security violations occurred while power was off, e.g., via software for reading status registers. This can trigger event log entries and further data authentication operations by the gaming device software.

Trusted memory devices and/or trusted memory sources are preferably included in an IGT gaming device computer to ensure the authenticity of the software that may be stored on less secure memory subsystems, such as mass storage devices. Trusted memory devices and controlling circuitry are typically designed to not enable modification of the code and data stored in the memory device while the memory device is installed in the gaming device. The code and data stored in these devices may include authentication algorithms, random number generators, authentication keys, operating system kernels, etc. The purpose of these trusted memory devices is to provide gaming regulatory authorities a root trusted authority within the computing environment of the gaming device that can be tracked and verified as original. This may be accomplished via removal of the trusted memory device from the gaming device computer and verification of the secure memory device contents is a separate third party verification device. Once the trusted memory device is verified as authentic, and based on the approval of the verification algorithms included in the trusted device, the gaming device is enabled to verify the authenticity of additional code and data that may be located in the gaming computer assembly, such as code and data stored on hard disk drives. A few details related to trusted memory devices that may be used in at least one embodiment described herein are described in U.S. Pat. No. 6,685,567 from U.S. patent application Ser. No. 09/925,098, filed Aug. 8, 2001 and titled "Process Verification," which is incorporated herein in its entirety and for all purposes.

In at least one embodiment, at least a portion of the trusted memory devices/sources may correspond to memory which cannot easily be altered (e.g., "unalterable memory") such as, for example, EPROMS, PROMS, Bios, Extended Bios, and/or other memory sources which are able to be configured, verified, and/or authenticated (e.g., for authenticity) in a secure and controlled manner.

According to a specific implementation, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment of at least one embodiment described herein, the remote device and the trusted information source may engage in methods using zero knowledge proofs to authenticate each of their respective identities.

Gaming devices storing trusted information may utilize apparatus or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

Additional details relating to trusted memory devices/sources are described in U.S. patent application Ser. No. 11/078,966, entitled "Secured Virtual Network in a Gaming Environment", naming Nguyen et al. as inventors, filed on Mar. 10, 2005, herein incorporated in its entirety and for all purposes.

Mass storage devices used in a general purpose computer typically enable code and data to be read from and written to the mass storage device. In a gaming device environment, modification of the gaming code stored on a mass storage device is strictly controlled and would only be enabled under specific maintenance type events with electronic and physical enablers required. Though this level of security could be provided by software, IGT gaming computers that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present. Details using a mass storage device that may be used with at least one embodiment described herein are described, for example, in U.S. Pat. No. 6,149,522, herein incorporated by reference in its entirety for all purposes.

Figure 4:
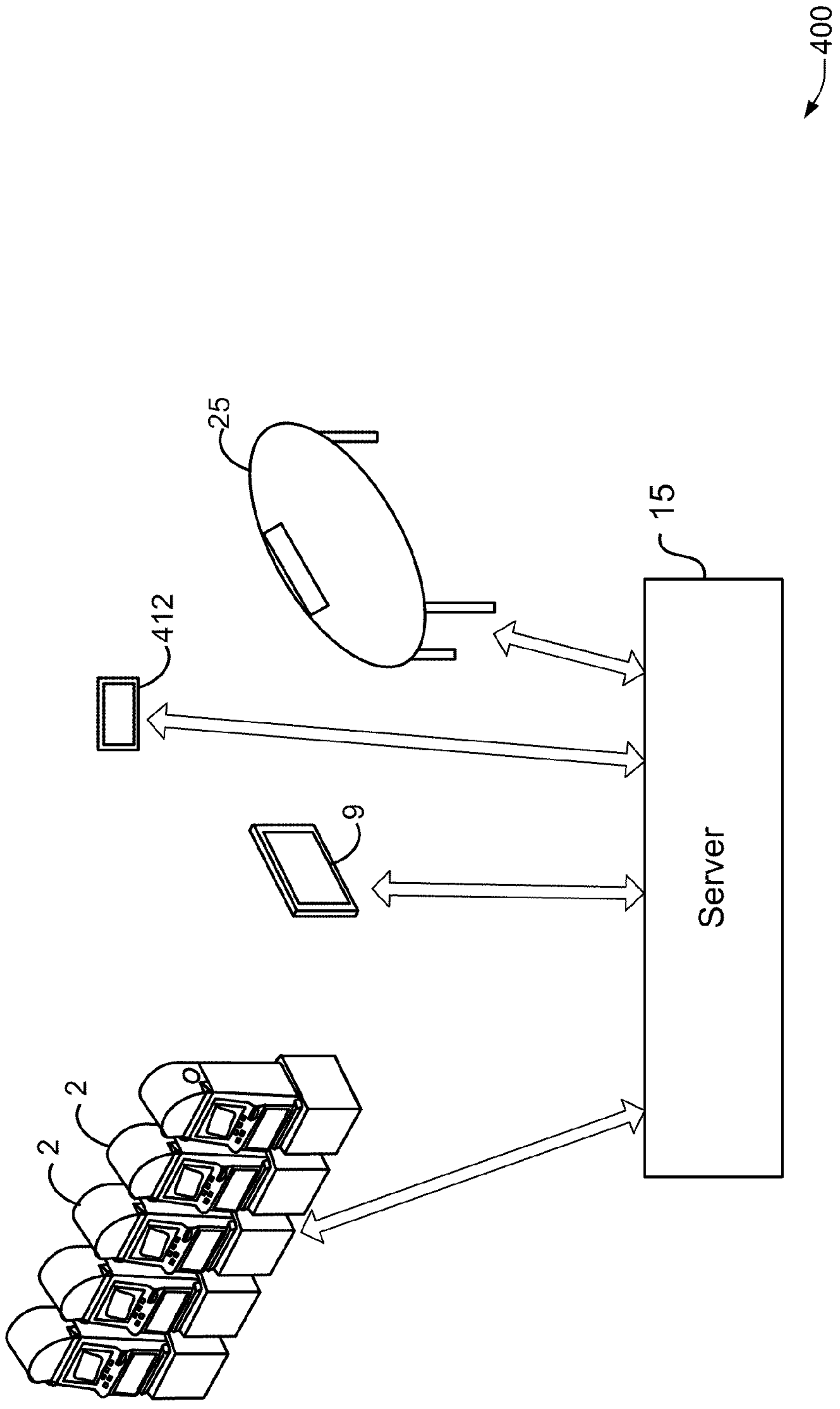
FIG. 4 shows collection of entertainment resource data in a casino in accordance with one embodiment of various aspects described or referenced herein.

FIG. 4 shows an example of different casino entertainment resources (and associated data) which may be tracked using one or more embodiments disclosed herein.

As illustrated in the example of FIG. 4, examples of various types of entertainment resources may include, but are not limited to, one or more of the following (or combinations thereof): gaming devices (such as, for example, gaming machines 2, mobile gaming devices 412, etc.), gaming tables (such as, for example, poker tables, craps tables, blackjack tables, etc.), video screens, cameras, dynamic displays showing advertising and/or promotional offerings, group gaming offerings, etc.

In at least one embodiment, data tracked for each entertainment resource may include details of the resource type (e.g., blackjack card table, gaming machine, game name currently on the gaming machine, etc.), current location, date moved to its current location, data associated with the gaming activity at present location and historical data from previous locations, games offered on current machine historically and at present location, number of times a new game was downloaded to gaming machine at present location and historical locations, etc. Data tracked for each gaming machine may also include model, hardware options, and game option, for example.

In at least one embodiment, communication between server 15 and the various different entertainment resources (e.g., gaming machines 2, video screens 9, gaming mobile gaming devices 412, gaming tables 25, etc.) may use any suitable communications technology and protocol, which, for example, may include wired communication technology and/or wireless communication technology. For example, in specific embodiments, at least a portion of the various different entertainment resources may utilize wireless technology when communicating with server 15.

According to specific embodiments, wireless entertainment resource tracking may be implemented in both traditional gaming machines 2 and mobile gaming devices 412. The location of these devices can be tracked and the information stored in a central database associated with server 15. Several wireless technologies are suitable for use herein. 802.11 is one suitable wireless protocol and technology that offers commercially available equipment. GPS technology may also be used to track mobile gaming devices beyond the limits of a casino property. This allows a casino to track devices and/or patrons to determine where they are going while not utilizing the offerings in a particular casino. Such information may also be stored as behavior data, for example.

In at least one embodiment, the casino tracking system may be operable to collect data relating to people and/or entertainment resources using RFID technology. One such example embodiment is illustrated in FIGS. 5A-C.

Figure 5A:
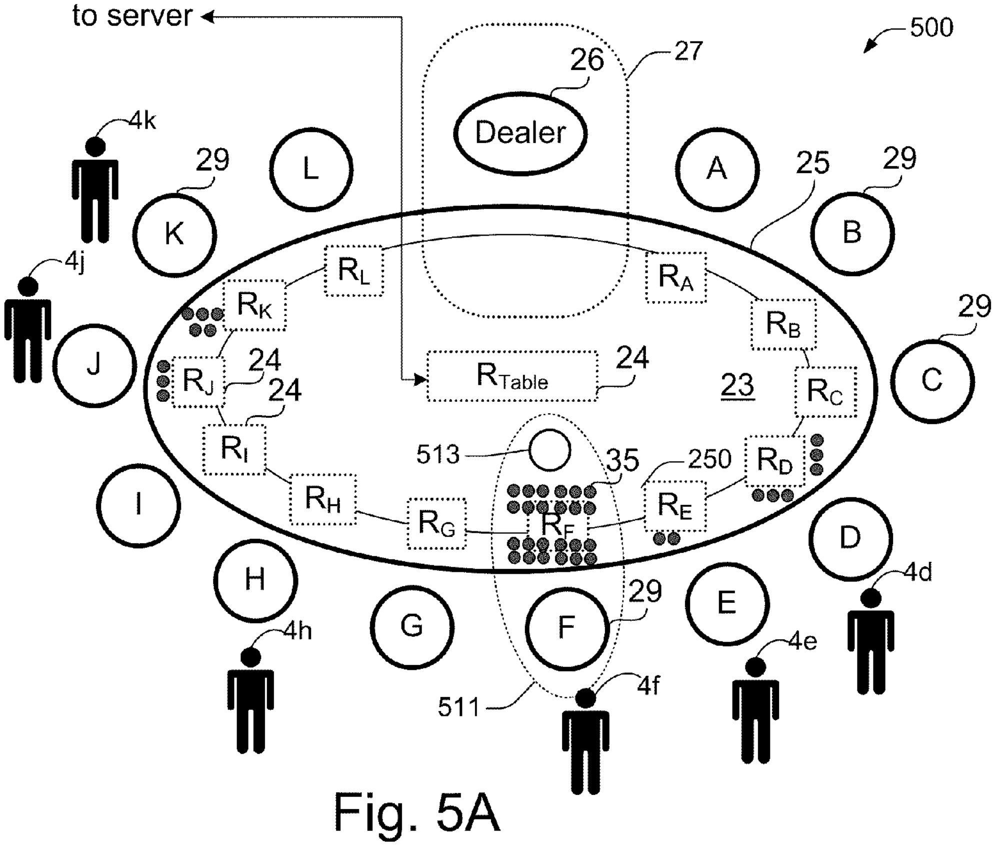
FIG. 5A shows a poker table that includes wireless readers in accordance with one embodiment of various aspects described or referenced herein.
Figure 5B:
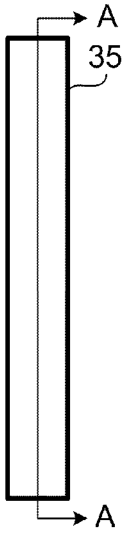
FIGS. 5B and 5C illustrate a portable RFID token in accordance with one embodiment of various aspects described or referenced herein.
Figure 5C:
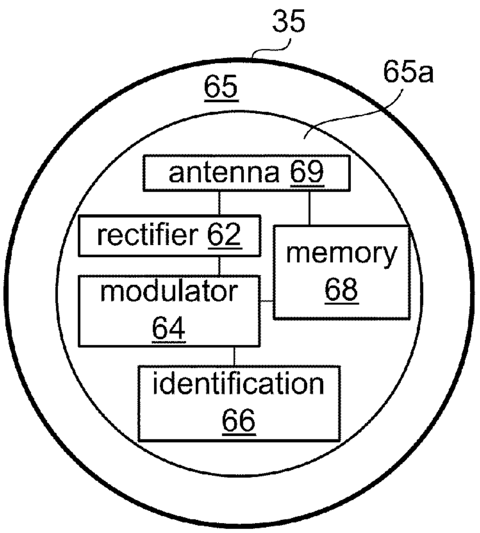

FIG. 5A shows an example embodiment of a gaming table system 500 which is suitable for implementing various aspects described or referenced herein. As illustrated in the example embodiment of FIG. 5A, gaming table system 500 comprises a poker-type gaming table 25 which includes a playing surface 23, a set of RFID readers 24, and a dealer station 27. Gaming poker table 25 includes twelve seats 29, lettered A-L, disposed around the perimeter of table 25. Each seat 29 is intended to sit a person that wants to play poker at table 25. Table 25 may include a different numbers of seats, such as six, eight or ten.

In one embodiment, each person carries an RFID device, associated with their identity, that a reader 24 can detect. For example, a player-tracking card associated with a person may include an RFID tag. In at least some embodiments, portable gaming tokens 35 carried by the players may have RFID tags included therein and each associated with a respective patron 4. Externally, the tokens resemble coins or wagering chips, but include RFID tag technology internal to the outer body.

In one embodiment, a server assigns token ownership to a person by: a) appointing a unique ID number to each token 35, and b) allocating identification information that correlates the identification number and a current owner. Token tracking software may monitor ownership of each token on the table, and may also track which tokens (e.g., 35) are owned by each person sitting at the gaming table. In at least one embodiment, the tokens may also provide a means to track a person (and the tokens being carried by that person) through a casino property using RFID readers at the property.

As illustrated in the example embodiment of FIG. 5A, table 25 includes multiple RFID readers 24. In one embodiment, each RFID reader 24 is embedded below surface 23 (hence the dotted lines in FIG. 5A) and monitors the presence of RFID devices carried by people (e.g., 4*d*-4*k*) within a local area determined by its interrogation range. For example, one or more centrally disposed RFID readers 24 for the table (e.g., RFID reader 25 designated $R_{Table}$), may be configured or designed to detect and monitor the presence of RFID devices carried by any people 4 in the vicinity of the table 25.

Additionally, as illustrated in the example embodiment of FIG. 5A, each player station associated with each respective seat 29 at the table may also include its own respective RFID reader(s) 24 (e.g., RFID Readers $R_{A-L}$), configured or designed to detect and monitor the presence of a RFID devices within the possession or control of the person occupying that seat/player station. For example, in one embodiment, the gaming table system may include one or more components for detecting wagering tokens within a specified region or zone at the gaming table which, for example, may be defined as that player's personal space. For example, as illustrated in the embodiment of FIG. 5A, the player station associated with seat F has associated therewith a personal space region 511. In at least one embodiment, each player station at the gaming table may have associated therewith its own unique personal player space region. In one embodiment, a tracking system utilizing the gaming table RFID readers may be operable to automatically identify and track the number and values of wagering tokens which are located within a player's personal space at the gaming table.

It will be appreciated that other RFID reader configurations (not shown) are also suitable for use herein.

FIGS. 5B and 5C illustrate an example embodiment RFID token 35 in accordance with one embodiment. FIG. 5B shows a side view of token 35, while FIG. 5C shows a top cross section of token 35 taken through plane A-A of FIG. 5B. In one embodiment, token 35 may be implemented as an intelligent wagering token.

As illustrated in the example embodiment of FIG. 5C, token 35 includes a body 65, an identification (ID) tag 66, a memory component 68, and one or more communications components. In this particular example, the communications components include rectifier 62, a modulator 64, and an antenna 69.

In at least one embodiment, body 65 includes a rigid material, such as a durable and substantially rigid plastic, that is externally shaped to resemble a coin. The internal RFID components are embedded within a central portion 65*a* of body 65.

Functionally, a wireless probe of token 35 identifies the portable RFID device relative to other portable RFID devices near it. This may occur using any suitable identification technique, such as a unique frequency response from the token or logical enumeration and identification, for example. In a specific embodiment, when probed, token 35 replies with a unique identifier, ID number, or other numeric representation assigned to token 35.

In at least one embodiment, the identifier distinctively enumerates each token 35. This allows each token 35 to be distinguished from other tokens 35—as would be encountered, for example, when numerous tokens 35 are within a reading range of a reader 24 at gaming table 25. In one embodiment, portable RFID device 35 automatically returns an identification signal when probed by token reader 24.

In at least one embodiment, the unique identifier associated with each token also provides a means of automatically logging and updating data entry corresponding to the status of each token 25, such as, for example, one or more of the following (or combinations thereof):

- when ownership of a given token changes (e.g., as a result of game play/wagering activities at the gaming table);
- when the presence of a given token is no longer detected at the gaming table;
- when the presence of a given token is detected at a different gaming table;
- when the presence of a given token is detected at a gaming machine;
- when the presence of a given token is detected at the gaming table chip tray;
- when the presence of a given token is detected at an entrance or exit of a gaming region of the casino;
- when the presence of a given token is detected at an entrance or exit of a non-gaming region of the casino;
- when the presence of a given token is no longer detected as being within a specified distance or range (e.g., within about 3 feet) from a given player (e.g., the player identified as the current or most recent owner of the token) and/or player's RF-enabled smart card;
- when the presence of a given token is no longer detected by a given player's RF-enabled smart card (e.g., which includes functionality such as an RFID reader for detecting the presence of such tokens);
- etc.

In at least one embodiment, portable RFID device 35 includes a wireless communication system. For example, in the example embodiment shown in FIG. 5C, antenna 69 and modulator 64 collectively function as a wireless transponder. In at least one embodiment, a transponder functions to receive and transmit wireless signals. The transponder on token 35 receives a wireless signal from token reader 24, and in some embodiments, that signal includes sufficient power to allow transmission of the token's identifier and authentication information back to reader 24.

In a specific embodiment, the transponder includes an amplifier for increasing the strength of a received incident signal (from the reader 24 or other actuating device), a modulator 64 for modifying that signal with information provided to the transponder, and an antenna 69 or antennas for receiving and transmitting a wireless signal. In one embodiment, modulator 64 may be configured or designed to function as that part of a transponder which impresses information on a transmitted signal. In some embodiments, the interrogation and energizing signals are separate entities. In other embodiments, they are provided by the same means for simplification purposes, and/or may include an amplifier to facilitate signal transmission.

In one embodiment, reader 24 provides power to token 35. The power may be transmitted by RF waves, for example. Rectifier 62 rectifies the incoming signal, thereby providing sufficient DC voltage to operate any digital circuitry in token 35.

In one embodiment, the transponder may be operationally coupled to identification 66 in a manner giving it access to the identification 66 during probing by token reader 24. Various types of identifier tags 66 may be used with token 35. Examples of suitable ID tags 66 include microchips storing an ID code (e.g., an EPROM), magnetic recording devices, and the like.

Memory 68 stores information for token 35, such as, for example, one or more of the following (or combinations thereof):

- Token ID information.
- Timestamp information.
- Information relating to an identity of a current owner of the token.
- Information relating to identities of previous owners of the token.
- Information relating to devices (e.g., RFID readers, etc.) Which have communicated with the token.
- Information relating to signal strength criteria associated with one or more signals (detected by the token) which were transmitted by one or more external devices. For example, in one embodiment, a token (such as, for example, an intelligent wagering token) may be configured or designed to periodically store in it's local memory information relating to one or more interrogation and/or energizing signals detected by the token during one or more time intervals. According to specific embodiments, such information may include, for example: signal strength values (e.g., associated with one or more detected signals), device identifier data (e.g., for identifying the device(s) associated with transmission of the detected signals), timestamp information, etc.
- Authentication information.
- Information relating to parameters or criteria associated with collision avoidance communication protocols.
- Information relevant to a gaming property (e.g., casino name or identifying number).
- Historical information relating to use of the token.
- Other information pertinent to gaming interaction and/or token usage.
- Etc.

In at least one embodiment, memory 68 may include one or more of the following (or combinations thereof): non-volatile memory (e.g., FLASH memory, EPROMs, memristor-based non-volatile solid-state memory, etc.), unalterable memory (e.g., EPROMs 308), and/or other forms of memory. In another embodiment, token 35 does not include a separate identification 66 and memory 68, and the two are combined into a single memory 68 or identification 66.

It will be appreciated that other token designs (not shown) are also suitable for use herein. Additionally, at least some of the token designs described herein may also appropriate for use with authentication of intelligent wagering tokens.

Wireless ID tags are commercially known and there exists numerous manufacturers that currently offer a suitable selection of RFID tags. These tags may be either passive (receive energy via a rectified incident signal) or active (include their own power source). Major manufacturers include Texas Instruments of Dallas, Tex., Micron Communications of Boise, Id., Motorola of San Jose, Calif., and Gemplus International S.A. of Montgomeryville, Pa. Each manufacturer provides several models suitable for use herein.

Portable RFID devices (such as, for example, token 35) and RFID readers (such as, for example, 24) use wireless communication that takes place via electromagnetic radiation of one or more appropriate frequencies. Generally, however, token reader and token may be designed to allow any suitable probe signal or carrier (not just RF or other electromagnetic radiation). In at least one embodiment, the carrier may allow token 35 to be probed from a substantial distance and over a wide area. It may also power the transmission of data from the token to the reader. In at least one embodiment, the carrier may also provide sufficient bandwidth to transfer the desired information in a timely manner. Additionally, the modulated carrier may also be sufficiently unique, in terms of frequency, time synchronization, and/or coding, such that it is distinguishable from signals provided by other nearby tokens. Further, in at least one embodiment, one or more tokens may be configured or designed to include collision avoidance mechanisms which may be used to reduce occurrences of signal collisions which may be caused, for example, as a result of multiple different tokens in a given region attempting to "talk" at the same time.

Generally, the carrier may be a wave or field or other intangible effector that acts over a distance through one or more mediums (e.g., air, fluid, solid, etc.) between a reader (e.g., reader 24) and a token (e.g., token 35). Examples of suitable carriers include RF radiation, microwave radiation, Ultra High Frequency (UHF) radiation, Super High Frequency (SHF) radiation, Low Frequency (LF) radiation, High Frequency (HF) radiation, Ultra Low Frequency (ULF) radiation, Super Low Frequency (SLF) radiation, infrared radiation, electric fields, magnetic fields, and/or other frequency ranges or bands of the electro-magnetic spectrum.

In at least one embodiment, Ultra High Frequency (UHF) radiation may include electro-magnetic signals within the range of about 0.3 GHz to 3 GHz, Super High Frequency (SHF) radiation may include electro-magnetic signals within the range of about 3 GHz to 30 GHz, Low Frequency (LF) radiation may include electro-magnetic signals within the range of about 30 kHz to 300 kHz, High Frequency (HF) radiation may include electro-magnetic signals within the range of about 3 MHz to 30 MHz, Super Low Frequency (SLF) radiation may include electro-magnetic signals within the range of about 30 Hz to 300 Hz, and Ultra Low Frequency (ULF) radiation may include electro-magnetic signals within the range of about 0.3 kHz to 3 kHz As an illustrative example, if the token-reader system employs the use of RF radiation, the frequency may range between about 125 kHz and 5800 MHz, and may be provided at a power of between about 7 and 2 Watts, respectively (e.g., as specified by the IEEE). In a specific embodiment, a reader may be configured or designed to operate at an approved frequency at or near that used for an available RFID device; e.g., near 125 kHz in one case and about 13 MHz in another case.

Microwave radiation provides another suitable carrier. Generally, microwave provides the same functionality as RF radiation, but at larger read ranges. In addition, any approved or regulated band such as the ISM bands at 945 MHz, 5.8 GHz and 2.45 GHz may be used. In at least one embodiment, a reader may also employ a multi-band or multi-frequency source having one frequency to supply power and a second frequency for interrogation, for example.

In operation, each token reader may probes tokens 35 which are located within the reader's read range. For example, in one embodiment, reader 24 provides a wireless probe signal that triggers token 35 to respond with its identity. In some embodiments, the token may also respond by providing other information such as, for example, authentication information, timestamp information, selected information stored in the memory of the gaming token, etc.

For example, in one embodiment, when probed by reader 24, token 35 may reply with its ID code (from identification tag 66 or memory component 68) and optionally any ownership data contained in memory component 68. In a specific embodiment, the signal provided by reader 24 also provides the energy for token 35 to reply. In one embodiment, reader 24 may detect the token 35 reply, and a processor local to the reader 24 may convert the detected reply (and information embedded therein) to a signal suitable for transmission to a computer system or server. In one embodiment, the ID code provides a means for the server to automatically log data corresponding to individual portable RFID devices 35.

In at least one embodiment, a token reader may be configured or designed to interrogate multiple tokens 35 simultaneously. This allows the reader to interrogate large numbers of tokens within a given region (such as, for example, the region defined by gaming table 25). In some embodiments, selected identifier tag/interrogation systems may be configured or designed to poll tokens one at a time (e.g., serially). In other embodiments, selected interrogators are configured or designed to poll multiple different tokens simultaneously.

In at least one embodiment, various types of communication strategies may employ the use of anti-collision and/or arbitration procedures which may be used to control the timing of when a tag responds to a probe.

In a specific embodiment, each reader may include its own processor, control logic, transceiver and interrogator antenna adapted to interrogate multiple tokens simultaneously.

In at least one embodiment, reader 24 may provide a probing signal (and optionally power) to a token 35. In a specific embodiment, one or more readers may be configured or designed to provide:

- sufficient radiated power to energize each token 35 at a desired read rate;
- sufficient bandwidth to interrogate numerous tokens 35 during a given time interval;
- sufficient sensitivity to accurately obtain a response from each token;
- processing or interrogation mechanisms to discriminate between nearby tokens 35 in its reading range;
- suitable interface(s) to access token-related information from a database stored on one or more remote/external systems;
- etc.

For example, in one embodiment, reader 24 may provide sufficient radiated power to energize one or more tokens (e.g., at a desired read rate) by transmitting an electromagnetic signal in the form of continuous wave, spread-spectrum waveform, impulse, and/or coded waveform.

In one embodiment, a passive token 35 may rectify an incident RF signal received from reader 24 to provide DC power for internal token processing. In one embodiment, once activated, token 35 may modulate the incident carrier with its ID code (and/or with other data), and provide a modulated backscatter signal. The response signal may be at a frequency different from that of the incident signal. Reader 24 detects this modulated backscattered signal and translates the identification number (and other embedded data) for the token into a suitable format (e.g., TCP/IP packet) for communication with a server and/or other remote device(s)/system(s).

Although not shown, the various techniques described herein may also be suitable for other types of gaming table tables used at the casino property, such as, for example, one or more of the following (or combinations thereof): blackjack tables, craps tables, baccarat tables, roulette tables, poker tables, pai gow tables, sic bo tables, fantan tables, etc.

Moreover, it will be appreciated that reader 24 is not limited to use at a gaming table. Various types of readers may be deployed at multiple different locations/devices of the casino property. For example, in one embodiment, a reader may be installed in a gaming machine, for example, to allow token detection/tracking/usage and/or player identification/authentication at a gaming machine. According to different embodiments, one or more readers may be located at one or more kiosks in the casino, at one or more entry/exit doors (e.g., to automatically poll portable tracking devices entering and/or leaving various regions of the property), at one or more locations adjacent to different types of entertainment services/devices available to patrons of the casino, and/or at other desired locations. In some embodiments, one or more readers may be configured or designed as mobile or portable readers, which may be carried by one or more persons moving about the casino. For example, in at least one embodiment, a reader mechanism may be incorporated into a patron's player tracking card or smart card for enabling such cards to be able to detect, probe, and/or communicate with tokens such as, for example, tokens being carried by the patron, tokens located within the patron's personal space, etc.

In addition, although portable RFID devices have been described with respect to portable tokens that resemble coins or casino-type betting chips, tracking systems described herein may include and/or be compatible for use with other types of portable devices, such as, for example, one or more of the following (or combinations thereof): cards (e.g., player tracking cards, smart cards, etc.), PDA's, cellular phones, mobile gaming devices, mobile kiosk devices, Bluetooth headset devices, etc. In at least some embodiments, at least some of the portable devices may include RFID technology configured to communicate with an RFID reader. Other types of commonly known portable devices may are also be suitable for use herein.

In at least one embodiment, the tracking system may be configured or designed to enable data to be transmitted by portable instruments (e.g., passively and/or actively) to thereby enable patron and/or token tracking without requiring any active participation by the patron other than the patron carrying (or possessing on his or her person) at least one portable device which is capable of being tracked (e.g., RF-enabled player tracking card, intelligent wagering token, etc.). For example, in one example scenario where a patron is assumed to be carrying an intelligent wagering token such as token 35 of FIG. 5C, the location of the patron may be detected each time the patron approaches a compatible reader. In at least one embodiment, one or more different readers may be installed at each gaming device in a casino (e.g., gaming machine, gaming table, etc.), at each entry or exit, in hallways of the hotel near rooms, at elevators, at services such as restaurants and shops, etc. Accordingly, in at least one embodiment, the patron may be tracked, in real-time, as he or she moves through about the casino property. In at least one embodiment, at least a portion of the tracked data may be collected and stored at least one database in the casino network.

Automation of Player Rating Sessions at Gaming Tables

Various techniques described herein may be also used to automatically determine a player's wagers and time played at a gaming table. For example, as described herein, different player tracking mechanisms may be used to detect the presence and/or location of a player (and/or presence and location of a player's electronic player tracking card or other wireless device(s) associate with that player) within the casino. Additionally, different player tracking mechanisms may also be used to detect the presence, absence and/or location of a player (and/or presence and location of a player's electronic player tracking card or other wireless device(s) associate with that player) at one or more casino gaming tables. In at least one embodiment, at least a portion of such player tracking information may be provided to a player rating system to be used in performing automated player rating activities associated with the player.

For example, according to different embodiments, an automated player rating system may be operable to use at least a portion of the player tracking information (and/or other desired information, events and/or criteria as described herein) to automatically start, stop, pause and/or resume player rating session(s) associated with a given player.

In at least one embodiment, various distinctions may be made between player tracking session information and player rating session information. For example, in one embodiment, player tracking session information may include a variety of different information generally relating to locations and/or activities of players in different regions of a casino. Such activities may include gaming and/or non-gaming related player activities. In one embodiment, for example, a single player rating session may include generating, monitoring, tracking and/or recording information relating to a variety of different player gaming (and/or non-gaming) activities which may occur (e.g., for a given player) at different gaming stations, gaming tables and/or gaming machines at the casino. Thus, for example, in one embodiment, a single player tracking session for a given player may include information relating to the player's gaming activities at multiple different gaming tables. In at least one embodiment, such player tracking session information may include player rating information relating to the player's gaming activities at the different gaming tables.

In at least one embodiment, player tracking information may be characterized as a subset of player tracking information. For example, in at least one embodiment, player rating information may be used to track and/or evaluate a player's skill level, ranking, and/or comp value to the casino. In at least one embodiment, player tracking information may include at least a portion of such player rating information, but may also include other information which may be used to characterize a player's preferences, habits, non-gaming activities, interests, etc.

In one embodiment, player rating information may include a variety of different information generally relating to a player gaming activities at a given gaming table, gaming station and/or gaming machine. Moreover, in at least one embodiment, a separate player rating session for a given player may be initiated and used to track player rating information relating to the player's gaming activities at each different gaming table visited by the player. Thus, for example, in one embodiment where a player may engage in gaming activities at three different casino gaming tables, three different player rating session may be initiated for that player, wherein each player rating session may be used to track the player's gaming activities at respective gaming table visited by the player.

In one embodiment, information relating to tracked patron movement may be stored as a traffic pattern data and used for subsequent patron traffic pattern analysis.

Figure 6:
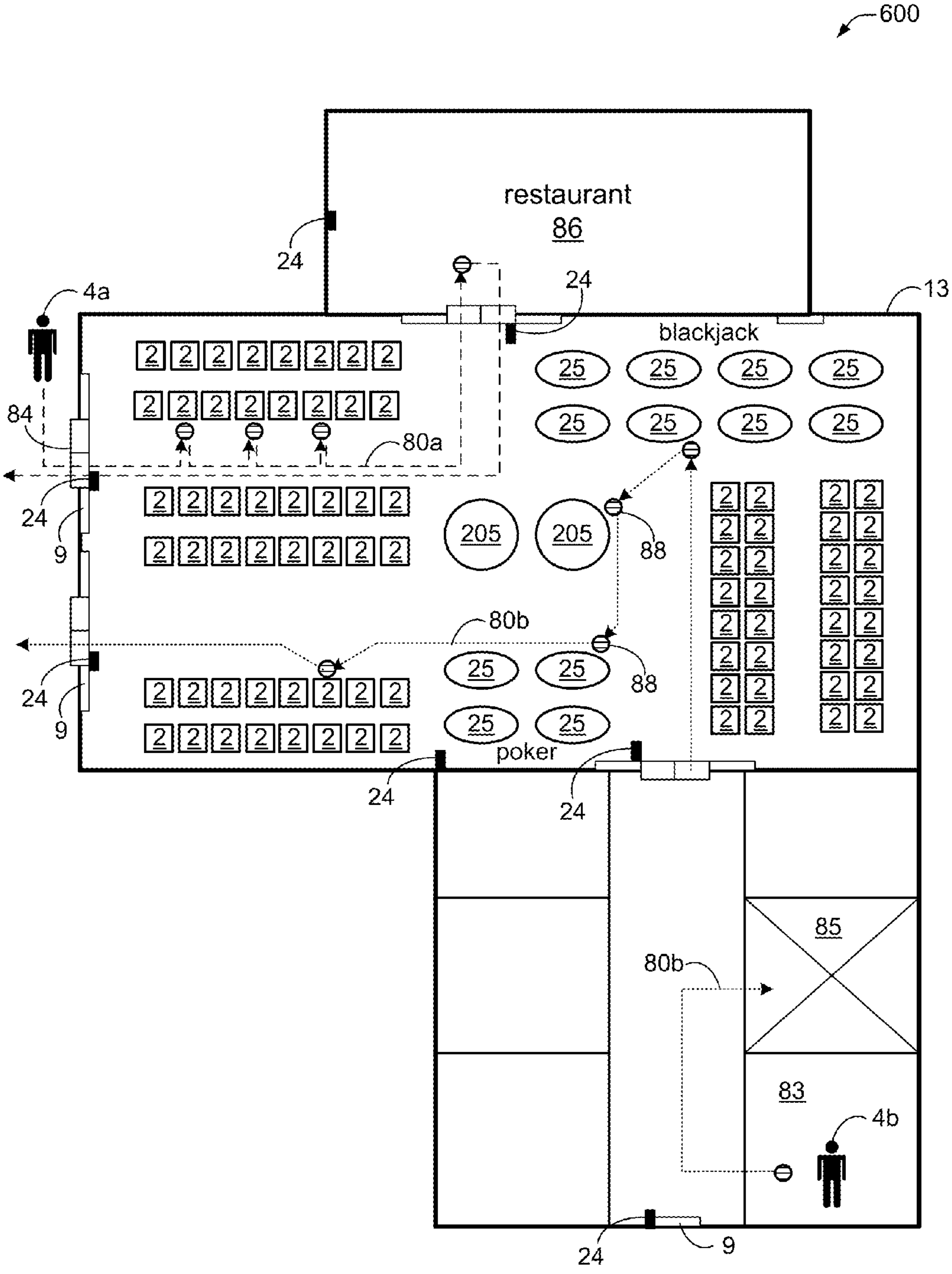
FIG. 6 shows sample traffic patterns for two people in a casino in accordance with a specific embodiment of various aspects described or referenced herein.

FIG. 6 shows an example embodiment illustrating sample traffic patterns 80*a* and 80*b* relating to two different people (4*a* and 4*b*, respectively) in a casino establishment 13.

In at least one embodiment, the term "traffic pattern" may refer to the route(s) a person takes in a casino property. In this particular example, it is assumed that person 4*a* entered the casino through external doors 84, played a game at three different gaming machines 2, had lunch at restaurant 86, and then left casino 13 through doors 84. A person may make multiple routes in a casino. For example, when the person stays in a hotel with the casino, a route may be designated as each time the person enters the casino floor, each time they leave their room, or each time they enter the casino grounds. Person 4*b* began route 80*b* from a hotel room 83 in the casino, took an elevator 85 down to the casino floor, and then proceeded to a blackjack table 25, then to kiosk 205, then to a poker table 25, and then out an external casino door.

In at least one embodiment, the traffic pattern data may include a log of activities performed or engaged by the patron at one or more destinations. In the example embodiment of FIG. 6, examples of patron activity data are indicated as dots 88 along each traffic pattern 80. Data may be logged from each activity. For example, if the person played a game on a gaming machine, then all (or selected) data from the gaming machine interaction may be logged, such as duration of play, what games were played, wager amounts, etc.

In at least one embodiment, all (or selected portions of) the tracked data relating to each traffic pattern 80 may be sent to one or more systems/devices of the casino network for storage and/or analysis. For example, in one embodiment, all (or selected portions of) the tracked data relating to each traffic pattern 80 may be sent to a central server for storage and/or analysis.

In at least one embodiment, casino 13 includes numerous RFID readers 24 disposed throughout the property. When an RFID tag passes through the electromagnetic zone of a reader 24 in casino 13, the tag detects the reader's activation signal. The reader decodes the data encoded in the tag and the data is passed to a server.

In at least one embodiment, use of portable RFID devices allow persons (e.g., 4*a*, 4*b*) to be tracked throughout the casino. By tracking such portable RFID devices, casino management may determine the identity of a patron at a gaming machine, even if the patron did not insert a card.

In at least some other embodiments, the tracking system(s) may use other portable devices (e.g., with RFID tags) to track patron/token movements, activities, etc. For example, if the casino has a retail shop, selected retail items may be tagged with an RFID device. When purchased by a user, tracking data may be collected via the use of the retail item tag, such as, for example: identification or location information, specifics about the product tagged (e.g., price, color, date of purchase, etc.), identity of purchaser of the retail item, etc.

In at least one embodiment, automated video surveillance and storage of patron behavior data are also suitable for use herein. For example, in one embodiment, one or more cameras may be installed in casino and used to view and record patron behavior-related activities in a casino. In one embodiment, this may be accomplished by providing a network of cameras, one or more servers, and at least one storage medium for storing video clips and other patron behavior data. Video clips of patron activities may be captured, recorded, and automatically associated with patrons (e.g., based on biometric identification), and optionally associated with one or more patron behavior data identifiers that characterize patron behavior. Examples of different patron behavior data identifiers may include, for example, one or more of the following (or combinations thereof): playing a game, entering a restaurant, sitting at a card table, playing a card game, what times these activities occur, their duration, etc.

In some embodiments, passive monitoring and/or wireless tracking of patrons (and/or portable tracking devices such as tokens, player tracking cards, etc.) enables a casino to collect and analyze movement and behaviors at a level of granularity not possible using presently existing player tracking mechanisms. For example, by employing one or more tracking techniques described herein, a patron can be tracked from the time they enter a casino until the time they leave. In some embodiments, the tracked data may include information relating to where a patron went in a casino property, what they did, and how much time they spent in each location. Additionally, in at least some embodiments, the tracking system may also track (e.g., in real-time) the number and total value of wagering tokens which a patron possesses (and/or possessed) at any given time interval and/or at any given location where the patron has been. Such tracking mechanisms may also allow casino management to track information relating to, for example: how and where casino patrons spend their money; the quantity and/or value of money and/or wagering tokens a person possesses when entering a gaming region of the casino; the quantity and/or value of money and/or wagering tokens a person possesses when leaving a gaming region of the casino; the quantity and/or value of money and/or wagering tokens a person possesses at various times while the person is located in a gaming region of the casino; the quantity and/or value of money and/or wagering tokens a person possesses at various times while the person is located in a gaming region of the casino; the quantity and/or value of money and/or wagering tokens a person possesses when starting a gaming session at a gaming machine or gaming table; the quantity and/or value of money and/or wagering tokens a person possesses when ending a gaming session at a gaming machine or gaming table; etc.

Over time, patron tracking of multiple people permits a casino to better understand behaviors and habits of their patrons. This allows the casino to configure the property to guide patron experience in order to increase revenue. Such macro-casino actions resulting from improved information collection are described herein.

Figure 7C:
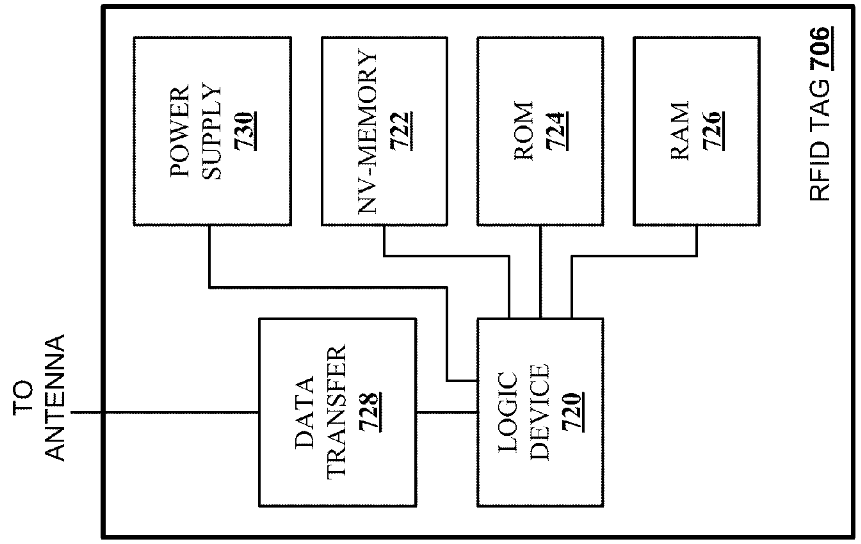
FIG. 7A-7C illustrate block diagrams representing example embodiments of various RFID tags and RFID readers which may be used for implementing various aspects described or referenced herein.
Figure 7A:
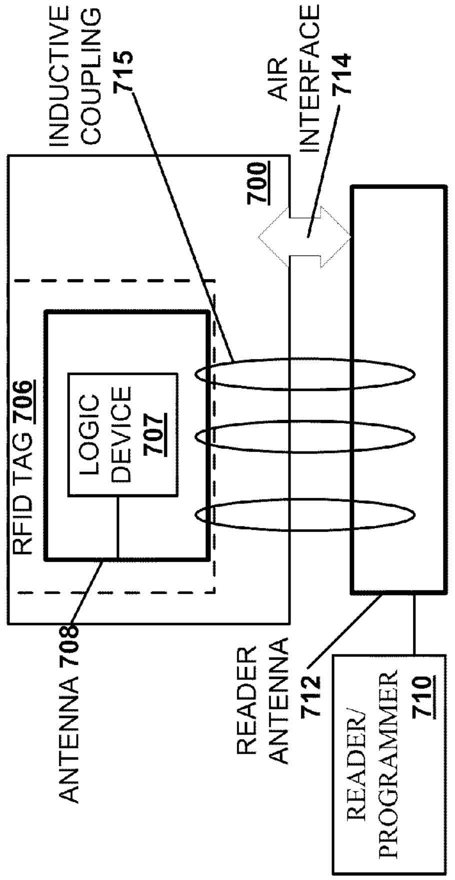
Figure 7B:
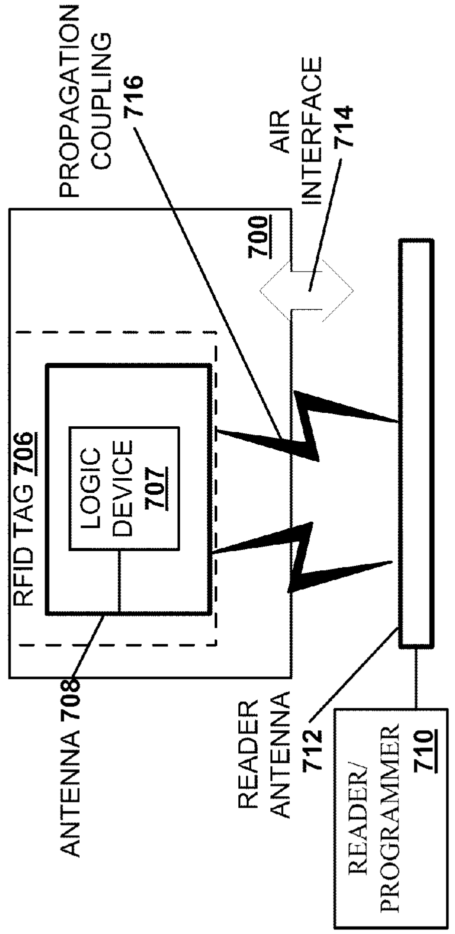

FIG. 7A-7C illustrate block diagrams representing example embodiments of various RFID tags and RFID readers which may be used for implementing various aspects described or referenced herein. More specifically, the example embodiments shown in FIGS. 7A and 7B employ the use of inductive coupling and propagation coupling to read RFID tags. FIG. 7C shows a block diagram of an example embodiment of an RFID tag which may be used for implementing various aspects described or referenced herein.

In FIG. 7A, a reader antenna 712 connected to a reader/programmer 710 is used to communicate with an RFID tag 708, including a logic device 707 and antenna 708, which is located on a substrate 700. The RFID tag 706 is a passive RFID tag and does not include a power supply. Although, as described with respect to FIG. 7C, active RFID tags with a power supply may be used in one or more embodiments described herein. The logic device may be a silicon microprocessor, which may vary in size. The antenna is typically a metal coil made of a conductive metal such as copper or aluminum.

Power is supplied to the RFID tag 706 via the air interface 714 through inductive coupling 715 to the metal coil which is the tag's antenna 708. Inductive RFID tags are powered by a magnetic field generated by the reader. The antenna 708 picks up magnetic energy. The magnetic energy is then used to power the logic device 707. The logic device 707 modulates the magnetic field in order to retrieve and transmit data back to the reader 710. The data transmitted back to the reader then may be communicated to another gaming device, such as but not limited to, a logic device on a player tracking unit, a master gaming controller on a gaming machine and a remote server.

An example embodiment of an RFID tag using capacitive coupling or propagation coupling 716 is shown in FIG. 7B. In a typical RFID tag using propagation coupling, the logic device 707 is a silicon microprocessor. The RFID tag's antenna 708 is generated using a conductive ink. By printing the antenna structure on a media, such as paper, using the conductive ink, the antenna may be formed. Carbon-ink electrodes on the paper, which may be integrated into an adhesive label, may be used to connect the antenna to the microprocessor. The capacitively coupled RFID tag 706 is powered by electric fields generated by the reader antenna 712 attached to the reader/programmer 710.

In another embodiment, the RFID tag 706 may include one or more photocells. The photocells may be used to power the RFID tag by shining light energy, such as a generated by a laser, onto the photocell. The photocell then transmits the energy received from the laser to the logic device.

According to specific embodiments, the RFID tags may use one or more different frequency ranges (e.g., low, medium and/or high) to communicate information. For example, in one embodiment, at least 3 different frequency ranges may be used, including, for example, a low frequency range from about 100-500 KHz, a medium frequency range from about 10-15 MHz, and a high frequency range from about 850-850 MHz and 2.4 to 5.8 GHz. In one embodiment, the reading speed for data and the reading range increases as the frequency used with the RFID tag increases. The range of the RFID system is a function of the power available at the reader/programmer 710 and the power available by the RFID tag to respond and the environmental conditions in which the RFID tag is used, such as a casino environment.

One function of the reader portion of the reader/programmer 710 is to provide a mechanism for communicating with the tags and facilitating data transfer. The reader may include a logic device designed to perform signal conditioning and parity error checking and correction. RFID readers, such as 710, may probe simultaneously a plurality of RFID tags. Once a signal from an RFID tag has been correctly received and decoded, algorithms may be applied to decide whether the signal is a repeat transmission. When the reader 710 determines the transmission has been repeated, the reader may instruct the RFID tag to stop transmitting. This process, which may be referred to as "Command Response Protocol," may be used to circumvent the problem of reading multiple tags in a short period of time during batch processing. In another approach, the reader 710 may look for RFID tags with specific identities and interrogate them in turn.

Batch processing may be applied when a plurality of RFID tags are within the range of the RFID reader. For example, batch processing may be applied when a player is carrying a plurality of instruments where each instrument may include one or more RFID tags. In this example, the reader may be able to interrogate each of the RFID tags to determine the function of each instrument carried by the player. In one embodiment, when the player is carrying a plurality of RFID tags where a portion of the RFID tags encode index numbers corresponding to different player tracking programs, then the RFID reader located on the gaming machine may be able to read each of the index numbers stored on the tags and determine if any of the read index numbers are valid for a player tracking program implemented on the gaming machine. The interrogation of the different RFID tags by the reader may be initiated when a game play session is initiated on the gaming machine.

In one embodiment, the player may carry instruments with RFID tags issued for a number of purposes, such as player tracking programs, anonymous loyalty instruments, cashless instruments (e.g., wagering tokens), promotional credits, coupons and comps. These RFID tags may have been issued at different locations and at different times. Thus, the RFID tags may store various types of information such as, for example one or more of the following (or combinations thereof): a purpose, where they were issued, the time they were issued, when they expire, etc.

When a game play session is initiated on the gaming machine by a player or in response to some other game event, a reader may interrogate the RFID tags that are within range of the reader such as the RFID tags carried by the player initiating the game play session. With this information, the gaming machine may be able to determine 1) what types of tags the player is carrying, 2) what is their purpose and 3) where the player has been. The gaming machine may also be able to determine where the RFID tag was issued, when the instrument with the RFID tag was issued and whether the instrument has an expiration date. This process may be carried out at other locations frequented by the player. For instance, RFID readers may be located at cashier stations, ATM machines, casino kiosk, hotel registration desks, gaming machines, gaming tables, portable electronic devices (such as, for example, a player tracking card or smart card carried by a casino patron), etc.

Using information read from RFID tags carried by the player, system or device, such as a gaming machine, or a casino employee that has access to the read information, may provide targeted information to the player. For instance, if the player is carrying a coupon for promotional credits, the gaming machine may remind the player of the coupon and encourage them to use it. In another embodiment, if the gaming machine determines the player is carrying cashless instruments with a cash value above a certain threshold, then the gaming machine may offer the player promotional offers to entice them to spend it. The promotional offer may be displayed on a display screen on the gaming machine or may be made via a printed ticket issued by the gaming machine. In another embodiment, based upon information read from the RFID tags, such as the value of cashless instruments (e.g., coupons, vouchers, wagering tokens, lines of credit, etc.) carried by the player, the gaming machine may notify an attendant to provide the player special service.

In another embodiment, if the gaming machine determines that any of the instruments carried by the player are about to expire, the gaming machine may generate and display a notification message. For instance, cashless instruments are only redeemable for a limited time period. Thus, if the gaming machine determines that a cashless instrument is about to expire, the gaming machine may generate a notification message with this information and display the message. In another example, promotions, such as promotional credits, may only be valid for a limited time period. Therefore, if the gaming machine determines the promotion is about to end, then the gaming machine may generate a notification message with this information and display the message.

The targeted services may also be provided while identity of the player is unknown. For example, in situations where the RFID tags do not contain information about the player's identity, targeted anonymous gaming services may be possible using other information read from a plurality of RFID tags carried by the player, such as, for example: the purpose of the instrument, when they were issued, where they were issued, etc. In at least one embodiment, such information may be sufficient to allow targeting of one or more services to the player. As described above, information read from the instruments the player is carrying may be used to construct a history of the player's recent activities, and may also be used to target selected services to the player.

In at least one embodiment, a person carrying the RFID tags may not know what information is stored on the tags or in what instruments the tags are located. Further, the information on the RFID tags may be gathered without any active participation by a person carrying the RFID tag, i.e., the information gathering process is passive in regards to participation by the player.

It will be appreciated that such passive information gathering is not possible with a magnetic striped card. For example, with a magnetic striped card, active information gathering is required because the player has to correctly insert the card into a card reader to have the information from the card read. Further, only the information on the inserted card is read. Information from other magnetic striped cards carried by the player can't be read unless the player serially inserts the card in the card reader.

However, using RFID tags, the player may only have to be in a location within the range of the RFID reader to have the information on all the RFID tags (e.g., which the player is carrying) to be read.

Returning to FIGS. 7A and 7B, the reader/programmer 710 may be used to store information to an RFID tag 706. In one embodiment, the programming process may involve a write-once read many (WORM) RFID tag. For this type of tag, the information programming may be carried out when the instrument with the RFID tag is issued. For example, a printable media with an embedded RFID tag may be programmed by the reader/programmer 710 during the process of generating a printed ticket with the RFID tag. In another embodiment, the embedded RFID tag may be pre-programmed and the information stored on RFID tag may only be read when the printed ticket is issued. The data read from the RFID tag may be stored in a database located on one of the gaming machine, a remote server and combinations thereof. As described with respect to FIG. 7C, more complicated RFID tags may be read/write capable, i.e., the memory on the tags may be written to and over written a plurality of times.

In one embodiment, a portion or all of the electronic circuitry for an RFID tag used in an instrument may be generated by printing the circuitry directly to a printable media. The printing process may be carried out by a printer located in a gaming device, such as a gaming machine as part of the process of issuing the instrument from the gaming machine. For example, circuitry may be printed on a cashless instrument when the cashless instrument is issued from the gaming machine. The circuitry may be used to store information about the cashless instrument, such as a value of the ticket.

In one embodiment, the printed circuitry may be memory circuitry used to store information used on the RFID tag 706. The printed circuitry may be generated when the instrument is issued i.e., "on the fly." As an example, the memory circuitry may be generated using conductive ink transferred to a suitable media, such as paper, using an inkjet printer. Paper is one example of a flexible media that may be used with one or more embodiments described herein. In another example, a thermal printer may be used to activate electronic pathways on a thermally activated media to create the electronic circuitry. The memory circuitry printed on the media used for the instrument may be capable of storing a number of bits of information, such as an index number for a loyalty program instrument. The memory circuitry may be connected to an RFID microprocessor embedded in the printable media, such as the logic device 707. Therefore, the stored information in the memory circuitry may be later read by an RFID reader 710.

The printers used in one or more embodiments described herein may also be capable of printing information (such as, for example, loyalty program instrument data, user ID data, instrument ID data, etc.) in other formats, such as, for example, 1-D/2-D bar-codes and/or alpha-numeric symbols, and/or other types of machine readable content. The printer may be one of a laser printer, inkjet printer and thermal contact printer. Further, the printer may be capable of printing information, such as a bar-code symbols, in an invisible format.

FIG. 7C shows a block diagram of an example embodiment of an RFID tag which may be used for implementing various aspects described or referenced herein.

In at least one embodiment, the RFID tags described or referenced herein may be passive and/or active tags. Active tags are powered by an internal battery and are typically read/write devices. Passive tags operate without an internal battery source, deriving the power to operate from the field generated by the reader.

The RFID tag memory may comprise one or more of ROM 724, non-volatile (NV) memory 722 (e.g., EEPROM, flash memory, solid-state memory, etc.) and RAM 726. The ROM memory may be used to accommodate security data and the RFID tag operating system instructions. The operating system instructions may be used by the logic device 720 to perform internal functions, such as response delay timing, data flow control, encryption/decryption and power supply switching. The RAM memory 726 may be used for temporary data storage during interrogation and response between the RFID tag 706 and the reader 710.

The NV-memory may be used to store RFID tag data and/or other data described or referenced herein. In at least one embodiment, NV-memory may be used to ensure the RFID tag data is not lost when the device is in its quiescent or power-saving sleep state. The NV-memory used in one or more embodiments described herein may vary in storage capacity. The NV-memory may be capable of storing a number of bits of information used to store a number that is an index to a record in a database or may be large enough to store a portable data file which may be a record in a database. For example, in at least one embodiment, information relating to gaming services may be provided using the record stored in a portable data file without contacting a remote server.

The data transfer circuitry 726 may be used as a data buffer to temporarily hold incoming data following demodulation and outgoing data for modulation and may be used to interface with the reader antenna. The data transfer circuitry 726 may also be used to direct and accommodate the interrogation field energy for powering purposes and triggering of the transponder response. Circuitry (not shown) may also be provided to allow for programming of the RFID tag 706. The power supply 730 is optional. Active tags may require a power supply while passive tags may derive power from remote sources such as the from field energy provided by the reader antenna or a laser light source used to transfer energy to the tag via a photocell.

Figure 8:
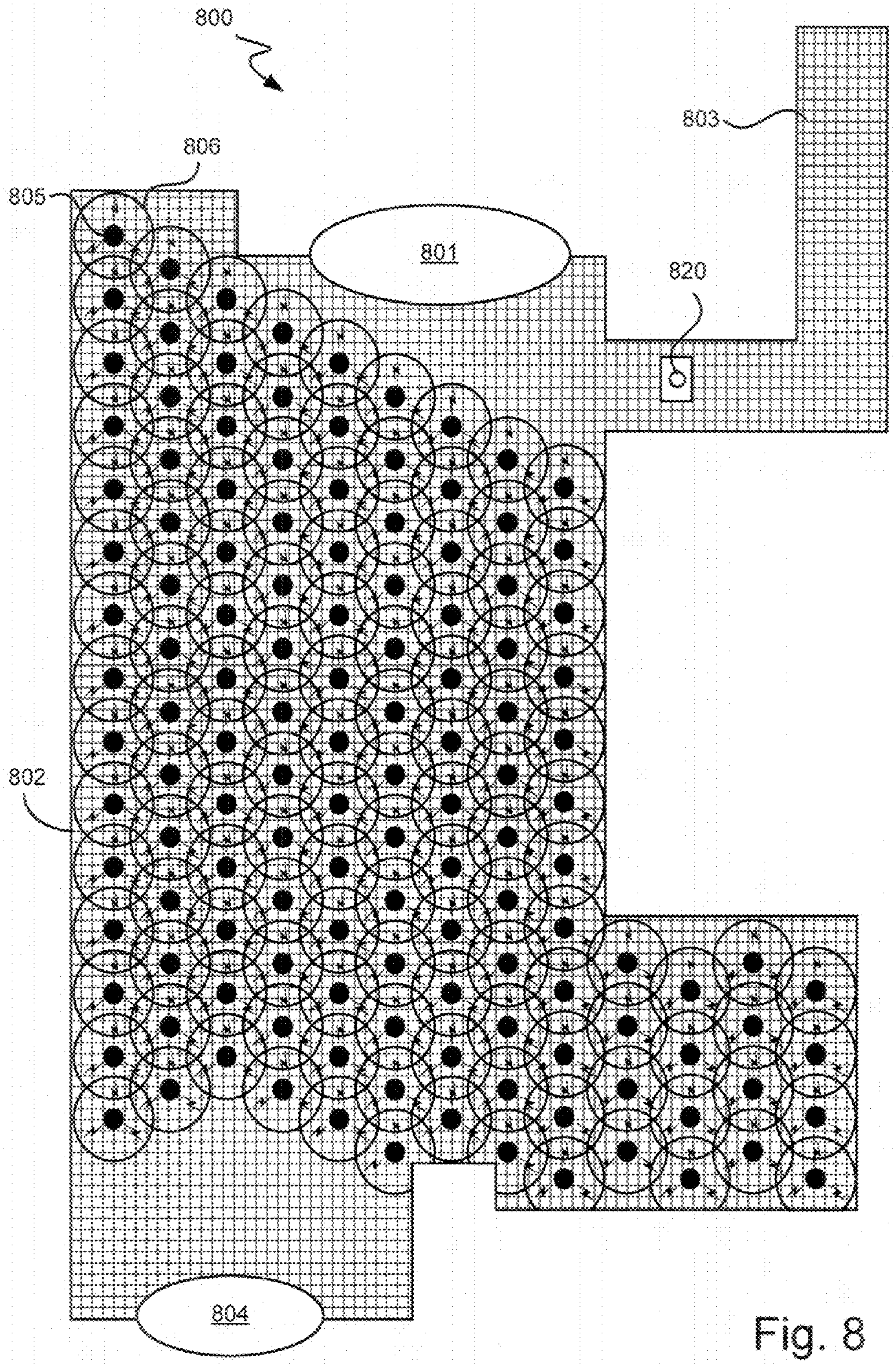
FIG. 8 shows a top-plan view of an example embodiment of a portion of casino floor layout 800 in accordance with one embodiment.

FIG. 8 shows a top-plan view of an example embodiment of a portion of casino floor layout 800 in accordance with one embodiment.

As shown in the example embodiment of FIG. 8, casino portion 800 can include various items in its floor layout, such as, for example, a main or primary entrance region 801, a main or primary gaming floor 802 adapted for the play of wager based games, a hallway or other passageway 803 to an associated hotel or set of elevators to hotel facilities, and an entrance region 804 to a restaurant, shop or other affiliated enterprise within the casino, among other items.

Of course, many other floor layout items and types of items may exist, and it will be understood that only a few are being shown for purposes of illustration in the present example.

As shown in the example embodiment of FIG. 8, an array of tracking device readers 805 (such as, for example, RFID readers) can be established within casino portion 800 in and about desired areas. In one embodiment, each tracking device reader 805 can have a limited short range, denoted as perimeter 806, within which signals emitted from the tracking device reader can be detected by a portable tracking device (such as portable tracking device 820) and vice-versa.

In at least one embodiment, each of the tracking device readers of the array may be communicatively coupled (e.g., via wired and/or wireless interfaces) to a casino tracking system. Utilizing this array of tracking device readers, the casino tracking system may be operable to perform one or more of the following (or combinations thereof):

- detect the presence of all (or selected) portable tracking devices within casino portion 800;
- track (e.g., in real time) the movements of all (or selected) portable tracking devices within casino portion 800;
- communicate with all (or selected) portable tracking devices within casino portion 800;
- communicate with the casino tracking system (e.g., for analyzing and/or establishes tracking patterns)
- etc.

As shown in FIG. 8, it may be desirable to orient multiple tracking device readers 805 such that there is some overlap with respect to the range of more than one cell. Such an overlapping design would not only prevent various "holes" in coverage that can occur where cells are spaced farther apart, but can also provide for a greater amount of backup coverage in an area in the event that a particular tracking device reader is lost, damaged or becomes non-functional for any reason.

Another aspect described herein is directed to different embodiments for automatically opening, suspending, resuming and/or closing wagering token tracking sessions at the casino.

For example, according to specific embodiments, various embodiments may include functionality for automatically tracking the locations and/or movements of one or more wagering tokens (e.g., RFID enabled wagering tokens) at a given gaming table and/or at other desired locations of the casino. For example, according to some embodiments, various mechanisms (e.g., directional RFID antennas, cameras, optical sensors, etc.) may be used to automatically track the locations and/or movements of one or more wagering tokens at a given gaming table and/or at other desired locations of the casino.

Additionally, another aspect is directed to different techniques for detecting and/or tracking wagering tokens which are within the personal space of one or more patrons or players at a casino.

In at least one embodiment, the "personal space" associated with a given player may be used, for example, for purposes of identifying wagering token(s) which are within the possession and/or control of that player.

According to different embodiments, various techniques and/or criteria may be used for determining the appropriate zone or region which defines the personal space for a given patron. Examples of such techniques and/or criteria may include, but are not limited to, one or more of the following (and/or combination thereof):

- size of the patron;
- relative density of patrons within region(s) adjacent to patron;
- patron profile data;
- type of game being played by patron;
- gaming table configuration;
- location of patron;
- reading range of wagering token reader(s);
- location of wagering token reader(s);
- etc.

For example, in one embodiment, the "personal space" boundaries for a given patron may be predefined or determined using fixed criteria, such as, for example, any region of space which is within about 2 feet from the current location of the patron.

In other embodiments, such as, for example, those in which the patron is in possession of a portable tracking device (e.g., player tracking card) which includes an RFID reader (or other functionality for detecting and communicating with wagering tokens), the "personal space" boundaries for that patron may be defined based on the reading range of the portable tracking device's RFID reader. In some embodiments, such a portable RFID reader may be specifically configured or designed to have a predetermined maximum reading range (such as, for example, a radius of about 3 feet).

In yet other embodiments, such as, for example, in situations where a patron is currently seated at a gaming table, the "personal space" boundaries for a given patron may be defined based upon the gaming table's configuration and the relative location of the patron (and/or patron's associated player station) at the gaming table. For example, as illustrated in the embodiment of FIG. 5A, a player (e.g., **4*f*) occupying a player station associated with seat F may have associated therewith a personal space region represented by region 511**. In one embodiment, the gaming table may include one or more components for detecting wagering tokens (e.g., belonging to a particular player) within a predetermined region or zone at the gaming table which, for example, may be defined as that player's personal space. In at least one embodiment, each player station at the gaming table may have associated therewith its own unique personal player space region. In one embodiment, a tracking system may be operable to automatically identify and track the number and values of wagering tokens which are located within a given player's personal space at the gaming table.

In at least one embodiment, the boundaries of a patron's "personal space" may automatically and dynamically change (e.g., in real time) depending upon various conditions or criteria such as, for example:

- the patron's current location;
- proximity to other patrons;
- proximity to other patrons' wagering tokens;
- proximity to other readers (such as, for example, proximity to other patrons' portable RFID readers);
- the patron's current activity;
- whether or not the patron is currently engaged in active game play at a gaming table or gaming device;
- etc.

For example, in one embodiment, a patron may enter a gaming region of the casino carrying a portable tracking device which includes an RFID reader. Upon entering the gaming region, the patron's personal space boundaries may be defined based on the reading range of the portable tracking device's RFID reader (e.g., current personal boundary of player is any region within 3 foot radius from portable RFID reader being carried by patron). The patron then approaches a gaming machine which includes one or more RFID readers, and begins play at the gaming machine. In one embodiment, the personal space of a player at a gaming machine may be defined to be the volume of space directly adjacent to the front of the gaming machine which is within 3 feet from the gaming machine body. In at least one embodiment, the gaming machine's RFID reader(s) may be configured or designed to have a collective reading range which approximately corresponds to these predefined gaming machine "personal space" boundaries. Accordingly, in one embodiment, when the patron begins play at the gaming machine, the patron's personal space boundaries may be automatically and dynamically updated to correspond to match the predefined gaming machine "personal space" boundaries. Sometime later, it is detected that the player has taken a seat at a specific gaming table. In response, the patron's personal space boundaries may be automatically and dynamically updated to correspond to match the predefined gaming table "personal space" boundaries associated with that gaming table's particular configuration.

According to various embodiments, different mechanisms may be used to identify and track the number and values of wagering tokens which are located within a player's personal space at the gaming table. For example, in at least one embodiment, one or more video cameras and intelligent image analysis software may be used to identify and/or track at least a portion wagering tokens which are located within a player's personal space at the gaming table. In some embodiments where at least a portion of the player's wagering tokens are RFID-enabled wagering tokens, tracking of the movements and/or locations of the wagering tokens may be accomplished, for example, using various types of RFID device tracking mechanisms such as, for example, RFID device tracking mechanisms well known in the art, and/or other types of RFID device tracking mechanisms such as those disclosed, for example, in U.S. patent application Ser. No. 11/726,633, entitled RADIO DIRECTION FINDER FOR GAMING CHIP AND/OR PLAYER TRACKING, by Mattice et al., filed Mar. 21, 2007, the entirety of which is herein incorporated by reference for all purposes.

In at least one embodiment, such wagering token tracking functionality allows for the simultaneous real-time tracking of a player's multiple different wagering tokens at the table at all or desired times, and not just when a wager is made. For example, it may be used to automatically determine the amount and/or value of wagering tokens which a player walked with, for example, based on the removal of chips from the player's personal space. It may also be used to automatically track player buy-in information, for example, based on the adding of new chips to the player's personal space and/or other criteria (e.g., chips awarded to the player due to a win at the gaming table are not counted or included). Accordingly, it will be appreciated that such functionality may help eliminate delays in closing a player rating session which traditionally have been associated with manual processes.

Figure 9:
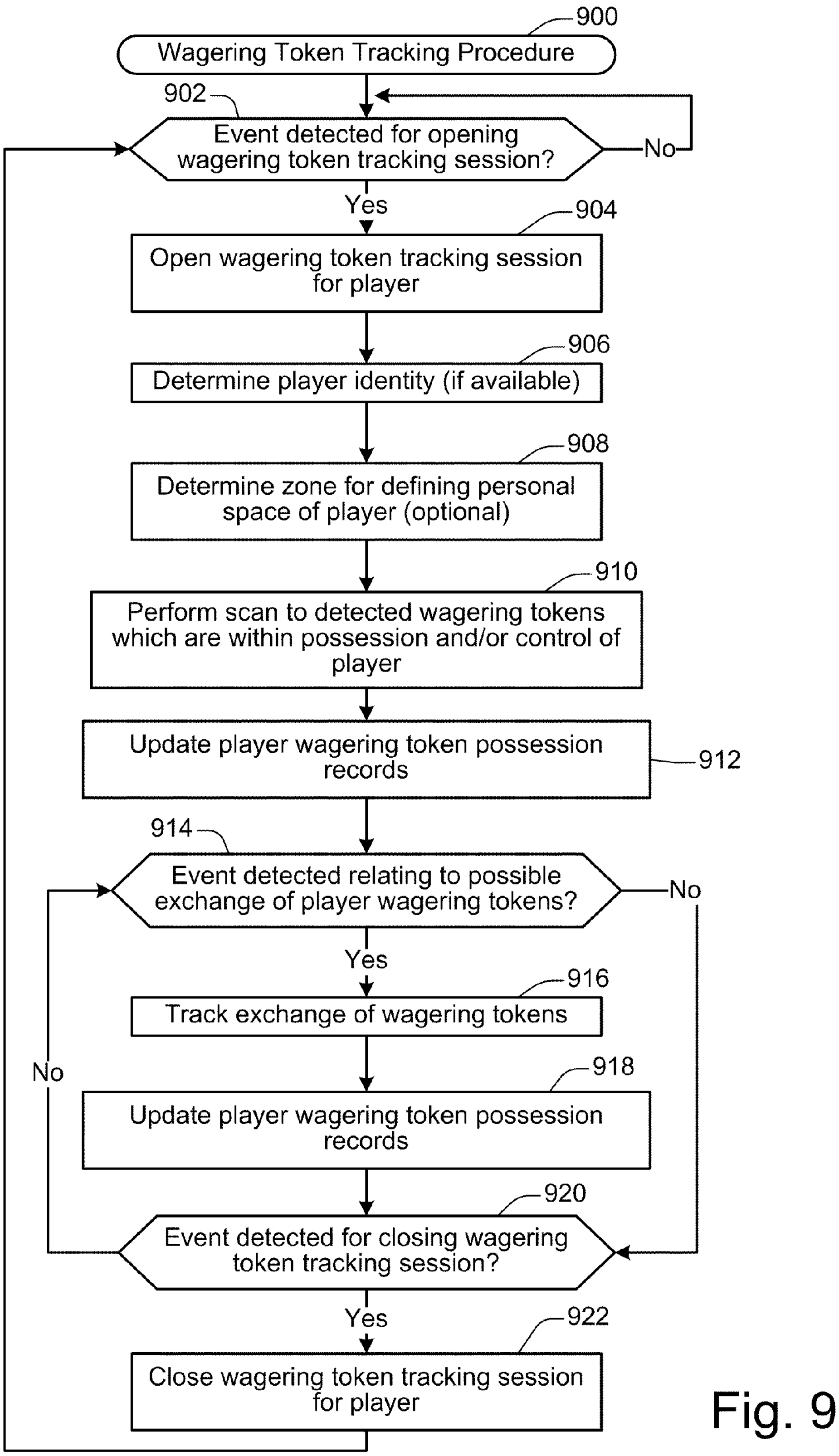
FIG. 9 shows an example of a Wagering Token Tracking Procedure 900 in accordance with a specific embodiment.

FIG. 9 shows an example of a Wagering Token Tracking Procedure 900 in accordance with a specific embodiment. According to specific embodiments, at least a portion of operations relating to the Wagering Chip Tracking Procedure may be implemented by one or more devices (or combination thereof) such as, for example: gaming table devices/components; casino wagering token tracking devices/components; player tracking devices/components; etc.

For example, in one embodiment, multiple directional RFID antennas may be positioned at desired locations within the casino in order to detect location and/or track movement of wagering tokens within selected regions of the casino. In one embodiment, data from the directional RFID antennas may be fed to a wagering token tracking system, which may be operable to use the directional RFID antennas data to detect, locate, identify, and/or track movements of people (e.g., patrons or players) and/or wagering tokens.

As illustrated in the example of FIG. 9, one or more event(s) may be detected (902) for triggering the opening (904) of a wagering token tracking session. According to specific embodiments, a variety of different events may be used to trigger the start or opening of a wagering token tracking session for a given player. Such events may include, for example, but are not limited to, one or more of the following (and/or some combination thereof):

- detection of player/patron;
- identification of player/patron;
- location of player/patron detected as satisfying predetermined criteria;
- detection of player/patron's player tracking card and/or other wireless media;
- time related events (e.g., random intervals, periodic intervals, expired timer, etc.);
- game state events (e.g., beginning of a new table game/round/hand, etc.);
- detection of wagering token(s);
- physical location of player/patron tracking media (and/or wireless device(s)) detected as satisfying predetermined criteria;
- physical location of wagering token(s) detected as satisfying predetermined criteria;
- player/patron tracking device shown or handed to dealer and/or other casino employee;
- appropriate player/patron input detected (e.g., player/patron/dealer pushes button);
- detection of other appropriate input/signal(s) from human and/or device(s);
- specified time constraints detected as being satisfied (e.g., begin wagering token tracking session at next round of play);
- presence of player/patron detected at gaming table player/patron station;
- detection of player/patron's first wager being placed;
- player/patron location or position detected as satisfying predefined criteria;
- appropriate floor supervisor input detected;
- player/patron identity determined (e.g., through the use of directional RFID; through placement of player/patron tracking media on a designated spot at a table game; etc.);
- detection of continuous presence of player/patron tracking media for a predetermined amount of time;
- etc.

For example, one event which may trigger the opening of a wagering token tracking session is the detection of the presence of a patron, player and/or other person within one or more specified regions of the casino. For example, one or more gaming tables may include functionality for detecting the presence of a player at one of the gaming table's player stations. Additionally, other selected regions within the casino (e.g., casino gaming floor, sports book, dining area, pool area, etc.) may be equipped with functionality for detecting the presence of patrons or players within specified regions or locations of the casino.

In an alternate embodiment, the Wagering Token Tracking Procedure may include detecting the presence of one or more wagering token(s) within specified regions of the casino. For example, in one embodiment, intelligent wagering tokens may be utilized which include memory and read/write functionality. The memory of a wagering token may be used to store various information which, for example may include, but is not limited to, one or more of the following (and/or combination thereof):

- wagering token value/denomination;
- identify of current owner;
- time/date of activation;
- time/date of ownership transfer(s);
- data relating to history ownership transfers;
- promotional information;
- wagering token status (e.g., battery voltage, read/write cycles, etc.)
- encryption key or code information;
- alternate communication channels, frequencies, timeslots, etc.;
- serial number or token ID;
- security/tamper codes;
- tilt information;
- collision avoidance information (such as, for example, back-off values, alternate communication channels, frequencies, timeslots, etc.);
- timestamp information;
- information relating to identities of previous owners of the token;
- information relating to devices (e.g., RFID readers, etc.) which have communicated with the token;
- information relating to signal strength criteria associated with one or more signals or readers detected by the token;
- authentication information;
- information relevant to a gaming property (e.g., casino name or identifying number);
- historical information relating to use of the token;
- other information pertinent to gaming interaction and/or token usage;
- etc.

As shown at 904, a wagering token tracking session may be opened or initiated, for example, in response to detecting the presence of a player or patron. According to specific embodiments, the opening of a wagering token tracking session may automatically occur in response to detection of one or more specific events.

Although not specifically illustrated in the embodiment of FIG. 9, other embodiments may include functionality for suspending and/or resuming selected wagering token tracking session(s). For example, according to different embodiments, a variety of different events may be used to trigger the suspension of a wagering token tracking session for a given player. Such events may include, for example, but are not limited to, one or more of the following (and/or some combination thereof):

- no detection of player;
- no detection of player's tracking media within predetermined range;
- player input;
- dealer input;
- time based events;
- player proximity detected as not being within predetermined range;
- no player activity with specified time period;
- player determined to be out of wagering tokens;
- etc.

According to specific embodiments, a variety of different events may be used to trigger the resuming of a wagering token tracking session for a given player. Such events may include, for example, but are not limited to, one or more of the following (and/or some combination thereof):

- re-detection of player;
- re-detection of player's player tracking media within predetermined range;
- player input;
- dealer input;
- time based events;
- player proximity detected as being within predetermined range;
- player game play activity detected;
- player wager activity detected;
- etc.

As shown at 906, and attempt may be made to determine the identity of a detected player or the identify of a person in possession of a detected wagering token. For example, in one embodiment, when the presence of a player is detected, a determination may be made as to whether the player is a registered member of the casino's player tracking system. In one embodiment, this may be accomplished, for example, using information from the player's player tracking card. For example, the player's player tracking card may transmit a unique identifier which may be used to look up the player's identity and/or other information in a database, such as, for example, a player tracking system database. In alternate embodiments, data retrieved from detected wagering token(s) may be used to identify one or more players.

According to at least one embodiment, if the player's identity can not be determined, an anonymous player tracking account may be created for the player, for example, in order, for example: to allow for tracking of wagering tokens possessed by the player; to allow for tracking of wagering tokens which pass into and/or pass out of possession of the player; etc.

For purposes of illustration, it will be assumed in the example of FIG. 9 that a player has been detected as being present within a specified region of the casino.

As shown at 908, when appropriate, at least one mechanism may be implemented to determine an appropriate zone or region which defines the "personal space" associated with the detected player.

Returning to the example of FIG. 9, at 910, a scan (or other action) may be implemented to detected wagering tokens which are within the possession and/or control of the detected player. For example, in one embodiment, a scan may be performed in order to detect wagering tokens which are within the personal space of the detected player. Any chips which are detected may be assumed to be within the possession and/or control of the detected player. This may include, for example, wagering tokens which are held by the player (e.g., within player's pocket(s), held in player's hand(s), etc.), wagering tokens which have been placed or stored in regions adjacent to the player (e.g., the region(s) of a gaming table surface either directly in front of the player, or to the side of the player, etc.

In at least one embodiment, one or more wagering token scan operations may include the automatic reading and/or writing of data from/to selected wagering tokens. For example, in one embodiment, data from selected wagering tokens (which, for example, have been identified as being within the possession or control of an identified player) may be accessed in order, for example, to determine and/or verify authenticity, denomination, ownership information, etc.

In one embodiment, a wagering token tracking system may be operable to automatically identify and track the number and values of wagering tokens which are located within a player's personal space at the gaming table. In at least one embodiment, such functionality allows the tracking of player wagering tokens on the table at all times, and not just when a wager is made. For example, it may be used to automatically determine the amount and/or value of wagering tokens which a player arrived with and/or walked away with. It may also be used to automatically track player buy-in events, markers, winnings, losses, and/or other transactions involving some type of wagering token exchange between the player and another entity (e.g., the dealer/house).

As shown at 912, wagering token possession records for the detected player may be updated, for example, using at least a portion of information obtained during the wagering token scan at 910. In one embodiment, a each detected player or patron may have associated therewith a respective account or record which may be used for tracking wagering tokens which are in possession and/or control of that player.

At 914, it is assumed that an event has been detected which relates to a possible exchange of wagering tokens associated with the detected player. Examples of such events may include, but are not limited to, one or more of the following (and/or combination thereof):

- activity relating to use of a table marker;
- player buy-in activity;
- player cash-in activity;
- chips-in activity;
- markers-in activity;
- player wagering activity
- rim credit activity;
- mark-up activity;
- bonus bet activity;
- player side wagering activity;
- player insurance wagering activity;
- start/end of a new hand/round;
- game start/end event(s);
- initial deal period start/end event(s);
- player card draw/decision period start/end event(s);
- subsequent wager period start/end event(s);
- rake period start/end event(s);
- payout period start/end event(s);
- etc.

As shown at 916, any exchanges of wagering token(s) between the player and another entity (e.g., dealer, house, other players/patrons, electronic devices, etc.) may be tracked. Additionally, in at least one embodiment, the tracking of wagering token exchanges may include the automatic reading and/or writing of data from/to selected wagering tokens. For example, if the player is determined to be a winner at a hand of blackjack, various types of data may be automatically and/or dynamically written to one or more selected wagering tokens which are to be provided from the dealer to the player as the player's winnings. Examples of such data may include, but are not limited to, one or more of the following (and/or combination thereof):

- player identity information;
- time/date information;
- dealer identity information;
- gaming table ID information;
- etc.

As shown at 918, wagering token possession records for the detected player may be updated, for example, using at least a portion of information obtained during the wagering token exchange tracking.

As shown at 920, a determination may be made as to whether one or more event(s) have been detected for closing (922) the wagering token tracking session for the detected player. According to specific embodiments, the closing of a wagering token tracking session may automatically occur in response to detection of one or more specific events. Examples of such events may include, but are not limited to, one or more of the following (and/or combination thereof):

- failure to detect presence of player/patron;
- location of player/patron detected as meeting predetermined criteria;
- failure to detect presence of player/patron's player tracking card and/or other wireless media;
- time related events (e.g., random intervals, periodic intervals, expired timer, etc.);
- game state events (e.g., ending of a new table game/round/hand, etc.);
- failure to detect presence of wagering token(s);
- detection of appropriate input/signal(s) from human and/or device(s);
- no detection of player at assigned player station;
- no detection of player's player tracking media within predetermined range;
- player input;
- dealer input;
- player detected as not being within predetermined range;
- no player activity with specified time period;
- player determined to be out of wagering tokens;
- timeout exceeded;
- player detected at another location in the casino;
- player's tracking media detected at another location in the casino;
- cash out event detected;
- etc.

It will be appreciated that at least a portion of the above-described functionality may be used to enable and/or facilitate the tracking of player wagering tokens throughout selected regions of the casino. Additionally, at least a portion of the above-described functionality may be used to automatically determine the amount and/or value of wagering tokens which a player walked with, and/or may also be used to automatically track wagering token exchanges between the player and other entities.

According to at least some embodiments, another aspect is directed to different techniques for tracking table game wagering activities. According to specific embodiments, the tracking table game wagering activities may include, for example: detecting movement of one or more wagering tokens within specified regions at the gaming table, detecting relative locations of wagering tokens at the gaming table, etc.

According to various embodiments, different table game wager tracking mechanisms (e.g., directional RFID antennas, cameras, optical sensors, computer systems, etc.) may be used to table game wagering activities and/or other wagering token related activities. Examples of such activities may include, but are not limited to, one or more of the following (and/or combination thereof):

- activity relating to use of a table marker;
- buy-in activity;
- cash-in activity;
- chips-in activity;
- markers-in activity;
- rim credit activity;

- mark-up activity;
- bonus bet activity;
- side wagering activity;
- insurance wagering activity;
- etc.

Figure 10A:
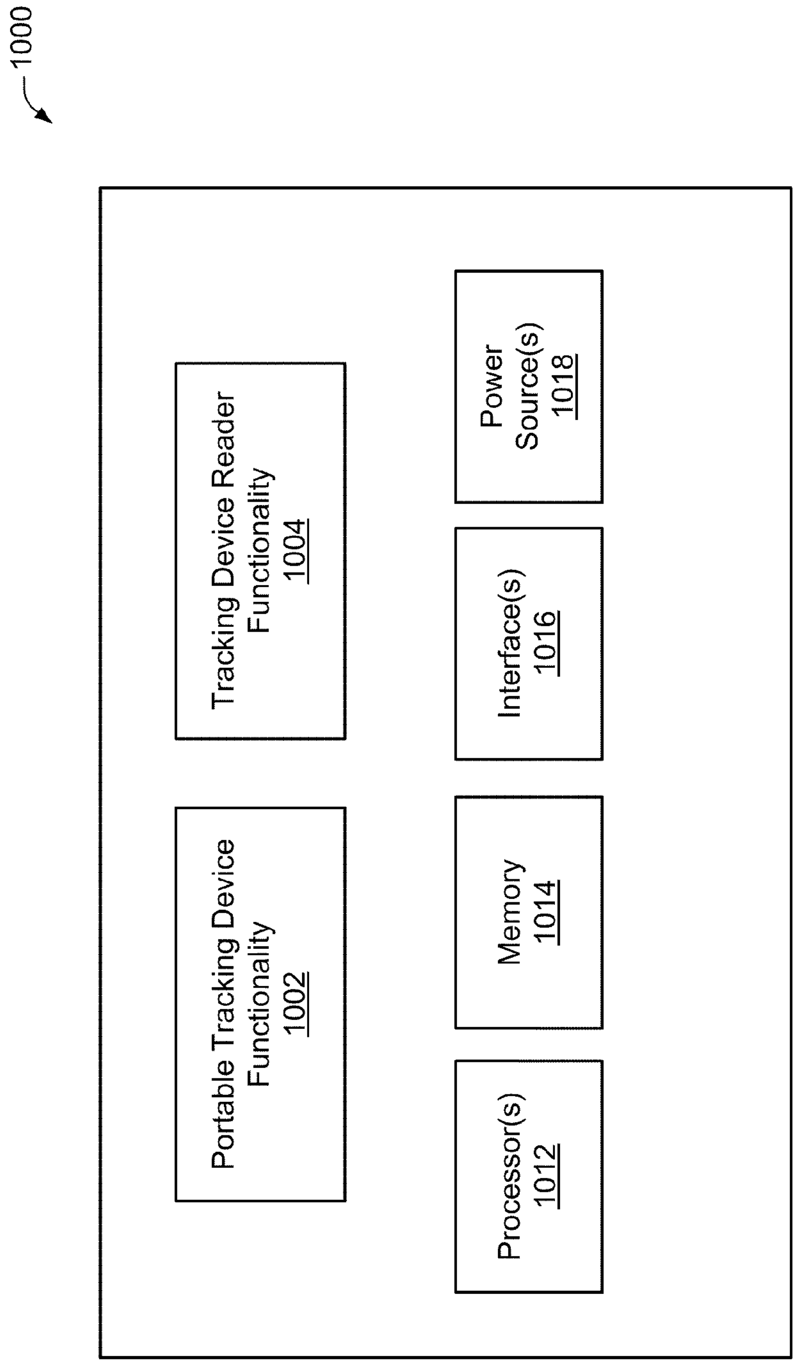
FIG. 10A shows an alternate example embodiment of a smart card 1000 which may be used for implementing various aspects described herein.

FIG. 10A shows an alternate example embodiment of a smart card 1000 which may be used for implementing various aspects described herein.

As illustrated in the example of FIG. 10A, smart card 1000 may include a variety of components, modules and/or systems for providing functionality relating to one or more aspects described herein. In at least one embodiment, smart card 1000 may be implemented as a patron tracking card or player tracking card. For example, smart card 1000 may include, but not limited to, one or more of the following (or combination thereof):

- At least one processor or CPU (1012). In at least one implementation, the processor(s) 1012 may be operable to implement features and/or functionality similar to other processors described herein.
- Memory 1014, which, for example, may include volatile memory (e.g., RAM), non-volatile memory (e.g., NV-RAM, disk memory, FLASH memory, EPROMs, etc.), unalterable memory, and/or other types of memory. In at least one implementation, the memory 1014 may be operable to implement features and/or functionality similar to other memory described herein.
- Interface(s) 1016 which, for example, may include wired interfaces and/or wireless interfaces. In at least one implementation, the interface(s) 1016 may be operable to implement features and/or functionality similar to other interfaces described herein. For example, in at least one embodiment, interface(s) 1016 may include one or more interfaces for communicating with other systems, processes, components and/or devices of the smart card. in at least one embodiment, interface(s) 1016 may include one or more one or more wireless communication interfaces, which, for example, may be configured or designed to communicate with other external devices and/or systems such as, for example, one or more of the following (or combinations thereof): remote servers, electronic gaming machines, other wireless devices (e.g., PDAs, portable gaming devices, cell phones, player tracking transponders, etc.), base stations, etc. According to different embodiments, such wireless communication may be implemented using one or more wireless interfaces/protocols such as, for example, 802.11 (WiFi), 802.15 (including Bluetooth™), 802.16 (WiMax), 802.22, Cellular standards such as CDMA, CDMA2000, WCDMA, Radio Frequency (e.g., RFID), Infrared, Near Field Magnetics, etc.
- At least one power source 1018. In at least one implementation, the power source may include at least one mobile power source for allowing the smart card to operate in a mobile environment. For example, in one implementation, portable power source 1018 may include a rechargeable battery 1018. Additionally, in at least one embodiment, smart card 1000 may include a battery recharging system which, for example, may be configured or designed to recharge the device's rechargeable battery. In one embodiment, the battery recharging system may be configured or designed to utilize power from an external power source (such as, for example, power from other AC and/or DC power sources, etc.) for recharging the smart card's power source 1018.
- Portable Tracking Device Functionality 1002. In at least one embodiment, the portable tracking device functionality may include hardware and/or software components which are operable to provide smart card 1000 with portable tracking device functionality for allowing the smart card to be detected and/or tracked using one or more portable tracking device readers. For example, in at least one embodiment, the portable tracking device functionality may include an RFID tag (or hardware/software configured or designed to provide functionality similar to that of an RFID tag). According to different embodiments, the portable tracking device functionality 1002 may be configured or designed to provide passive RFID tag functionality and/or active RFID tag functionality. Additionally, in some embodiments, the smart card may be configured or designed to allow one or more portable tracking device readers to read and/or write data from/to the memory of the smart card.
- Tracking Device Reader Functionality 1004. In at least one embodiment, the tracking device reader functionality may include hardware and/or software components which are operable to provide smart card 1000 with tracking device reader functionality for enabling the smart card detect and/or communicate with one or more portable tracking devices (such as, for example, intelligent wagering tokens, etc.). For example, in at least one embodiment, the tracking device reader functionality may include an RFID reader (or hardware/software configured or designed to provide functionality similar to that of an RFID reader). According to different embodiments, the tracking device reader functionality 1004 may be configured or designed to provide passive RFID tag reader functionality and/or active RFID tag reader functionality. For example, in one embodiment, the tracking device reader functionality 1004 may be configured or designed to provide interrogation and/or energizing signal(s) to one or more portable tracking devices (such as, for example, objects which include RFID tags, intelligent wagering tokens, etc.). In at least some embodiments, while communicating with a given portable tracking device (e.g., an RFID type wagering chip), the smart card may be configured or designed read information or data from the portable tracking device and/or may be configured or designed cause information or data to be written into the memory 1014 of the portable tracking device.

In at least one embodiment, smart card 1000 may be configured or designed to perform one or more of the following operations (or combinations thereof):

- Periodically poll or detect the presence of one or more portable tracking devices in order, for example, to identify wagering tokens which are currently in possession being carried by the patron and/or which are located within the patron's personal space, etc. Thus, for example, in one embodiment, a smart card being carried by a given patron may be configured or designed to periodically take a real-time inventory (e.g., during one or more time intervals) of wagering tokens which are currently within the possession, control and/or personal space of that patron.
- Probe, and/or communicate with portable tracking devices. In at least one embodiment, the smart card may be configured or designed to read or access information from a detected gaming token, and/or may also be configured or designed to provide information to the detected gaming token for storage in local memory at the detected gaming token.

- Generate device tracking information relating to one or more portable tracking devices which have been detected by the smart card. For example, in at least one embodiment, each time a patron's smart card performs an inventory scan of detectable, proximate wagering tokens (e.g., which are currently being carried by the patron or within the personal space of that patron), the smart card may generate information which includes a list of the detected wagering tokens and/or other related information.
- Store selected information within local memory (e.g., memory 1014). According to specific embodiments, the information stored at memory 1014 may include, for example, one or more of the following (or combinations thereof): information generated by the smart card, information acquired from one or more portable tracking devices, information acquired from one or more other external devices/systems, etc.
- Transmit (e.g., via wireless interface) selected information to one or more external devices/systems. For example, in at least one embodiment, the smart card may be configured or designed to periodically transmit selected information (e.g., stored at memory 1014) to one or more external devices/systems, such as, for example, a casino tracking system. Examples of such information may include, but are not limited to, one or more of the following (or combinations thereof): information generated by the smart card, information acquired from one or more portable tracking devices, information acquired from one or more other external devices/systems, information stored in the smart card memory 1014, etc.
- Etc.

In at least one embodiment, smart card 1000 may be configured or designed to store various types of information in it's local memory (e.g., memory 1014). Examples of the different types of information which may be stored in the smart card memory may include, but are not limited to, one or more of the following (or combinations thereof):

- Information generated by the smart card.
- Information acquired from one or more portable tracking devices.
- Information acquired from one or more other external devices/systems.
- Smart Card ID information.
- Token ID information.
- Timestamp information.
- Information relating to an identity of a current owner of the smart card.
- Information relating to identities of previous owners of the smart card.
- Information relating to devices (e.g., tokens, readers, etc.) which have communicated with the smart card.
- Information relating to signal strength criteria provided by one or more tokens.
- Authentication information.
- Information relating to parameters or criteria associated with collision avoidance communication protocols.
- Information relevant to a gaming property (e.g., casino name or identifying number).
- Historical information relating to use of the smart card.
- Other information pertinent to gaming interaction and/or token usage.

It will be appreciated that other smart card embodiments (not shown) may include different and/or other components than those illustrated in FIG. 10A.

Figure 10B:
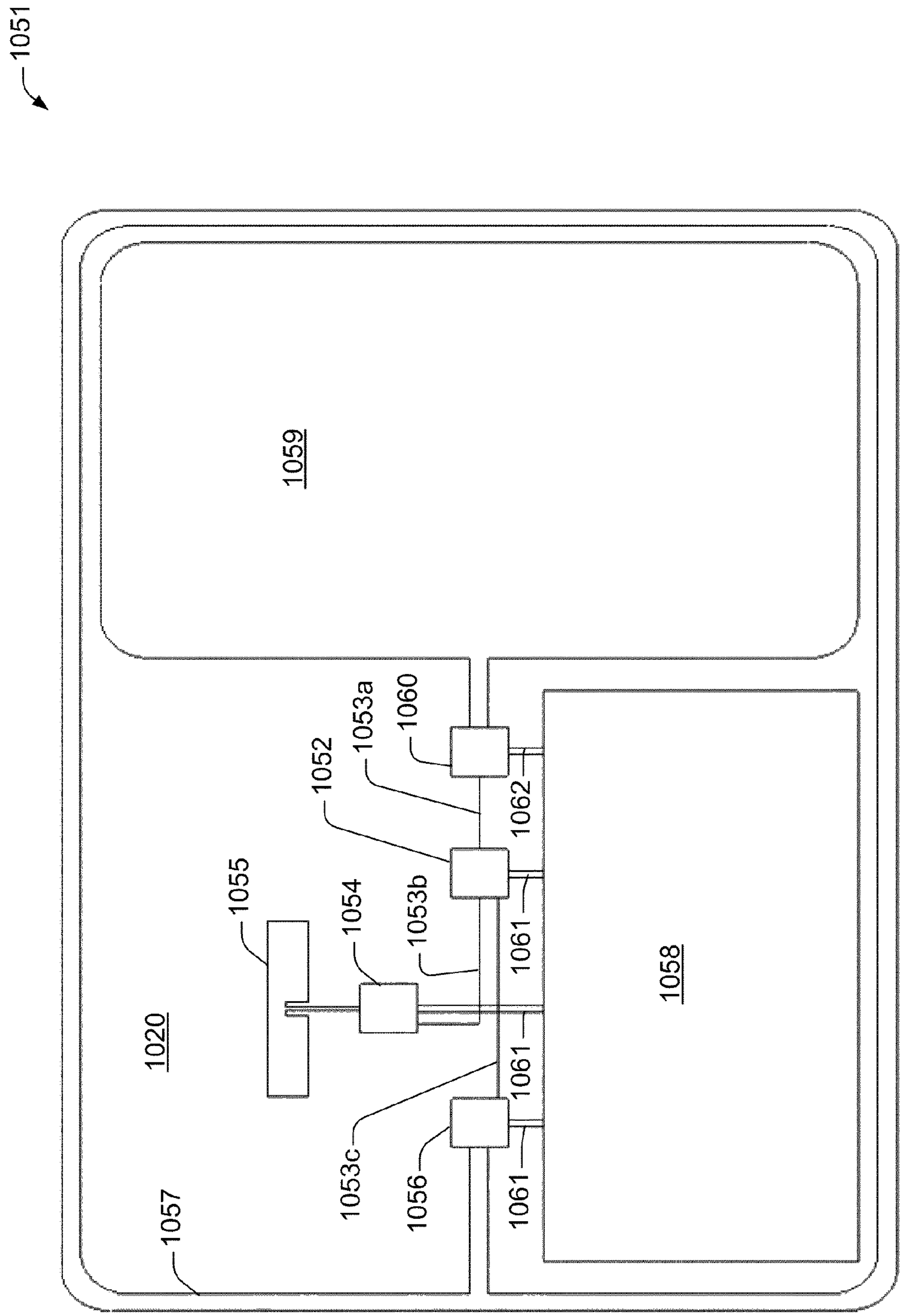
FIG. 10B shows a block diagram of another example embodiment of a casino smart card 1051.

FIG. 10B shows a block diagram of another example embodiment of a casino smart card 1051. In at least one embodiment, smart card 1051 may be configured or designed to be used as a casino player tracking card.

Referring to FIG. 10B, the casino smart card 1051 may include one or more of the following (or combinations thereof):

- At least one microprocessor (e.g., 1052). In at least one embodiment, microprocessor 1052 may include memory such as, for example, RAM, Flash memory, EEPROMs, ROM, and/or other types of non-volatile memory. In some embodiments the smart card may also include one or more memory modules external to the microprocessor.
- Relative High Frequency Transceiver 1054. In at least one embodiment, Relative High Frequency Transceiver 1054 may be operable to wirelessly transmit and/or receive data to/from external devices using Relative High Frequency signals such as, for example, UHF (Ultra High Frequency) band signals and/or SHF (Super High Frequency) band signals. In at least one embodiment, UHF band signals may include electromagnetic signals within the frequency range of about 0.3 GHz to 3 GHz. In at least one embodiment, SHF band signals may include electromagnetic signals within the frequency range of about 3 GHz to 30 GHz.
- Relative Low Frequency Transceiver 1056. In at least one embodiment, Relative Low Frequency Transceiver 1056 may be operable to wirelessly transmit and/or receive data to/from external devices using Relative Low Frequency band signals such as, for example, LF (Low Frequency) band signals and/or HF (High Frequency) band signals. In at least one embodiment, LF band signals may include electromagnetic signals within the frequency range of about 30 kHz to 300 kHz. In at least one embodiment, HF band signals may include electromagnetic signals within the frequency range of about 3 MHz to 30 MHz.
- Battery or power supply recharging circuitry 1060.
- Patch antenna 1055. In at least one embodiment, the patch antenna may be used to receive and/or transmit Relative High Frequency band signals.
- EH antenna (e.g., wire loop 1057). In at least one embodiment, the EH antenna may be used to receive and/or transmit Relative Low Frequency band signals.
- Rechargeable power storage device 1058.
- Magnetic energy pickup antenna 1059. In at least one embodiment, magnetic energy pickup antenna 1059 may be configured or designed in a manner which optimizes reception of SLF (Super Low Frequency) band and/or ULF (Ultra Low Frequency) band signals, and/or other signal frequencies which may be used for magnetic induction. In at least one embodiment, SLF band signals may include electromagnetic signals within the frequency range of about 30 Hz to 300 Hz. In at least one embodiment, ULF band signals may include electromagnetic signals within the frequency range of about 0.3 kHz to 3 kHz.
- Etc.

As shown in the example embodiment of FIG. 10B, microprocessor 1052 may be operatively coupled to control internal battery charging circuitry 1060 via interconnect wiring 1053*a*. Microprocessor 1052 may also be operatively coupled to control the Relative High Frequency Transceiver 1054 via interconnect wiring 1053*b*. Microprocessor 1052 may also be operatively coupled to control the Relative Low Frequency Transceiver 1056 via interconnect wiring 1053*c*.

In at least one embodiment, smart card 1050 may include one or more power distribution components which are operable to receive power provided by an external power source, and operable to distribute the received power to one or more internal components of the smart card. For example, in one implementation, smart card 1050 may be configured or designed to be able to operate using power provided by an external power source (if desired). Additionally, in at least one embodiment, smart card 1050 may be configured or designed to enable the portable power source (e.g., 1058) to be recharged using power provided by an external power source. For example, in one embodiment, smart card 1050 may be configured or designed to enable the portable power source (e.g., 1058) to be recharged (e.g., using power supply recharging circuitry 1060 and magnetic energy pickup antenna 1059) from an external power source using magnetic induction. In this way, the power source of the smart card may be recharged without requiring metal-to-metal contact.

In at least one embodiment smart card 1050 may include position location circuitry operable to automatically and dynamically determine a current (e.g., real time) position or location of the smart card. For example, in at least one embodiment, the smart card may include a geolocation module which, for example, may be configured or designed to acquire geolocation information from remote sources and use the acquired geolocation information to determine information relating to a relative and/or absolute position of the smart card. For example, in one implementation, the geolocation module may be adapted to receive GPS signal information for use in determining the position or location of the smart card. In another implementation, the geolocation module may be adapted to receive multiple wireless signals from multiple remote devices (e.g., gaming machines, servers, wireless access points, etc.) and use the signal information to compute position/location information relating to the position or location of the portable gaming system. In at least one embodiment, smart card 1050 may be configured or designed to take periodic readings of its current location, and to store a least a portion of this data in its local memory.

In at least one embodiment, smart card 1050 may be operable as a "multi-band frequency" transceiver device, which is able to transmit and receive signals across different frequency bands of the electromagnetic spectrum.

For example, in at least one embodiment, smart card 1050 may be operable to transmit/receive signals of the Relative Low Frequency band which, for example, may include electromagnetic signals within the frequency ranges of about 30 kHz to 300 kHz, and 3 MHz to 30 MHz. In at least one alternate embodiment, a Relative Low Frequency band may include electromagnetic signals within the frequency ranges of about 30 kHz to 30 MHz (e.g., which, for example, includes signals from within the frequency range of 300 kHz to 3 MHz.)

Additionally, in at least one embodiment, smart card 1050 may also be operable to transmit/receive signals of the Relative High Frequency band which, for example, may include electromagnetic signals within the frequency range of about 0.3 GHz to 30 GHz.

In at least one embodiment, smart card 1050 may also be operable to concurrently transmit and/or receive signals in both the Relative High Frequency band and Relative Low Frequency band.

According to different embodiments, each of the different frequency bands (e.g., Relative Low Frequency band, Relative High Frequency band) may have associated therewith different inherent characteristics and/or properties which, for example, may be advantageously utilized in specific situations for conducting specific types of activities.

For example, Relative Low Frequency band signals have longer wavelengths than Relative High Frequency band signals, and possess inherent characteristics such as, for example: requiring less power for signal transmission (e.g., relative to Relative High Frequency band signals); being better able to penetrate through walls, clothing, and/or other objects or barriers (e.g., relative to Relative High Frequency band signals), being less vulnerable to multipath, etc.

In contrast, Relative High Frequency band signals have shorter wavelengths than Relative Low Frequency band signals, and possess inherent characteristics such as, for example: being better suited (e.g., relative to Relative Low Frequency band signals) for carrying higher rates of data transmission, being better suited for use with relatively short antennas, etc.

Accordingly, in at least one embodiment, use of Relative High Frequency band signals may be preferable and/or advantageous in at least one or more of the following situations (or combinations thereof):

- Conducting wireless data communications between the smart card 1050 and one or more external devices/systems of the casino network (such as, for example: gaming machine controllers, gaming table controllers, data collection units, casino tracking systems, etc.);
- Situations involving relatively high rates of data transmission between smart card 1050 and the external system(s)/device(s);
- Situations wherein a smaller antenna profile is desirable;
- Situations where it is desirable to facilitate transmissions within the far field producing longer range with less attenuation.
- Etc.

On the other hand, use of Relative Low Frequency band signals may be preferable in at least one or more of the following situations (or combinations thereof):

- Situations involving relatively low rates of data transmission
- Situations where reduced power consumption is desirable
- Situations where the communication involves penetration of one or more barriers (such as, for example, walls, clothing, bodies, tables, etc.).
- Situations wherein the near field (e.g., within one wave length) decreases in strength faster than a far field signal.
- Etc.

Thus, for example, in at least one embodiment, it may be advantageous to use Relative Low Frequency band signals (e.g., at smart card 1050) for detecting the presence of portable tracking devices (such as, for example, detection of one or more intelligent wagering tokens located within the pockets of a given patron), and/or for communicating with one or more portable tracking devices.

In at least one embodiment, one or more of the wireless communication and/or tracking techniques described herein may be implemented using RTLS (real-time locating system) technology such as that provided by Real Time Location Systems Inc., of Sandy, Utah. In at least one embodiment, RTLS may include a combination of wireless hardware and real-time software that is used to continuously determine and provide the real time position of assets and resources equipped with devices designed to operate with the system.

Near-field electromagnetic ranging (NFER) is an emerging RTLS technology that employs transmitter tags and one or more receiving units. For example, when operating within a half-wavelength of a receiver, transmitter tags may use relatively low frequencies (e.g., less than 30 MHz) to achieve significant ranging. According to different embodiments, depending on the choice of frequency, NFER may have the potential for range resolution of about 30 cm (e.g., about 1 ft), and ranges up to about 300 m (e.g., about 1,000 ft).

In at least one embodiment, device tracking systems utilizing NFER technology may have several inherent advantages over other types of RTLS systems.

For example, in at least one embodiment, no signal modulation is required when utilizing NFER technology. As a result, baseband signals with an arbitrarily small bandwidth may be used for ranging. Additionally, precise synchronization is not required between different receivers utilizing NFER technology. In fact, in at least one embodiment, a local range measurement can be made with just a single receiver which utilizes NFER technology. Further, since EH phase differences are preserved when a signal is down-converted to baseband, high range precision may be achieved with relatively low time precision.

In at least one embodiment, an EH antenna (e.g., 1057) may be configured or designed to use a phasing network to align the phase of both E and H field components, thus leading to a radiation field which is built up much faster and closer to the antenna. As a result, much smaller antennas may be utilized with an effectiveness comparable to a usually larger dipole. For example, according to specific embodiments, typical sizes of EH antennas may range, for example, from about 2% to about 3% of the wavelength.

In at least one embodiment, one or more EH antennas may be configured or designed as mono band antennas. Additionally, EH antennas may be configured or designed to be compact in size for use in space restricted environments. Additionally EH antennas are comparatively quiet, reducing the often strong noise levels on the Relative Low Frequency band.

Figure 12A:
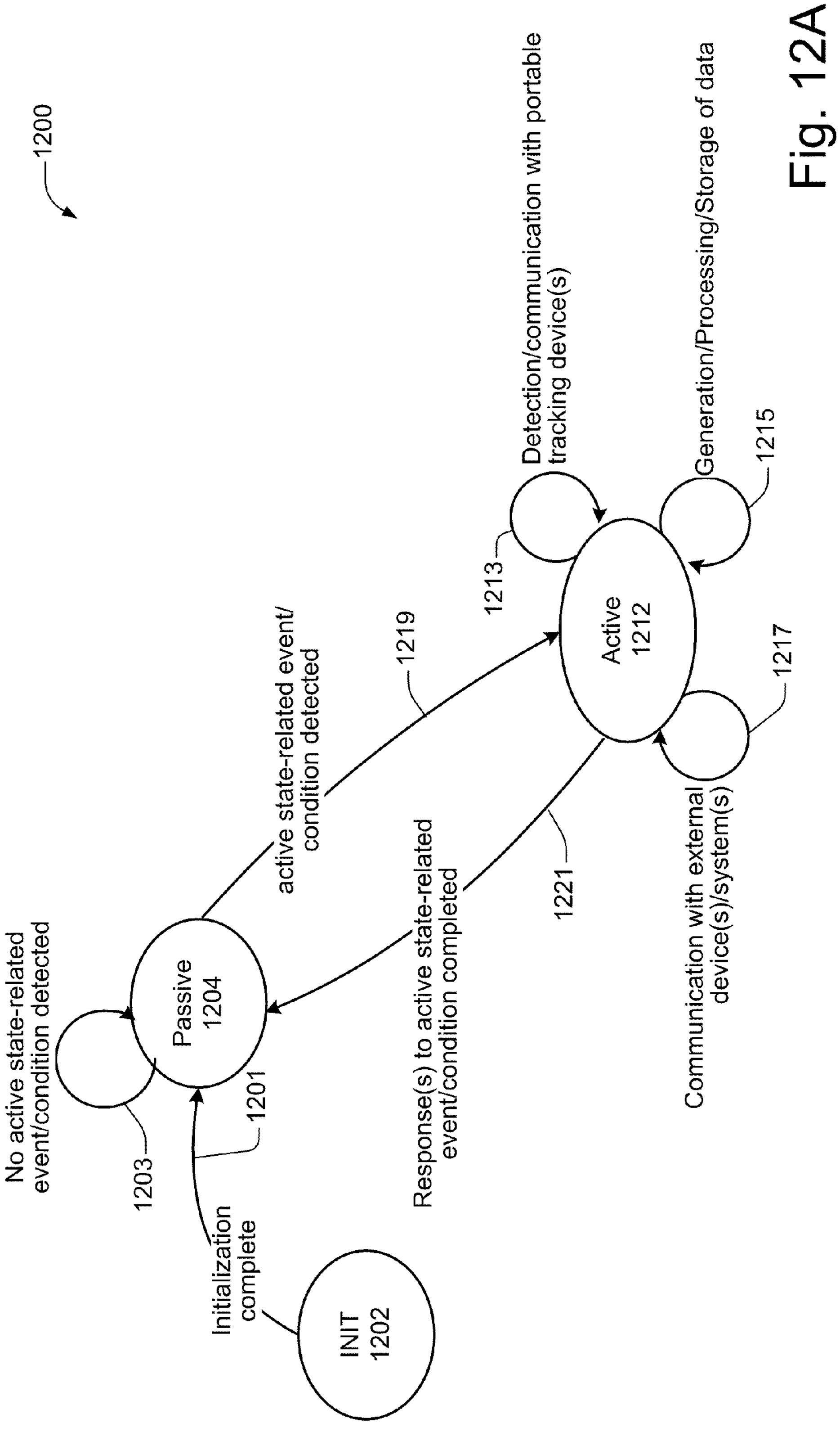
FIG. 12A shows an example embodiment of a smart card state diagram 1200 which may be used for implementing various aspects or features described herein.

FIG. 12A shows an example embodiment of a smart card state diagram 1200 which may be used for implementing various aspects or features described herein. In at least one embodiment, a least a portion of the operations and/or activities associated with state diagram 1200 may be performed or implemented by one or more components of a smart card such as, for example, one or more smart card embodiments described herein. Additionally, according to different embodiments, the various operations and/or activities associated with state diagram 1200 may be implemented via hardware, software, and/or some combination thereof.

For purposes of illustration, a description of state diagram 1200 will now be provided by way of example. In this particular example it is assumed that the operations and/or activities associated with state diagram 1200 are performed or implemented at a smart card such as, for example, smart card 1051 of FIG. 10B. In other embodiments at least a portion of the operations and/or activities associated with state diagram 1200 may be performed or implemented by other smart card embodiments.

As illustrated in the example of FIG. 12A, state diagram 1200 may include a plurality of different states including, for example, an initialization state 1202, a passive state 1204, an active state 1212, etc. In at least one embodiment, each of the different states 1202, 1204, 1212, may relate to (or be descriptive of) a different state of operation of the smart card. In at least one embodiment, the smart card may be configured or designed to have a plurality of different states currently active at the same time.

According to one embodiment, during initialization state 1202, the smart card may perform any desired initialization procedures.

In one embodiment, the successful completion of the initialization procedures may trigger 1201 advancement to passive state 1204.

In at least one embodiment, while in the passive state 1204, the smart card may be operable to perform one or more of the following (or combinations thereof):

- Set or update a current power mode of operation of the smart card to a low power consumption mode or low power operating mode. For example, in at least one embodiment, while in the passive state 1204, the smart card may be a in power down mode, conserving battery power.
- Monitor events, conditions and/or activities at the smart card for detection of any active state-related events and/or conditions.
- Initiate and/or implement one or more operations relating to the smart card's RFID tag functionality. For example, in at least some embodiments, while in the passive state, the smart card may function in a manner similar to that of a passive RFID-tag and/or in a manner similar to that of an active RFID-tag.
- Periodically record selected information associated with events, conditions and/or activities detected at the smart card.
- Receive requests, commands and/or instructions from external or remote systems/devices.
- Etc.

According to different embodiments, various examples of active state-related events and/or conditions may include for example, one or more of the following (or combinations thereof):

- Detection of one or more events, conditions and/or activities which meet or exceed specified "active state-related" threshold criteria.
- Detection of one or more events, conditions and/or activities which may result in loss or altering of information stored at the smart card.
- Detection of one or more unauthorized events, conditions and/or activities at the smart card.
- Detection of one or more fault events or conditions at the smart card.
- Detection of one or more events and/or conditions which may require the smart card to detect or communicate with one or more portable tracking devices. For example, in one embodiment, a timer mechanism at the smart card may be used to cause the smart card to periodically implement a wagering token polling procedure in which the smart card initiates one or more operations (e.g., via its internal RFID reader functionality) for polling or detecting the presence of one or more wagering tokens in order, for example, to identify wagering tokens which are currently in possession being carried by the patron and/or which are located within the patron's personal space, etc.
- Detection of one or more events and/or conditions which may require the smart card to transmit and/or receive data to/from one or more external devices. For example, in at least one embodiment, the smart card may receive instructions from an external device (such as, for example, wagering token tracking system) to read or access information from one or more wagering tokens which have been detected by the smart card. In at least some embodiments, the smart card may receive instructions from the external device to cause specific information to be stored in local memory of one or more wagering tokens which have been detected by the smart card. In another embodiment, the smart card may receive a request from an intelligent wagering token to forward specific data (e.g., provided from the token to the smart card) to one or more specified external devices of the casino network.

- Detection of one or more events and/or conditions which may require the smart card to generate device tracking information relating to one or more portable tracking devices which have been detected by the smart card.
- Detection of one or more events and/or conditions which may require the smart card to store selected information within it local memory.
- Detection of one or more events and/or conditions which may require the smart card to transmit (e.g., via wireless interface) selected information to one or more external devices/systems. For example, in at least one embodiment, the smart card may be configured or designed to periodically transmit selected information (e.g., stored in local memory) to one or more external devices/systems, such as, for example, a casino tracking system.
- Etc.

In at least one embodiment, the smart card may continue to remain in the passive state 1204 while no active state-related events and/or conditions are detected (1203).

In at least one embodiment, while in the passive state 1204, the detection of a active state-related event or condition may trigger 1205 a change to active state 1212.

In at least one embodiment, while in the active state 1212, the smart card (and/or selected systems, devices, components associated with the smart card) may be operable to perform one or more of the following (or combinations thereof):

- Set or update a current power mode of operation of the smart card to a low power consumption mode or low power operating mode. For example, in at least one embodiment, while in the passive state 1204, the smart card may be a in power down mode, conserving battery power.
- Monitor events, conditions and/or activities at the smart card for detection of any active state-related events and/or conditions.
- Initiate and/or implement one or more operations relating to the smart card's RFID tag functionality. For example, in at least some embodiments, while in the passive state, the smart card may function in a manner similar to that of a passive RFID-tag and/or in a manner similar to that of an active RFID-tag.
- Initiate and/or implement one or more operations relating to the smart card's RFID reader functionality.
- Periodically record selected information associated with events, conditions and/or activities detected at the smart card.
- Receive requests, commands and/or instructions from external or remote systems/devices.
- Periodically poll or detect the presence of one or more portable tracking devices. For example, in one embodiment, a smart card being carried by a given patron may be configured or designed to periodically take a real-time inventory (e.g., during one or more time intervals) of wagering tokens which are currently within the possession, control and/or personal space of a patron.
- Probe, and/or communicate with portable tracking devices. In at least one embodiment, the smart card may be configured or designed to read or access information from a detected wagering token, and/or may also be configured or designed to provide information to the detected gaming token for storage in local memory at the detected wagering token.
- Generate device tracking information relating to one or more portable tracking devices which have been detected by the smart card. For example, in at least one embodiment, each time a patron's smart card performs an inventory scan of detectable, proximate wagering tokens (e.g., which are currently being carried by the patron or within the personal space of that patron), the smart card may generate information which includes a list of the detected wagering tokens and/or other related information.
- Store selected information within local memory of the smart card. Examples of such information may include, but are not limited to, one or more of the following (or combinations thereof): information generated by the smart card, information acquired from one or more portable tracking devices, information acquired from one or more other external devices/systems, etc.
- Detect or communicate with one or more portable tracking devices. For example, in one embodiment, the smart card may periodically initiate one or more operations (e.g., via its internal RFID reader functionality) for polling or detecting the presence of one or more wagering tokens in order, for example, to identify wagering tokens which are currently in possession being carried by the patron and/or which are located within the patron's personal space, etc.
- Transmit and/or receive data to/from one or more external devices. For example, in at least one embodiment, the smart card may be configured or designed to periodically transmit selected information to one or more external devices/systems, such as, for example, a casino tracking system. Examples of such information may include, but are not limited to, one or more of the following (or combinations thereof): information generated by the smart card, information acquired from one or more portable tracking devices, information acquired from one or more other external devices/systems, information stored in the smart card memory, etc. In at least one embodiment, the smart card may receive instructions from an external device (such as, for example, wagering token tracking system) to read or access information from one or more wagering tokens which have been detected by the smart card. In at least some embodiments, the smart card may receive instructions from the external device to cause specific information to be stored in local memory of one or more wagering tokens which have been detected by the smart card. In another embodiment, the smart card may receive a request from an intelligent wagering token to forward specific data (e.g., provided from the token to the smart card) to one or more specified external devices of the casino network.
- Automatically power-up the smart card (e.g., if smart card is in power-off, hibernate and/or standby mode).
- Automatically power-up selected components/devices of the smart card.
- Provide instructions for shutting down or disabling one or more components of the smart card.
- Provide instructions to one or more wagering tokens for initiating one or more operations at the wagering token (s). For example, in one embodiment, the smart card may issue instructions to an identified wagering token to transmit specific information stored at the memory of the wagering token. In another embodiment, the smart card may issue instructions to an identified wagering token to enable and/or disable specific functionalities at the wagering token.
- Etc.

In at least one embodiment, the smart card may continue to remain in the active state 1212 while one or more active state-related events and/or conditions are detected (1209) and/or until all appropriate (e.g., desired and/or required) operations have been successfully completed.

In at least one embodiment, while in the active state 1212, if it has been detected that all appropriate operations/procedures have been completed a state change to the passive state 1204 may be triggered 1221.

In at least one embodiment, at least a portion of information which is transmitted by the smart card (such as, for example, selected information sent via wireless transmission) may be encrypted, for example, using one or more commonly available encryption protocols.

FIG. 11 shows a block diagram of another example embodiment of an intelligent token 1100. In at least one embodiment, token 1100 may be configured or designed as an intelligent wagering token, and may have a size and shape similar to that of commonly used (e.g., ordinary or traditional) casino wagering tokens. Additionally, in at least one embodiment, each intelligent wagering token may have associated therewith a respective monetary value (e.g., $1, $5, $25, $100, etc.), and may be used by casino patrons or players in the same manner that such patrons/players may use traditional casino wagering tokens, such as, for example, placing wagers at live casino gaming tables, tipping, exchanging tokens for cash or vice-versa, etc.

Referring to FIG. 11, token 1100 may include one or more of the following (or combinations thereof):

- At least one microprocessor (e.g., 1121). In at least one embodiment, microprocessor 1121 may include memory such as, for example, RAM, Flash memory, EEPROMs, ROM, and/or other types of non-volatile memory. In some embodiments the intelligent wagering token may also include one or more memory modules external to the microprocessor.
- Transceiver 1124. In at least one embodiment, Frequency Transceiver 1124 may be operable to wirelessly transmit and/or receive data to/from external devices (e.g., smart card 1050, device tracking readers, etc.) using multiple different frequency bands of electromagnetic waves or signals. For example, in one embodiment, frequency transceiver 1124 may be operable to wirelessly transmit and/or receive data using multiple different frequency bands such as, for example, LF (Low Frequency) band signals, HF (High Frequency) band signals, etc. In at least one embodiment, LF band signals may include electromagnetic signals within the frequency range of about 30 kHz to 300 kHz. In at least one embodiment, HF band signals may include electromagnetic signals within the frequency range of about 3 MHz to 30 MHz. In some embodiments, transceiver 1124 may be configured or designed to transmit/receive signals at one or more frequencies which correspond to frequencies associated with well-known wireless communication protocols or standards such as, for example: signals in the 5 GHz spectrum band, signals in the 2.4 GHz spectrum band, signals in the 900 MHz spectrum band, signals in the 400 MHz spectrum band, etc.
- EH antenna (e.g., wire loop 1127). In at least one embodiment, the EH antenna may be configured or designed to receive and/or transmit various different bands of electromagnetic waves or signals such as those which are compatible for operation with transceiver 1124.
- Rechargeable power storage device 1125. For example, in one implementation, portable power source 1125 may include a rechargeable battery and/or capacitor.
- Battery or power supply recharging circuitry 1122. In at least one embodiment, token 1100 may include a battery recharging system which, for example, may be configured or designed to recharge the token's rechargeable battery. In one embodiment, the battery recharging circuitry may be configured or designed to utilize power from an external power source (such as, for example, power from other AC and/or DC power sources, magnetic induction, etc.) for recharging the token's power source 1125.
- Magnetic energy pickup antenna 1126. In at least one embodiment, magnetic energy pickup antenna 1126 may be configured or designed in a manner which optimizes reception of SLF (Super Low Frequency) band and/or ULF (Ultra Low Frequency) band signals, and/or other signal frequencies which may be used for magnetic induction. In at least one embodiment, SLF band signals may include electromagnetic signals within the frequency range of about 30 Hz to 300 Hz. In at least one embodiment, ULF band signals may include electromagnetic signals within the frequency range of about 0.3 kHz to 3 kHz.
- One or more memory modules, which, for example, may include volatile memory (e.g., RAM), non-volatile memory (e.g., NV-RAM, disk memory, FLASH memory, EPROMs, etc.), unalterable memory, and/or other types of memory.
- One or more wireless interface(s). For example, in at least one embodiment, token 1100 may include one or more one or more wireless communication interfaces, which, for example, may be configured or designed to communicate with other external devices and/or systems such as, for example, one or more of the following (or combinations thereof): remote servers, electronic gaming machines, other wireless devices (e.g., PDAs, portable gaming devices, cell phones, player tracking transponders, smart cards, tracking device readers, etc.), base stations, etc. According to different embodiments, such wireless communication may be implemented using one or more wireless interfaces/protocols such as, for example, 802.11 (WiFi), 802.15 (including Bluetooth™), 802.16 (WiMax), 802.22, Cellular standards such as CDMA, CDMA2000, WCDMA, Radio Frequency (e.g., RFID), Infrared, Near Field Magnetics, etc.
- Etc.

According to different embodiments (not shown), token 1100 may include other components and/or functionality. For example, in at least one embodiment, token 1100 may be configured or designed to include appropriate components and/or circuitry for implementing additional functionality such as that provided by smart card embodiments 1000 and/or 1050 of FIGS. 10A, 10B. For example, according to specific embodiments, token 1100 may be configured or designed to include one or more of the following (or combinations thereof): tracking device reader functionality (e.g., similar to Tracking Device Reader Functionality 1004), one or more additional transceivers (such as, for example, Relative High Frequency Transceiver 1054), one or more additional antennas (e.g., patch antenna 1055), etc.

In at least one embodiment, the token 1100 may include hardware and/or software components which are operable to provide token 1100 with portable tracking device functionality for allowing the token to be detected and/or tracked using one or more portable tracking device readers. For example, in at least one embodiment, the portable tracking device functionality may include an RFID tag (or hardware/software configured or designed to provide functionality similar to that of an RFID tag). According to different embodiments, the portable tracking device functionality may be configured or designed to provide passive RFID tag functionality and/or active RFID tag functionality. Additionally, in some embodiments, the token may be configured or designed to allow one or more portable tracking device readers to read and/or write data from/to the memory of the token.

As shown in the example embodiment of FIG. 11, microprocessor 1121 may be operatively coupled to control internal battery charging circuitry 1122 via interconnect wiring 1125. Microprocessor 1121 may also be operatively coupled to control the transceiver 1024 via interconnect wiring 1123.

In at least one embodiment token 1100 may include position location circuitry operable to automatically and dynamically determine a current (e.g., real time) position or location of the token. For example, in at least one embodiment, the token may include a geolocation module which, for example, may be configured or designed to acquire geolocation information from remote sources and use the acquired geolocation information to determine information relating to a relative and/or absolute position of the token. For example, in one implementation, the geolocation module may be adapted to receive GPS signal information for use in determining the position or location of the token. In another implementation, the geolocation module may be adapted to receive multiple wireless signals from multiple remote devices (e.g., gaming machines, servers, wireless access points, etc.) and use the signal information to compute position/location information relating to the position or location of the portable gaming system. In at least one embodiment, token 1100 may be configured or designed to take periodic readings of its current location, and to store a least a portion of this data in its local memory.

In at least one embodiment, token 1100 may include one or more power distribution components which are operable to receive power provided by an external power source, and operable to distribute the received power to one or more internal components of the token. For example, in one implementation, token 1100 may be configured or designed to be able to operate using power provided by an external power source (if desired). Additionally, in at least one embodiment, token 1100 may be configured or designed to enable the portable power source (e.g., 1125) to be recharged using power provided by an external power source. For example, in one embodiment, token 1100 may be configured or designed to enable the portable power source (e.g., 1125) to be recharged (e.g., using power supply recharging circuitry 1122 and magnetic energy pickup antenna 1126) from an external power source using magnetic induction. In this way, the power source of the token may be recharged without requiring metal-to-metal contact.

In at least one embodiment, token 1100 may be operable as a multi-band frequency transceiver device, which is able to transmit and receive signals across different frequency bands of the electromagnetic spectrum such as, for example, one or more of the following (or combinations thereof): LF (Low Frequency) band signals (e.g., within the frequency range of about 30 kHz to 300 kHz), HF (High Frequency) band signals (e.g., within the frequency range of about 3 MHz to 30 MHz), signals in the 5 GHz spectrum band, signals in the 2.4 GHz spectrum band, signals in the 900 MHz spectrum band, signals in the 400 MHz spectrum band, signals which correspond to frequencies associated with other well-known wireless communication protocols or standards such as those described or referenced herein, etc.

According to different embodiments, each of the different frequency bands (e.g., Low Frequency band, High Frequency band, etc.) may have associated therewith different inherent characteristics and/or properties which, for example, may be advantageously utilized in specific situations for conducting specific types of activities.

For example, the Low Frequency band signals have longer wavelengths than the High Frequency band signals, and possess inherent characteristics such as, for example: requiring less power for signal transmission (e.g., relative to High Frequency band signals); being better able to penetrate through walls, clothing, and/or other objects or barriers (e.g., relative to High Frequency band signals), being less vulnerable to multipath interference, etc.

In contrast, High Frequency band signals have shorter wavelengths than Low Frequency band signals, and possess inherent characteristics such as, for example: being better suited (e.g., relative to Low Frequency band signals) for carrying higher rates of data transmission, being better suited for use with relatively short antennas, etc.

Accordingly, in at least one embodiment, use of High Frequency band signals (and/or signals in the 5 GHz spectrum band, 2.4 GHz spectrum band, 900 MHz spectrum band, and/or 400 MHz spectrum band) may be preferable and/or advantageous in at least one or more of the following situations (or combinations thereof):

- conducting wireless data communications between the token 1100 and one or more external devices/systems of the casino network (such as, for example: gaming machine controllers, gaming table controllers, data collection units, casino tracking systems, etc.);
- situations involving relatively high rates of data transmission between token 1100 and the external system(s)/device(s);
- situations involving wireless communication using one or more wireless communication protocols or standards (such as, for example, 802.11 (WiFi), 802.15 (including Bluetooth™), 802.16 (WiMax), 802.22, Cellular standards such as CDMA, CDMA2000, WCDMA, etc.)
- Etc.

On the other hand, use of Low Frequency band signals may be preferable in at least one or more of the following situations (or combinations thereof):

- situations involving relatively low rates of data transmission;
- situations where reduced power consumption is desirable;
- situations where the communication involves penetration of one or more barriers (such as, for example, walls, clothing, bodies, tables, etc.);
- situations involving communication with one or more portable tracking device readers (e.g., RFID readers);
- situations involving wireless communication using one or more wireless communication protocols or standards such as, for example, Radio Frequency (e.g., RFID), Infrared, Near Field Magnetics, etc.
- Etc.

As mentioned previously, currently existing wireless ID tags include both passive wireless ID tags (which obtain their power from an external power source) and active wireless ID tags (which include their own internal power source). In at least one embodiment, casino wagering tokens which include passive wireless RFID tags may be referred to as a passive RFID-enabled wagering token, whereas casino wagering tokens which include active wireless RFID tags may be referred to as an active RFID-enabled wagering token.

Conventional wisdom suggests that there are a number of advantages to casino operators and gaming vendors in choosing passive RFID-enabled wagering tokens over active RFID-enabled wagering token for use in casino gaming establishments. For example, as mentioned previously, a passive RFID-enabled wagering token is typically configured or designed to obtain its power from energizing signals which are provided from external devices such as RFID readers. Accordingly, such tokens are typically configured or designed to operate without the use of an internal battery. One advantage of such a wagering token design is that, by eliminating the need for an internal battery, the cost of manufacturing such a passive RFID-enabled wagering token is significantly less than the cost of manufacturing an active RFID-enabled wagering token (which includes an internal battery). Moreover, given that a significant percentage of wagering tokens may be mistreated, lost, stolen, or removed from the premises each year, it is understandable that casino operators have little desire to invest significant amount of money in purchasing expensive wagering tokens.

Another advantage of the passive RFID-enabled wagering token design is that its lack of internal battery makes it easier to design and manufacture passive RFID-enabled wagering tokens which have a form factor (e.g., size, shape, thickness, etc.) that substantially matches the form factor of traditional-type casino wagering tokens.

Yet another advantage of the passive RFID-enabled wagering token design is that the expected operational lifetime of a passive RFID-enabled wagering token is significantly greater than that of an active RFID-enabled wagering token. For example, an expected operational lifetime of an active RFID-enabled wagering token may typically be limited to the expected lifetime of its internal battery, whereas the expected lifetime of a passive RFID-enabled wagering token has no such limitation.

In order to extend the expected lifetime of an active RFID-enabled wagering token, conventional wisdom suggests that it is desirable to reduce the power consumption requirements of the internal circuitry of the active RFID-enabled wagering token in order to extend the effective lifetime of the internal battery as long as possible.

As a result, there is currently little incentive or desire in today's marketplace for manufacturing and/or purchasing RFID-enabled wagering tokens that include additional processors, circuitry, and/or functionality which: (1) would not be compatible or operable with the power supply constraints of passive RFID-enabled wagering tokens; (2) would result in the RFID-enabled wagering tokens having a form factor which is noticeably different from the form factor of traditional-type casino wagering tokens; (3) would result in additional power consumption demands being placed upon an active RFID-enabled wagering token's internal battery; and/or (4) would result in a noticeable decrease in the operational battery life of an active RFID-enabled wagering token.

Accordingly, most (if not all) of today's currently existing RFID-enabled casino wagering tokens are typically configured or designed to include little (if any) processing capabilities or other "intelligence."

However, in contrast to such conventional wisdom and market forces, various aspects described herein are directed to different embodiments of intelligent wagering tokens that may be configured or designed to include additional features, functionalities, and/or processing capabilities which, heretofore, have not been provided in currently existing RFID-enabled casino wagering tokens.

For example, according to different embodiments, token 1000 may be configured or designed to include one or more of the following features and/or perform one or more of the following operations (and/or combinations thereof):

- Periodically determine location information relating to the token's current position or location.
- Periodically report (e.g., transmit) location information relating to the token's current position to one or more external devices.
- Periodically store location information relating to the token's current position in local memory.
- Engage in wireless communication with other intelligent wagering tokens.
- Engage in wireless communication with external/remote devices using at least two different frequency bands.
- Provide power recharging capability for recharging the token's internal, rechargeable power source (e.g., rechargeable battery).
- Detect the occurrence of possible signal transmission collisions involving that token.
- Independently initiate and/or implement one or more signal collision avoidance procedures.
- Determine and record information relating to identities of one or more smart cards (e.g., RFID-enabled player tracking cards) and/or other external devices which have communicated with the token.
- Determine and record signal strength information relating to the respective signal strengths of each (or selected) smart card (and/or other external devices) which has communicated with the token. Timestamp data and/or other data may also be stored and/or linked to the data record stored on the chip.
- Determine and/or verify the current token-owner association.
- Periodically store/update information (e.g., in local memory) relating to the current owner of that token. Timestamp data and/or other data may also be stored and/or linked to the data record stored on the chip. In one embodiment, each chip may store information relating to all (or selected) previous owners of that chip.
- Etc.

In at least one embodiment, token 1100 may be configured or designed to store various types of information in it's local memory. Examples of the different types of information which may be stored in the token memory may include, but are not limited to, one or more of the following (or combinations thereof):

- Information generated by the token.
- Information acquired from one or more portable tracking devices.
- Information acquired from one or more other external devices/systems.
- Token ID information.
- Smart Card or Player Tracking Card ID information.
- Timestamp information.
- Information relating to an identity of a current owner of the token.
- Information relating to identities of previous owners of the token.
- Information relating to devices (e.g., tokens, readers, etc.) which have communicated with the token.
- Information relating to signal strength criteria associated with one or more signals (detected by the token) which were transmitted by one or more external devices (e.g., RFID readers, smart card readers, and/or other types of portable tracking device readers). For example, in one embodiment, a token 1100 may be configured or designed to periodically store in it's local memory information relating to one or more interrogation and/or energizing signals detected by the token during one or more time intervals. According to specific embodiments, such information may include, for example: signal strength values (e.g., associated with one or more detected signals), device identifier data (e.g., for identifying the device(s) associated with transmission of the detected signals), timestamp information, etc.

Authentication information.

Information relating to parameters, criteria, and/or instructions relating to signal collision avoidance procedures or protocols to be implemented at or by the token.

Alternate communication channels, frequencies, timeslots, etc.

Information relevant to a gaming property (e.g., casino name or identifying number).

Historical information relating to use of the token.

Wagering token value/denomination.

Time/date of activation.

Time/date of ownership transfer(s).

Data relating to history ownership transfers.

Promotional information.

Wagering token status (e.g., battery voltage, read/write cycles, etc.)

Encryption key or code information.

Serial number or token id.

Security/tamper codes.

Other information pertinent to gaming interaction and/or token usage.

Etc.

As will readily be appreciated by one having ordinary skill in the art, currently available passive RFID-enabled wagering tokens are typically incapable of implementing and/or performing many of the different token features and/or functionalities described above (e.g., with respect to token 1100), since, for example, currently available passive RFID-enabled wagering tokens simply do not have sufficient processor and/or power resources for implementing and/or performing many of the different token features and/or functionalities described above.

Additionally, currently available active RFID-enabled wagering tokens would also be incapable of implementing and/or performing many of the different token features and/or functionalities described above (e.g., with respect to token 1100), since, for example, currently available active RFID-enabled wagering tokens typically do not have sufficient processor and/or power resources for implementing and/or performing many of the different token features and/or functionalities described above. Moreover, it will be appreciated that any attempt to modify one of today's currently available active RFID-enabled wagering tokens to include all (or selected portions) of the token features and/or functionalities described above would result in additional power consumption demands being placed upon the modified, active RFID-enabled wagering token's internal battery, and/or would result in a noticeable decrease in the expected (and/or actual) operational battery life of the modified, active RFID-enabled wagering token.

However, as described herein, one or more intelligent wagering token embodiments may be configured or designed to include a processor which is operable to implement and/or perform all (or selected ones) of the different token features and/or functionalities described above. Additionally, as described herein, some or all of the intelligent wagering token embodiments described herein may be configured or designed to include a rechargeable battery (or other internal rechargeable power source) and recharging circuitry which are operable provide the necessary power for enabling the token to implement and/or perform all (or selected ones) of the different token features and/or functionalities described above. Moreover, intelligent wagering token embodiments which include such an internal rechargeable power source and recharging circuitry may be able to implement and/or perform all (or selected ones) of the above-described token features and/or functionalities without causing noticeable decrease in the expected (and/or actual) operational battery life of the intelligent wagering token.

For example, one benefit of at least one intelligent wagering token embodiment described herein is that it enables an intelligent wagering token to be configured or designed to include functionality for detecting the occurrence of possible signal transmission collisions and/or for independently initiating and/or implementing one or more signal collision avoidance procedures at the token.

One current problem which typically arises when attempting to identify and track individual RFID-enabled wagering tokens at a given location or region (such as, for example, at a specified live casino gaming table) relates to the occurrence of signal collisions which may occur between the various different RFID-enabled wagering tokens located within that region.

For example, in an example situation at a live casino gaming table where an RFID-reader at the gaming table is used to detect and individually identify all of the RFID-enabled wagering tokens which are located within a given region of the gaming table surface (such as, for example, multiple different RFID-enabled wagering tokens which have been placed within a specific wagering circle displayed on the gaming table surface) it is quite common for multiple signal collisions to occur (e.g., during the reader's simultaneous probe of the multiple RFID-enabled wagering tokens which are located within the given region) which inhibits or prevents the RFID-reader from accurately (and/or timely) detecting and/or ascertaining the identities of all of the RFID-enabled wagering tokens which are located within the given region.

Presently, various techniques may be employed in an attempt to reduce or mitigate the occurrence of such collisions. For example, as described previously, RFID readers, such as 710 (FIG. 7), may be configured or designed to probe simultaneously a plurality of different RFID tags. Once a signal from an RFID tag has been correctly received and decoded, algorithms may be applied (e.g., by the RFID reader and/or by the casino tracking system) to decide whether the signal is a repeat transmission. In one embodiment, when the reader determines the transmission has been repeated, the reader may instruct the RFID tag to stop transmitting. This process may be referred to as "Command Response Protocol," and may be used to circumvent the problem of reading multiple tags in a short period of time during batch processing. In another approach, the reader may look for RFID tags with specific identities and interrogate each in turn.

It is noted that each of the above-described mechanisms which may be employed for circumventing the problems associated with the reading multiple RFID tags (e.g., in a short period of time during batch processing) are initiated and/or managed by the reader and/or by some external system/device other than the RFID-enabled wagering token. Thus, for example, while a currently available RFID-enabled wagering token may be configured or designed to stop transmissions in response to a Command Response Protocol signal provided by the reader, the token itself has no awareness that a collision may have occurred, nor does the token possess any functionality or intelligence for automatically and independently initiating, at the token, one or more collision avoidance procedures.

However, as described herein, one or more intelligent wagering token embodiments may be configured or designed to include functionality for: detecting occurrences (or possible occurrences) of signal collisions, and/or independently initiating (and/or implementing), at the token, one or more signal collision avoidance procedures.

Another benefit of at least one intelligent wagering token embodiment described herein is that it enables an intelligent wagering token to be configured or designed to include functionality for determining and recording information relating to identities of one or more external devices which have communicated with the token, and/or for determining and recording signal strength information relating to the respective signal strengths of each (or selected) external device(s) which has/have communicated with the token. For example, in one embodiment, a token (such as, for example, an intelligent wagering token) may be configured or designed to periodically store in it's local memory information relating to one or more interrogation and/or energizing signals detected by the token during one or more time intervals. According to specific embodiments, such information may include, for example: signal strength values (e.g., associated with one or more detected signals), device identifier data (e.g., for identifying the device(s) associated with transmission of the detected signals), timestamp information, etc. For example, in one embodiment, the token may be configured or designed to periodically record information relating to the relatively highest signal strengths associated with detected signals corresponding to relatively highest n signals (e.g., n=1-10, n=5)

In at least one embodiment where the token 1100 includes, for example, a wireless charging circuit, the charging circuit (and/or components thereof) could be used to detect and/or generate at least a portion of the various types of signal strength information described herein. For example, in one embodiment, the charging circuit may be temporarily (e.g., and automatically and/or dynamically) disconnected from the internal battery, and used to generate signal strength information (e.g., without the battery load) which, for example, may include respective voltage data relating to one or more different signals which are detected by the charging circuit antenna(s). In at least one embodiment, the measured voltage data for each respective signal may be proportional to (and/or used to calculate or determine) the received signal strength of that signal. In one embodiment, this voltage data may be fed into an A/D converter in order to determine the receiver signal strength for each (or selected ones of) the detected signals.

In at least one embodiment, the token 1100 may include at least one electronic (or electro-mechanical) controlled switch which may be operable to automatically and/or dynamically disconnect/reconnect the charging circuit from/to the battery (and/or other components). Additionally, in at least one embodiment, the token 1100 may include one or more A/D converter(s).

It will be appreciated that other token embodiments (not shown) may include different and/or other components than those illustrated in FIG. 11.

Figure 12B:
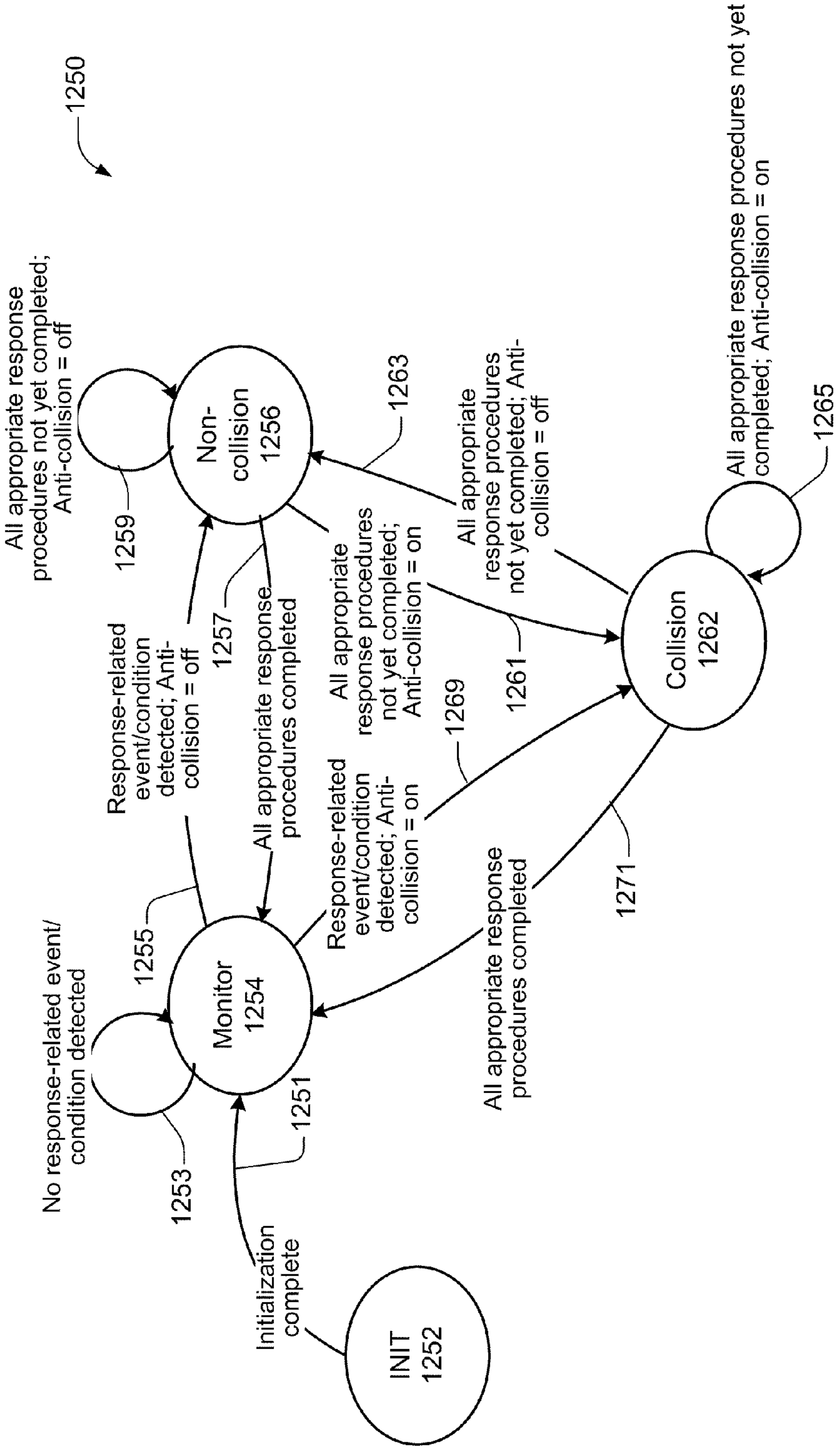
FIG. 12B shows an example embodiment of a wagering token state diagram 1250 which may be used for implementing various aspects or features described herein.

FIG. 12B shows an example embodiment of a wagering token state diagram 1250 which may be used for implementing various aspects or features described herein. In at least one embodiment, a least a portion of the operations and/or activities associated with state diagram 1250 may be performed or implemented by one or more components of a wagering token such as, for example, one or more intelligent wagering token embodiments described herein. Additionally, according to different embodiments, the various operations and/or activities associated with state diagram 1250 may be implemented via hardware, software, and/or some combination thereof.

For purposes of illustration, a description of state diagram 1250 will now be provided by way of example. In this particular example it is assumed that the operations and/or activities associated with state diagram 1250 are performed or implemented at a intelligent wagering token such as, for example, intelligent wagering token 1100 of FIG. 11. In other embodiments at least a portion of the operations and/or activities associated with state diagram 1250 may be performed or implemented by other wagering token embodiments described herein.

As illustrated in the example of FIG. 12B, state diagram 1250 may include a plurality of different states including, for example, an initialization state 1252, a monitor state 1254, a non-collision state 1256, a collision state 1262, etc. In at least one embodiment, each of the different states 1252, 1254, 1256, 1262, may relate to (or be descriptive of) a different state of operation of the intelligent wagering token. In at least one embodiment, the wagering token may be configured or designed to have a plurality of different states currently active at the same time. According to one embodiment, during initialization state 1252, the intelligent wagering token may perform any desired initialization procedures.

In one embodiment, the successful completion of the initialization procedures may trigger 1251 advancement to monitor state 1254.

In at least one embodiment, while in the monitor state 1254, the intelligent wagering token (and/or selected systems, devices, components associated with the wagering token) may be operable to perform one or more of the following (or combinations thereof):

- Set or update a current power mode of operation of the intelligent wagering token to a low power consumption mode or low power operating mode. For example, in at least one embodiment, while in the monitor state 1254, the intelligent wagering token may be in power down mode, conserving battery power.
- Set or update criteria relating to collision avoidance (e.g., anti-collision) procedures to be implemented at the intelligent wagering token. For example, in at least one embodiment, the intelligent wagering token may update collision avoidance criteria relating to a collision avoidance response flag (and/or other type(s) of data structure(s)) which, for example, may be used by the token to determine whether any collision avoidance procedures should be implemented at the token when responding to a detected response-related event/condition. In at least one embodiment, the collision avoidance criteria may also be used to determine which type(s) collision avoidance procedures should be implemented at the token when responding to a detected response-related event/condition.
- Monitor events, conditions and/or activities at the wagering token for detection of any response-related events and/or conditions.
- Periodically record selected information associated with events, conditions and/or activities detected at the wagering token.
- Receive requests, commands and/or instructions from one or more external devices (such as, for example, smart cards, RFID-readers, devices/systems associated with a casino tracking system, other intelligent wagering tokens, etc.).
- Implement or carry out requests, commands and/or instructions received from one or more external devices.
- etc.

According to different embodiments, various examples of response-related events and/or conditions may include for example, one or more of the following (or combinations thereof):

- Detection of one or more events, conditions and/or activities which meet or exceed specified "response-related" threshold criteria.
- Detection of one or more events, conditions and/or activities which may result in loss or altering of information stored at the wagering token.
- Detection of one or more unauthorized events, conditions and/or activities at the wagering token.
- Detection of one or more fault events or conditions at the wagering token.
- Detection of one or more events and/or conditions which may require the token to perform an action or operation in response to signal(s) and/or communication(s) received from one or more external devices (e.g., smart cards, RFID-readers, devices/systems associated with a casino tracking system, other intelligent wagering tokens, etc.).
- Detection of one or more events and/or conditions which may require the token to transmit and/or receive data to/from one or more external devices.
- Detection of one or more events and/or conditions which may require the token to generate and/or acquire information.
- Detection of one or more events and/or conditions which may require the token to store selected information within its local memory.
- Detection of one or more events and/or conditions which may require the token to transmit (e.g., via wireless interface) selected information to one or more external devices/systems.
- Detection of other events and/or conditions which may require the token to perform an activity or operation at the token.
- Detect the occurrence of possible signal transmission collisions involving that token.
- Determine and record information relating to identities of one or more smart cards (e.g., RFID-enabled player tracking cards) and/or other external devices which have communicated with the token.
- Determine and record signal strength information relating to the respective signal strengths of each (or selected) smart card (and/or other external devices) which has communicated with the token. Timestamp data and/or other data may also be stored and/or linked to the data record stored on the chip.
- Determine and/or verify the current token-owner association.
- Periodically store/update information (e.g., in local memory) relating to the current owner of that token. Timestamp data and/or other data may also be stored and/or linked to the data record stored on the chip. In one embodiment, each chip may store information relating to all (or selected) previous owners of that chip.
- Etc.

In at least one embodiment, the wagering token may continue to remain in the monitor state 1254 while no response-related events and/or conditions are detected (1253).

In at least one embodiment, while in the monitor state 1254, the detection of a response-related event or condition may trigger 1255 a change of state. For example, as illustrated in the example embodiment of FIG. 12B, while in the monitor state 1254, if no collision avoidance procedures are currently in effect at the token (e.g., anti-collision=off), the detection of a response-related event or condition may trigger (e.g., 1255) a change to non-collision state 1256. Alternatively, while in the monitor state 1254, if collision avoidance procedures are currently in effect at the token (e.g., anti-collision=on), the detection of a response-related event or condition may trigger (e.g., 1269) a change to collision state 1262.

In at least one embodiment, while in the non-collision state 1256, the intelligent wagering token may be operable to perform one or more of the following (or combinations thereof):

- Set or update a current power mode of operation of the intelligent wagering token to a low power consumption mode or low power operating mode. For example, in at least one embodiment, while in the monitor state 1254, the intelligent wagering token may be in power down mode, conserving battery power.
- Set or update criteria relating to collision avoidance (e.g., anti-collision) procedures to be implemented at the intelligent wagering token. For example, in at least one embodiment, the intelligent wagering token may update collision avoidance criteria relating to a collision avoidance response flag (and/or other type(s) of data structure(s)) which, for example, may be used by the token to determine whether any collision avoidance procedures should be implemented at the token when responding to a detected response-related event/condition. In at least one embodiment, the collision avoidance criteria may also be used to determine which type(s) collision avoidance procedures should be implemented at the token when responding to a detected response-related event/condition.
- Monitor events, conditions and/or activities at the wagering token for detection of any response-related events and/or conditions.
- Detect the occurrence of possible signal transmission collisions involving that token.
- Determine and record information relating to identities of one or more smart cards (e.g., RFID-enabled player tracking cards) and/or other external devices which have communicated with the token.
- Determine and record signal strength information relating to the respective signal strengths of each (or selected) smart card (and/or other external devices) which has communicated with the token. Timestamp data and/or other data may also be stored and/or linked to the data record stored on the chip.
- Determine and/or verify the current token-owner association.
- Periodically store/update information (e.g., in local memory) relating to the current owner of that token. Timestamp data and/or other data may also be stored and/or linked to the data record stored on the chip. In one embodiment, each chip may store information relating to all (or selected) previous owners of that chip.
- Receive requests, commands and/or instructions from one or more external devices (such as, for example, smart cards, RFID-readers, devices/systems associated with a casino tracking system, other intelligent wagering tokens, etc.).
- Implement or carry out requests, commands and/or instructions received from one or more external devices.
- Acquire and/or generate various types of information such as, for example, one or more of the following (or combinations thereof): information generated by the token, information acquired from and/or relating to one or more external devices, information relating to one or more detected events and/or conditions, etc.
- Store various types of information within local memory of the token. Examples of such information may include, but are not limited to, one or more of the following (or combinations thereof): information generated by the token, information acquired from and/or relating to one or more external devices, information relating to one or more detected events and/or conditions, etc.

Transmit and/or receive selected information to/from one or more external devices. Examples of such information may include, but are not limited to, one or more of the following (or combinations thereof): information generated by the token, information acquired from and/or relating to one or more external devices, information relating to one or more detected events and/or conditions, information stored in the token memory, etc.

Disable the wagering token from use in wagering and/or game play.

Etc.

In at least one embodiment, the wagering token may continue to remain in the non-collision state 1256 while (a) no collision avoidance procedures are currently in effect and (b) all appropriate response procedures have not yet been completed. (1259).

Additionally, in at least one embodiment, while in the non-collision state 1256, the token may implement or perform appropriate response procedures (such as, for example, transmission of data or other information to an RFID-reader) without initiating any locally implemented collision avoidance procedures (such as, for example, one or more collision avoidance procedures which may be automatically and independently initiated at the token).

In at least one embodiment, while in the non-collision state 1256, the detection of a response-related event or condition may trigger (e.g., 1261) a change to collision state 1262. Additionally, in at least one embodiment, if all appropriate response procedures have not yet been completed and it is detected that collision avoidance procedures are currently in effect, such conditions may also trigger (e.g., 1261) a change to collision state 1262.

In at least one embodiment, while in the collision state 1262, the wagering token may be operable to perform one or more of the following (or combinations thereof):

Set or update a current power mode of operation of the intelligent wagering token to a low power consumption mode or low power operating mode. For example, in at least one embodiment, while in the monitor state 1254, the intelligent wagering token may be in power down mode, conserving battery power.

Set or update criteria relating to collision avoidance (e.g., anti-collision) procedures to be implemented at the intelligent wagering token. For example, in at least one embodiment, the intelligent wagering token may update collision avoidance criteria relating to a collision avoidance response flag (and/or other type(s) of data structure(s)) which, for example, may be used by the token to determine whether any collision avoidance procedures should be implemented at the token when responding to a detected response-related event/condition. In at least one embodiment, the collision avoidance criteria may also be used to determine which type(s) collision avoidance procedures should be implemented at the token when responding to a detected response-related event/condition.

Monitor events, conditions and/or activities at the wagering token for detection of any response-related events and/or conditions.

Periodically record selected information associated with events, conditions and/or activities detected at the wagering token.

Receive requests, commands and/or instructions from one or more external devices (such as, for example, smart cards, RFID-readers, devices/systems associated with a casino tracking system, other intelligent wagering tokens, etc.).

Implement or carry out requests, commands and/or instructions received from one or more external devices.

Acquire and/or generate various types of information such as, for example, one or more of the following (or combinations thereof): information generated by the token, information acquired from and/or relating to one or more external devices, information relating to one or more detected events and/or conditions, etc.

Store various types of information within local memory of the token. Examples of such information may include, but are not limited to, one or more of the following (or combinations thereof): information generated by the token, information acquired from and/or relating to one or more external devices, information relating to one or more detected events and/or conditions, etc.

Transmit and/or receive selected information to/from one or more external devices. Examples of such information may include, but are not limited to, one or more of the following (or combinations thereof): information generated by the token, information acquired from and/or relating to one or more external devices, information relating to one or more detected events and/or conditions, information stored in the token memory, etc.

Disable the wagering token from use in wagering and/or game play.

Detect the occurrence of possible signal transmission collisions involving that token.

Independently and automatically initiate and/or implement one or more signal collision avoidance procedures.

Determine and record information relating to identities of one or more smart cards (e.g., RFID-enabled player tracking cards) and/or other external devices which have communicated with the token.

Determine and record signal strength information relating to the respective signal strengths of each (or selected) smart card (and/or other external devices) which has communicated with the token. Timestamp data and/or other data may also be stored and/or linked to the data record stored on the chip.

Determine and/or verify the current token-owner association.

Periodically store/update information (e.g., in local memory) relating to the current owner of that token. Timestamp data and/or other data may also be stored and/or linked to the data record stored on the chip. In one embodiment, each chip may store information relating to all (or selected) previous owners of that chip.

Etc.

In at least one embodiment, the intelligent wagering token may continue to remain in the collision state 1262 while (a) collision avoidance procedures are currently in effect and (b) all appropriate response procedures have not yet been completed. (1265). Additionally, in at least one embodiment, if all appropriate response procedures have not yet been completed and it is detected that no collision avoidance procedures are currently in effect, such conditions may trigger (e.g., 1263) a change to non-collision state 1256. Further, in at least one embodiment, while in the collision state 1262, if it has been detected that all appropriate security response procedures have been completed (and no other response-related events and/or conditions are detected), a state change to the monitor state 1254 may be triggered 1271.

In at least one embodiment, a variety of different classifications may be used to characterize different types of response-related events/conditions detected at one or more wagering tokens. For example, in one embodiment, a detected response-related events/conditions may be automatically and/or dynamically classified as either a response-related event/condition or a non-response-related event/condition. In at least one embodiment, the classification of a detected response-related event/condition may be based, at least in part, upon various other factors, events, conditions, and/or criteria. For example, in at least one embodiment, classification of a detected response-related event/condition may be based on one or more of the following (or combinations thereof):

operating state or mode of operation of the wagering token at the time of occurrence of the detected response-related event/condition;

other contemporaneous factors, events, and/or conditions which were in effect before, during, and/or after the occurrence of the detected response-related event/condition.

etc.

In one embodiment, the intelligent wagering token may be operable to determine a classification of a detected response-related event/condition. In some embodiments, one or more external devices may be operable to determine a classification of a detected response-related event/condition.

Additionally, in at least one embodiment, different types of appropriate actions or operations may be performed or initiated by the intelligent wagering token depending upon the classification of the type of response-related event/condition detected (e.g., critical, non-critical, etc.).

In at least one alternate embodiment (not shown), the intelligent wagering token may be configured or designed to include additional states of operation, to include modified states of operations (e.g., with respect to the states illustrated in FIG. 12B), and/or to omit one or more states (such as, for example, one or more of the states illustrated in FIG. 12B). For example, in one such embodiment, the intelligent wagering token may be configured or designed to include a passive state and active state similar to those shown, for example, in FIG. 12A.

Various features of at least one intelligent wagering token embodiment may be illustrated by way of the following example. In this example, it is assumed that an intelligent wagering token has been configured or designed to include functionality for: (a) detecting the occurrence of possible wagering token signal transmission collisions, and (b) independently and automatically initiating and/or implementing one or more signal collision avoidance procedures. Additionally, in this particular example, it is assumed that the intelligent wagering token is currently in close proximity to other intelligent wagering tokens (e.g., the intelligent wagering token is located in a stack of RFID-enabled wagering tokens), and that the intelligent wagering token has received or detected an interrogation signal from a nearby RFID reader, which is attempting to concurrently detect and/or identify the presence of each of the multiple RFID-enabled wagering tokens (including the intelligent wagering token of this example).

As is generally known in the art, a single interrogation signal (e.g., from the RFID reader) can result in a cacophony of answer signals from multiple RFID-enabled wagering tokens. Where such responses are unduly numerous, detection and processing of all such answer signals can become problematic, resulting in lost data or even undetected responses altogether.

In the present example, it is assumed that the intelligent wagering token initially provides an answer signal to the RFID reader in response to the interrogation signal. In at least one embodiment, if the intelligent wagering token may be configured or designed to wait to receive an acknowledgment signal (e.g., from the RFID reader) acknowledging receipt or detection of the intelligent wagering token's answer signal. In one embodiment, if the intelligent wagering token does not receive the acknowledgment signal within a predetermined time interval (e.g., acknowledgment signal not received within a specified time window of about 10-100 msec from the time that the acknowledgment signal was transmitted by the intelligent wagering token), the intelligent wagering token may independently and automatically initiate and/or implement one or more signal collision avoidance procedures. Alternatively, in at least some embodiments, an external device (such as, for example, an RFID reader) may transmit a signal (and/or other information) to one or more selected wagering tokens to alert the tokens to initiate implementation of local or internal collision avoidance protocols. In response, for example, an intelligent wagering token may automatically initiate and/or implement one or more local signal collision avoidance procedures as described herein.

According to different embodiments, a variety of different collision avoidance procedures may be utilized. For example, in some embodiments, one or more well-known collision avoidance procedures may be utilized such as, for example, one or more of the following (or combinations thereof): Carrier Sense Multiple Access (CSMA); Multiple Access Collision Avoidance (MACA); CSMA/CA (which, for example, relates to a combination of the CSMA and MACA protocols); collision avoidance tree expansion, etc. Implementation specific details relating to such well-known collision avoidance procedures are generally known to one of ordinary skill in the art, and therefore will not be described in greater detail herein.

Other types of collision avoidance procedures may involve the staggering subsequent transmission attempts. For example, according to different embodiments, subsequent transmission attempts by the intelligent wagering token may be staggered randomly in time using various approaches such as, for example, binary tree and/or binary exponential backoff.

For example, in the binary exponential backoff approach, the intelligent wagering token may include a backoff counter which is configured or designed to track the number of idle time slots before a node with pending packets attempts to seize the channel. In one embodiment, the intelligent wagering token may initialize its backoff counter by drawing a random value from a range of values (e.g., corresponding to a backoff window range). In one embodiment, each time slot the channel is found idle, the backoff counter is decreased by 1 and transmission is attempted upon expiration of the backoff counter. In one embodiment, the window size may be doubled every time a collision occurs, and the backoff countdown may be started again. In an alternate embodiment, a variant of this contention resolution scheme may be utilized in which a truncated binary exponential backoff may be used starting at a specified window and allowing up to a maximum backoff range below which transmission is attempted.

In at least one embodiment, predefined backoff parameter data may be stored within the memory of the intelligent wagering token. For example, in one embodiment, the back-off parameter data may include data relating to the initial and final back-off windows, which, for example, may be specified in the form of back-off start (BS) and back-off end (BE) parameters. In at least one embodiment, these back-off window parameters are expressed as a power of two. For example, in one embodiment, a back-off window parameter of 5 indicates a window of 25-32 random numbers, selected from the range 0-31.

In one embodiment, when the intelligent wagering token detects an occurrence of a collision, it may respond by setting its internal back-off window equal to the back-off start window parameter specified by the backoff data stored at the token memory. The intelligent wagering token may then pick a random number from this window of numbers to be used as a current backoff value. In one embodiment, the random number chosen by the token (herein referred to as a token back-off value) may represent a proportionate number of time units (e.g., milliseconds) which the token should wait before re-transmitting its signal (e.g., to the RFID reader). In at least one embodiment, since each of the colliding tokens may be configured or designed to independently and automatically select a respective random number from it's backoff window, the chances of more than one token choosing the same random number is relatively low. Accordingly, it is anticipated that the intelligent wagering token may succeed in its second transmission attempt.

However if the number of tokens that had originally collided is relatively large (e.g., as compared to the range of available backoff values that each token may use for choosing its random number, there is a high probability that at least two tokens will select the same random number and collide again. Accordingly, in at least one embodiment, each time the tokens collide, each may be configured or designed to increment its internal back-off window by one, until the back-off window reaches the value of the back-off end parameter. Thus back-off end represents the largest window of numbers from which to select the random backoff value.

In at least one embodiment, each token may choose its respective back-off value from a window of back-off parameters. Additionally, in at least one embodiment, each token may use the back-off parameters (which, for example, may be stored in local memory at the token) to determine a range of possible back-off values. For example, in one embodiment the intelligent wagering token may be configured or designed to use a truncated binary exponential back-off algorithm to determine the backoff value. For example, the token may specify the window of values ([back-off_start, back-off_end]) to be used by the token in selecting the random backoff value. In one embodiment, the size of the window may be controlled by a back-off exponent value (e.g., specified as a power of 2), which also may be stored at the local token memory. at the token. For example, if the current value of the back-off exponent at a particular token is 3, the token will choose a random number from the values within the range [0, 23-1], which translates to the range [0, 1, 2, . . . 7]. Once a random number has been selected from this range (the random number being the back-off value), the token may attempt to retransmit after it has deferred a number of time intervals (e.g., time interval=1 msec) equal to the selected random number.

In one embodiment, when the intelligent wagering token determines that its transmission may have caused or resulted in a collision, it may independently and automatically initiate local collision avoidance procedures, for example, starting with a local exponent value=back-off start value, and then may increment its local exponent by some predetermined value n (e.g., n=1) each time another collision event is detected. This may continue, for example, until the back-off end parameter is reached. In at least one embodiment, the exponent value used by a token should preferably be small if there are few tokens that have collided. Under such conditions, a small back-off exponent may help to avoid unnecessary access delays by preventing the collided tokens from deferring too much time before attempting re-transmission.

In at least one embodiment, once the intelligent wagering token has successfully completed the appropriate response operations, the intelligent wagering token may return to the monitor state (e.g., 1254) of operation.

In at least one embodiment, at least a portion of information which is transmitted by the intelligent wagering token (such as, for example, selected information sent via wireless transmission) may be encrypted, for example, using one or more commonly available encryption protocols.

One advantage of at least one embodiment described herein relates to the introduction of systems and methods that enhance the automated identification and tracking of RFID wagering tokens within a gaming environment, such as at a gaming table. In at least one embodiment, this may be accomplished in part by the introduction of multiple RFID tags within or about each wagering token to be used in the tracking system.

For example, in at least one embodiment, various difficulties in identifying and reading RFID embedded wagering tokens in the prior art are overcome through the implementation of features such as, for example, one or more of the following (or combinations thereof):

- multiple RFID tags per wagering token,
- rechargeable battery,
- additions of antennae and readers about the gaming table or other venue,
- a time delay component to the individual responses from each RFID tag or wagering token,
- etc.

Another advantage relates to increased security features provided for such RFID wagering tokens. Increased security can be accomplished in part by providing one or more encryption techniques or protocols as part of the RFID tag and reader system, such that plain unprotected data is not generally transmitted from the RFID wagering tokens. A security breach feature can also be added, such that when an unauthorized write command or attempt to remove an RFID tag from a wagering token is detected, an appropriate alert and/or other counteraction can be made.

Figure 13A:
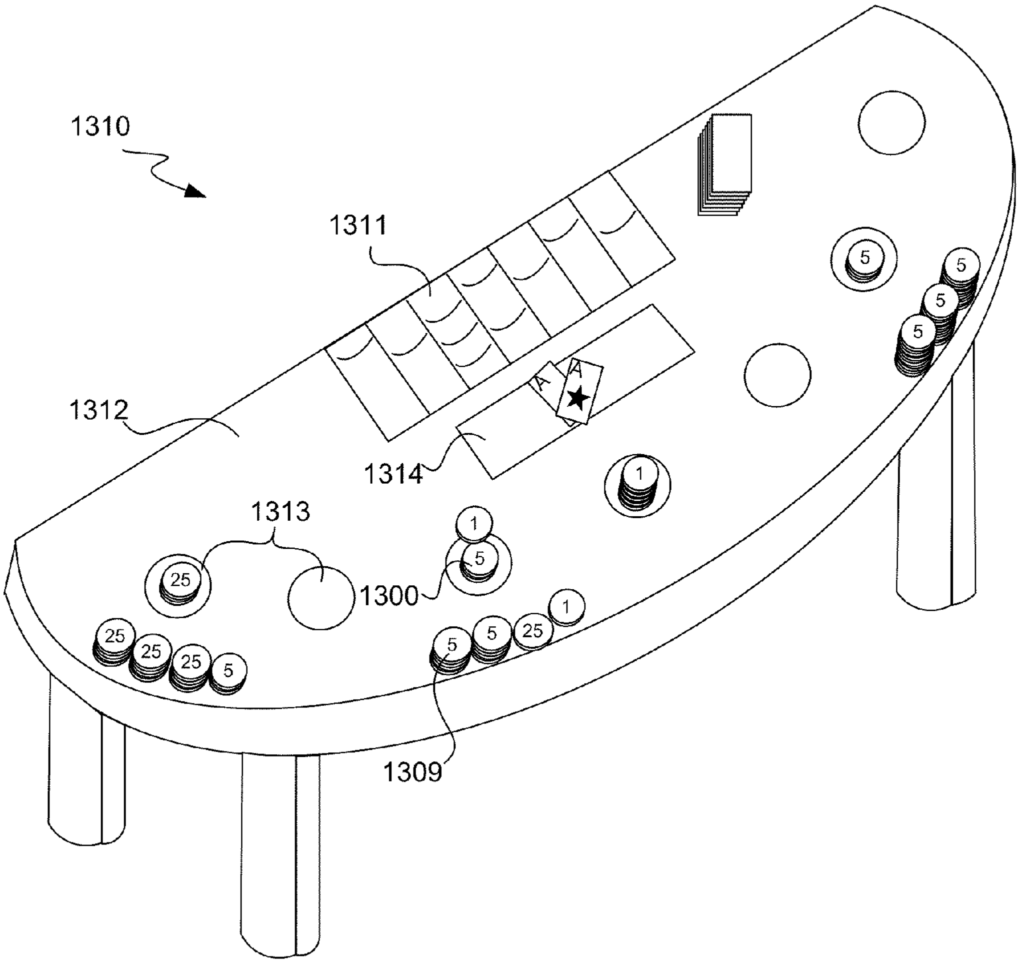
FIG. 13A illustrates in top perspective view an exemplary gaming table according to one embodiment of the present invention.

FIG. 13A illustrates in top perspective view an exemplary gaming table according to one embodiment. From its outer appearance, gaming table 1310 preferably generally looks to be just like any other gaming table that a patron might encounter at a casino or other gaming establishment. Differences between specialized gaming table 1310 and any other ordinary gaming table can include the presence of RFID wagering tokens in use at the table, as well as RFID reading devices and other related components, which may preferably be located beneath the gaming table or in other non-obtrusive locations, as detailed below. Gaming table 1310 has a chip tray 1311 configured or designed to store a plurality of wagering tokens, including RFID wagering tokens, as well as an upper surface 1312 adapted for the play of games and various other transactions involving wagering tokens. Various designated chip placement areas 1313, 1314 are distributed about the upper surface 1312 of the gaming table 1310. Such chip placement areas can include bet or wager placement areas 1313, as well as a general cash for chips or other chip conversion area 1314.

Wagering tokens 1309, 1300 of one or more denominations may also be located atop the upper surface 1312 of the gaming table, particularly during times of gaming activity at the table. For example, wagering token 1300 is a $5 chip that is subject to a current wager in a bet placement area, while wagering token 1309 is a $5 chip designated as belonging to a player that is not subject to a current play or action at the gaming table. As will be readily appreciated, wagering tokens 1309 and 1300 may be identical or substantially similar, with the possible exception of RFID tags included on the chips, as detailed below. Although gaming table 1310 has the general appearance of a blackjack table or table for a similarly distributed game, it will be readily appreciated that various gaming table embodiments described herein can also be extended to other forms of gaming tables and gaming venues. For example, similar specialized gaming tables or venues can be adapted for use as a craps table, a roulette layout, and/or a sports book counter or presentation, among other suitable gaming tables or venues.

Figure 13B:
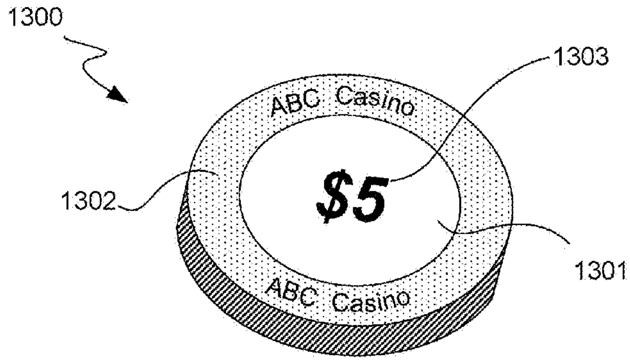
FIGS. 13B-F illustrate different example embodiments of intelligent wagering tokens.

Continuing next to FIG. 13B, the exterior of an exemplary wagering token according to one embodiment is illustrated in top perspective view. In the example embodiment of FIG. 13B, wagering token 1300 generally includes a center portion 1301, an outer rim portion 1302 and a specific monetary denomination and amount 1303 designated on an outer surface, such as on the center portion. As shown, wagering token 1300 is a $5 chip for use at "ABC Casino." Other designations, such as a casino name, advertising, and/or multiple color schemes may also be included on one or more outer surfaces of wagering token 1300.

Although the exemplary wagering token shown has distinctive center and rim portions, it is contemplated that other wagering token embodiments may not have such portions distinctively set forth, as will be readily appreciated. Regardless of the exact style and type of wagering token used, it may be preferable that some or all of wagering tokens each have multiple RFID tags embedded therein. Whether wagering tokens similar to or substantially different in style and type from the exemplary wagering tokens disclosed are used, it may also be preferable, although not required, that such RFID system wagering tokens at least resemble wagering tokens that do not include RFID tags. In some embodiments, the presence of RFID tags within the RFID wagering tokens should be largely undetectable or at least not obtrusive to the typical patron.

In at least one embodiment, each wagering token preferably includes a plurality of RFID tags, each of which may include one or more functional components to be used by a table game management system, a casino chip tracking system, and/or any other suitable system within a casino where wagering token identification or tracking may be desired.

In at least one embodiment, different RFID tags within a given wagering token may be configured or designed to provide a different function or functions with respect to other RFID tags within the same wagering token. For example, on a wagering token having two embedded RFID tags, a first RFID tag can be "read-only" and dedicated to reflecting security information, the wagering token denomination, a specific wagering token serial number, and/or other relevant chip information. A second RFID tag could be "read-write" and thus used for changeable information, such as, for example, token ownership information, information relating to communications with external devices, player tracking information, wagering token location history, wagering token transaction history, and/or other information described or referenced herein. In one embodiment, the player tracking information might include not only identifying information for the player, but also a history of transactions made by the player using the particular wagering token. According to different embodiments, such information could be written or stored in memory of the token, read and/or access by external devices, and/or rewritten. Thus, for example, in one embodiment RFID tag could include read only data, while another within the same wagering token could be a read-write RFID tag.

Other RFID tags having specialty functions could also be separately embedded or otherwise included on a single wagering token. Such specialty functions could include bonusing information, progressive jackpot information, added player tracking and computing data, as well as other information. In some embodiments, one or more RFID tags could have overlapping or identical functions. In some instances, two or more RFID tags on a single wagering token could even be identical, such as for security and verification purposes.

For example, where precautions against unwanted tampering with RFID wagering tokens are desired, one or more of such wagering tokens may include identical RFID tags. When signals are emitted from the identical RFID tags from such wagering tokens, the emitted signals should be identical, and could be compared to verify as such. Where an outside party or other unauthorized source has tampered with one of the RFID tags such that an improper or otherwise altered signal is given, then an unexpected result would be detected upon comparison of the multiple signals emitted from that tampered RFID wagering token. An appropriate alert and/or other action could then be taken by the casino or other gaming establishment.

In addition, further security features could also be included on one or more RFID tags on a single wagering token. In contrast to the relatively simple RFID communications currently used with wagering tokens having single RFID tags, one or more RFID tags on a wagering token can be configured or designed to communicate using one or more encryption protocols or techniques. As one possible example, Texas Instruments currently provides a number of RFID tags configured or designed to communicate through encrypted means. These include the DST-40 series of RFID tags, as well as various DST-Plus and other higher security encryption based RFID tags. As will be readily appreciated, any version or series of such RFID tags could be used, with appropriate selection based on security levels and speed being made as desired. As is generally known, higher encryption levels (and thus greater security) tend to result in tags that have a longer startup time, since increased bit levels result in extended interaction time with the transponder or other outside reading device.

Where the encryption of data stored on system RFID tags is included, it may be preferable that public keys be distributed to the various wagering tokens, while the private key or keys are held by the system run by the host casino or other gaming establishment. Of course, any form of encryption suitable for use in an environment involving RFID tags and readers may be used in association with one or more embodiments described herein. Through the use of such encryption methods, tampering by criminals and other unscrupulous persons who might attempt to improperly read and/or rewrite the contents of an RFID chip can be thwarted or at least deterred.

In still further embodiments, which may be combined with one or more of the foregoing embodiments and features, additional features can be included within one or more RFID tags to help detect when a tampering attempt has occurred. Such a tampering attempt can include attempts by unauthorized parties to write to an RFID tag within a wagering token, as well as attempts to dissect a wagering token or otherwise remove or isolate an RFID tag from the body of its respective wagering token. To help detect unauthorized write attempts, an RFID tag may require an appropriate input signal or secured identification means from the outside device attempting to write to the RFID tag. In the event that the outside device is an appropriate RFID transponder that is part of the casino operated system, a proper ID or other secured information can be provided such that the desired writing function can proceed smoothly.

Where such a proper identifier or other secure password is not presented to the RFID tag upon a write attempt, however, then the RFID tag can be programmed to note the attempt to write to the tag as being made without an apparent authorization or proper access information for writing or overwrite purposes. Such a status can then be stored on the RFID tag for reporting to a proper system transponder or other read device upon the next instance of the RFID tag detecting such a device. Another possible result from an improper write attempt is for the RFID tag to be programmed to erase any or all of the data stored thereon. Such erasure can further thwart the attempts of outside parties to manipulate, reverse engineer or otherwise learn information about the RFID wagering token system employed by a given casino or other gaming establishment. For example, where an unauthorized hacking attempt is detected, it may be prudent for an affected RFID wagering token to be programmed to simply erase all data relating to chip location history, transaction history, bonusing status, player tracking status, and so forth. Information that might remain could include a static chip identifier or serial number, as well as a chip denomination.

As yet another security feature that could be included in one or more of the RFID adapted wagering tokens embodiments described herein, one or more mechanisms might be included with some RFID tags in order to detect when a separation with the outer body of the wagering token is attempted. For example, a small spring-loaded tab or other similarly adapted item could be coupled to a fuse on the RFID tag such that the tag could easily detect when it has been removed from the body of its wagering token. Other mechanical, thermal and/or electrical adaptations could also be used to help detect when a physical removal of an RFID tag is attempted. As in the foregoing embodiments regarding an unauthorized write attempt to a tag, similar consequences might attach to any attempt to remove an RFID tag from its associated wagering token, notably the recording of an alert on the RFID, as well as the erasure of some or all of the data that might be stored on the RFID tag.

In at least one embodiment, the use of RFID tags within wagering tokens can be tied to monitoring and/or tracking the various transactions, movements and other activities of such wagering tokens in a variety of manners and contexts. For example, wagering tokens that have been implemented with RFID chips can be tracked at times of cashing in or cashing out at the gaming table, amongst other transactions. A player approaching the table with a $105 EZ Pay® ticket might offer the ticket for wagering tokens, and after the ticket is validated, $105 worth of RFID enabled wagering tokens can be placed in a designated area on the table that can be read by an RFID chip reader at the table. The $105 EZ Pay® ticket can then be canceled and taken away at or about the same time that the $105 worth of read and verified RFID enabled wagering tokens are pushed toward or otherwise provided to the player. Regardless of the specific implementation, RFID chip readers are preferably configured or designed to forward RFID wagering token data to one or more locations, such as a cashless interface device at the gaming table, a LAN based server and/or database, and/or a centralized WAN based server and/or database or data repository.

In some embodiments, an RFID chip tracking system can be configured or designed to work in conjunction with one or more bill acceptors, cashless interface devices and/or other suitable cash or credit tracking devices at the subject gaming tables or other tracked gaming activity venues or locations. In such arrangements, cash, printed tickets or other suitable credit instruments can be input to a bill acceptor, ticket acceptor or reader, or other suitable device as part of a regular cash in and/or cash drop procedure at a gaming table or other suitable venue, whereupon a corresponding level of wagering tokens are then provided to the player providing the cash or credit. An automated check can then be performed between the readings made of the bill acceptor or other suitable credit accepting drop device and the RFID reading devices to ensure that the proper level of wagering tokens have been provided to the player.

For example, where a player "buys in" at a tracked gaming table by providing a $100 bill, twenty $5 RFID embedded wagering tokens might be provided to the player, such as in a manual transaction by the dealer. Contemporaneously or soon thereafter, one or more RFID reading devices at the table can detect that twenty $5 RFID embedded wagering tokens have been provided to the player, at which time this information can be correlated with the $100 drop information. In the event that 19 or 21 wagering tokens have been inadvertently provided to the player, an alert can be provided and appropriate correction made. Of course, manual or partially manual transactions involving a casino dealer, a patron, or both, may also be identified and tracked.

Various system embodiments may include at least one associated processor and at least associated memory to facilitate the processing and possible storage of data regarding RFID wagering token related transactions. As will be readily appreciated, a system involving multiple gaming tables, venues, cashier cages, casino vaults and other locations where wagering tokens are used and stored can include a vast array of suitable RFID reading devices at many such venues and locations, such that wagering tokens and their histories can be tracked and recorded constantly. To this end, a central server and data repository may also be used with such a system, with data being accessible to various casino employees at various locations as may be desired.

To the extent that improved detection and reading abilities, or "visibility," within an overall RFID wagering token tracking system are desired, a number of items and potential added features can come into play. As noted above, the inclusion of multiple RFID tags within each wagering token may provide some increased visibility for such chips in some instances. For example, to the extent that known RFID chips having single embedded RFID tags are limited in their tag implementations and antennae arrangements, multiple tags distributed about the chips with more extensive antennae patterns may be more likely to be detected by a transponder, antenna, or other outside reading device.

In addition, a time delay circuit component or other similarly suitable device can be added to one or more of the RFID tags, such that a given incident or interrogation signal from an outside transponder or other RFID device results in staggered responses from the various affected RFID wagering tokens within range of that interrogating device. As is generally known in the art, a single interrogation signal can result in a cacophony of answer signals from multiple RFID tags. Where such responses are unduly numerous, detection and processing of all such answer signals can become problematic, resulting in lost data or even undetected responses altogether. To combat this problem, which is well-known with respect to large stacks or collections of RFID embedded wagering tokens, a time delay response element can be built into many or all of the RFID tags within the wagering tokens. Such response delays can be provided through the use of a simple capacitative element or other suitable combination within the overall circuit, as will be readily appreciated.

As one exemplary system application where a given gaming establishment has over 10,000 wagering tokens that are to be implemented with RFID tags, the tags for each such wagering token can be programmed to have a response delay that is different than every other chip. For example, each chip of the 10,000 wagering tokens can have a programmed delay time of 0 to 10,000 milliseconds, in 1 millisecond increments, such that the delay from any given chip will be anywhere from 1 millisecond to 10 seconds, and the delay time for each chip is different than the delay time for every other chip in the system. Of course, smaller increments than 1 millisecond could also be provided, particularly where there are to be more wagering tokens in the system, and also where a 0 to 10 second response delay is considered to be too long.

In some embodiments then, a 0 to 3000 millisecond delay may be preferable, such that a 3 second delayed response is the maximum delayed response time. Of course, the shrinking of the overall response time and/or the use of greater numbers of wagering tokens in the system may result in some wagering tokens having identically delayed response times. Alternatively, further divisions of response times may be possible, such as microseconds. In any event, given the length of time needed for a typical response, there may invariably be some instances where two different wagering tokens are providing parts of their answer signal back to the system at the same time. Although possibly not ideal, such instances are preferable to the current situation where all wagering tokens respond at the same time, resulting in a huge volume of signals that may not all be detected or interpreted thoroughly.

In some embodiments, one or more RFID wagering tokens could even be configured or designed to communicate with each other. For instance, where an RFID transponder or other reading device delivers enough RF power to facilitate communications between RFID tags on the same or separate wagering tokens, information regarding neighboring chips and transactions can be exchanged. Although relatively expensive, it is also contemplated that batteries may be incorporated into one or more RFID wagering tokens where extra power is desired such that communications between wagering tokens and/or added processing capacity within one or more RFID tags in the wagering token can be better accomplished.

Moving now to FIGS. 13C through 13F, several exemplary arrangements of multiple RFID tags within a single wagering token according to various embodiments are all illustrated in top plan view.

Figure 13C:
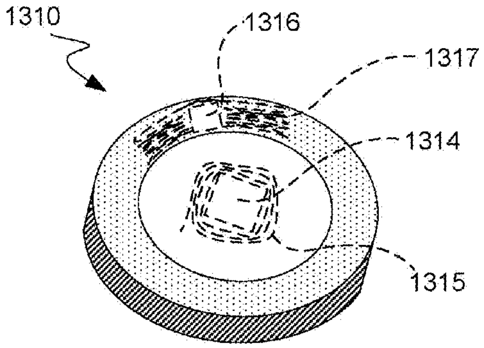

Starting first with FIG. 13C, exemplary wagering token 1310 includes a first RFID tag 1314 located within a center portion of the wagering token and a second RFID tag 1316 located in a rim portion of the wagering token. As in the case of each of these exemplary arrangements of RFID tags within wagering tokens, wagering token 1310 may appear on its surface to look exactly like wagering token 1300 of FIG. 13B. In fact, as shown from outer appearance only, wagering token 1300 could represent any of wagering tokens 1310, 1320, 130 or 1340 from any of FIGS. 13C through 13F. Included within wagering token 1310 are antennae 1315, 1317 coupled to RFID tags 1314, 1316 respectively, as will be readily appreciated by those skilled in the art. Although depicted as being relatively short in length and in relatively restricted patterns, it will be readily appreciated that these antennae may be longer and may extend further out from each RFID tag in one or more directions. For example, antenna 1315 for RFID tag 1314 may extend in a spiral that substantially fills the entire center portion of wagering token 1310, while antenna 1317 for RFID tag 1316 may extend across and substantially fill the entire rim portion of the wagering token.

In some embodiments, RFID tags 1314 and 1316 may be in communication with each other, while in other embodiments, isolation from each other may be preferred. As noted above, various functions may be separated completely into one RFID tag or the other. For example, one RFID tag might be used simply to store basic read-only information about the wagering token (e.g., denomination and serial number), while the other tag might be used to store reprogrammable information, such as a transaction and location histories. Alternatively, or in addition, one RFID tag might be adapted for encrypted communications, while the other is not. Further, a time delay response component might be included in only one RFID tag, or different response times can be programmed into each RFID tag. It should be noted that each of and/or any mix of these characteristics might also apply to any other arrangement of RFID tags within a wagering token, such as those provided in FIGS. 13D-3D below.

Figure 13D:
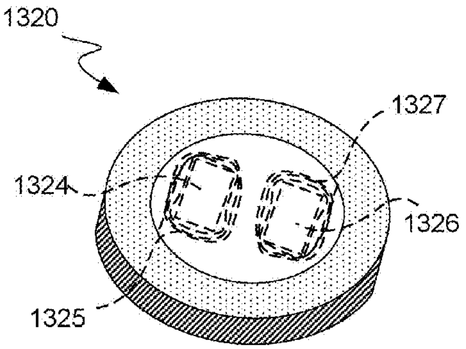

Continuing with FIG. 13D, separate RFID tags 1324 and 1326 are both provided within the center portion of wagering token 1320, albeit spaced apart by some distance. Of course, each tag has its own antenna 1325, 1327, and it will again be understood that the lengths and/or patterns for each RFID antenna may be designed differently as may be desired.

Figure 13E:
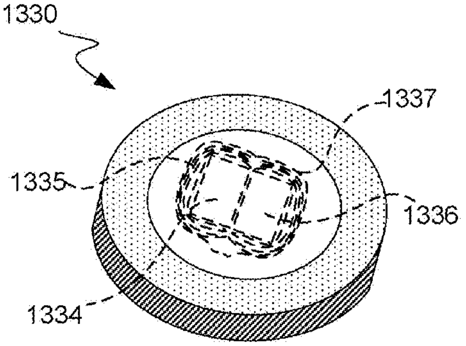

In FIG. 13E, wagering token 1330 also includes two RFID tags 1334, 1336, having antennae 1335, 1337 respectively. Unlike the previous examples, however, RFID tags 1334 and 1336 are adjacent to each other, such as at the center of the center portion of the wagering token. As in the foregoing examples, these tags may be in communication with each other, or may alternatively be electrically isolated from each other. In one embodiment, RFID tags 1334 and 1336 may even be within one overall housing or unit, although distinctively separate from an electrical and/or functional point of view.

Figure 13F:
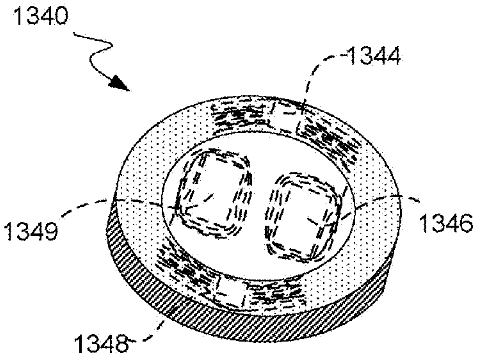

Moving to the last exemplary arrangement of FIG. 13F, wagering token 1340 includes four separate RFID tags 1344, 1346, 1348, 1349, with two being in the center portion of the wagering token and two being in the rim portion. One or more of these separate RFID tags may be in communication with each other, and each may provide one or more different functions. In addition, some of RFID tags 1344, 1346, 1348 and 1349 may be identical to each other, such as where security functions involving the comparison of answer signals are desired. Of course, portions or all of the RFID tags of any of the foregoing examples might also be identical, particularly where security solutions involving comparing answer signals from separate RFID tags within the same wagering token may be a heightened priority. As will be readily appreciated, any or all of the foregoing arrangements might be used to duplicate information on a plurality of RFID tags within a single wagering token, particularly where increased "visibility" and reliability with respect to detecting and reading are desired.

Figure 13G:
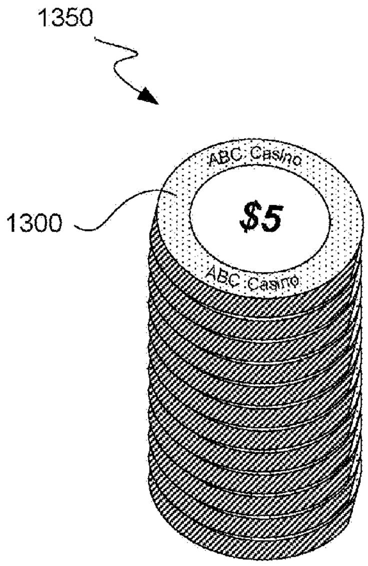
FIG. 13G illustrates an example embodiment of a stack of intelligent wagering tokens.
Figure 13H:
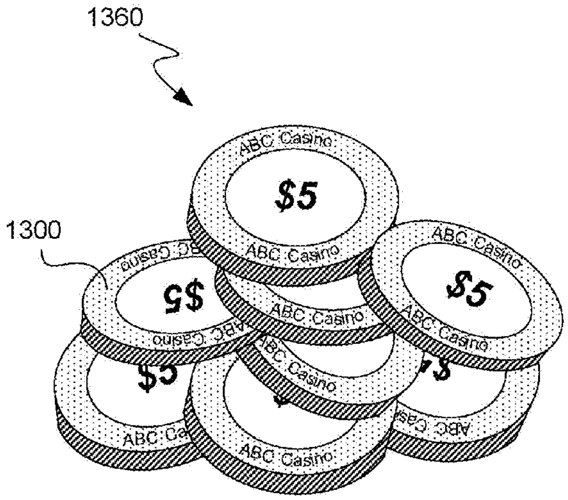
FIG. 13H illustrates an example embodiment of a random unorganized collection of intelligent wagering tokens.

FIG. 13G illustrates in top perspective view a stack 1350 of the exemplary wagering tokens 1300 of FIG. 13B, while FIG. 13H illustrates in top perspective view a random unorganized collection 1360 of the exemplary wagering tokens 1300 of FIG. 13B according to various embodiments. As noted above, the actual configurations of RFID tags within each of the chips in FIGS. 13G and 13H may be any of the exemplary configurations shown above, as well as any other suitable configuration of RFID tags that might be used in such wagering tokens. As is generally known, systems using wagering tokens having singular RFID tags that communicate in simple RF form tend to have problems reading all chips accurately once such RFID wagering tokens are stacked at about the level of the chip stack 1350 in FIG. 13G, or higher. Multiple signals and particularly interference amongst such signals from all chips at once can be difficult to read. This is especially true where the single RFID tag within each wagering token is generally located in the same place, and where there tends to be only one RFID reader associated with each wagering token placement location at a gaming table or other associated gaming venue. As is also generally known, similar detection and reading problems can occur when the number of randomly placed or disorganized wagering tokens is the same as or higher than that which is shown in the chip pile 1360 of FIG. 13H.

Unlike that which is known in the art, however, the present systems and methods include the use of RFID wagering tokens that are more "visible" to the various reading devices in the system. As noted above, there are multiple RFID tags located at each wagering token. In addition, a time delay component can be incorporated into some or all of the RFID tags within the wagering tokens of the system, such that staggered answer responses occur from the various affected wagering tokens in response to an interrogation signal from an RFID transponder at the gaming table or other venue configured or designed to track RFID wagering tokens. These features alone help to increase the detectability and readability of RFID wagering tokens in the current system such that all of the wagering tokens in the stack 1350 of FIG. 13G and the jumbled pile 1360 of FIG. 13H can be detected and read without undue problems or errors. An additional feature that can also aid in detecting and reading various system wagering tokens is the use of a more comprehensive gaming table or other RFID wagering token reading venue.

Figure 13I:
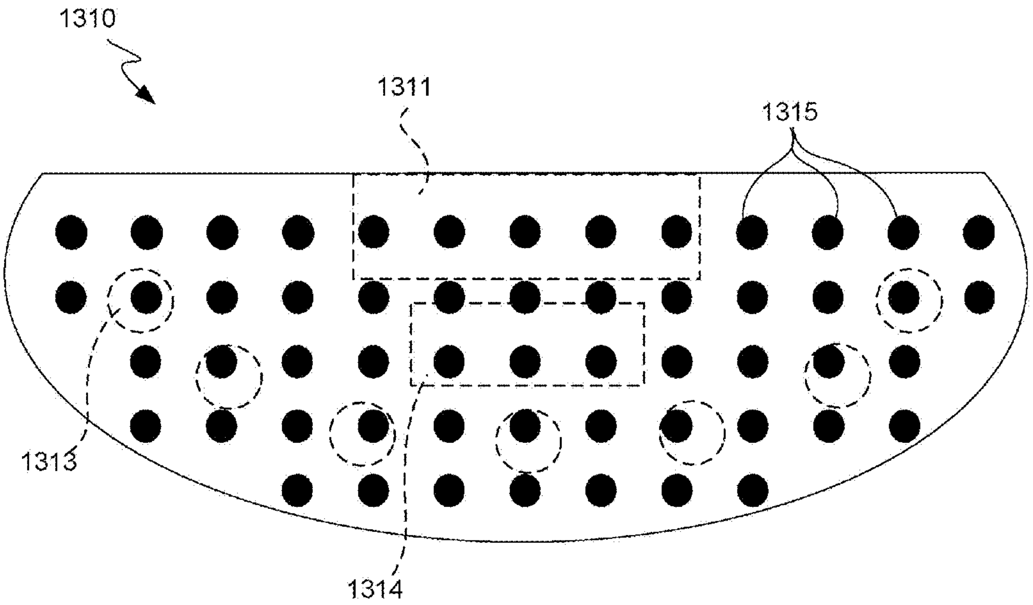
FIG. 13I illustrates in bottom plan view of an example embodiment of an intelligent wagering token reading/tracking system which may be implemented at one or more gaming tables.

Turning next to FIG. 13I, an exemplary arrangement of RFID reading devices at the gaming table of FIG. 13A according to one embodiment is illustrated in bottom plan view. As noted above, it may be preferable that gaming table 1310 generally appear to patrons to be like any other ordinary gaming table. To this end, the various RFID detection devices 1315 located at the table can be placed beneath the upper surface of the table, so as not to be obtrusive. Such RFID detection devices can include transponders, readers, antennae or any combination thereof, as may be suitable to assist in the reading of RFID wagering tokens at the table. As shown, such reading devices 1315 can be placed under the chip tray 1311, under each of the bet placement areas 1313, and under the cash for chips exchange area 1314. Of course, additional RFID reading devices may also be provided, and it may be preferable that enough devices be provided so that the detection and reading of various amounts and formations of wagering tokens on the gaming table surface can be accomplished with relative ease and reliability.

In a preferred embodiment, a grid of RFID detection devices 1315 is distributed about or beneath gaming table 1310, so as to better detect and read the various RFID tags included within the wagering tokens on the surface of the table. Of course, such a grid-like distribution results in there being more RFID reading devices at the gaming table than there are designated chip placement areas on the surface of the table. The inclusion of such a grid or array of RFID reading devices also means that wagering tokens outside the designated chip placement areas may also be read. For example, chips placed directly in front of a player could be read by the various RFID reading devices 1315 distributed at gaming table 1310. As shown in FIG. 13A, wagering token 1309 could be read by the reading devices at gaming table 1310, while such a wagering token at this location would not typically be read at a gaming table known in the art.

In this manner, preferably all wagering tokens present at the surface of the gaming table at any given time can be detected and read by the RFID devices and system at the gaming table. Such an ability greatly increases the options that are available to a gaming establishment with respect to the detection and tracking of wagering tokens, particularly at a gaming table or other suitably trackable gaming venue. Again, this may also include poker tables, craps tables, roulette tables, sports books, cashier cages, casino back room vaults and many other locations within a casino.

In addition to the largely stationary nature of the reading devices shown in the foregoing embodiments, it is also specifically contemplated that other forms of RFID reading and tracking devices could be used in conjunction with the various inventive systems and methods disclosed herein. For example, a hand-held wand or other suitable RFID reading device could be used to scan RFID wagering tokens, particularly as such wagering tokens move from place to place throughout the casino. In particular, wagering tokens being moved to or from a back vault, cashier cage, chip tray or other secure location could be scanned and read en masse through the use of such a hand-held wand or other device. Where multiple trays or racks of RFID wagering tokens are to be read at once, even greater systems can be employed as may be desired. For example, a large cart sized region full of high powered RFID transponders may be placed in a designated area at a vault or cashier cage, such that racks, trays or carts full of chips might be read in a relatively short span of time. Other adaptations may also be used in this regard, as will be readily appreciated.

Figure 14A:
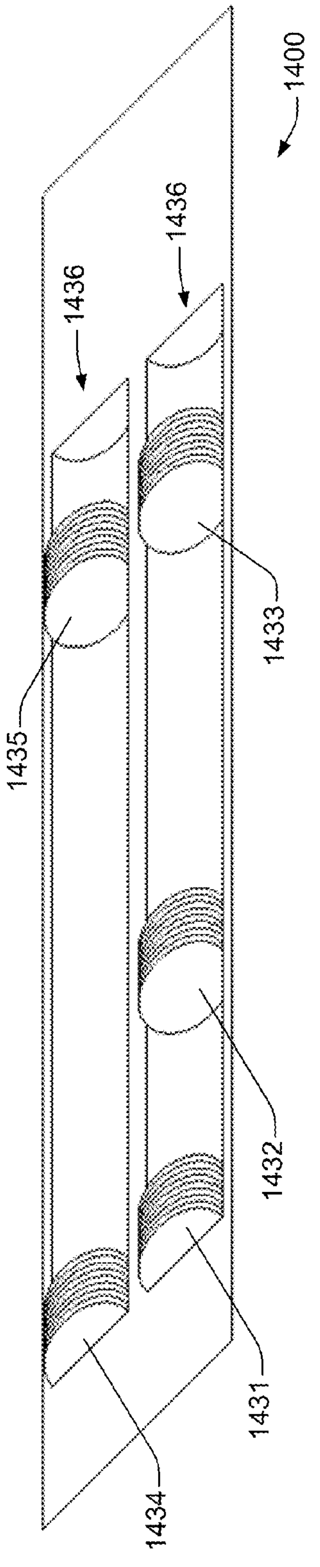
FIGS. 14A-B illustrate different perspective views of an example embodiment of a casino chip tray recharging station.

FIG. 14A illustrates an example embodiment of a casino chip tray recharging station in accordance with a specific embodiment. As illustrated in the example embodiment of FIG. 14A, chip tray 1400 may be configured or designed to hold various types of wagering tokens, including intelligent wagering tokens, which, for example, may be arranged into different groups or groupings such as, for example, groupings 1431, 1432, 1433, 1434, 1435 as illustrated in the example of FIG. 14A. As illustrated in the example embodiment of FIG. 14A, casino chip tray recharging station may include one or more slots or troughs (e.g., 1436) for receiving and/or holding multiple wagering tokens.

The example embodiment of FIG. 14A illustrates a perspective view of a top portion casino chip tray recharging station 1400. According to some embodiments, the casino chip tray recharging station 1400 may be configured or designed to be a self-contained, portable unit. In other embodiments, the casino chip tray recharging station may be configured or designed to be installed onto or into a tabletop such as, for example, a casino gaming table.

In at least one embodiment, the casino chip tray recharging station may be configured or designed to include appropriate software and/or hardware for enabling the casino chip tray recharging station to function as a portable tracking device reader. For example, in one embodiment, the casino chip tray recharging station may include an RFID reader or other suitable hardware and/or software components which enable the casino chip tray recharging station to wirelessly communicate with one or more intelligent wagering tokens.

In at least one embodiment, the casino chip tray recharging station 1400 may be manufactured of plastic and/or other suitable materials which will not interfere with the unit's ability to communicate with one or more intelligent wagering tokens and/or which will not interfere with the unit's ability to perform power recharging operations of portable power sources associated with one or more portable devices (such as, for example, the internal rechargeable batteries of one or more intelligent wagering tokens).

Figure 14B:
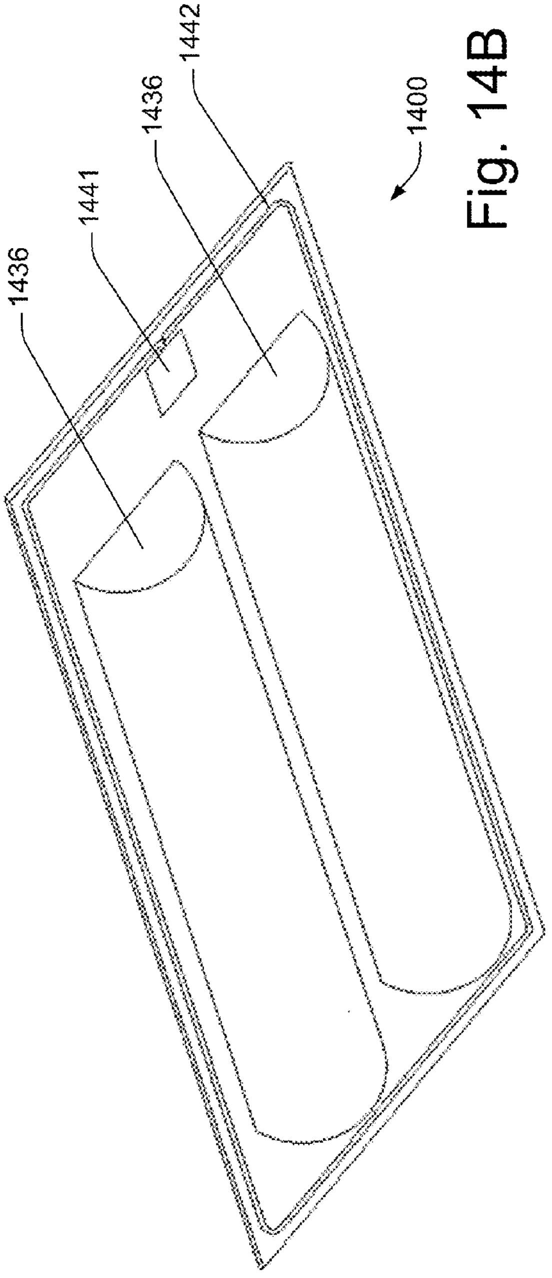

FIG. 14B illustrates a perspective view of a bottom portion casino chip tray recharging station 1400. In at least one embodiment, an recharging circuitry 1441 may be operatively coupled to one or more antenna(s) (e.g., 1442) which, for example, may be used to wirelessly and simultaneously recharge multiple portable power sources associated with multiple different intelligent wagering tokens which have been placed in the tray. For example, in one embodiment, the recharging circuitry 1441 may be operatively coupled to and SLF or ULF (Super Low Frequency 30 Hz to 300 Hz or Ultra Low Frequency 0.3 kHz to 3 kHz) magnetic energy transmit antenna which, for example, may be used to wirelessly and simultaneously recharge multiple portable power sources associated with multiple different intelligent wagering tokens (and/or other suitable devices) via magnetic coupling. In at least one embodiment, recharging circuitry 1441 may also provides magnetic energy to operate an RFID casino chip shuttle reader such as that described, for example, with respect to FIG. 14D.

Figure 14C:
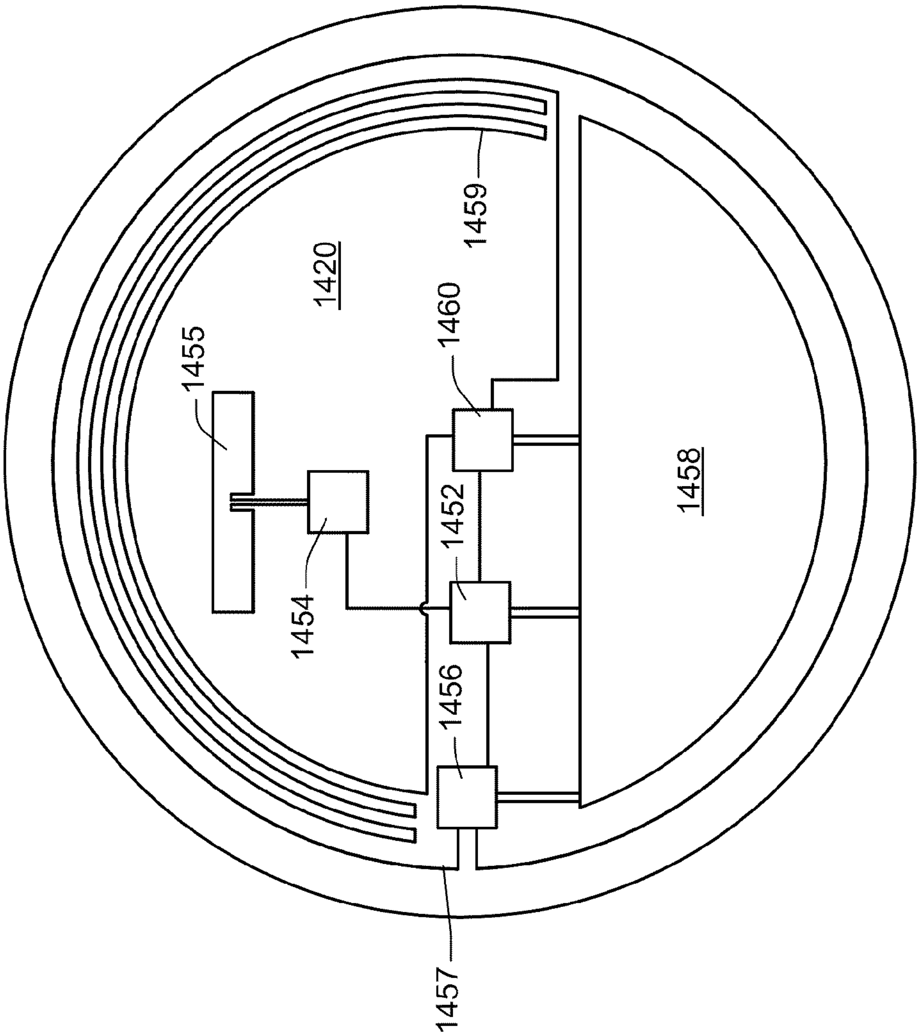
FIG. 14C shows a block diagram of an example embodiment of a casino chip shuttle reader 1450.

FIG. 14C shows a block diagram of an example embodiment of a casino chip shuttle reader 1450.

Referring to FIG. 14C, the shuttle reader 1450 may include one or more of the following (or combinations thereof):

- At least one microprocessor (e.g., 1452). In at least one embodiment, microprocessor 1452 may include memory such as, for example, RAM, Flash memory, EEPROMs, ROM, and/or other types of non-volatile memory. In some embodiments the shuttle reader may also include one or more memory modules external to the microprocessor.
- Relative High Frequency Transceiver 1454. In at least one embodiment, Relative High Frequency Transceiver 1454 may be operable to wirelessly transmit and/or receive data to/from external devices using Relative High Frequency signals such as, for example, UHF (Ultra High Frequency) band signals and/or SHF (Super High Frequency) band signals. In at least one embodiment, UHF band signals may include electromagnetic signals within the frequency range of about 0.3 GHz to 3 GHz. In at least one embodiment, SHF band signals may include electromagnetic signals within the frequency range of about 3 GHz to 30 GHz.
- Relative Low Frequency Transceiver 1456. In at least one embodiment, Relative Low Frequency Transceiver 1456 may be operable to wirelessly transmit and/or receive data to/from external devices using Relative Low Frequency band signals such as, for example, LF (Low Frequency) band signals and/or HF (High Frequency) band signals. In at least one embodiment, LF band signals may include electromagnetic signals within the frequency range of about 30 kHz to 300 kHz. In at least one embodiment, HF band signals may include electromagnetic signals within the frequency range of about 3 MHz to 30 MHz.
- Voltage regulator/power distribution circuitry 1460.
- Patch antenna 1455. In at least one embodiment, the patch antenna may be used to receive and/or transmit Relative High Frequency band signals.
- EH antenna (e.g., wire loop 1457). In at least one embodiment, the EH antenna may be used to receive and/or transmit Relative Low Frequency band signals.
- Portable power storage device 1458.
- Magnetic energy pickup antenna 1459. In at least one embodiment, magnetic energy pickup antenna 1459 may be configured or designed in a manner which optimizes reception of SLF (Super Low Frequency) band and/or ULF (Ultra Low Frequency) band signals, and/or other signal frequencies which may be used for magnetic induction. In at least one embodiment, SLF band signals may include electromagnetic signals within the frequency range of about 30 Hz to 300 Hz. In at least one embodiment, ULF band signals may include electromagnetic signals within the frequency range of about 0.3 kHz to 3 kHz.
- Etc.

As shown in the example embodiment of FIG. 14C, microprocessor 1452 may be operatively coupled (e.g., via interconnect wiring) to control internal battery charging circuitry 1460. Microprocessor 1452 may also be operatively coupled (e.g., via interconnect wiring) to control the Relative High Frequency Transceiver 1454. Microprocessor 1452 may also be operatively coupled (e.g., via interconnect wiring) to control the Relative Low Frequency Transceiver 1456 (and associated EH antenna 1457).

In at least one embodiment, shuttle reader 1450 may include one or more power distribution components which are operable to: receive power provided by an external power source; perform voltage and/or current regulation; distribute power to one or more internal components of the shuttle reader.

For example, in one implementation, shuttle reader 1450 may be configured or designed to be able to operate using power provided by an external power source (if desired). In some embodiments, shuttle reader 1450 may be configured or designed to utilize power obtained from an internal or local power source (e.g., 1458). Additionally, in at least one embodiment, shuttle reader 1450 may be configured or designed to enable the portable power source (e.g., 1458) to be recharged using power provided by an external power source. For example, in one embodiment, shuttle reader 1450 may include power supply recharging circuitry, and may be configured or designed to enable the portable power source (e.g., 1458) to be recharged (e.g., using power supply recharging circuitry and magnetic energy pickup antenna 1459) from an external power source using magnetic induction.

In at least one embodiment, shuttle reader 1450 may be operable as a "multi-band frequency" transceiver device, which is able to transmit and receive signals across different frequency bands of the electromagnetic spectrum.

For example, in at least one embodiment, shuttle reader 1450 may be operable to transmit/receive signals of the Relative Low Frequency band which, for example, may include electromagnetic signals within the frequency ranges of about 30 kHz to 300 kHz, 300 kHz to 3 MHz, and/or 3 MHz to 30 MHz.

Additionally, in at least one embodiment, shuttle reader 1450 may also be operable to transmit/receive signals of the Relative High Frequency band which, for example, may include electromagnetic signals within the frequency range of about 0.3 GHz to 30 GHz.

In at least one embodiment, shuttle reader 1450 may also be operable to concurrently transmit and/or receive signals in both the Relative High Frequency band and Relative Low Frequency band.

Figure 14D:
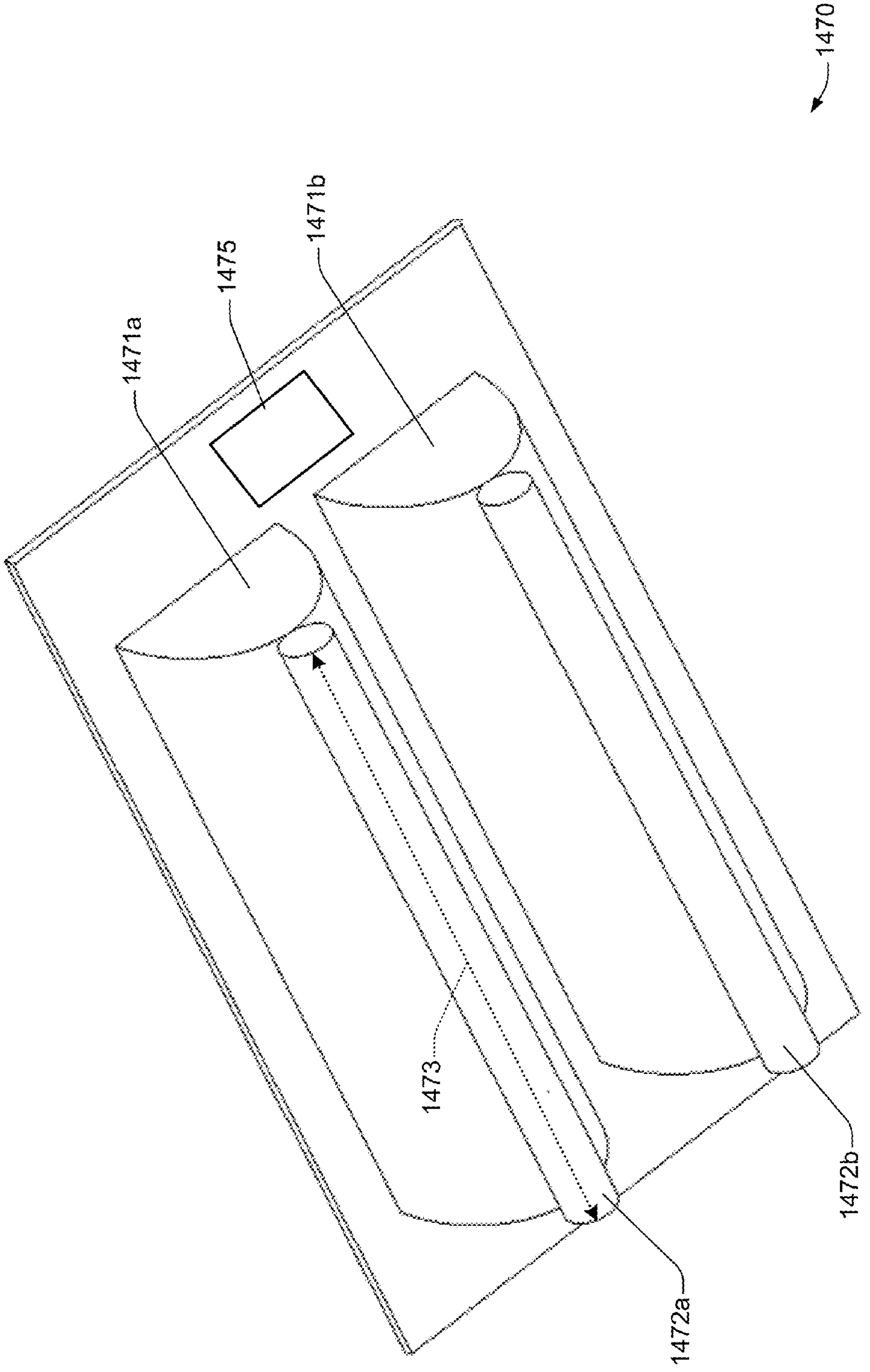
FIG. 14D illustrates a perspective view of a bottom portion of an embodiment of casino chip tray 1470.

FIG. 14D illustrates a perspective view of a bottom portion of an embodiment of casino chip tray 1470. As illustrated in the example embodiment of FIG. 14D, casino chip tray 1470 may include one or more transport members or structures (e.g., 1472*a*, 1472*b*) which have been configured or designed for use in facilitating transport of one or more shuttle reader(s) such as, for example, the shuttle reader 1450 of FIG. 14C.

In at least one embodiment, each slot or trough (e.g., 1471*a*, 1471*b*) of the chip tray (which, for example, is used for receiving and/or holding multiple wagering tokens) may have a respective transport member (e.g., 1472*a*, 1472*b*) coupled thereto. Additionally, in at least one embodiment, each transport member may have associated their with a respective shuttle reader.

In one embodiment, transport members 1472*a*, 1472*b* may be each be configured or designed to include a support structure having an elongated passage (e.g., 1473) which is sized and dimensioned to receive a shuttle reader, and to facilitate transport of the shuttle reader to different desired positions of the elongated passage.

In one embodiment, transport member 1472*a* may be configured or designed as a tube-shaped structure having an elongated interior passage that is sized and dimensioned to receive shuttle reader 1450 of FIG. 14C. In at least one embodiment, the shuttle reader is able to slide back and forth along the elongated passage (e.g., 1473) of the transport member (e.g., 1472*a*) and communicate with the wagering tokens which are located in the corresponding tray slot (e.g., 1471*a*). In one embodiment, shuttle reader may perform wireless communication with the intelligent wagering tokens in the chip tray via a wireless transceiver such as, for example, Relative Low Frequency Transceiver 1456.

In at least one embodiment, chip tray 1470 may be configured or designed as an intelligent chip tray which includes appropriate hardware and/or software components (e.g., 1475) for controlling various movement(s) and/or operation(s) of the shuttle reader.

In at least one embodiment, as the shuttle reader traverses its path along the elongated passage (e.g., from one end to the other end), it will pass under each of the wagering tokens which are located in the corresponding slot of the chip tray. According to one embodiment, as the shuttle reader traverses its path and passes beneath a given intelligent wagering token located in the chip tray, the shuttle reader may be configured or designed to communicate with that token and/or to receive or acquire data from the token (such as, for example, data stored within the token memory). In one embodiment, the acquired data may be stored (e.g., at least temporarily) at the memory of the shuttle reader. In at least one embodiment, the shuttle reader may be configured or designed to communicate with wagering tokens in a sequential or serial manner. For example, in one embodiment, the reading range (or wagering token communication range) of the shuttle reader, and the movements of the shuttle reader may be coordinated such that, as the shuttle reader passes under or beneath each wagering token located in the chip tray, the shuttle reader engages in communication with that specific token.

In other embodiments, the shuttle reader may be configured or designed to simultaneously or concurrently communicate with a plurality of different wagering tokens. For example, in one embodiment, the reading range (or wagering token communication range) of the shuttle reader, and the movements of the shuttle reader may be coordinated such that, as the shuttle reader traverses its path, the shuttle reader concurrently engages in communication with a selected plurality of wagering tokens located in the chip tray.

In at least one embodiment, a casino chip tray may be configured or designed to include a shuttle reader system which, for example, may include a first transport member (e.g., which is coupled to a specific trough of the chip tray), a shuttle reader (e.g., movably secured to the transport member), and a shuttle transport mechanism (e.g., configured or designed to move the shuttle reader to different physical locations along the elongated passage). In one embodiment, the shuttle reader system may be configured or designed to cause the shuttle reader to traverse the length of the elongated passage (or portions thereof) a specified number of times during one or more specified time intervals.

For example, in one embodiment, the shuttle reader system may be configured or designed to cause the shuttle reader to perform a single traverse of the entire length of the chip tray trough about every 2 seconds. In another embodiment, the shuttle reader system may be configured or designed to cause the shuttle reader to perform multiple traverses (e.g., a double traverse) of the entire length of the chip tray trough about every N seconds (e.g., N=5).

In at least one embodiment, the shuttle reader may be configured or designed to periodically transmit (e.g., at periodic intervals, in real time, upon demand, etc.) selected information (such as, for example, information relating to and/or acquired from one or more wagering tokens) to one or more external devices/systems, such as, for example, a table controller, a data collection unit, a device of the casino tracking system, etc. For example, in one embodiment, each time the shuttle reader completes a traversal operation (such as, for example, when the shuttle reader reaches one of the ends of the chip tray trough), the shuttle reader may transmit selected information to one or more external devices/systems. In one embodiment, the shuttle reader may be configured or designed to transmit data to the one or more external devices/systems using a wireless transceiver such as, for example, Relative High Frequency Transceiver 1454 (and associated patch antenna 1455).

Additionally, in at least some embodiments, shuttle reader may be configured or designed to provide wireless power (e.g., via magnetic induction) to one or more intelligent wagering tokens to thereby enable the intelligent wagering tokens to recharge their internal rechargeable batteries.

According to different embodiments, different types of transport mechanisms may be used to physically move the shuttle reader to different physical locations (e.g., along the elongated passage). Example of such transport mechanisms may include, but are not limited to, one or more of the following (or combinations thereof):

- mechanical type movement mechanisms (e.g., stepper motors, gears, levers, etc.);
- pressure type movement mechanisms (e.g., where movement of the shuttle reader is effected via the use of air pressure and/or differentials in air pressures);
- etc.

As illustrated in the example embodiment of FIG. 14D, transport member 1472*a* may be physically coupled to a side (e.g., underside, bottom, etc.) of slot or trough 1471*a*; or may be integrated with slot 1471*a*.

According to various embodiments, one or more different mechanisms may be used to secure the shuttle reader(s) to transport members 1472*a*, 1472*b*, and/or to move the shuttle reader(s) back-forth along their respective transport members 1472*a*, 1472*b*. For example, in at least one embodiment, the diameter or width of the tube-shaped transport member 1472*a* may be large enough for the shuttle to slide back and forth within the tube passage or cavity. In at least one embodiment, the movement of the shuttle back-and-forth within the tube passage may be achieved via the use of air pressure, such as, for example, by creating a relatively higher air pressure condition on one end of the tube (as compared with the other end of the tube) during a first time interval to thereby cause the shuttle reader to move in one direction; and then creating a relatively higher air pressure condition on the other end of the tube during a second time interval to thereby cause the shuttle reader to move in the opposite direction. In this way, for example, different relative pressure conditions may be created at each end of the transport members during different time intervals to thereby cause the shuttle reader(s) to move back-and-forth within the transport member passage.

Figure 15A:
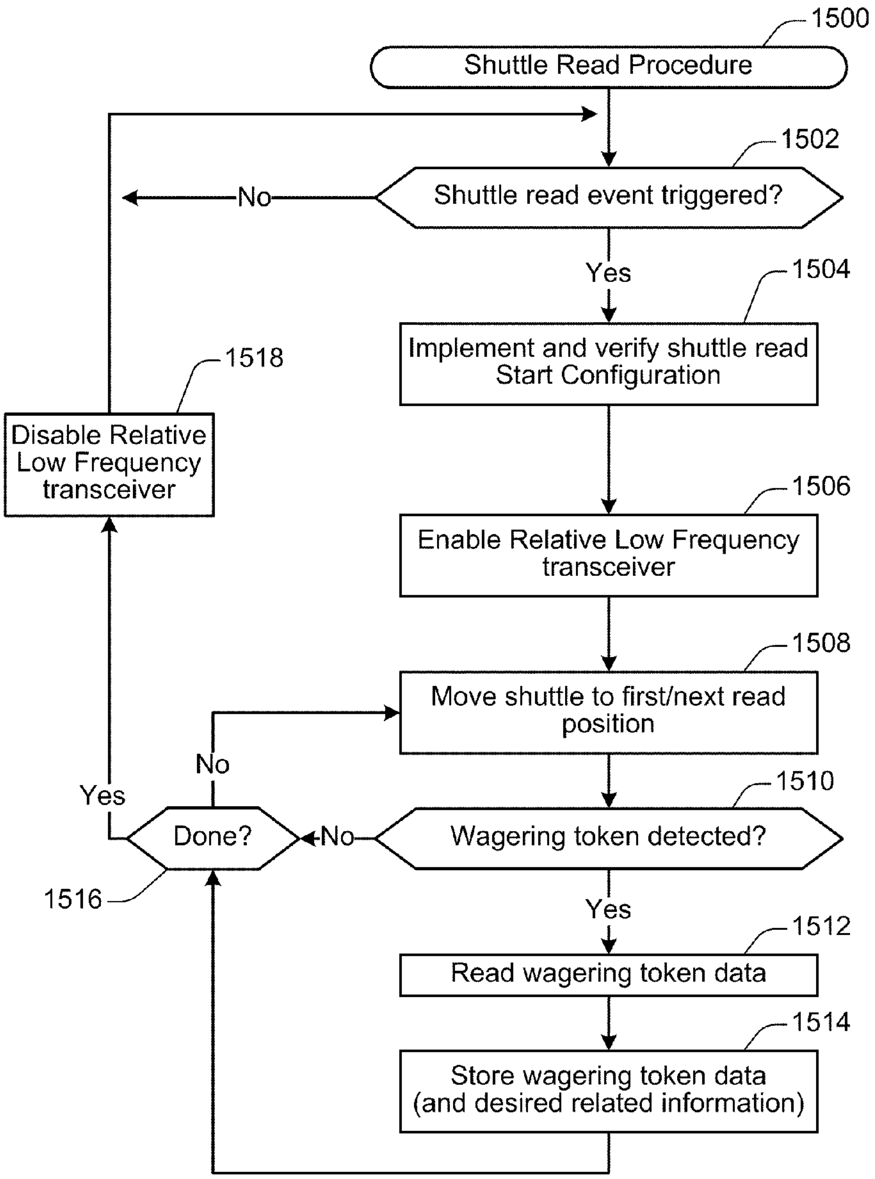
FIG. 15A shows an example embodiment of a Shuttle Read Procedure 1500 in accordance with a specific embodiment.

FIG. 15A shows an example embodiment of a Shuttle Read Procedure 1500 in accordance with a specific embodiment. In at least one embodiment, the Shuttle Read Procedure 1500 may be utilized in conjunction with a shuttle device such as, for example, casino chip shuttle device 1450 of FIG. 14C. In at least one embodiment, at least a portion of the Shuttle Read Procedure 1500 may be initiated and/or implemented by one or more systems, devices, and/or controllers such as, for example, a master controller of a gaming table. In some embodiments, at least a portion of the Shuttle Read Procedure 1500 may be initiated and/or implemented by an intelligent casino chip tray which has been configured or designed to include appropriate hardware (e.g., processor(s), memory, interface(s), etc.) and/or software for implementing and/or initiating aspects of the Shuttle Read Procedure.

For purposes of illustration, a specific embodiment of the Shuttle Read Procedure will be described by way of example with respect to FIG. 15A. In this particular example, it is assumed that the Shuttle Read Procedure 1500 is implemented at an intelligent casino chip tray system which includes a chip tray, a shuttle device, and appropriate hardware and/or software components for controlling the movement(s) and/or operation(s) of the shuttle device.

At 1502, a "shuttle read" operation may be triggered when an event or condition is detected which satisfies minimum threshold criteria for triggering a shuttle read operation. According to different embodiments, examples of different types of events and/or conditions which may trigger a shuttle read operation may include, but are not limited to, one or more of the following (or combinations thereof):

- Detection of appropriate locally generated signal(s). For example, in one embodiment, a local timer at the shuttle device may be configured or designed to periodically generate one or more "shuttle read" signals which are suitable for triggering one or more shuttle read operations.
- Detection of appropriate externally generated signal(s). For example, in one embodiment, a timer at the intelligent casino chip tray system may be configured or designed to periodically generate one or more "shuttle read" signals which are suitable for triggering one or more shuttle read operations. In some embodiments, one or more external controllers (such as, for example, a master table controller, intelligent chip tray controller, etc.) may automatically generate one or more "shuttle read" signals or commands which are suitable for triggering one or more shuttle read operations.

For example, according to different embodiments, one or more devices of the casino gaming network may be operable to monitor various types of events and/or conditions at the casino establishment, and may be operable to generate one or more "shuttle read" signals (e.g., in response to detection of appropriate event(s)/condition(s) which meet the minimum threshold criteria for triggering a shuttle read operation) for triggering one or more shuttle read operations at a given intelligent casino chip tray system. According to different embodiments, examples of other types of events and/or conditions which may cause one or more external devices/components to generate appropriate signals for triggering a shuttle read operation may include, but are not limited to, one or more of the following (or combinations thereof):

- Gaming table opening event.
- Gaming table closing event.
- Shift change event (e.g., at the station where the intelligent casino chip tray system is located).
- Detection of a new player/patron within a given range of the station where the intelligent casino chip tray system is located.
- Detection of a player/patron leaving the vicinity of the station where the intelligent casino chip tray system is located.
- Identification of player/patron/employee.
- Detection of player//patron's player tracking card and/or other portable tracking device.
- Time related events (e.g., random intervals, periodic intervals, expired timer, etc.).
- Game state events (e.g., beginning of a new table game/round/hand; initial deal period start/end event(s); player card draw/decision period start/end event(s); subsequent wager period start/end event(s); rake period start/end event(s); payout period start/end event(s); etc.).
- Detection of a change of wagering token(s) at the intelligent casino chip tray.
- Physical location of wagering token(s) detected as satisfying predetermined criteria.
- Appropriate manual input detected (e.g., dealer pushes button).
- Detection of other appropriate input/signal(s) from human and/or device(s).
- Specified time constraints detected as being satisfied.
- Activity relating to use of a table marker.
- Player buy-in activity.
- Player cash-in activity.
- Chips-in activity.
- Markers-in activity.
- Player wagering activity
- Rim credit activity.
- Mark-up activity.
- Bonus bet activity.
- Player wagering activity.
- Etc.

In at least one embodiment, when an event or condition is detected which satisfies minimum threshold criteria for triggering a shuttle read operation, one or more appropriate actions may be initiated (1504) for implementing and/or verifying desired shuttle read start configuration parameters. According to specific embodiments, actions relating to implementation of the shuttle read start configuration may include, but are not limited to, one or more of the following (or combinations thereof):

- initializing one or more registers;
- clearing selected memory locations within the system memory;
- determining a starting position or location of the shuttle device;
- determining an ending position or location for the shuttle read operation;
- moving the shuttle device to a predetermined initial starting position or location;
- enabling and/or activating one or more transceivers for detecting and/or communicating with one or more wagering tokens;
- disabling and/or deactivating one or more other transceivers;
- etc.

For example, in one embodiment, before performing one or more specific read operations, the shuttle device may moved or positioned to a designated "home" position, which, for example, may correspond to a designated end of the casino chip tray. Additionally, in at least one embodiment, the shuttle device may initialize and/or configure an array of memory to store various types of information relating to the shuttle read operations.

At 1506 it is assumed that the Relative Low Frequency transceiver of the shuttle device is enabled. Additionally, in at least one embodiment, the system may also disable the Relative High Frequency transceiver (at least temporarily) if it is determined that the Relative High Frequency transceiver is enabled.

As shown at 1508, the shuttle device may be moved to a first (or next) read position for detecting the presence of (and/or engaging in communication with) a first wagering token in the chip tray. For example, in one embodiment, each trough of the chip tray may have associated therewith a plurality of different pre-designated positions, wherein each designated position of the chip tray trough may be suitable for accommodating a respective wagering token. In at least one embodiment, the layout or spacing of the pre-designated positions may be based, at least in part, on the physical dimensions (e.g., width, thickness, etc.) of the wagering tokens utilized by the casino establishment.

As shown at 1510, a determination may be made as to whether the presence of a wagering token is detected by the shuttle device at it's current position/location. For example, in one embodiment, the shuttle device may be operable to transmit an interrogation signal (and/or energizing signal) which is specifically configured to be detectable only by a token which is located directly above (or, in other embodiments, directly adjacent to) the shuttle device.

In at least one embodiment, if the presence of a wagering token not is detected by the shuttle device at its current position/location, the shuttle device may be moved (1508) to a next position/location along the chip tray for performing additional wagering token detection/read operations.

In at least one embodiment, when the presence of a wagering token is detected (1510) by the shuttle device, the shuttle device may initiate a read (1512) of selected data from the wagering token. Examples of the various types of data which may be read from the wagering token may include, but are not limited to, one or more of the following (or combinations thereof):

- wagering token ID;
- wagering token value/denomination;
- identify of current owner;
- time/date of activation;
- time/date of ownership transfer(s);
- data relating to history ownership transfers;
- promotional information;
- wagering token status (e.g., battery voltage, read/write cycles, etc.)
- encryption key or code information;
- alternate communication channels, frequencies, timeslots, etc.;
- serial number or token ID;
- security/tamper codes;
- tilt information;
- collision avoidance information (such as, for example, back-off values, alternate communication channels, frequencies, timeslots, etc.);
- timestamp information;
- information relating to identities of previous owners of the token;
- information relating to devices (e.g., RFID readers, etc.) which have communicated with the token;
- information relating to signal strength criteria associated with one or more signals or readers detected by the token;
- authentication information;
- information relevant to a gaming property (e.g., casino name or identifying number);
- historical information relating to use of the token;
- other information disclosed herein;
- etc.

Additionally, in at least one embodiment, the shuttle device may perform additional communications (and/or additional operations) with the detected wagering token such as, for example, one or more of the following (or combinations thereof):

- writing specific data to the memory of wagering token,
- instructing the wagering token to perform one or more specific operations,
- performing wireless recharging of the wagering token's internal battery,
- etc.

As shown at 1514, data acquired during the wagering token read operation (and/or other related information associated with the wagering token read operation) may be stored in memory. For example, in one embodiment, the acquired data and related information may be stored within local memory of the shuttle device. In one embodiment, data read or acquired from the wagering token may be stored in a memory array of the shuttle device microprocessor. Additionally, in some embodiments, other information relating to the wagering token read operation may also be stored in the memory array and/or associated with the data read or acquired from the token. Examples of such related information may include, for example, one or more of the following (or combinations thereof):

- timestamp information,
- shuttle device position/location information,
- wagering token position/location information,
- other types of information disclosed herein,
- etc.

As shown at 1516, a determination may be made as to whether or not the shuttle device should perform additional wagering token detection/read operations. In at least one embodiment, if it is determined that the shuttle device should perform additional wagering token detection/read operations, the shuttle device may be moved (1508) to a next position/location along the chip tray for performing additional wagering token detection/read operations. Alternatively, if it is determined that the shuttle device should not perform additional wagering token detection/read operations, the wagering token communication transceiver (e.g., Relative Low Frequency transceiver) of the shuttle device may be disabled (1518). Thereafter, in at least one embodiment, the Shuttle Read Procedure may await the next condition or event which satisfies minimum threshold criteria for triggering a shuttle read operation.

According to different embodiments, various factors or criteria may be used in determining whether or not the shuttle device should perform additional wagering token detection/read operations at block 1516. Examples of such factors/criteria may include, but are not limited to, one or more of the following (or combinations thereof):

- Current position/location of the shuttle device. For example, does the current position of shuttle device correspond to the designated ending position/location for the shuttle read operations?
- Failure/Success in detecting additional wagering tokens. In one embodiment, before proceeding with the wagering token read operations, the shuttle device may perform an initial scan of the chip tray to determine, for example, the relative locations and/or densities of the wagering tokens which are located in the chip tray (e.g., in order to facilitate determination of the starting and/or ending positions of the Shuttle Read Procedure operations).

Timeout event/condition detected?

Error event/condition detected?

Etc.

Figure 15B:
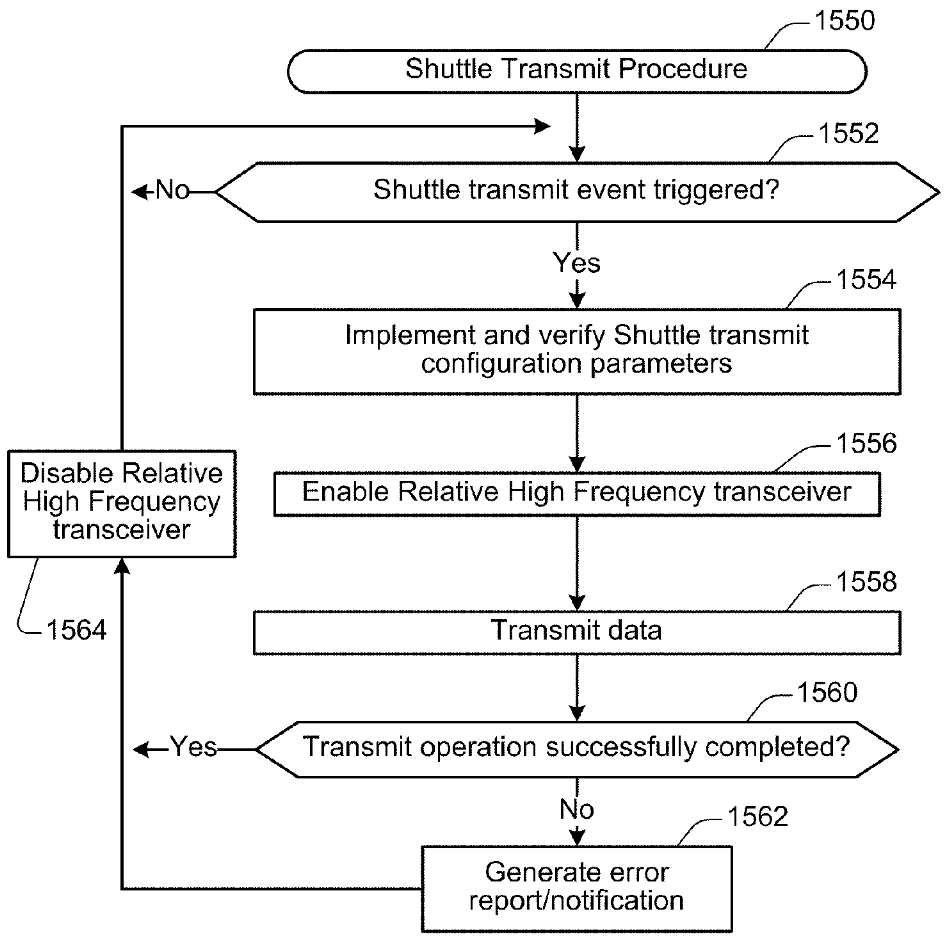
FIG. 15B shows an example embodiment of a Shuttle Transmit Procedure 1550 in accordance with a specific embodiment.

FIG. 15B shows an example embodiment of a Shuttle Transmit Procedure 1550 in accordance with a specific embodiment. In at least one embodiment, the Shuttle Transmit Procedure 1550 may be utilized in conjunction with a shuttle device such as, for example, casino chip shuttle device 1450 of FIG. 14C. In at least one embodiment, at least a portion of the Shuttle Transmit Procedure 1550 may be initiated and/or implemented by one or more systems, devices, and/or controllers such as, for example, a master controller of a gaming table. In some embodiments, at least a portion of the Shuttle Transmit Procedure 1550 may be initiated and/or implemented by an intelligent casino chip tray which has been configured or designed to include appropriate hardware (e.g., processor(s), memory, interface(s), etc.) and/or software for implementing and/or initiating aspects of the Shuttle Transmit Procedure.

For purposes of illustration, a specific embodiment of the Shuttle Transmit Procedure will be described by way of example with respect to FIG. 15B. In this particular example, it is assumed that the Shuttle Transmit Procedure 1550 is implemented at an intelligent casino chip tray system which includes a chip tray, a shuttle device, and appropriate hardware and/or software components for controlling the movement(s) and/or operation(s) of the shuttle device.

At 1552, a "shuttle transmit" operation may be triggered when an event or condition is detected which satisfies minimum threshold criteria for triggering a shuttle transmit operation. According to different embodiments, examples of different types of events and/or conditions which trigger a shuttle transmit operation may include, but are not limited to, one or more of the following (or combinations thereof):

Detection of appropriate locally generated signal(s). For example, in one embodiment, a local timer at the shuttle device may be configured or designed to periodically generate one or more "shuttle transmit" signals which are suitable for triggering one or more shuttle transmit operations. In some embodiments, the shuttle device may be configured or designed to transmit selected information to one or more external devices/systems after completion of one or more "shuttle read" operation(s).

Detection of appropriate externally generated signal(s). For example, in one embodiment, a timer at the intelligent casino chip tray system may be configured or designed to periodically generate one or more "shuttle transmit" signals which are suitable for triggering one or more shuttle transmit operations. In some embodiments, one or more external controllers (such as, for example, a master table controller, intelligent chip tray controller, etc.) may automatically generate one or more "shuttle transmit" signals or commands which are suitable for triggering one or more shuttle transmit operations.

For example, according to different embodiments, one or more devices of the casino gaming network may be operable to monitor various types of events and/or conditions at the casino establishment, and may be operable to generate one or more "shuttle transmit" signals (e.g., in response to detection of appropriate event(s)/condition(s) which meet the minimum threshold criteria for triggering a shuttle transmit operation) for triggering one or more shuttle transmit operations at a given intelligent casino chip tray system. According to different embodiments, examples of other types of events and/or conditions which may cause one or more external devices/components to generate appropriate signals for triggering a shuttle transmit operation may include, but are not limited to, one or more of the following (or combinations thereof):

Completion of one or more "shuttle read" operation(s).

New information/data acquired (e.g., during one or more "shuttle read" operation(s)).

Gaming table opening/closing event(s).

Shift change event (e.g., at the station where the intelligent casino chip tray system is located).

Identification of player/patron/employee.

Time related events (e.g., random intervals, periodic intervals, expired timer, etc.).

Game state events (e.g., beginning of a new table game/round/hand; initial deal period start/end event(s); player card draw/decision period start/end event(s); subsequent wager period start/end event(s); rake period start/end event(s); payout period start/end event(s); etc.).

Detection of a change of wagering token(s) at the intelligent casino chip tray.

Physical location of shuttle device detected as satisfying predetermined criteria.

Appropriate manual input detected (e.g., dealer pushes button).

Detection of other appropriate input/signal(s) from human and/or device(s).

Specified time constraints detected as being satisfied.

Etc.

In at least one embodiment, when an event or condition is detected which satisfies minimum threshold criteria for triggering a shuttle transmit operation, one or more appropriate actions may be initiated (1554) for implementing and/or verifying desired shuttle transmit start configuration parameters. According to specific embodiments, actions relating to implementation of the shuttle transmit start configuration may include, but are not limited to, one or more of the following (or combinations thereof):

accessing selected memory locations within the system memory;

determining current position or location of the shuttle device;

moving the shuttle device to a predetermined initial starting position or location;

enabling and/or activating one or more transceivers for detecting and/or communicating with one or more wagering tokens;

disabling and/or deactivating one or more other transceivers;

etc.

At 1556 it is assumed that the Relative High Frequency transceiver of the shuttle device is enabled. Additionally, in at least one embodiment, the system may also disable the Relative Low Frequency transceiver (at least temporarily) if it is determined that the Relative Low Frequency transceiver is enabled.

As shown at 1558, the shuttle may transmit selected information to one or more external devices, components, systems. Examples of different external devices, components, and/or systems may include, but are not limited to, one or more of the following (or combinations thereof):

gaming machine controllers;

gaming table controllers;

data collection units;

casino tracking systems;

intelligent casino chip tray systems;

- wireless devices (such as, for example, smart cards, portable security devices, etc.);
- and/or other desired devices/components/systems of the casino gaming network.

Examples of the various types of information which may be transmitted from the shuttle device may include, but are not limited to, one or more of the following (or combinations thereof):

- information relating to one or more shuttle read operations (such as, for example, number of shuttle read operations performed since last transmission, error information (if any), etc.)
- shuttle device ID;
- information relating to and/or acquired from one or more wagering tokens;
- total number of wagering tokens detected in chip tray;
- total monetary value of wagering tokens detected in chip tray;
- timestamp information;
- wagering token ID and associated position/location information;
- wagering token status information;
- encryption key or code information;
- alternate communication channels, frequencies, timeslots, etc.;
- security/tamper codes;
- security information;
- authentication information;
- information relevant to a gaming property (e.g., casino name or identifying number);
- other information disclosed herein;
- etc.

As shown at 1560, if it is detected that the shuttle transmit operation has not successfully completed, appropriate error response operations may be initiated (e.g., 1562) such as, for example, generating and/or transmitting an error notification message to one or more external devices/systems.

In at least one embodiment, if it is detected that the shuttle transmit operation has successfully completed, the Relative High Frequency transceiver of the shuttle device may be disabled (1564). Thereafter, in at least one embodiment, the Shuttle Transmit Procedure may await the next condition or event which satisfies minimum threshold criteria for triggering a shuttle transmit operation.

Figure 16A:
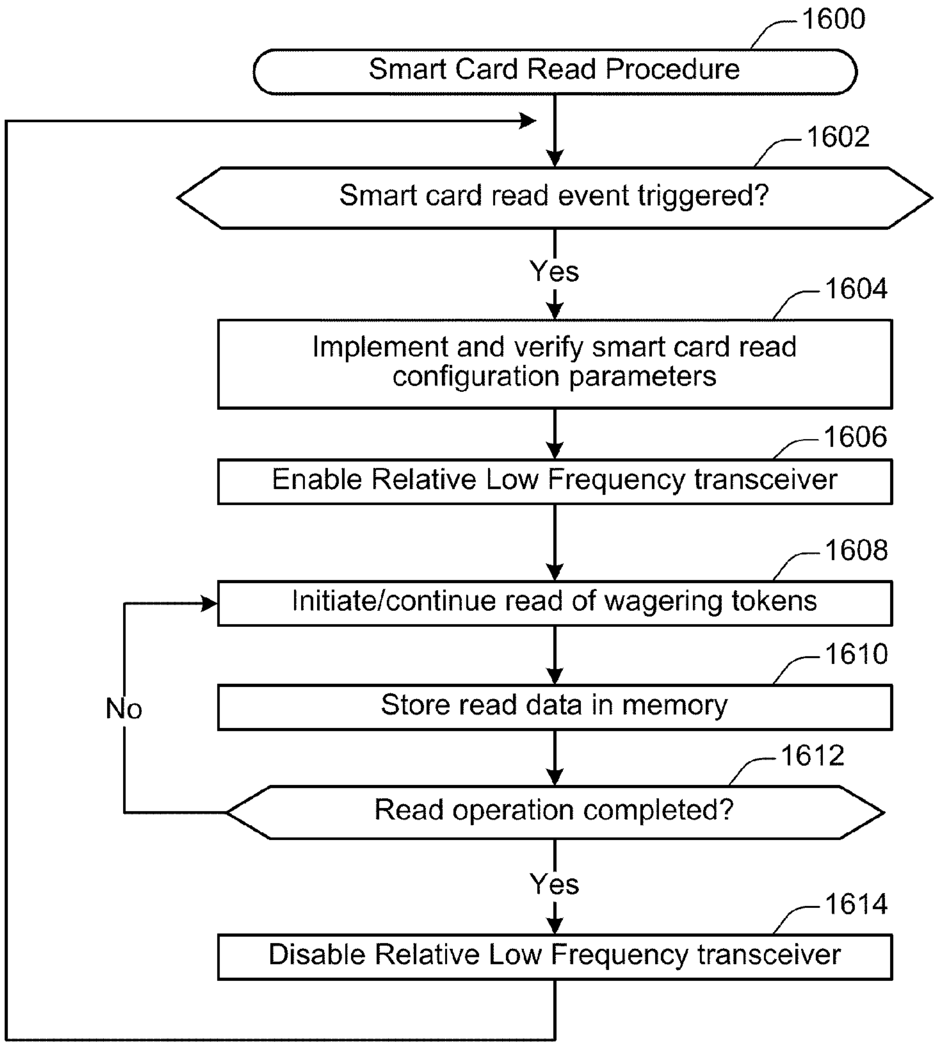
FIG. 16A shows an example embodiment of a Smart Card Read Procedure 1600 in accordance with a specific embodiment.

FIG. 16A shows an example embodiment of a Smart Card Read Procedure 1600 in accordance with a specific embodiment. In at least one embodiment, at least a portion of the Smart Card Read Procedure 1600 may be initiated and/or implemented by a smart card such as, for example, smart card 1051 of FIG. 10B. In some embodiments, at least a portion of the Smart Card Read Procedure 1600 may be initiated and/or implemented by one or more other systems, devices, and/or controllers such as, for example, a gaming table master controller, a gaming machine master controller, a casino tracking system, etc.

For purposes of illustration, a specific embodiment of the Smart Card Read Procedure will be described by way of example with respect to FIG. 16A. In this particular example, it is assumed that the Smart Card Read Procedure 1600 is implemented at a smart card (e.g., 1051) which is carried by a patron who is located within the casino establishment.

At 1602, a "smart card read" operation may be triggered when an event or condition is detected which satisfies minimum threshold criteria for triggering a smart card read operation. According to different embodiments, examples of different types of events and/or conditions which may trigger a smart card read operation may include, but are not limited to, one or more of the following (or combinations thereof):

- Detection of appropriate locally generated signal(s). For example, in one embodiment, a local timer at the smart card may be configured or designed to periodically generate one or more "smart card read" signals which are suitable for triggering one or more smart card read operations at the smart card.
- Detection of appropriate externally generated signal(s). For example, in some embodiments, one or more external devices, systems, and/or components (such as, for example, a gaming table system, a gaming machine, a data collection unit, an intelligent wagering token, etc.) may automatically generate one or more "smart card read" signals or commands which are suitable for triggering one or more smart card read operations.

For example, according to different embodiments, one or more devices of the casino gaming network may be operable to monitor various types of events and/or conditions at the casino establishment, and may be operable to generate one or more "smart card read" signals (e.g., in response to detection of appropriate event(s)/condition(s) which meet the minimum threshold criteria for triggering a smart card read operation) for triggering one or more smart card read operations at a given smart card. According to different embodiments, examples of other types of events and/or conditions which may cause one or more external devices/components to generate appropriate signals for triggering a smart card read operation may include, but are not limited to, one or more of the following (or combinations thereof):

- Smart card location detected as being within specified range of a gaming device and/or gaming table.
- Smart card location detected as continuously being within specified range of a gaming device and/or gaming table for a given time interval.
- Smart card location detected as no longer being within specified range of a gaming device and/or gaming table.
- Time related events (e.g., random intervals, periodic intervals, expired timer, etc.).
- Game state events (e.g., beginning of a new table game/round/hand; initial deal period start/end event(s); player card draw/decision period start/end event(s); subsequent wager period start/end event(s); rake period start/end event(s); payout period start/end event(s); etc.).
- Detection of a change of the number of wagering token(s) possessed by the current owner of the smart card.
- Physical location of wagering token(s) detected as satisfying predetermined criteria.
- Appropriate manual input detected (e.g., dealer pushes button).
- Detection of other appropriate input/signal(s) from human and/or device(s).
- Specified time constraints detected as being satisfied.
- Start/close of player tracking session relating to the smart card and/or current owner of the smart card.
- Start/close of player rating session relating to the current owner of the smart card.
- Start/close of wagering token tracking session relating to the smart card and/or current owner of the smart card.
- Detection of one or more events, conditions and/or activities which meet or exceed specified "active state-related" threshold criteria (see, FIG. 12A).
- Detection of one or more events, conditions and/or activities which may result in loss or altering of information stored at the smart card.
- Detection of one or more unauthorized events, conditions and/or activities at the smart card.

Detection of one or more fault events or conditions at the smart card.

Detection of one or more events and/or conditions which may require the smart card to detect or communicate with one or more portable tracking devices. For example, in one embodiment, a timer mechanism at the smart card may be used to cause the smart card to periodically implement a wagering token polling procedure in which the smart card initiates one or more operations (e.g., via its internal RFID reader functionality) for polling or detecting the presence of one or more wagering tokens in order, for example, to identify wagering tokens which are currently in possession being carried by the patron and/or which are located within the patron's personal space, etc.

Detection of one or more events and/or conditions which may require the smart card to transmit and/or receive data to/from one or more external devices. For example, in at least one embodiment, the smart card may receive instructions from an external device (such as, for example, wagering token tracking system) to read or access information from one or more wagering tokens which have been detected by the smart card. In at least some embodiments, the smart card may receive instructions from the external device to cause specific information to be stored in local memory of one or more wagering tokens which have been detected by the smart card. In another embodiment, the smart card may receive a request from an intelligent wagering token to forward specific data (e.g., provided from the token to the smart card) to one or more specified external devices of the casino network.

Detection of one or more events and/or conditions which may require the smart card to generate device tracking information relating to one or more portable tracking devices which have been detected by the smart card.

Detection of one or more events and/or conditions which may require the smart card to store selected information within it local memory.

Etc.

In at least one embodiment, when an event or condition is detected which satisfies minimum threshold criteria for triggering a smart card read operation, one or more appropriate actions may be initiated (1604) for implementing and/or verifying desired smart card read start configuration parameters. According to specific embodiments, actions relating to implementation of the smart card read start configuration may include, but are not limited to, one or more of the following (or combinations thereof):

initializing one or more registers;

clearing selected memory locations within the system memory;

determining a current position or location of the smart card;

enabling and/or activating one or more transceivers for detecting and/or communicating with one or more wagering tokens;

disabling and/or deactivating one or more other transceivers;

determining whether collision avoidance procedures are currently in effect;

determining whether one or more collision avoidance procedures should be implemented when communicating with selected wagering tokens;

etc.

For example, in one embodiment, before performing one or more specific read operations, the smart card may initialize and/or configure an array of memory to store various types of information relating to the smart card read operations.

At 1606 it is assumed that the Relative Low Frequency transceiver of the smart card is enabled for communication with one or more intelligent wagering tokens. Additionally, in at least one embodiment, the system may also disable the Relative High Frequency transceiver (at least temporarily) if it is detected that the Relative High Frequency transceiver is enabled.

As shown at 1608, the smart card may initiate communication with one or more wagering tokens (such as, for example, intelligent wagering tokens which are currently in possession of the patron carrying the smart card).

In at least one embodiment, when the presence of a wagering token is detected by the smart card, the smart card may initiate a read of selected data from that wagering token. Examples of the various types of data which may be read from the wagering token may include, but are not limited to, one or more of the following (or combinations thereof):

wagering token ID;

wagering token value/denomination;

identify of current owner;

time/date of activation;

time/date of ownership transfer(s);

data relating to history ownership transfers;

promotional information;

wagering token status (e.g., battery voltage, read/write cycles, etc.)

encryption key or code information;

alternate communication channels, frequencies, timeslots, etc.;

serial number or token ID;

security/tamper codes;

tilt information;

collision avoidance information (such as, for example, back-off values, alternate communication channels, frequencies, timeslots, etc.);

timestamp information;

information relating to identities of previous owners of the token;

information relating to devices (e.g., RFID readers, etc.) which have communicated with the token;

information relating to signal strength criteria associated with one or more signals or readers detected by the token;

authentication information;

information relevant to a gaming property (e.g., casino name or identifying number);

historical information relating to use of the token;

other information disclosed herein;

etc.

Additionally, in at least one embodiment, the smart card may perform additional communications (and/or additional operations) with the detected wagering token such as, for example, one or more of the following (or combinations thereof):

writing specific data to the memory of wagering token, instructing the wagering token to perform one or more specific operations, etc.

As shown at 1610, data acquired during the wagering token read operation(s) (and/or other related information associated with the wagering token read operation) may be stored in memory. For example, in one embodiment, the acquired data and related information may be stored within local memory of the smart card. In one embodiment, data read or acquired from the wagering token may be stored in a memory array of the smart card microprocessor. Additionally, in some embodiments, other information relating to the wagering token read operation(s) may also be stored in the memory array and/or associated with the data read or acquired from the token. Examples of such related information may include, for example, one or more of the following (or combinations thereof):

- timestamp information,
- smart card position/location information,
- wagering token position/location information,
- other types of information disclosed herein,
- etc.

As shown at 1612, a determination may be made as to whether or not the smart card should perform additional wagering token detection/read operations. In at least one embodiment, if it is determined that the smart card should perform additional wagering token detection/read operations, the smart card may continue (1608) to communicate (e.g., detect, read data from, write data to, etc.) with one or more wagering tokens.

Alternatively, if it is determined (1612) that the smart card should not perform additional wagering token detection/read operations, the wagering token communication transceiver (e.g., Relative Low Frequency transceiver) of the smart card may be disabled (1614). Thereafter, in at least one embodiment, the Smart Card Read Procedure may await the next condition or event which satisfies minimum threshold criteria for triggering a smart card read operation.

According to different embodiments, various factors or criteria may be used in determining whether or not the smart card should perform additional wagering token detection/read operations at block 1616. Examples of such factors/criteria may include, but are not limited to, one or more of the following (or combinations thereof):

- Failures/Successes in detecting and/or communicating with wagering tokens.
- Timeout events/conditions detected.
- Error events/conditions detected.
- Etc.

Figure 16B:
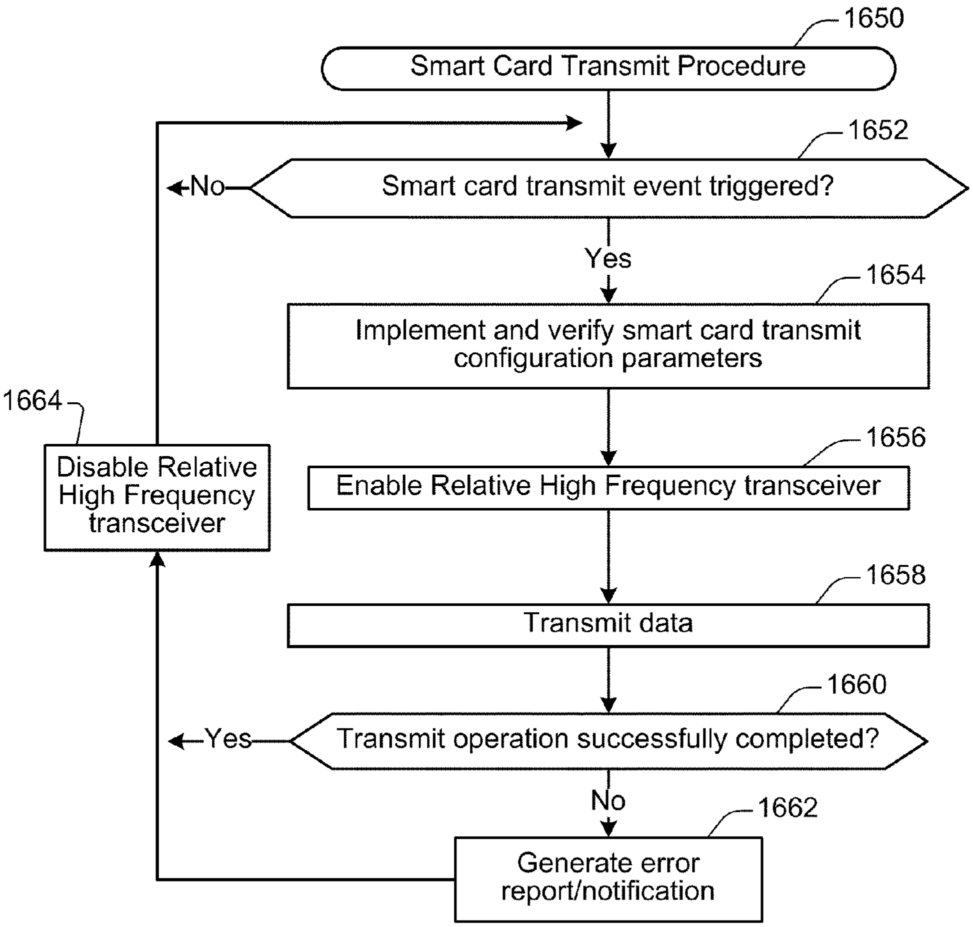
FIG. 16B shows an example embodiment of a Smart Car d Transmit Procedure 1650 in accordance with a specific embodiment.

FIG. 16B shows an example embodiment of a Smart Card Transmit Procedure 1650 in accordance with a specific embodiment. In at least one embodiment, at least a portion of the Smart Card Transmit Procedure 1650 may be initiated and/or implemented by a smart card such as, for example, smart card 1051 of FIG. 10B. In some embodiments, at least a portion of the Smart Card Transmit Procedure 1650 may be initiated and/or implemented by one or more other systems, devices, and/or controllers such as, for example, a gaming table master controller, a gaming machine master controller, a casino tracking system, etc.

For purposes of illustration, a specific embodiment of the Smart Card Transmit Procedure will be described by way of example with respect to FIG. 16B. In this particular example, it is assumed that the Smart Card Transmit Procedure 1650 is implemented at a smart card (e.g., 1051) which is carried by a patron who is located within the casino establishment.

At 1652, a "smart card transmit" operation may be triggered when an event or condition is detected which satisfies minimum threshold criteria for triggering a smart card transmit operation. According to different embodiments, examples of different types of events and/or conditions which trigger a smart card transmit operation may include, but are not limited to, one or more of the following (or combinations thereof):

- Detection of appropriate locally generated signal(s). For example, in one embodiment, a local timer at the smart card may be configured or designed to periodically generate one or more "smart card transmit" signals which are suitable for triggering one or more smart card transmit operations. In some embodiments, the smart card may be configured or designed to transmit selected information to one or more external devices/systems after completion of one or more "smart card read" operation(s).
- Detection of appropriate externally generated signal(s). For example, in one embodiment, a timer at the intelligent casino chip tray system may be configured or designed to periodically generate one or more "smart card transmit" signals which are suitable for triggering one or more smart card transmit operations. In some embodiments, one or more external controllers (such as, for example, a master table controller, intelligent chip tray controller, etc.) may automatically generate one or more "smart card transmit" signals or commands which are suitable for triggering one or more smart card transmit operations.

For example, according to different embodiments, one or more devices of the casino gaming network may be operable to monitor various types of events and/or conditions at the casino establishment, and may be operable to generate one or more "smart card transmit" signals (e.g., in response to detection of appropriate event(s)/condition(s) which meet the minimum threshold criteria for triggering a smart card transmit operation) for triggering one or more smart card transmit operations at a given intelligent casino chip tray system. According to different embodiments, examples of other types of events and/or conditions which may cause one or more external devices/components to generate appropriate signals for triggering a smart card transmit operation may include, but are not limited to, one or more of the following (or combinations thereof):

- Completion of one or more smart card read operation(s).
- New information/data acquired (e.g., during one or more smart card read operation(s)).
- Smart card location detected as being within specified range of a gaming device and/or gaming table.
- Smart card location detected as continuously being within specified range of a gaming device and/or gaming table for a given time interval.
- Smart card location detected as no longer being within specified range of a gaming device and/or gaming table.
- Time related events (e.g., random intervals, periodic intervals, expired timer, etc.).
- Game state events (e.g., beginning of a new table game/round/hand; initial deal period start/end event(s); player card draw/decision period start/end event(s); subsequent wager period start/end event(s); rake period start/end event(s); payout period start/end event(s); etc.).
- Detection of a change of the number of wagering token(s) possessed by the current owner of the smart card.
- Physical location of wagering token(s) detected as satisfying predetermined criteria.
- Appropriate manual input detected (e.g., dealer pushes button).
- Detection of other appropriate input/signal(s) from human and/or device(s).
- Specified time constraints detected as being satisfied.
- Start/close of player tracking session relating to the smart card and/or current owner of the smart card.
- Start/close of player rating session relating to the current owner of the smart card.
- Start/close of wagering token tracking session relating to the smart card and/or current owner of the smart card.

- Detection of one or more events, conditions and/or activities which meet or exceed specified "active state-related" threshold criteria (see, FIG. 12A).
- Detection of one or more events, conditions and/or activities which may result in loss or altering of information stored at the smart card.
- Detection of one or more unauthorized events, conditions and/or activities at the smart card.
- Detection of one or more fault events or conditions at the smart card.
- Detection of one or more events and/or conditions which may require the smart card to detect or communicate with one or more portable tracking devices. For example, in one embodiment, a timer mechanism at the smart card may be used to cause the smart card to periodically implement a wagering token polling procedure in which the smart card initiates one or more operations (e.g., via its internal RFID reader functionality) for polling or detecting the presence of one or more wagering tokens in order, for example, to identify wagering tokens which are currently in possession being carried by the patron and/or which are located within the patron's personal space, etc.
- Detection of one or more events and/or conditions which may require the smart card to transmit and/or receive data to/from one or more external devices. For example, in at least one embodiment, the smart card may receive instructions from an external device (such as, for example, wagering token tracking system) to read or access information from one or more wagering tokens which have been detected by the smart card. In at least some embodiments, the smart card may receive instructions from the external device to cause specific information to be stored in local memory of one or more wagering tokens which have been detected by the smart card. In another embodiment, the smart card may receive a request from an intelligent wagering token to forward specific data (e.g., provided from the token to the smart card) to one or more specified external devices of the casino network.
- Detection of one or more events and/or conditions which may require the smart card to generate device tracking information relating to one or more portable tracking devices which have been detected by the smart card.
- Detection of one or more events and/or conditions which may require the smart card to store selected information within it local memory.
- Detection of one or more events and/or conditions which may require the smart card to transmit (e.g., via wireless interface) selected information to one or more external devices/systems. For example, in at least one embodiment, the smart card may be configured or designed to periodically transmit selected information (e.g., stored in local memory) to one or more external devices/systems, such as, for example, a casino tracking system.
- Etc.

In at least one embodiment, when an event or condition is detected which satisfies minimum threshold criteria for triggering a smart card transmit operation, one or more appropriate actions may be initiated (1654) for implementing and/or verifying desired smart card transmit start configuration parameters. According to specific embodiments, actions relating to implementation of the smart card transmit start configuration may include, but are not limited to, one or more of the following (or combinations thereof):

- accessing selected memory locations within the smart card memory;
- determining current position or location of the smart card;
- enabling and/or activating one or more transceivers for detecting and/or communicating with one or more wagering tokens;
- disabling and/or deactivating one or more other transceivers;
- etc.

At 1656 it is assumed that the Relative High Frequency transceiver of the smart card is enabled. Additionally, in at least one embodiment, the system may also disable the Relative Low Frequency transceiver (at least temporarily) if it is determined that the Relative Low Frequency transceiver is enabled.

As shown at 1658, the smart card may transmit selected information to one or more external devices, components, systems. Examples of different external devices, components, and/or systems may include, but are not limited to, one or more of the following (or combinations thereof):

- gaming machine controllers;
- gaming table controllers;
- data collection units;
- casino tracking systems;
- intelligent casino chip tray systems;
- wireless devices (such as, for example, smart cards, portable security devices, etc.);
- and/or other desired devices/components/systems of the casino gaming network.

Examples of the various types of information which may be transmitted from the smart card may include, but are not limited to, one or more of the following (or combinations thereof):

- information relating to one or more smart card read operations (such as, for example, number of smart card read operations performed since last transmission, error information (if any), etc.)
- smart card ID;
- information relating to and/or acquired from one or more wagering tokens;
- total number of wagering tokens detected in chip tray;
- total monetary value of wagering tokens detected in chip tray;
- timestamp information;
- wagering token ID and associated position/location information;
- wagering token status information;
- encryption key or code information;
- alternate communication channels, frequencies, timeslots, etc.;
- security/tamper codes;
- security information;
- authentication information;
- information relevant to a gaming property (e.g., casino name or identifying number);
- other information disclosed herein;
- etc.

As shown at 1660, if it is detected that the smart card transmit operation has not successfully completed, appropriate error response operations may be initiated (e.g., 1662) such as, for example, generating and/or transmitting an error notification message to one or more external devices/systems.

In at least one embodiment, if it is detected that the smart card transmit operation has successfully completed, the Relative High Frequency transceiver of the smart card may be disabled (1664). Thereafter, in at least one embodiment, the Smart Card Transmit Procedure may await the next condition or event which satisfies minimum threshold criteria for triggering a smart card transmit operation.

Figure 17:
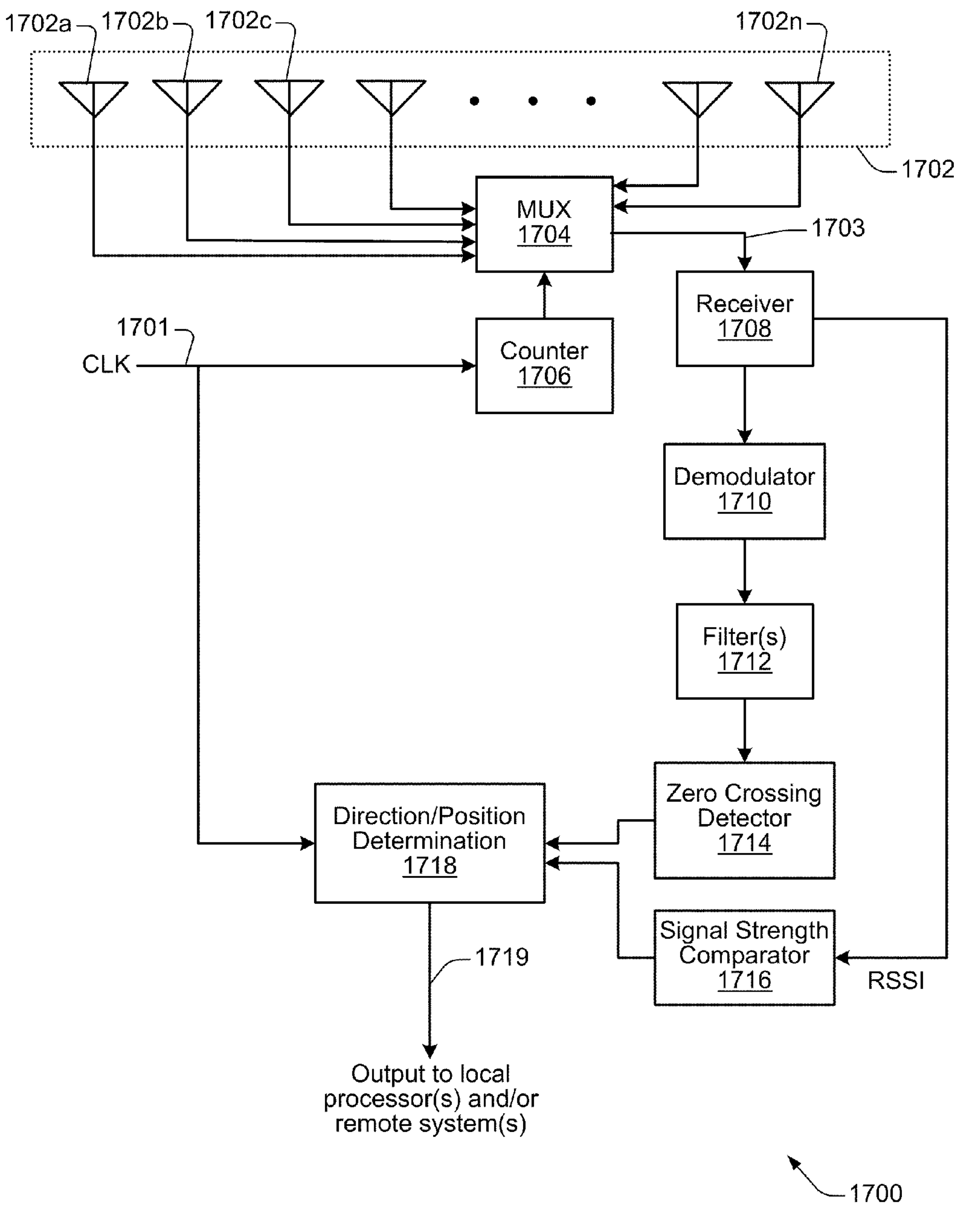
FIG. 17 shows a schematic block diagram of an example embodiment of an electrical switching system which may be used for implementing various aspects described herein.

FIG. 17 shows a schematic block diagram of an example electrical switching system 1700 in accordance with a specific embodiment. According to at least one embodiment, electrical switching system 1700 may be configured or designed to function as electrically switched Doppler antenna system (e.g., electrical Doppler radio direction finder) which, for example, may be used to stimulate, identify, and/or determine directional bearings of various wireless communication devices (WCDs) such as, for example, casino player tracking cards, wagering tokens, smart cards, and/or other wireless transponder devices within selected regions of the casino. Various example embodiments of electrical Doppler radio direction finders are described, for example, in U.S. patent application Ser. No. 11/726,633, entitled RADIO DIRECTION FINDER FOR GAMING CHIP AND/OR PLAYER TRACKING, by Mattice et al., filed Mar. 21, 2007, previously incorporated by reference for all purposes.

As illustrated in the example of FIG. 17, electrical switching system 1700 includes an antenna array 1702, which may be configured or designed to provide functionalities similar to a mechanically rotating Doppler antenna system. According to specific embodiments, the antenna array may include a plurality of individual antennas 1702$a$-$n$. The number of antennas in the antenna array 1702 may vary, depending upon desired design constraints. For example, in at least some embodiments, antenna array 1702 may include 6-12 antennas. In one embodiment, the antennas (e.g., 1702$a$-$n$) of the antenna array may be arranged in a circular configuration, and sequentially activated in a desired manner which approximates a virtual rotating antenna that is rotating at a specified frequency.

According to a specific embodiment, when an RF-enabled device (such as, for example, an RF-enabled player tracking card or intelligent wagering token) comes within range of the electronic switching system 1700, the RFID signals transmitted or detected from the RF-enabled device may be received at the antenna array 1702, and used to determine a directional position or location of the RF-enabled device.

It will be appreciated that other embodiments of the electrical switching system may be configured or designed for use with other types of wireless devices, wireless signal protocols and/or wireless signal frequencies. Examples of at least some wireless protocols may include, but are not limited to, one or more of the following (or combination thereof): 802.11 (WiFi), 802.15 (including Bluetooth™), 802.16 (WiMax), 802.22, Cellular standards such as CDMA, CDMA2000, WCDMA, Radio Frequency (e.g., RFID), Infrared, Near Field Magnetic communication protocols, etc. The communication devices may transmit electrical, electromagnetic and/or optical signals which carry wireless digital data streams and/or analog signals representing various types of information.

As illustrated in the embodiment of FIG. 17, a multi-input selectable switching device (e.g., MUX) 1704 may be used to selectively switch its output 1703 between each of the different input antenna signals. In one embodiment, a round-robin selection scheme may be used to select each of the antennas in a sequential manner such that, over a given time period, each antenna is periodically selected at specific time intervals. In at lease one embodiment, a clock signal 1701 (which, for example, may be derived using a local clock source and/or a remote clock source) and/or a counter may be used to facilitate switching activities implemented by MUX 1704. It at least one embodiment, the selection/deselection of an antenna may include switching the antenna on/off at desired time intervals.

According to a specific embodiment, one or more antennas of the antenna array 1702 may be configured or designed for optimal performance with respect to a specified frequency range. For example, in one embodiment, the antennas 1702$a$-$n$ may be specifically configured or designed to include features and/or characteristics which are optimal for receiving/detecting various wireless signals which may be transmitted by portable tracking devices such as, for example, RF-enabled wagering tokens, RF-enabled player tracking cards, RF-enabled smart cards, and/or other RF-enabled devices.

According to various embodiments, such signals may be within different frequency ranges and/or may be within predefined wavelength ranges such as, for example: the ultra-high frequency (UHF) range (e.g., 300-3000 MHz, 1 m-100 mm wavelength); super-high frequency (SHF) range (e.g., 3-30 GHz, 100 mm-10 mm wavelength); and/or other specifically defined frequencies or frequency ranges such as, for example: 9-135 kHz; 6.78 MHz; 13.56 MHz; 27.125 MHz; 40.680 MHz; 433.92 MHz; 869.0 MHz; 915.0 MHz; 2.45 GHz; 5.8 GHz; 24.125 GHz; etc.

According to specific embodiments, an anharmonic wireless communication technique may be used, for example, in which different signal frequencies are used to stimulate a wireless communication device and perform data communication with the wireless communication device. In at least one embodiment, the term anharmonic may refer to the use of multiple independent frequencies which are neither harmonics of each other nor sub-harmonics of each other.

For example, in at least one embodiment, the wireless communication device may correspond to an RF-enabled device (e.g., player tracking card, wagering token, etc.) which includes functionality for operating using one or more Near Field Magnetic communication protocols. In one embodiment, a "stimulation" signal may be transmitted to "stimulate" the RF-enabled device to transmit a response. For example, in one embodiment, the Doppler antenna system (e.g., electrical switching system 1700) may include a transmitter configured or designed to transmit magnetic energy to energize the transponder of the RF-enabled device. In one embodiment, the frequency that provides the magnetic energy to power the transponder may be anharmonic to the frequency of the signal generated and/or transmitted by the transponder of the RF-enabled device.

As an example, a frequency in the range of 9-135 kHz (e.g., 130.796 kHz) may be used to energize the RFID transponder of the RF-enabled device. The transponder may be configured or designed to transmit and/or receive data via signals having a frequency of about 13.56 MHz. It is noted that the frequency of 13.56 MHz is anharmonic to the 9-135 kHz magnetic frequency. In one embodiment, the bandwidth of the receiver (e.g., 1708) may be configured or designed to eliminate or filter out the lower frequencies (e.g., 9-135 kHz) that are used to energize the transponder.

According to a specific embodiment, the output of MUX 1704 may include a sinusoidal modulated signal, which may be provided to receiver 1708. In at least one embodiment, the receiver 1708 may be configured or designed as an FM receiver which is able to receive signals within specific frequency ranges such as, for example, UHF, SHF, and/or other desired frequency ranges. In at least one embodiment, receiver 1708 may be configured or designed to generate at least one output signal. For example, in one embodiment, receiver 1708 may be configured or designed to generate an FM output signal within a frequency range of 980-1500 Hz.

In one embodiment, the FM output from the receiver 1708 is then demodulated by demodulator 1710. If desired, the modulated and/or demodulated signal(s) may also be amplified using one or more amplifiers (not shown).

As illustrated in the embodiment of FIG. 17, the output of the demodulator 1710 may be processed by one or more filters 1712. Examples of various filters may include, but are not limited to, one or more of the following (or combination thereof): high pass filters, low pass filters, anti-aliasing filters, bandpass filters, Butterworth filters, Chebyshev filters, Bessel filters, Finite Impulse Response (FIR) filters, Infinite Impulse Response (IIR) filters, etc. According to different embodiments, some filters may be configured to function without use of an external clock source, while other filters may be configured to function using an external clock signal or other timing reference signal.

In one example embodiment, the output of the demodulator 1710 may be filtered using a high pass filter, the output from the high pass filter may then be filtered using a low pass filter, and the output from the low pass filter may then be applied to an anti-aliasing filter.

In one embodiment, the high pass filter may be configured or designed to have the following properties: 4 pole, corners at approximately 400 Hz, +20 dB gain.

In one embodiment, the low pass filter may be configured or designed to have the following properties: 8 pole, corners at approximately 500 Hz, 0 dB gain. In one embodiment, the low pass filter may be implemented using a Maxim MAX295 Butterworth switch capacitor filter. Further, in one embodiment, the low pass filter may be clocked, for example, using a 95 kHz clock signal.

In one embodiment, the anti-aliasing filter may be configured or designed to have the following properties: corner at approximately 1 KHz, 0 dB gain. According to specific embodiments, the a continuous anti-aliasing filter may be applied to other filtered output, for example, to eliminate clocking and/or switching spikes which may occur on the output of the low pass switch capacitor filter. In one embodiment, the anti-aliasing filter may be configured or designed to reduce the switching frequency of 25 KHz by −60 dB, and to reduce the output at 500 Hz to −0.3 dB.

According to specific embodiments, output from filter(s) 1712 may then be provided to a zero crossing detector 1714. According to a specific embodiment, the output of the zero crossing detector 1714 may be provided to Direction/Position Determination component 1718. In at least one embodiment, the Direction/Position Determination component 1718 may be operable to utilize the information output from the zero crossing detector 1714 to determine a directional position or location of the signal source (e.g., the source of signal(s) received at antenna array 1702).

In at least one embodiment, electronic switching system 1700 may optionally include a signal strength comparator component (e.g., 1716). In one embodiment, receiver 1708 may be further operable to generate an RSSI (Received Signal Strength Indicator) output which, for example, may be provided as input to the signal strength comparator component 1716. In one embodiment, the output from signal strength comparator component 1716 may be provided to Direction/Position Determination component 1718 for use in determining a directional position or location of the signal source.

According to specific embodiments, output from the Direction/Position Determination component 1718 may be provided to various local and/or remote components, devices and/or systems. For example, in one embodiment, output from the Direction/Position Determination component 1718 may be provided to a local processor for further processing and analysis. In another embodiment, output from the Direction/Position Determination component 1718 may be provided to a remote system (such as, for example, a player tracking system and/or wagering token tracking system) for further processing and/or analysis.

In at least one embodiment, the casino tracking system may include a network of switching systems (e.g., each having at least a portion of functionality similar to that of switching system 1700) which may be deployed at multiple different locations of a casino establishment. In at least one embodiment, this network of switching systems may be operable to stimulate, identify, track and/or communicate with various wireless communication devices such as, for example, casino player tracking cards, intelligent wagering tokens, smart cards, and/or other portable tracking devices within selected regions of the casino.

In at least some embodiments, the network of switching systems may be operable to engage in bi-directional wireless communication with one or more different portable tracking devices. For example, in one embodiment, a network of switching systems may be configured or designed to simultaneously or concurrently determine and track (e.g., in real time) the locations of multiple different smart cards located within selected regions of the casino. Additionally, in at least one embodiment, the network of switching systems may be configured or designed to transmit instructions, data, and/or other information to selected smart cards (and/or other portable tracking devices) within the casino, and may also be configured or designed to receive data and/or other information from selected smart cards (and/or other portable tracking devices) within the casino. Further, in at least one embodiment, one or more of the switching systems may be configured or designed to function as a relay or repeater device for facilitating exchange of information between a given smart card (and/or other portable tracking device) and given system/device of the casino network (such as, for example, a casino tracking system, a player tracking system, wagering token tracking system, a gaming table system, a security system, etc.)

Associations Between Wagering Tokens, Players, and/or Player Tracking Cards

As described previously, various embodiments disclosed herein provide different mechanisms for creating and tracking associations between wagering tokens, players/patrons, and/or player tracking cards (and/or other types of smart cards which may be carried by a player/patron). In at least one embodiment, one or more of the various techniques described herein may be used to periodically create, update, and/or verify information relating to wagering token-player associations, wagering token-smart card associations, and/or other types of associations disclosed or referenced herein.

For example, in at least one embodiment, an intelligent wagering token may be configured or designed to periodically sample and store updated information (e.g., in local wagering token memory) relating to identities of player tracking cards (and/or other intelligent wagering token reading/communication devices) which have communicated with the token, as well as associated signal strength information. This data may subsequently be used as a basis for determining, updating and/or verifying various wagering token-player associations.

In at least one embodiment, a smart card (e.g., player tracking card) may be configured or designed to periodically poll wagering tokens in its vicinity (e.g., to thereby take a “chip inventory snapshot” of chips currently being carried by a player/patron), and may also request ID/Signal strength data and/or other information from the tokens. In at least some situations (e.g., in non-crowded environments) the smart card closest to the tokens will be identified as having the strongest signal strength, which preferably will correspond to the smart card which is being carried by the same player/patron who is carrying the identified tokens.

In some embodiments, data relating to various types of associations (such as, for example, wagering token-player associations, wagering token-smart card associations, and/or other types of associations disclosed or referenced herein) may be created, updated, and/or verified using information relating to tracked movements (e.g., velocity, trajectory, direction, position/location, acceleration, displacement, etc.) of smart cards (e.g., player tracking cards) and wagering tokens (e.g., intelligent wagering tokens). For example, in at least one embodiment, movement data (e.g., relating to one or more of the following: velocity, trajectory, direction, position/location, acceleration, displacement, etc.) associated with one or more wagering tokens may be tracked and compared with tracked movement data associated with one or more player tracking cards in order to determine whether there are any associations or relationships between the various tracked entities. For example, in one embodiment where an identified group of wagering tokens are identified as being near a given player tracking card, and the movement data associated with the group of identified wagering tokens substantially matches movement data associated with the identified player tracking card, it may be likely that the identified group of wagering tokens and the identified player tracking card are both being carried by the same person. Accordingly, in at least one embodiment, such information may be used to create, update and/or verify various types of association data (such as, for example, wagering token-player associations, wagering token-player tracking card associations, and/or other types of associations disclosed or referenced herein).

In at least one embodiment, at gaming tables with automated game state tracking, during a game state where payout is to be made to Player A, any chips removed from the chip tray (and/or placed in the payout zone on the gaming table) may be associated with Player A.

In at least one embodiment, at gaming tables without automated game state tracking, chips (e.g., intended for payout to Player A) may be removed from the chip tray and placed in a gaming table payout region on the surface of the gaming table. Movement of the chips may be tracked such that, when Player A collects the chips and places the collected chips at his/her player station at the gaming table, associations may be made between the chips, the player station, the player's smart card, and/or the identity of the player occupying that player station (e.g., Player A). According to specific embodiments, the identity of the player at that player station may be determined, for example, by video camera, by smart card, by biometric ID, and/or other identification techniques.

In at least one embodiment, when a player (e.g., Player A) elects to purchase wagering tokens (e.g., at a gaming table and/or at a kiosk), the identity of the player may be determined (e.g., by video camera, by PT card, by biometric ID, and/or other identification techniques), and the chips issued to Player A may be associated with a unique identifier for Player A. In one embodiment, an identifier may be used for identifying Player A, and may be stored in the memory of each wagering token which that player receives (e.g., at the time of purchasing the wagering tokens and/or at other times).

Example Gaming Network Embodiment(s)

Figure 18:
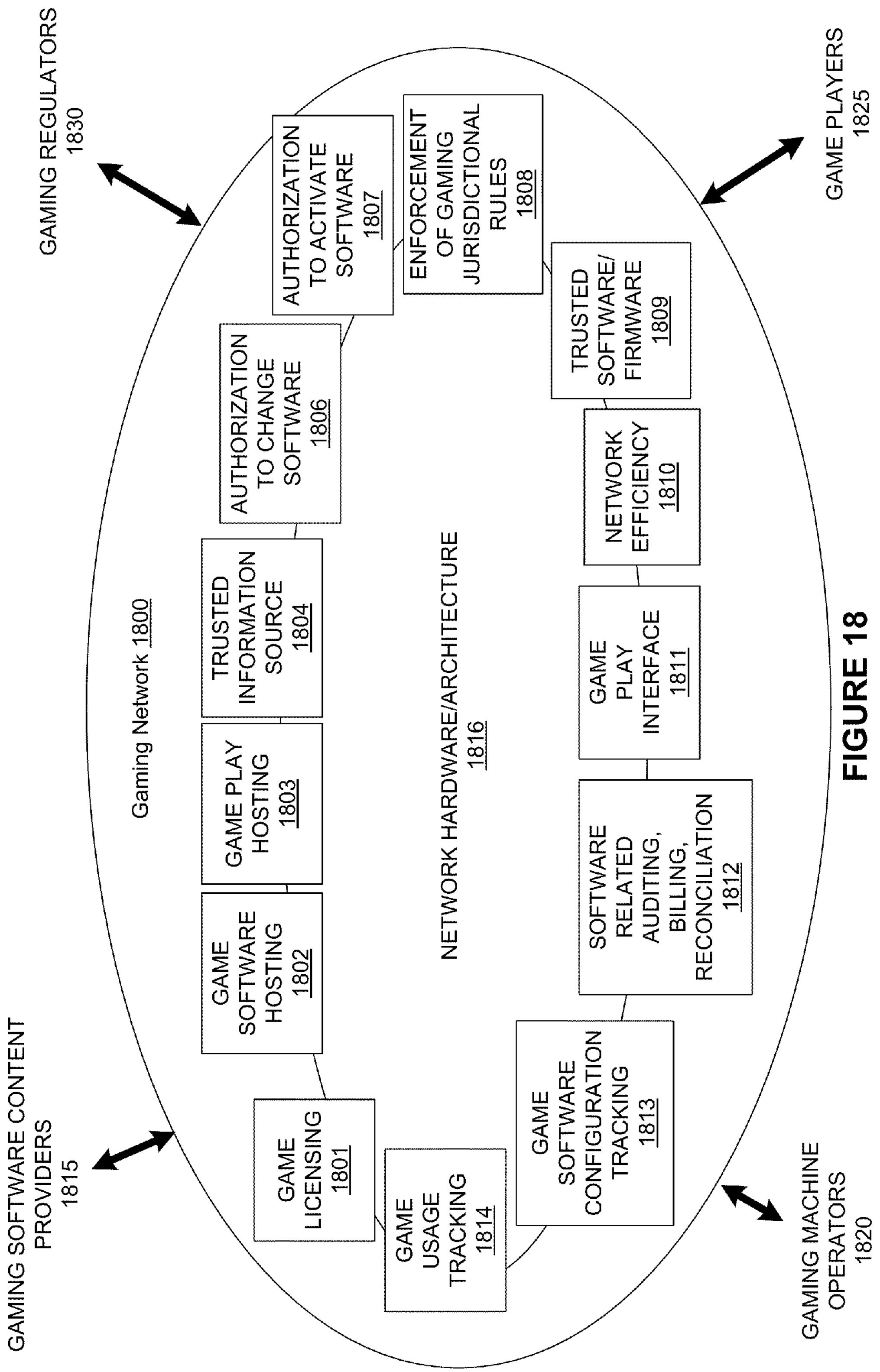
FIG. 18 shows a block diagram illustrating components of a gaming network 1800 which may be used for implementing various aspects of example embodiments.

FIG. 18 shows a block diagram illustrating components of a gaming network 1800 which may be used for implementing various aspects of example embodiments. In FIG. 18, the components of a gaming network 1800 for providing game software licensing and downloads are described functionally. The described functions may be instantiated in hardware, firmware and/or software and executed on a suitable device. In the system 1800, there may be many instances of the same function, such as multiple game play interfaces 1811. Nevertheless, in FIG. 18, only one instance of each function is shown. The functions of the components may be combined. For example, a single device may comprise the game play interface 1811 and include trusted memory devices or sources 1809.

The gaming network 1800 may receive inputs from different groups/entities and output various services and or information to these groups/entities. For example, game players 1825 primarily input cash or indicia of credit into the system, make game selections that trigger software downloads, and receive entertainment in exchange for their inputs. Game software content providers 1815 provide game software for the system and may receive compensation for the content they provide based on licensing agreements with the gaming machine operators. Gaming machine operators select game software for distribution, distribute the game software on the gaming devices in the system 1800, receive revenue for the use of their software and compensate the gaming machine operators. The gaming regulators 1830 may provide rules and regulations that must be applied to the gaming network and may receive reports and other information confirming that rules are being obeyed.

In the following paragraphs, details of each component and some of the interactions between the components are described with respect to FIG. 18. The game software license host 1801 may be a server connected to a number of remote gaming devices that provides licensing services to the remote gaming devices. For example, in other embodiments, the license host 1801 may 1) receive token requests for tokens used to activate software executed on the remote gaming devices, 2) send tokens to the remote gaming devices, 3) track token usage and 4) grant and/or renew software licenses for software executed on the remote gaming devices. The token usage may be used in utility based licensing schemes, such as a pay-per-use scheme.

In another embodiment, a game usage-tracking host 1814 may track the usage of game software on a plurality of devices in communication with the host. The game usage-tracking host 1814 may be in communication with a plurality of game play hosts and gaming machines. From the game play hosts and gaming machines, the game usage tracking host 1814 may receive updates of an amount that each game available for play on the devices has been played and on amount that has been wagered per game. This information may be stored in a database and used for billing according to methods described in a utility based licensing agreement.

The game software host 1802 may provide game software downloads, such as downloads of game software or game firmware, to various devious in the game system 1800. For example, when the software to generate the game is not available on the game play interface 1811, the game software host 1802 may download software to generate a selected game of chance played on the game play interface. Further, the game software host 1802 may download new game content to a plurality of gaming machines via a request from a gaming machine operator.

In one embodiment, the game software host 1802 may also be a game software configuration-tracking host 1813. The function of the game software configuration-tracking host is to keep records of software configurations and/or hardware configurations for a plurality of devices in communication with the host (e.g., denominations, number of paylines, paytables, max/min bets). Details of a game software host and a game software configuration host that may be used with example embodiments are described in co-pending U.S. Pat. No. 6,645,077, by Rowe, titled, "Gaming Terminal Data Repository and Information System," filed Dec. 21, 2000, which is incorporated herein in its entirety and for all purposes.

A game play host device 1803 may be a host server connected to a plurality of remote clients that generates games of chance that are displayed on a plurality of remote game play interfaces 1811. For example, the game play host device 1803 may be a server that provides central determination for a bingo game play played on a plurality of connected game play interfaces 1811. As another example, the game play host device 1803 may generate games of chance, such as slot games or video card games, for display on a remote client. A game player using the remote client may be able to select from a number of games that are provided on the client by the host device 1803. The game play host device 1803 may receive game software management services, such as receiving downloads of new game software, from the game software host 1802 and may receive game software licensing services, such as the granting or renewing of software licenses for software executed on the device 1803, from the game license host 1801.

In particular embodiments, the game play interfaces or other gaming devices in the gaming network 1800 may be portable devices, such as electronic tokens, cell phones, smart cards, tablet PC's and PDA's. The portable devices may support wireless communications and thus, may be referred to as wireless mobile devices. The network hardware architecture 1816 may be enabled to support communications between wireless mobile devices and other gaming devices in gaming network. In one embodiment, the wireless mobile devices may be used to play games of chance.

The gaming network 1800 may use a number of trusted information sources. Trusted information sources 1804 may be devices, such as servers, that provide information used to authenticate/activate other pieces of information. CRC values used to authenticate software, license tokens used to allow the use of software or product activation codes used to activate to software are examples of trusted information that might be provided from a trusted information source 1804. Trusted information sources may be a memory device, such as an EPROM, that includes trusted information used to authenticate other information. For example, a game play interface 1811 may store a private encryption key in a trusted memory device that is used in a private key-public key encryption scheme to authenticate information from another gaming device.

When a trusted information source 1804 is in communication with a remote device via a network, the remote device will employ a verification scheme to verify the identity of the trusted information source. For example, the trusted information source and the remote device may exchange information using public and private encryption keys to verify each other's identities. In another example of an embodiment, the remote device and the trusted information source may engage in methods using zero knowledge proofs to authenticate each of their respective identities. Details of zero knowledge proofs that may be used with example embodiments are described in US publication no. 2003/0203756, by Jackson, filed on Apr. 25, 2002 and titled, "Authentication in a Secure Computerized Gaming System", which is incorporated herein in its entirety and for all purposes.

Gaming devices storing trusted information might utilize apparatus or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

The gaming network 1800 of example embodiments may include devices 1806 that provide authorization to download software from a first device to a second device and devices 1807 that provide activation codes or information that allow downloaded software to be activated. The devices, 1806 and 1807, may be remote servers and may also be trusted information sources. One example of a method of providing product activation codes that may be used with example embodiments is describes in previously incorporated U.S. Pat. No. 6,264,561.

A device 1806 that monitors a plurality of gaming devices to determine adherence of the devices to gaming jurisdictional rules 1808 may be included in the system 1800. In one embodiment, a gaming jurisdictional rule server may scan software and the configurations of the software on a number of gaming devices in communication with the gaming rule server to determine whether the software on the gaming devices is valid for use in the gaming jurisdiction where the gaming device is located. For example, the gaming rule server may request a digital signature, such as CRC's, of particular software components and compare them with an approved digital signature value stored on the gaming jurisdictional rule server.

Further, the gaming jurisdictional rule server may scan the remote gaming device to determine whether the software is configured in a manner that is acceptable to the gaming jurisdiction where the gaming device is located. For example, a maximum bet limit may vary from jurisdiction to jurisdiction and the rule enforcement server may scan a gaming device to determine its current software configuration and its location and then compare the configuration on the gaming device with approved parameters for its location.

A gaming jurisdiction may include rules that describe how game software may be downloaded and licensed. The gaming jurisdictional rule server may scan download transaction records and licensing records on a gaming device to determine whether the download and licensing was carried out in a manner that is acceptable to the gaming jurisdiction in which the gaming device is located. In general, the game jurisdictional rule server may be utilized to confirm compliance to any gaming rules passed by a gaming jurisdiction when the information needed to determine rule compliance is remotely accessible to the server.

Game software, firmware or hardware residing a particular gaming device may also be used to check for compliance with local gaming jurisdictional rules. In one embodiment, when a gaming device is installed in a particular gaming jurisdiction, a software program including jurisdiction rule information may be downloaded to a secure memory location on a gaming machine or the jurisdiction rule information may be downloaded as data and utilized by a program on the gaming machine. The software program and/or jurisdiction rule information may used to check the gaming device software and software configurations for compliance with local gaming jurisdictional rules. In another embodiment, the software program for ensuring compliance and jurisdictional information may be installed in the gaming machine prior to its shipping, such as at the factory where the gaming machine is manufactured.

The gaming devices in game system 1800 may utilize trusted software and/or trusted firmware. Trusted firmware/software is trusted in the sense that is used with the assumption that it has not been tampered with. For instance, trusted software/firmware may be used to authenticate other game software or processes executing on a gaming device. As an example, trusted encryption programs and authentication programs may be stored on an EPROM on the gaming machine or encoded into a specialized encryption chip. As another example, trusted game software, i.e., game software approved for use on gaming devices by a local gaming jurisdiction may be required on gaming devices on the gaming machine.

In example embodiments, the devices may be connected by a network 1816 with different types of hardware using different hardware architectures. Game software can be quite large and frequent downloads can place a significant burden on a network, which may slow information transfer speeds on the network. For game-on-demand services that require frequent downloads of game software in a network, efficient downloading is essential for the service to viable. Thus, in example embodiments, network efficient devices 1810 may be used to actively monitor and maintain network efficiency. For instance, software locators may be used to locate nearby locations of game software for peer-to-peer transfers of game software. In another example, network traffic may be monitored and downloads may be actively rerouted to maintain network efficiency.

One or more devices in example embodiments may provide game software and game licensing related auditing, billing and reconciliation reports to server 1812. For example, a software licensing billing server may generate a bill for a gaming device operator based upon a usage of games over a time period on the gaming devices owned by the operator. In another example, a software auditing server may provide reports on game software downloads to various gaming devices in the gaming network 1800 and current configurations of the game software on these gaming devices.

At particular time intervals, the software auditing server 1812 may also request software configurations from a number of gaming devices in the gaming network. The server may then reconcile the software configuration on each gaming device. In one embodiment, the software auditing server 1812 may store a record of software configurations on each gaming device at particular times and a record of software download transactions that have occurred on the device. By applying each of the recorded game software download transactions since a selected time to the software configuration recorded at the selected time, a software configuration is obtained. The software auditing server may compare the software configuration derived from applying these transactions on a gaming device with a current software configuration obtained from the gaming device. After the comparison, the software-auditing server may generate a reconciliation report that confirms that the download transaction records are consistent with the current software configuration on the device. The report may also identify any inconsistencies. In another embodiment, both the gaming device and the software auditing server may store a record of the download transactions that have occurred on the gaming device and the software auditing server may reconcile these records.

There are many possible interactions between the components described with respect to FIG. 18. Many of the interactions are coupled. For example, methods used for game licensing may affect methods used for game downloading and vice versa. For the purposes of explanation, details of a few possible interactions between the components of the system 1800 relating to software licensing and software downloads have been described. The descriptions are selected to illustrate particular interactions in the game system 1800. These descriptions are provided for the purposes of explanation only and are not intended to limit the scope of example embodiments described herein.

Additional details relating to various aspects of gaming technology are described in one or more of the following references:

U.S. Provisional Patent Application Ser. No. 60/986,507, by Burrill et al., entitled "AUTOMATED TECHNIQUES FOR TABLE GAME STATE TRACKING," filed on Nov. 8, 2007, the entirety of which is incorporated herein by reference for all purposes;

U.S. Provisional Patent Application Ser. No. 60/987,276, by Wells et al., entitled "INTELLIGENT STAND ALONE MULTIPLAYER GAMING TABLE WITH ELECTRONIC DISPLAY," filed on Nov. 12, 2007, the entirety of which is incorporated herein by reference for all purposes;

U.S. patent application Ser. No. 11/938,179, by Wells et al., entitled "TRANSPARENT CARD DISPLAY," filed on Nov. 9, 2007, the entirety of which is incorporated herein by reference for all purposes;

U.S. patent application Ser. No. 11/515,184, by Nguyen et al., entitled "INTELLIGENT CASINO GAMING TABLE AND SYSTEMS THEREOF", filed on Sep. 1, 2006, the entirety of which is incorporated herein by reference for all purposes;

U.S. patent application Ser. No. 11/938,179, by Wells et al., entitled "TRANSPARENT CARD DISPLAY," filed on Nov. 9, 2007, the entirety of which is incorporated herein by reference for all purposes;

U.S. patent application Ser. No. 11/865,581, by Mattice et al., entitled "MULTI-USER INPUT SYSTEMS AND PROCESSING TECHNIQUES FOR SERVING MULTIPLE USERS," filed on Oct. 1, 2007, the entirety of which is incorporated herein by reference for all purposes;

U.S. Pat. No. 5,651,548, by French et al., entitled "GAMING CHIPS WITH ELECTRONIC CIRCUITS SCANNED BY ANTENNAS IN GAMING CHIP PLACEMENT AREAS FOR TRACKING THE MOVEMENT OF GAMING CHIPS WITHIN A CASINO APPARATUS AND METHOD", filed May 19, 1995, the entirety of which is incorporated herein by reference for all purposes.

U.S. Pat. No. 5,735,742, by French et al., entitled "GAMING TABLE TRACKING SYSTEM AND METHOD", filed Sep. 20, 1995, the entirety of which is incorporated herein by reference for all purposes.

This application is related to U.S. patent application Ser. No. 12/414,470, titled "INTELLIGENT PLAYER TRACKING CARD AND WAGERING TOKEN TRACKING TECHNIQUES", by MATTICE et al., filed concurrently herewith, the entirety of which is incorporated herein by reference for all purposes.

Techniques and mechanisms described or reference herein will sometimes be described in singular form for clarity. However, it should be noted that particular embodiments include multiple iterations of a technique or multiple instantiations of a mechanism unless noted otherwise.

Although several example embodiments of one or more aspects and/or features have been described in detail herein with reference to the accompanying drawings, it is to be understood that aspects and/or features are not limited to these precise embodiments, and that various changes and modifications may be effected therein by one skilled in the art without departing from the scope of spirit of the invention(s) disclosed herein.

It is claimed:

1. A wagering token adapted for use in a betting environment involving placement of wagers during wager-based game play, the wagering token comprising:

an outer body having a center portion, a rim portion, and a specific monetary denomination and amount designated on an outer surface thereof;

a first processor disposed within the outer body;

at least one transceiver including a first transceiver disposed within the outer body;

at least two antennas disposed within the outer body including a first antenna and a second antenna;

a rechargeable, portable power source disposed within the outer body;

memory disposed within the outer body; and a charging circuit disposed within the outer body and electrically coupled to the rechargeable, portable power source, the charging circuit being operable to recharge the rechargeable, portable power source by distributing power acquired from an external source; wherein the wagering token is configured to:

periodically sample and store updated information received from a plurality of RFID enabled smart cards, which have communicated directly with the wagering token, the updated information relating to identities of the smart cards, as well as associated signal strength information;

periodically acquire updated wagering token ownership information relating to an identity of a current owner of the wagering token, based on the sampled and stored updated information;

store, in the memory, at least a portion of the updated wagering token ownership information;

provide, to at least one external device, wireless access to a first selected portion of the updated wagering token ownership information stored in the memory.

2. The wagering token of claim 1:

wherein the first antenna is configured as a magnetic energy pickup antenna which is operable to receive wireless signals for use in performing magnetic induction, the magnetic energy pickup antenna being electrically coupled to the charging circuit;

wherein the magnetic energy pickup antenna is further operable to receive distribution of wireless power provided from the external source; and wherein the second antenna is configured as an EH antenna which is operable receive and transmit wireless signals associated with the selected frequency bands of an electromagnetic spectrum.

3. The wagering token of claim 1, wherein the wagering token is further configured to:

periodically acquire updated signal strength information relating to one or more detected wireless signals originating from one or more external devices;

store at least a portion of the updated signal strength information in the memory; and provide, to the at least one external device, wireless access to a first selected portion of the updated signal strength information stored in the memory.

4. The wagering token of claim 1, wherein the wagering token is further configured to:

detect wireless signals originating from one or more external device;

acquire external device identifier information relating to identities of the one or more external devices which have engaged in wireless communication with the wagering token;

store at least a portion of the external device identifier information in the memory; and provide, to the at least one external device, wireless access to a first selected portion of the external device identifier information stored in the memory.

5. The wagering token of claim 1, wherein the wagering token is further configured to:

periodically acquire updated wagering token ownership information relating to an identity of a current owner of the wagering token;

store at least a portion of the updated wagering token ownership information in the memory; and provide, to the at least one external device, wireless access to a first selected portion of the updated wagering token ownership information stored in the memory.

6. The wagering token of claim 1, wherein:

the updated wagering token ownership information includes timestamp data representing at least one first time when the updated wagering token ownership information was acquired by the wagering token;

and the wagering token is further configured to:

store, in the memory, token ownership history information relating to at least one identity of at least one previous owner of the wagering token, wherein the token ownership information history includes timestamp data representing at least one second time when the at least one previous owner of the wagering token was the current owner of the wagering token; and provide, to the at least one external device, wireless access to a first selected portion of the token ownership history information stored in the memory.

7. The wagering token of claim 1, wherein the wagering token is further configured to:

detect a first event or condition relating to a possible occurrence of a wagering token signal transmission collision; and automatically initiate, at the wagering token and in response to detection of the first event or condition, at least one first action relating to initiation of a first signal collision avoidance procedure at the wagering token.

8. The wagering token of claim 1, wherein the wagering token is further configured to:

operate in a first operating mode during a first time interval, wherein the first operating mode corresponds to a non-collision avoidance mode of operation;

engage in a first wireless communication with a first external device during the first time interval, wherein the first wireless communication is performed by the wagering token without use of a wireless signal collision avoidance mechanism;

detect a first event or condition relating to a possible occurrence of a wagering token signal transmission collision;

automatically initiate, at the wagering token and in response to detection of the first event or condition, at least one first action relating to initiation of a first signal collision avoidance procedure at the wagering token;

operate in a second operating mode during a second time interval, wherein the second operating mode corresponds to a collision avoidance mode of operation; and engage in second wireless communication with a second external device during the second time interval, wherein the second wireless communication is performed by the wagering token using the wireless signal collision avoidance mechanism.

9. The wagering token of claim 8, wherein the wagering token is further configured to provide, during the second time interval, an intentionally delayed answer signal in response to an interrogation signal from an outside RFID source.

10. The wagering token of claim 1, wherein the wagering token is further configured to:

detect an occurrence of a first event or condition; and automatically disable or deactivate the wagering token from use in wagering activities and wager-based game play activities in response to detecting the first event or condition.

11. The wagering token of claim 1:

wherein the first antenna is configured as a magnetic energy pickup antenna which is operable to receive wireless signals for use in performing magnetic induction, the magnetic energy pickup antenna being electrically coupled to the charging circuit;

the wagering token being further operable to:

automatically and dynamically electrically decouple the charging circuit from the rechargeable, portable power source in response to detecting a first event or condition;

generate, using the magnetic energy pickup antenna, signal strength information which includes wireless signal voltage data relating to voltage measurements of the wireless signals which are detected by the wagering token; and determine, using the wireless signal voltage data, received signal strength data corresponding to the wireless signals detected by the wagering token.

12. The wagering token of claim 1, wherein the smart cards are player tracking cards.

13. A method comprising:

periodically sampling and storing, with a wagering token, updated information received from a plurality of RFID enabled smart cards, which have communicated directly with the wagering token, the updated information relating to identities of the smart cards, as well as associated signal strength information, the wagering token comprising an outer body having a center portion, a rim portion, and a specific monetary denomination and amount designated on an outer surface thereof, at least one transceiver including a first transceiver disposed within the outer body, at least two antennas disposed within the outer body including a first antenna and a second antenna, a rechargeable, portable power source disposed within the outer body, a memory disposed within the outer body, and a charging circuit disposed within the outer body and electrically coupled to the rechargeable, portable power source, the charging circuit being operable to recharge the rechargeable, portable power source by distributing power acquired from an external source;

periodically acquiring updated wagering token ownership information relating to an identity of a current owner of the wagering token, based on the sampled and stored updated information;

storing, in the memory, at least a portion of the updated wagering token ownership information;

providing, to at least one external device, wireless access to a first selected portion of the updated wagering token ownership information stored in the memory.

14. The method of claim 13, wherein the first antenna is configured as a magnetic energy pickup antenna, the magnetic energy pickup antenna being electrically coupled to the charging circuit, the method further comprising:

receiving, via the magnetic energy pickup antenna, wireless signals for use in performing magnetic induction;

acquiring, at the wagering token, wireless power provided from the external source; and distributing the acquired wireless power to at least one internal component of the wagering token.

15. The method of claim 13 further comprising:

periodically acquiring, at the wagering token, updated signal strength information relating to one or more detected wireless signals originating from one or more external devices;

storing at least a portion of the updated signal strength information in the memory; and providing, to the at least one external device, wireless access to a first selected portion of the updated signal strength information stored in the memory.

16. The method of claim 13 further comprising:

detecting wireless signals originating from one or more external devices;

acquiring external device identifier information relating to identities of the one or more external devices which have engaged in wireless communication with the wagering token;

storing at least a portion of the external device identifier information in the memory; and providing, to the at least one external device, wireless access to a first selected portion of the external device identifier information stored in the memory.

17. The method of claim 13 further comprising:

periodically acquiring updated wagering token ownership information relating to an identity of a current owner of the wagering token;

storing at least a portion of the updated wagering token ownership information in the memory, wherein the updated wagering token ownership information includes timestamp data representing at least one first time when the updated wagering token ownership information was acquired by the wagering token;

storing, in the memory, token ownership history information relating to at least one identity of at least one previous owner of the wagering token, wherein the token ownership information history includes timestamp data representing at least one second time when the at least one previous owner of the wagering token was the current owner of the wagering token;

providing, to the at least one external device, wireless access to a first selected portion of the updated wagering token ownership information stored in the memory; and providing, to at least one external device, wireless access to a first selected portion of the token ownership history information stored in the memory.

18. The method of claim 13 further comprising:

detecting a first event or condition relating to a possible occurrence of a wagering token signal transmission collision; and automatically initiating, at the wagering token and in response to detection of the first event or condition, at least one first action relating to initiation of a first signal collision avoidance procedure at the wagering token.

19. The method of claim 13 further comprising:

operating in a first operating mode during a first time interval, wherein the first operating mode corresponds to a non-collision avoidance mode of operation;

engaging in a first wireless communication with a first external device during the first time interval, wherein the first wireless communication is performed by the wagering token without use of a wireless signal collision avoidance mechanism;

detecting a first event or condition relating to a possible occurrence of a wagering token signal transmission collision;

automatically initiating, at the wagering token and in response to detection of the first event or condition, at least one first action relating to initiation of a first signal collision avoidance procedure at the wagering token;

operating in a second operating mode during a second time interval, wherein the second operating mode corresponds to a collision avoidance mode of operation; and engaging in second wireless communication with a second external device during the second time interval, wherein the second wireless communication is performed by the wagering token using the wireless signal collision avoidance mechanism.

20. The method of claim 19 further comprising:

providing, during the second time interval, an intentionally delayed answer signal in response to an interrogation signal from an outside RFID source.

21. The method of claim 13 further comprising:

detecting an occurrence of a first event or condition; and automatically disabling or deactivating the wagering token from use in wagering activities and wager-based game play activities in response to detecting the first event or condition.

22. The method of claim 13, wherein the first antenna is configured as a magnetic energy pickup antenna, the magnetic energy pickup antenna being electrically coupled to the charging circuit, the method further comprising:

automatically and dynamically electrically decoupling the charging circuit from the rechargeable, portable power source in response to detecting a first event or condition;

generating, using the magnetic energy pickup antenna, signal strength information which includes wireless signal voltage data relating to voltage measurements of one or more different wireless signals which are detected by the wagering token; and determining, using the wireless signal voltage data, received signal strength data corresponding to the one or more of the different wireless signals detected by the wagering token.

23. The method of claim 13, wherein the smart cards are player tracking cards.

* * * * *